(12) United States Patent
Laut et al.

(10) Patent No.: US 12,187,944 B2
(45) Date of Patent: Jan. 7, 2025

(54) LIQUID-CRYSTAL MEDIUM

(71) Applicant: Merck Patent GmbH, Darmstadt (DE)

(72) Inventors: Sven Christian Laut, Darmstadt (DE); Tzu-Huan Tseng, Taipei (TW); Kuang-Ting Chou, Taipei (TW); Chi-Shun Huang, Taipei (TW)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 18/200,834

(22) Filed: May 23, 2023

(65) Prior Publication Data

US 2023/0383186 A1 Nov. 30, 2023

(30) Foreign Application Priority Data

May 31, 2022 (EP) .................................... 22176299

(51) Int. Cl.
| | | |
|---|---|---|
| *G02F 1/1333* | (2006.01) | |
| *C09K 19/06* | (2006.01) | |
| *C09K 19/12* | (2006.01) | |
| *C09K 19/30* | (2006.01) | |
| *C09K 19/54* | (2006.01) | |

(52) U.S. Cl.
CPC ........ *C09K 19/3003* (2013.01); *C09K 19/063* (2013.01); *C09K 19/12* (2013.01); *C09K 19/3048* (2013.01); *C09K 19/3066* (2013.01); *C09K 19/3098* (2013.01); *C09K 19/54* (2013.01); *C09K 2019/122* (2013.01); *C09K 2019/123* (2013.01); *C09K 2019/3009* (2013.01); *C09K 2019/301* (2013.01); *C09K 2019/3016* (2013.01); *C09K 2019/3053* (2013.01); *C09K 2019/3054* (2013.01); *C09K 2019/3096* (2013.01)

(58) Field of Classification Search
CPC .. C09K 19/3003; C09K 19/063; C09K 19/12; C09K 19/3048; C09K 19/3066; C09K 19/3098; C09K 19/54; C09K 2019/122; C09K 2019/123; C09K 2019/3009; C09K 2019/301; C09K 2019/3016; C09K 2019/3053; C09K 2019/3054; C09K 2019/3096; G02F 1/1333
See application file for complete search history.

(56) References Cited

U.S. PATENT DOCUMENTS

| | | | | |
|---|---|---|---|---|
| 7,445,819 B2 * | 11/2008 | Czanta | ................... | C09K 19/42 |
| | | | | 252/299.61 |
| 2006/0238696 A1 * | 10/2006 | Wen | ....................... | C09K 19/02 |
| | | | | 349/187 |

FOREIGN PATENT DOCUMENTS

| | | | | | |
|---|---|---|---|---|---|
| EP | 1 477 547 B1 | * | 6/2006 | ............. | C09K 19/58 |
| JP | 5036929 B2 | * | 9/2012 | ............. | C09K 19/02 |

OTHER PUBLICATIONS

Machine translation of JP-5036929-B2 (Year: 2024).*

* cited by examiner

*Primary Examiner* — Geraldina Visconti
(74) *Attorney, Agent, or Firm* — Millen, White, Zelano, & Branigan; Csaba Henter

(57) ABSTRACT

A liquid-crystal (LC) medium which is based on a mixture of polar compounds and is substantially dielectrically neutral, its use for optical, electro-optical and electronic purposes, in particular as optical retarder or optical compensator in LC displays, an optical retarder or optical compensator containing the LC medium, an optical, electrooptical or electronic device containing the optical retarder or optical compensator, and a process of manufacturing the optical retarder or optical compensator.

20 Claims, 2 Drawing Sheets

LIQUID-CRYSTAL MEDIUM

The present invention relates to a liquid-crystal (LC) medium which is based on a mixture of polar compounds and is substantially dielectrically neutral, to its use for optical, electro-optical and electronic purposes, in particular as optical retarder or optical compensator in LC displays, to an optical retarder or optical compensator comprising the LC medium, to an optical, electrooptical or electronic device comprising the optical retarder or optical compensator, and to a process of manufacturing the optical retarder or optical compensator.

The performance of a liquid crystal display (LCD) is based mainly on its response time, contrast, color, transmittance and reliability. To obtain best picture quality, also from different viewing angles, optical retardation or compensation films are typically used to compensate intrinsic display challenges and improve the optical properties of the LCD, such as the contrast ratio and the grey scale representation at large viewing angles.

Depending on the LCD mode, various types of compensators can be used, such as A plate, C plate or O plate compensators or any combination thereof.

In prior art polymer films made from polymerizable mesogenic compounds, also known as reactive mesogens or RMs, are suggested for use as optical retarders or compensators. Solutions of RMs or RM mixtures are commercially available which can be spin-coated and photopolymerised to provide a birefringent polymer film. In addition, photoalignment techniques may be applied to create films with patterned structure. By varying the coating conditions, it is possible to produce films of different thickness and so to produce for example half-wave or quarter wave retardation films.

Such birefringent polymer films can have advantages in processability, but still their usage can be difficult when applied in an LC display cell. For example, the manufacture of the RM layers requires UV treatment. Moreover, because the orientation and thickness of the RM layer is fixed by photopolymerization, different RM layers are needed for each type of retarder, e.g. A or C plate, and for each desired retardation value.

It is therefore an object of the present invention to provide improved optical retarders or optical compensators for use in LC displays, which do not exhibit the disadvantages described above or only do so to a small extent and have improved properties, and especially enable a wide viewing angle without significant loss of brightness.

A further object of the invention is to improved LC displays with good transmission and brightness, a high reliability, a broad working-temperature range, short response times, a low threshold voltage, a multiplicity of grey levels, a high contrast and a broad viewing angle.

It was found that one or more of these objects could be achieved by providing an LC medium as disclosed and claimed hereinafter.

Thus, it was surprisingly found that an LC medium according to the present invention, which comprises both dielectrically positive and dielectrically negative compounds, which are mixed in such proportions that the overall dielectrical anisotropy $\Delta\varepsilon$ of the LC medium is zero or close to zero, can be used as optical compensator in an LC display, especially to improve the viewing angle dependency of the display without affecting the other properties. Due to $\Delta\varepsilon$ being substantially zero, the LC mixture which is used as compensator does not switch and change its alignment under the applied electric field which is naturally present during operation of the display.

The alignment of the LC molecules in a layer of a LC mixture according to the present invention, e.g. planar or homeotropic alignment, can be controlled by an alignment layer that is in contact with the LC mixture. Depending on the chosen alignment, an +A plate or +C plate retarder can thus be realized using the same LC medium. By changing the birefringence $\Delta n$ of the LC mixture, e.g. via special mixture design, it is possible to adapt the retardation of the LC mixture to common cell gaps of the displays to realize the desired application, e.g. as quarter wave plate. In addition to this, the permittivity of the layer of the LC mixture can be adjusted by special mixture design. Also, the use of polymerizable compounds or RMs and corresponding polymerization techniques is not required.

The present invention thus relates to an LC medium which has a dielectric anisotropy $\Delta\varepsilon$ from −0.5 to +0.5, preferably from −0.3 to +0.3, more preferably from −0.1 to +0.1, very preferably from −0.05 to 0.05, most preferably of 0, determined at 20° C. and 1 kHz, and wherein the LC medium shows uniform alignment, preferably either planar or homeotropic alignment, and preferably does not contain polymerized or polymerizable components.

The invention further relates to an LC medium which comprises a first component A which has a dielectric anisotropy $\Delta\varepsilon$ of ≥+0.5, and a second component B which has a dielectric anisotropy $\Delta\varepsilon$ of ≤−0.5, wherein the proportions of the components A and B are selected such that the resulting dielectric anisotropy $\Delta\varepsilon$ of the LC medium is from −0.5 to +0.5, preferably from −0.3 to +0.3, more preferably from −0.1 to +0.1, very preferably from −0.05 to 0.05, most preferably of 0, determined at 20° C. and 1 kHz, wherein the LC medium shows uniform alignment, preferably either planar or homeotropic alignment, and which does preferably not contain polymerized or polymerizable components.

Preferably the LC medium comprising components A and B further comprises a third component C which has a dielectric anisotropy $\Delta\varepsilon$ from −0.5 to +0.5, wherein the proportions of the components A, B and C are selected such that the resulting dielectric anisotropy $\Delta\varepsilon$ of the LC medium is from −0.5 to +0.5, preferably from −0.3 to +0.3, more preferably from −0.1 to +0.1, very preferably from −0.05 to 0.05, most preferably of 0, determined at 20° C. and 1 kHz.

The invention further relates to a layer of an LC medium as described above and below which is situated between two substrates, which are preferably plane parallel and preferably transparent, and wherein one or both of the substrates is(are) preferably equipped with an alignment layer that provides the desired alignment in the LC medium.

The invention further relates to the use of an LC medium as described above and below as or in an optical retarder or optical compensator.

The LC medium is preferably not subjected to an electric field during its use, and preferably has uniform alignment, very preferably planar or homeotropic alignment, which preferably does not change during its use.

The invention further relates to an optical retarder or optical compensator comprising a layer of an LC medium as described above and below which has a dielectric anisotropy from −0.5 to +0.5, more preferably from −0.3 to +0.3, very preferably from −0.1 to +0.1, very particularly preferably from −0.05 to 0.05, most preferably of 0, determined at 20° C. and 1 kHz, which has uniform alignment, preferably planar or homeotropic alignment, and which preferably does not contain polymerized or polymerizable components.

In particular the invention relates to an optical retarder or compensator comprising two transparent, plane parallel substrates, between which is provided a layer of an LC medium as described above and below, and wherein each of the substrates is preferably equipped with alignment layer at the side facing the layer of the LC medium. Preferably the alignment of the LC molecules is uniform throughout the layer, and is either homeotropic or planar.

The invention further relates to the use of an LC medium or an optical retarder or optical compensator as described above and below, preferably as viewing angle compensator, in optical, electrooptical or electronic components or devices, preferably in electrooptical displays like LC displays or organic light emitting diodes (OLEDs).

The invention further relates to an optical, electrooptical or electronic component or device comprising an LC medium or comprising an optical retarder or optical compensator as described above and below.

Said components include, without limitation, optical retardation films, polarizers, compensators, beam splitters, reflective films, antistatic protection sheets, electromagnetic interference protection sheets, polarization controlled lenses for example for autostereoscopic 3D displays, IR reflection films for example for window applications, spatial light modulators, and lenses for light guides, focusing or other optical effects, eg. 3D, holography, telecomms.

Said devices include, without limitation, electrooptical displays, preferably LC displays, autostereoscopic 3D displays, OLEDs, optical data storage devices, goggles for AR/VR applications and smart windows, very preferably LC displays or OLEDs.

The invention furthermore relates to the use of an LC medium, an optical retarder or optical compensator or of an LC display as described above and below for an energy-saving LC display.

Figure 1:
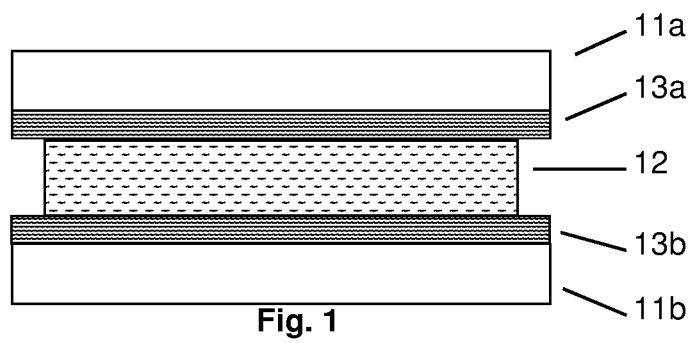
FIG. 1 schematically and exemplarily illustrates a retarder according to the present invention.

An alkenyl group in the compounds of formula IA to IE and IIa to IID or other components of the LC medium as disclosed below is not considered to be within the meaning of the term "polymerizable group" as used herein. The conditions for the polymerization of the polymerizable compounds of the LC medium are preferably selected such that alkenyl substituents do not participate in the polymerization reaction. Preferably the LC media disclosed and claimed in the present application do not contain an additive that initiates or enhances the participation of the alkenyl group in a polymerization reaction.

Unless stated otherwise, the compounds as disclosed above and below, except for the chiral dopants, are preferably selected from achiral compounds.

As used herein, the term "dielectrically positive compounds" denotes compounds having a $\Delta\varepsilon > 1.5$, the term "dielectrically neutral compounds" denotes compounds having $-1.5 \leq \Delta\varepsilon \leq 1.5$ and the term "dielectrically negative compounds" denotes compounds having $\Delta\varepsilon < -1.5$.

Unless stated otherwise, the dielectric anisotropy of the compounds as disclosed herein is determined by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.3 V to 1.0 V, but is always lower than the capacitive threshold of the respective liquid-crystal mixture investigated.

Unless stated otherwise, the values of the dielectric anisotropy $\Delta\varepsilon$ as mentioned herein are those determined at 20° C. and 1 kHz.

As used herein, the term "director" means the preferred alignment direction of the long molecular axes (in case of calamitic compounds) or short molecular axis (in case of discotic compounds) of the LC molecules in an LC material.

In a layer or film comprising uniaxially positive birefringent LC material the optical axis is given by the director.

As used herein, the terms "homeotropic alignment" and "homeotropic orientation" refer to a layer or film wherein the optical axis is substantially perpendicular to the film plane.

As used herein, the terms "planar alignment" and "planar orientation" refer to a layer or film wherein the optical axis is substantially parallel to the film plane.

As used herein, the terms "uniform alignment" and "uniform orientation" refer to an LC medium, for example in a layer or film, wherein the alignment direction of the LC molecules is substantially constant, e.g. planar or homeotropic, throughout the LC medium. However, slight deviations from the uniform alignment may occur for example for LC molecules that are close to the interfaces with the substrates.

As used herein, the term "A plate" refers to an optical retarder utilizing a layer of uniaxially birefringent material with its extraordinary axis oriented parallel to the plane of the layer, and its ordinary axis (also called 'a-axis') oriented perpendicular to the plane of the layer, i.e. parallel to the direction of normally incident light.

As used herein, the term "C plate" refers to an optical retarder utilizing a layer of uniaxially birefringent material with its extraordinary axis (also called 'c-axis') perpendicular to the plane of the layer, i.e. parallel to the direction of normally incident light.

As used herein, the term "O plate'" refers to an optical retarder utilizing a layer of a uniaxially birefringent material with its extraordinary axis oriented at an oblique angle with respect to the plane of the layer.

In A plates, C plates and O plates comprising optically uniaxial birefringent LC material with uniform alignment, the optical axis of the film is given by the direction of the extraordinary axis.

An A plate, C plate or O plate comprising optically uniaxial birefringent material with positive birefringence is also referred to as "+A/C/O plate" or "'positive A/C/O plate". An A plate or C plate comprising a film of optically uniaxial birefringent material with negative birefringence is also referred to as "−A/C/O plate" or "negative A/C/O plate".

Unless stated otherwise, the term "polarisation direction" or "optical axis" of a linear polariser means the polariser extinction axis. In case of stretched plastic polariser films comprising e.g. dichroic iodine based dyes the extinction axis usually corresponds to the stretch direction.

As used herein, the terms "quarter wave retarder" and "quarter wave plate", also abbreviated as "QWF", refer to a layer or film having an optical retardation of λ/4, and the terms "half wave retarder" and "half wave plate", also abbreviated as "HWF", refer to a layer or film having an optical retardation of λ/2, wherein λ is the wavelength of incident light. The terms "achromatic quarter wave retarder" and "achromatic quarter wave plate", also abbreviated as "AQWF", refer to a QWF with a retardation that has low or no dependence on the wavelength of the incident light.

The retardation R of a retarder, e.g. a QWF, HWF or AQWF, comprising an LC layer is defined as $$R = d \cdot \Delta n \qquad (1)$$

wherein d is the thickness and $\Delta n$ is the birefringence of the layer.

The birefringence $\Delta n$ is defined as follows $$\Delta n = n_e - n_o \qquad (2)$$

wherein $n_e$ is the extraordinary refractive index and $n_o$ is the ordinary refractive index, and the average refractive index $n_{av.}$ is given by the following equation:

$$n_{av.} = ((2n_o^2 + n_e^2)/3)^{1/2} \qquad (3)$$

The average refractive index $n_{av.}$ and the ordinary refractive index $n_o$ can be measured using an Abbe refractometer. $\Delta n$ can then be calculated from the above equations.

In case of doubt the definitions as given in C. Tschierske, G. Pelzl and S. Diele, Angew. Chem. 2004, 116, 6340-6368 shall apply.

Above and below,

denotes a trans-1,4-cyclohexylene ring, and

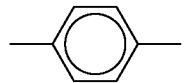

denotes a 1,4-phenylene ring.

In a group

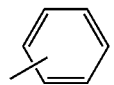

the single bond shown between the two ring atoms can be attached to any free position of the benzene ring.

If in the formulae shown above and below a terminal group like R, $R^0$, $R^1$, $R^2$, $R^{11,12,13}$, $R^{21,22}$, $R^{31,32}$, $R^{41,42}$, $R^{51,52}$, $R^{61,62}$, $R^{71,72}$, $R^{81,82,83}$, $R^Q$, R, $R^M$, $R^S$, $R^{S1,S2,S3,S4}$ or L denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

If one of the aforementioned terminal groups denotes an alkyl radical wherein one or more $CH_2$ groups are replaced by S, this may be straight-chain or branched. It is preferably straight-chain, has 1, 2, 3, 4, 5, 6 or 7 C atoms and accordingly preferably denotes thiomethyl, thioethyl, thiopropyl, thiobutyl, thiopentyl, thiohexyl or thioheptyl.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If one of the aforementioned terminal groups denotes an alkoxy or oxaalkyl group it may also contain one or more additional oxygen atoms, provided that oxygen atoms are not linked directly to one another.

If one of the aforementioned terminal groups denotes an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If one of the aforementioned terminal groups denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In another preferred embodiment, one or more of the aforementioned terminal groups, like $R^{1A, 2A}$, $R^1$, $R^2$, $R^{11, 12, 13}$, $R^{31,32}$, $R^{41,42}$, $R^{51,52}$, $R^{61,62}$, $R^{71,72}$, $R^{81,82,83}$, $R^Q$, $R^O$, R, $R^M$, $R^S$, $R^{S1,S2,S3,S4}$ or L are selected from the group consisting of

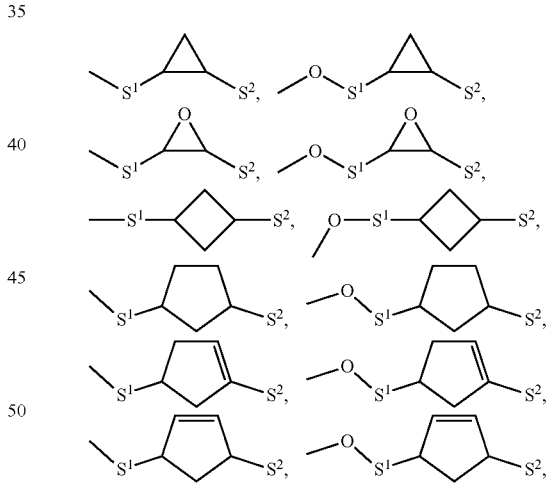

—$S^1$—F, —O—$S^1$—F, —O—$S_1$—O—$S_2$, wherein $S^1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

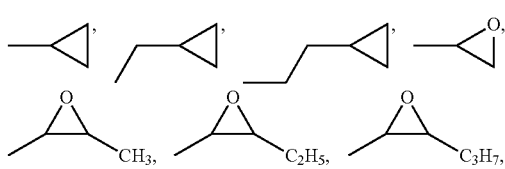

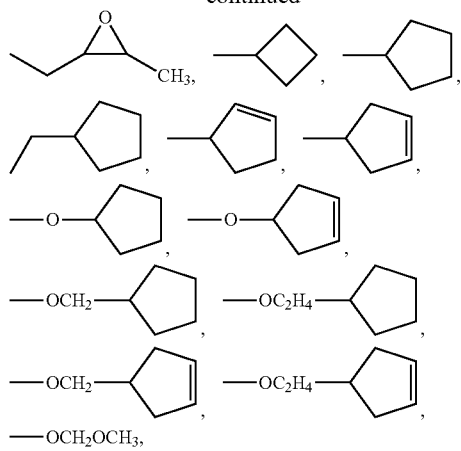

—O(CH$_2$)$_3$OCH$_3$, —O(CH$_2$)$_4$OCH$_3$, —O(CH$_2$)$_2$F, —O(CH$_2$)$_3$F, —O(CH$_2$)$_4$F.

Halogen is preferably F or Cl, very preferably F.

The group —CR$^0$=CR$^{00}$— is preferably —CH=CH—. —CO—, —C(=O)— and —C(O)— denote a carbonyl group, i.e.

Preferred substituents L, are, for example, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or C, optionally substituted silyl having 1 to 20 Si atoms, or optionally substituted aryl having 6 to 25, preferably 6 to 15, C atoms, wherein R$^x$ denotes H, F, Cl, CN, or straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P- or P-Sp-, and Y$^1$ denotes halogen.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

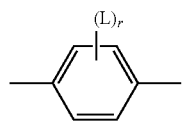

is preferably

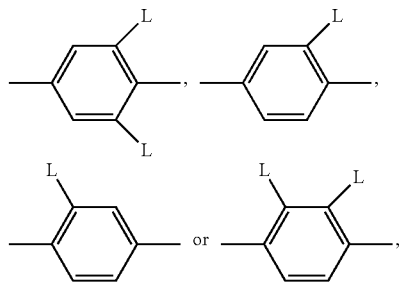

in which L has one of the meanings indicated above.

In a preferred embodiment of the present invention, the LC medium comprises a first component A which is dielectrically positive and preferably has a dielectric anisotropy Δε of ≥+0.5, and a second component B which is dielectrically negative and preferably has a dielectric anisotropy Δε of ≤−0.5, and optionally a third component C which is dielectrically neutral and preferably has a dielectric anisotropy Δε from −0.5 to +0.5. The proportions of the components A, B and C are chosen such that the resulting dielectric anisotropy Δε of the LC medium is from −0.5 to +0.5, preferably from −0.3 to +0.3, more preferably from −0.1 to +0.1, very preferably from −0.05 to +0.05, most preferably 0.

Component A preferably comprises one or more compounds selected from the group consisting of formulae IA, IB, IC, ID and IE IA
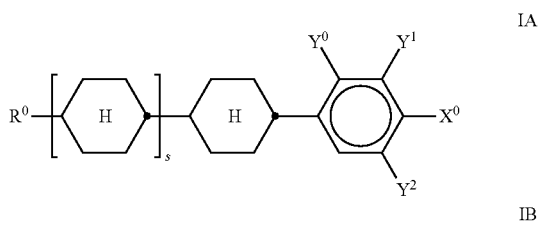

IB
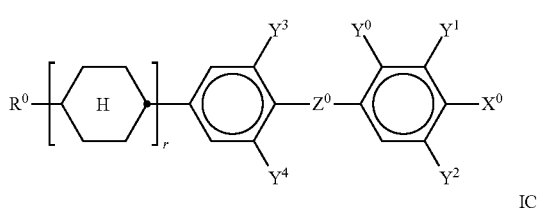

IC
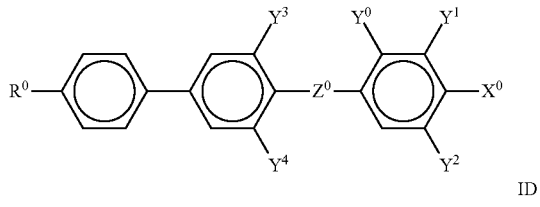

ID
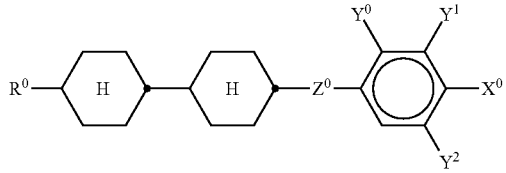

IE

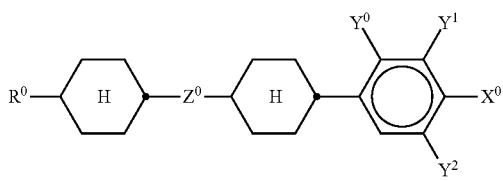

in which the individual radicals, on each occurrence identically or differently, and each, independently of one another, have the following meaning:

R⁰H, an alkyl, alkoxy or alkenyl radical having up to 15 C atoms which is unsubstituted or monosubstituted by F, Cl, CN or CF₃ and where, in addition, one or more CH₂ groups in these radicals may be replaced by —O—, —S—, —C≡C—, —CF₂O—, —OCF₂—, —OC—O—, —O—CO—

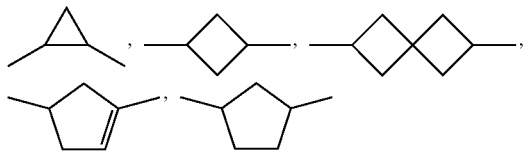

in such a way that O- and/or S-atoms are not linked directly to one another,

Z⁰ —CO—O—, —O—CO—, —CF₂O—, —OCF₂—, —CH₂O—, —OCH₂—, —CH₂—, —CH₂CH₂—, —(CH₂)₄—, —CH=CH—CH₂O—, —C₂F₄—, —CH₂CF₂—, —CF₂CH₂—, —CF=CF—, —CH=CF—, —CF=CH—, —CH=CH—, —C≡C— or a single bond, X⁰ F, C, CN, SF₅, SCN, NCS, a halogenated alkyl radical, a halogenated alkenyl radical, a halogenated alkoxy radical or a halogenated alkenyloxy radical having up to 6 C atoms, Y¹⁻⁴ H or F, Y⁰ H, F, Cl, CF₃, CHF₂, CH₃ or OCH₃, preferably H or CH₃, particularly preferably H, r 0 or 1, and s 0 or 1.

Component B preferably comprises one or more compounds selected from the group consisting of formulae IIA, IIB, IIC and ID (IIA)

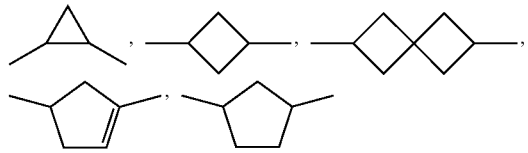

in which the individual radicals, on each occurrence identically or differently, and each, independently of one another, have the following meaning:

R²¹, R²² H, an alkyl, alkoxy or alkenyl radical having up to 15 C atoms which is unsubstituted or monosubstituted by F, Cl, CN or CF₃ and where, in addition, one or more CH₂ groups in these radicals may be replaced by —O—, —S—, —C≡C—, —CF₂O—, —OCF₂—, —OC—O—, —O—CO—

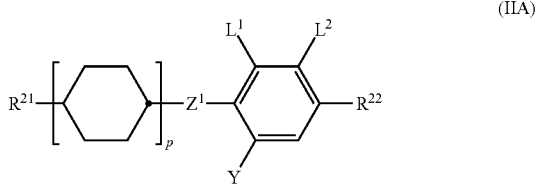

in such a way that O- and/or S-atoms are not linked directly to one another,

Z¹, Z² —CO—O—, —O—CO—, —CF₂O—, —OCF₂—, —CH₂O—, —OCH₂—, —CH₂—, —CH₂CH₂—, —(CH₂)₄—, —CH=CH—CH₂O—, —C₂F₄—, —CH₂CF₂—, —CF₂CH₂—, —CF=CF—, —CH=CF—, —CF=CH—, —CH=CH—, —C≡C— or a single bond, L¹⁻⁴ F, Cl, CF₃ or CHF₂, preferably H, F or Cl, Y H, F, Cl, CF₃, CHF₂, CH₃ or OCH₃, preferably H or CH₃, particularly preferably H, p 0, 1 or 2, q 0 or 1.

Component C preferably comprises one or more compounds selected from formulae IV, IVa, IVb and V

IV

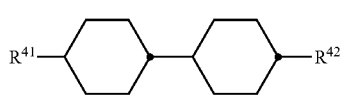

IVa

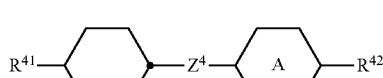

IVb

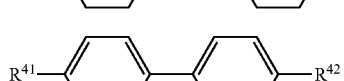

V

in which the individual radicals, on each occurrence identically or differently, and each, independently of one another, have the following meaning R⁴¹ an unsubstituted alkyl radical having 1 to 7 C atoms where, in addition, one or more CH₂ groups may be replaced by

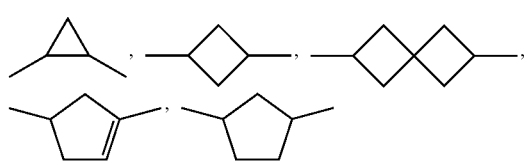

or an unsubstituted alkenyl radical having 2 to 7 C atoms, preferably an n-alkyl radical, particularly preferably having 2, 3, 4 or 5 C atoms, R⁴² an unsubstituted alkyl radical having 1 to 7 C atoms or an unsubstituted alkoxy radical having 1 to 6 C atoms, both preferably having 2 to 5 C atoms, or an unsubstituted alkenyl radical having 2 to 7 C atoms, preferably having 2, 3 or 4 C atoms, more preferably a vinyl radical or a 1-propenyl radical and in particular a vinyl radical,

denotes

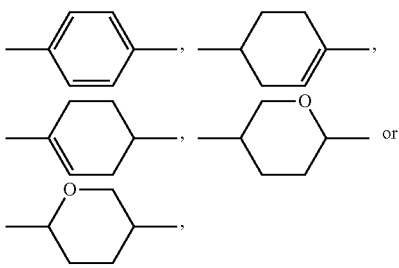

Z⁴ a single bond, —CH₂CH₂—, —CH═CH—, —CF₂O—, —OCF₂—, —CH₂O—, —OCH₂—, —COO—, —OCO—, —C₂F₄—, —C₄H₈— or —CF═CF—.

R⁵¹, R⁵² H, an alkyl, alkoxy or alkenyl radical having up to 15 C atoms which is unsubstituted, monosubstituted by F, Cl, CN or CF₃ or at least monosubstituted by halogen, where, in addition, one or more CH₂ groups in these radicals may be replaced by —O—, —S—, —C≡C—, —CF₂O—, —OCF₂—, —OC—O—, —O—CO—

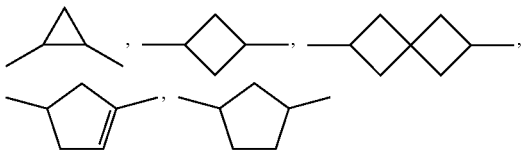

in such a way that O atoms are not linked directly to one another, and preferably denote alkyl having 1 to 7 C atoms, preferably n-alkyl, particularly preferably n-alkyl having 1 to 5 C atoms, alkoxy having 1 to 6 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

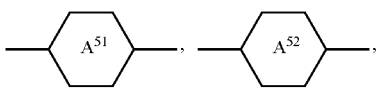

identically or differently, denote

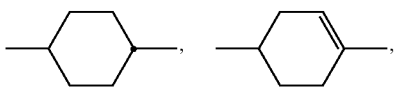

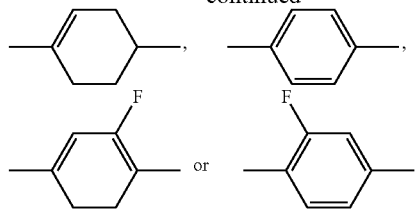

in which preferably denotes

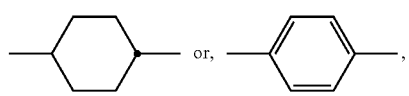

Z⁵¹, Z⁵² —CH₂—CH₂—, —CH₂—O—, —CH═CH—, —C≡C—, —COO— or a single bond, preferably —CH₂—CH₂—, —CH₂—O— or a single bond and particularly preferably a single bond, and n 1 or 2.

Preferred compounds of the formulae IA, IB, IC, ID and IE are those wherein R⁰ denotes an alkyl or alkoxy radical having up to 15 C atoms, and very preferably denotes (O)C$_v$H$_{2v+1}$ wherein (O) is an oxygen atom or a single bond and v is 1, 2, 3, 4, 5 or 6.

Further preferred compounds of the formulae IA, IB, IC, ID and IE are those wherein R⁰ denotes or contains a cycloalkyl or cycloalkoxy radical, preferably selected from the group consisting of

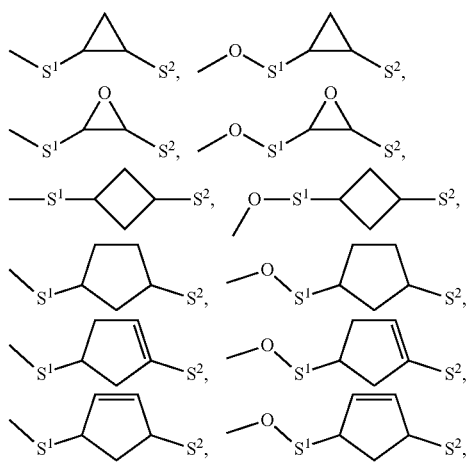

wherein S¹ is C$_{1-12}$-alkylene or C$_{2-12}$-alkenylene and S² is H, C$_{1-12}$-alkyl or C$_{2-12}$-alkenyl, and very preferably are selected from the group consisting of

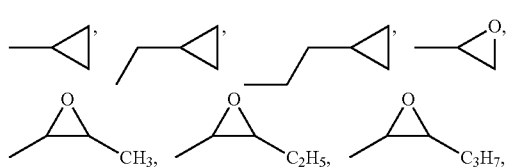

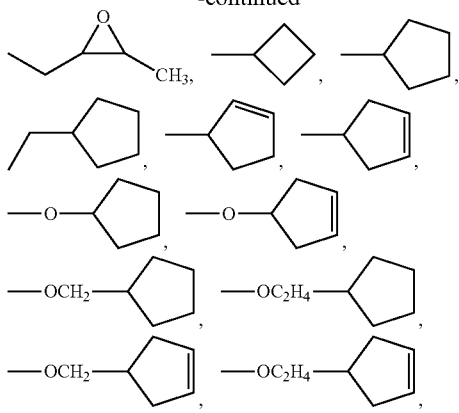

Further preferred compounds of the formulae IA, IB, IC, ID and IE are indicated below.

Preferred compounds of formula IA are selected from the following subformulae:

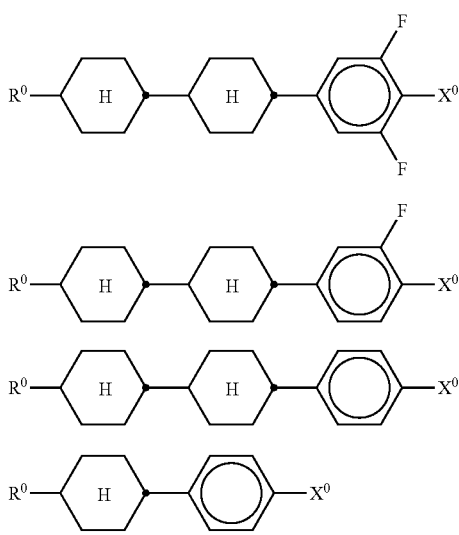

in which $R^0$ and $X^0$ have the meanings indicated above, and $R^0$ preferably denotes alkyl having 1 to 6 C atoms and $X^0$ preferably denotes F or $OCF_3$, furthermore $OCF=CF_2$ or Cl.

Very preferred compounds of formula IA are selected from the following subformula:

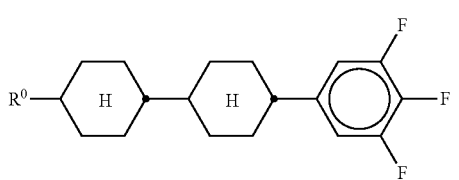

in which $R^0$ has the meanings indicated above and is preferably methyl, ethyl, propyl or pentyl.

Further very preferred compounds of formula IA are selected from the following subformula:

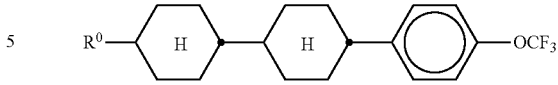

in which $R^0$ has the meanings indicated above and is preferably methyl, ethyl, propyl or pentyl.

Preferred compounds of formula IB are selected from the following subformulae:

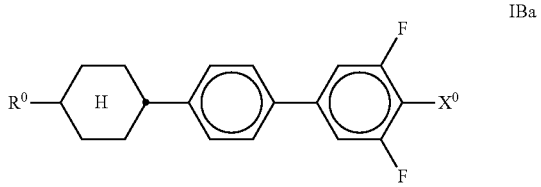

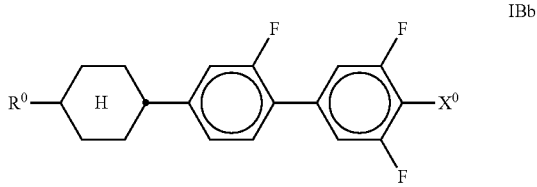

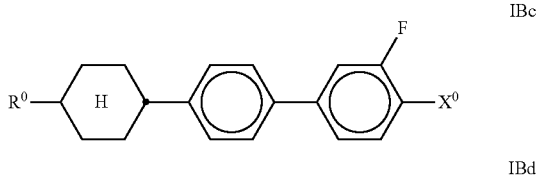

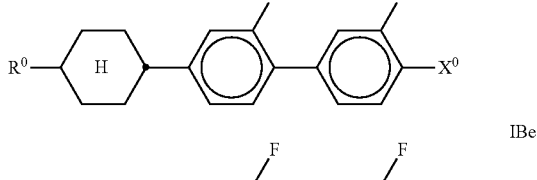

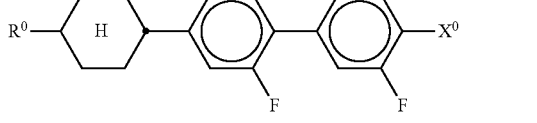

in which $R^0$ and $X^0$ have the meanings indicated above, and $R^0$ preferably denotes alkyl having 1 to 6 C atoms and $X^0$ preferably denotes F or $OCF_3$, furthermore $OCHF_2$, $CF_3$, $OCF=CF_2$ or $OCH=CF_2$.

Preferred compounds of formula IC are selected from the following subformulae:

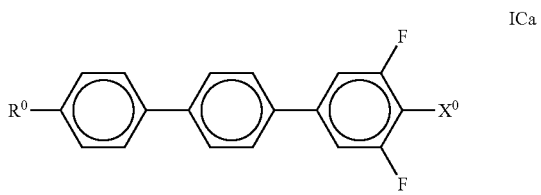

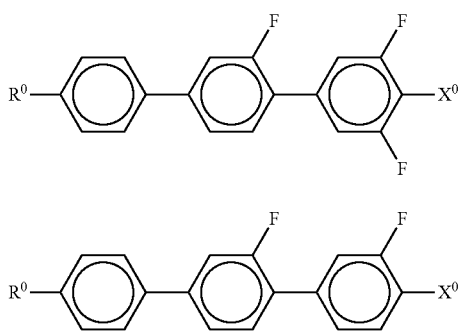

ICb

ICc in which $R^0$ and $X^0$ have the meanings indicated above, and $R^0$ preferably denotes alkyl having 1 to 6 C atoms and $X^0$ preferably denotes F, furthermore $OCF_3$, $CF_3$, $CF=CF_2$, $OCHF_2$ or $OCH=CF_2$.

Very preferred compounds of formula ICb are selected from the following subformula:

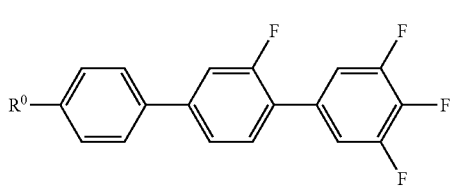

ICb1 in which $R^0$ has the meanings indicated above and is preferably ethyl, propyl or pentyl.

Preferred compounds of formula ID are selected from the following subformulae:

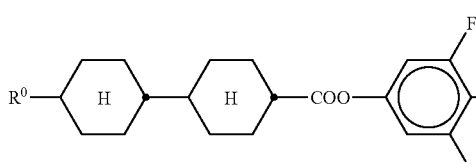

IDa

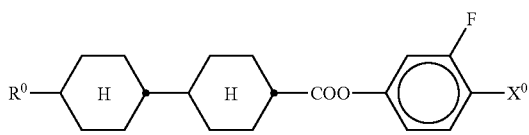

IDb in which $R^0$ and $X^0$ have the meanings indicated above, and $R^0$ preferably denotes alkyl having 1 to 6 C atoms and $X^0$ preferably denotes F, furthermore $OCF_3$, $OCHF_2$ or $OCH=CF_2$.

Very preferred compounds of formula ID are selected from the following subformula:

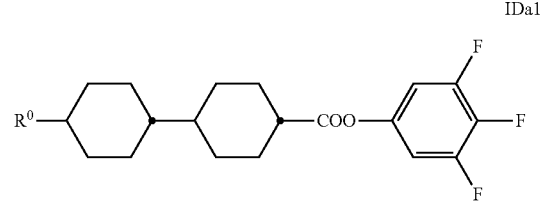

IDa1 in which $R^0$ has the meanings indicated above and is preferably ethyl, propyl or pentyl.

The proportions of the components A, B and C and of the individual compounds contained therein are selected such that the dielectric anisotropy Δε of the LC medium is from −0.5 to +0.5, preferably from −0.3 to +0.3, very preferably from −0.1 to +0.1, most preferably 0.

Preferably the total proportion of the component A in the LC medium is from 8 to 50%, very preferably from 10 to 35%, most preferably from 10 to 30% by weight.

Preferably the total proportion of the component B in the LC medium is from 15 to 70%, very preferably from 20 to 65%, most preferably from 25 to 50% by weight.

Preferably the total proportion of the component B in the LC medium is higher than the total proportion of the component A in the LC medium.

Preferably the total proportion of the component C in the LC medium is from 5 to 70%, very preferably from 10 to 65%, most preferably from 15 to 60% by weight.

Preferred compounds of the formulae IIA, IIB, IIC and IID are those wherein $R^{22}$ denotes an alkyl or alkoxy radical having up to 15 C atoms, and very preferably denotes $(O)C_vH_{2v+1}$ wherein (O) is an oxygen atom or a single bond and v is 1, 2, 3, 4, 5 or 6.

Further preferred compounds of the formulae IIA, IIB, IIC and IID are those wherein $R^{21}$ or $R^{22}$ denotes or contains a cycloalkyl or cycloalkoxy radical, preferably selected from the group consisting of

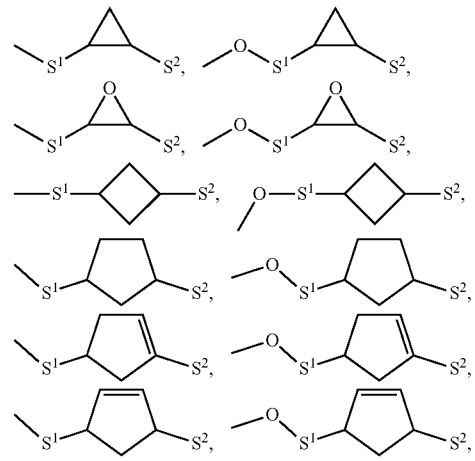

wherein $S^1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

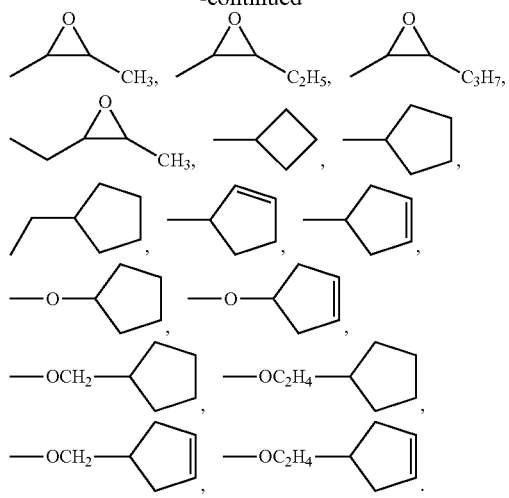
Further preferred compounds of the formulae IIA, IIB, IIC and IID are indicated below.
Preferred compounds of formula IIA are selected from the group consisting of the following subformulae:
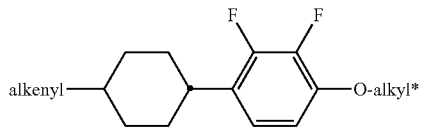
IIA-8
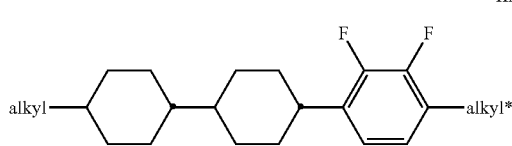
IIA-9
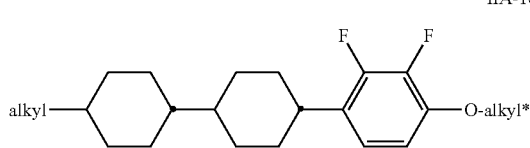
IIA-10
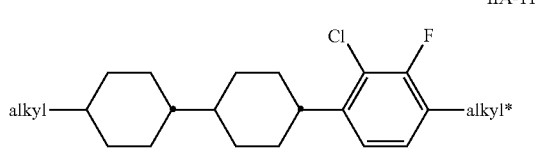
IIA-11
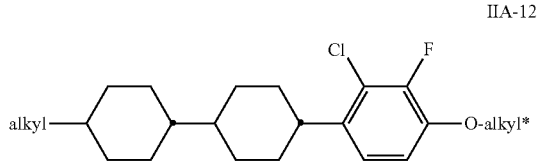
IIA-12
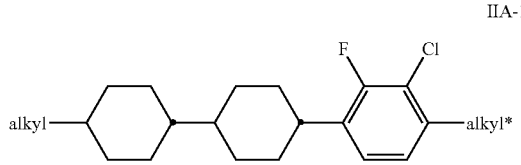
IIA-13
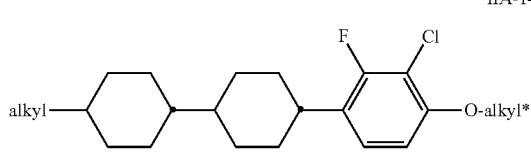
IIA-14
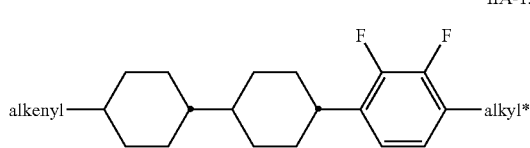
IIA-15
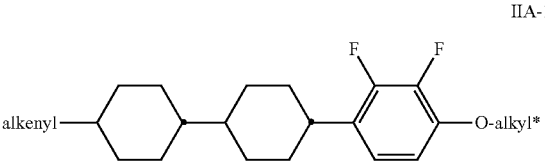
IIA-16
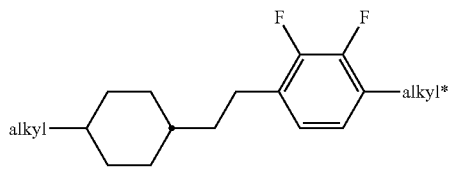
IIA-17

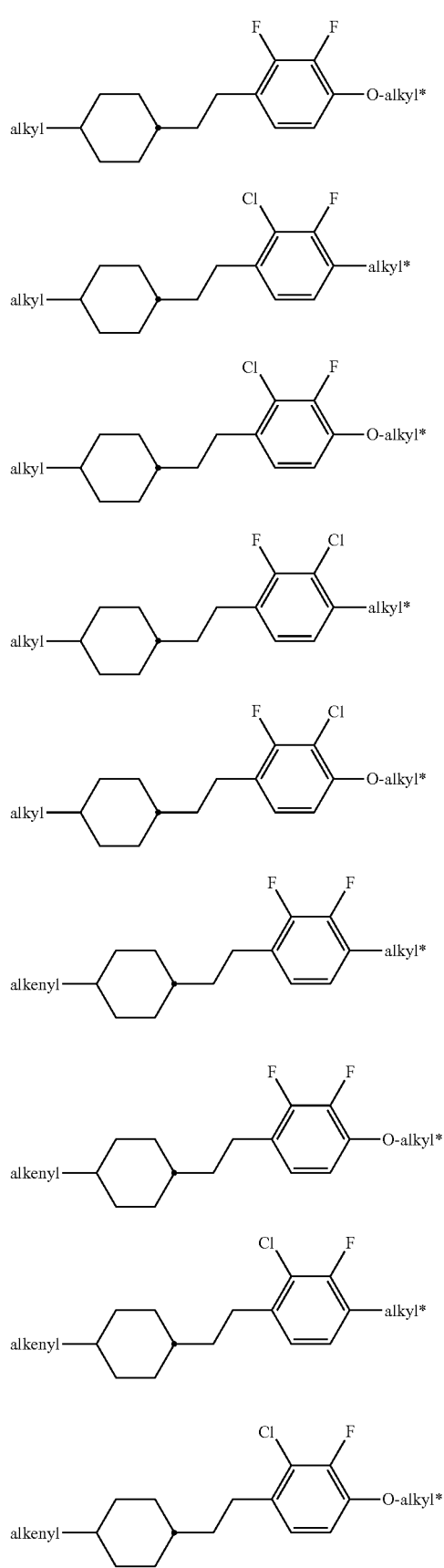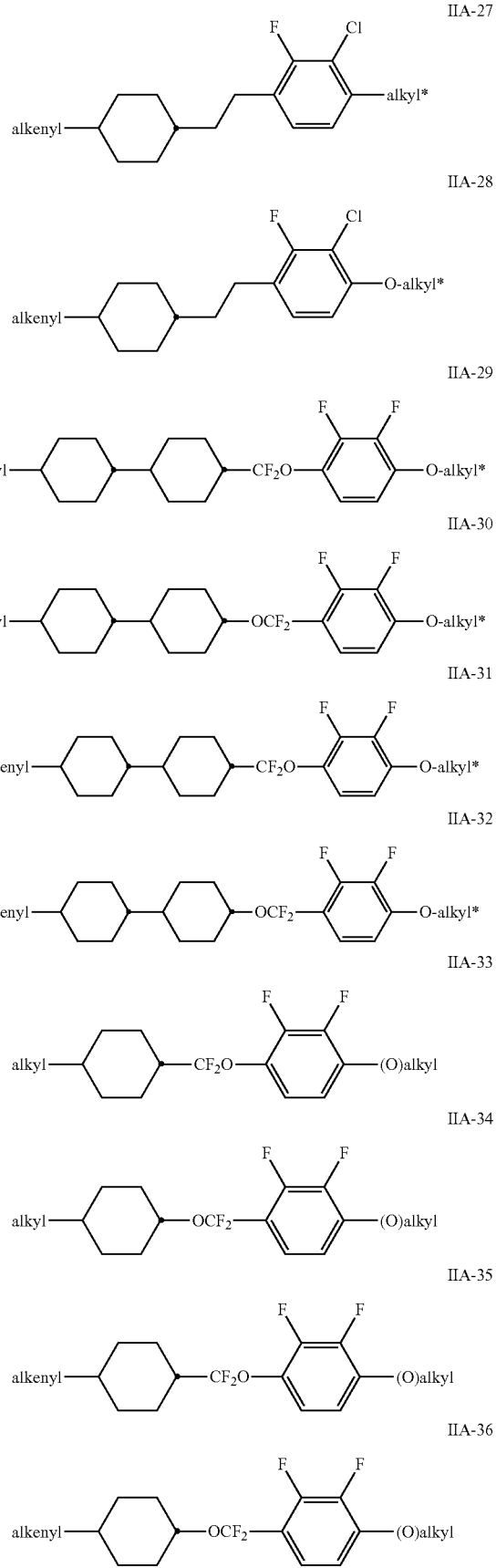

IIA-37
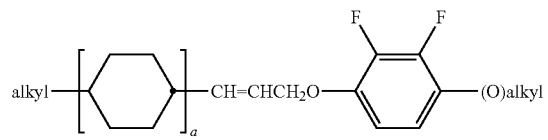
IIA-38
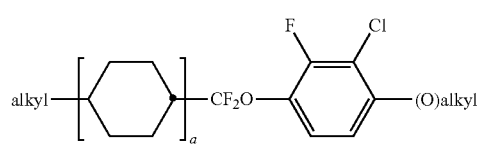
IIA-39
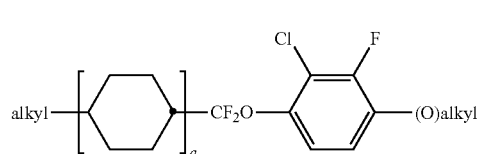
IIA-40
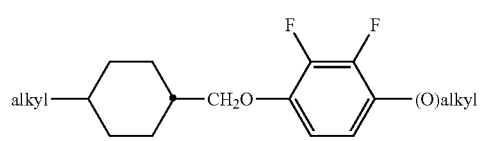
IIA-41
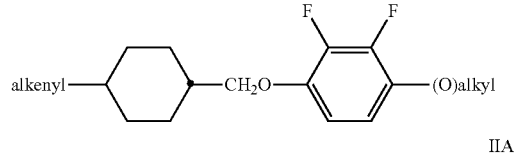
IIA-42
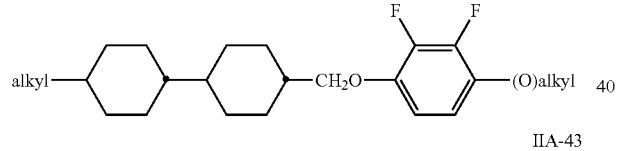
IIA-43
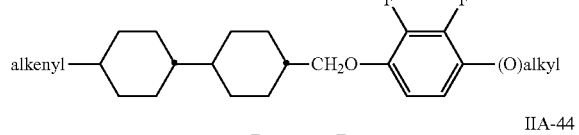
IIA-44
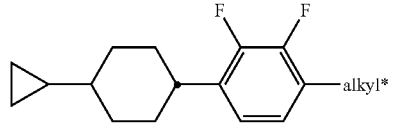
IIA-45
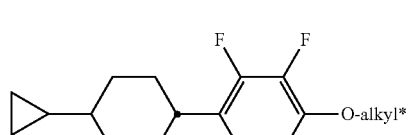
IIA-46
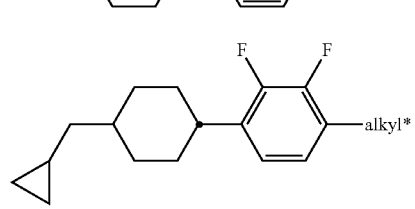
IIA-47
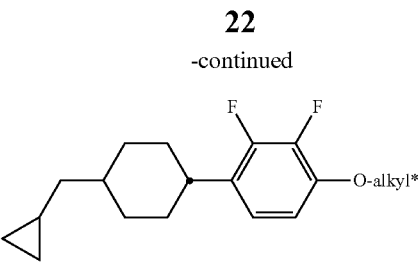
IIA-48
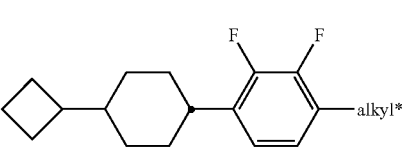
IIA-49
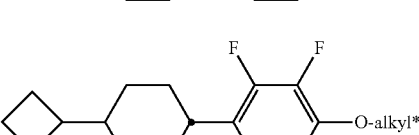
IIA-50
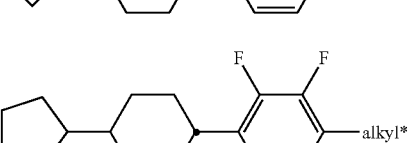
IIA-51
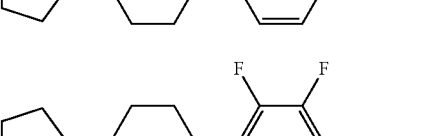
IIA-52
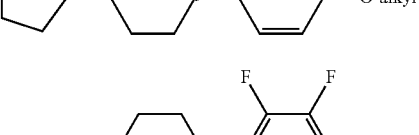
IIA-53
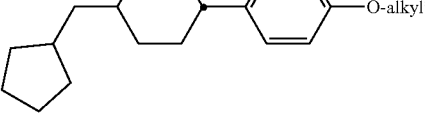
IIA-54
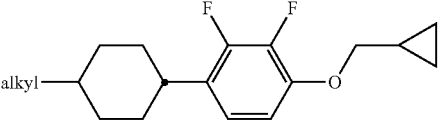
IIA-55
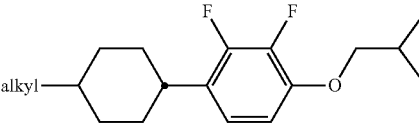
IIA-56
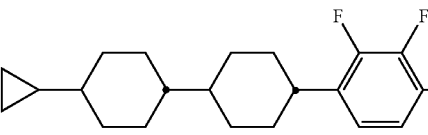
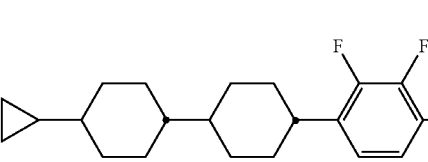

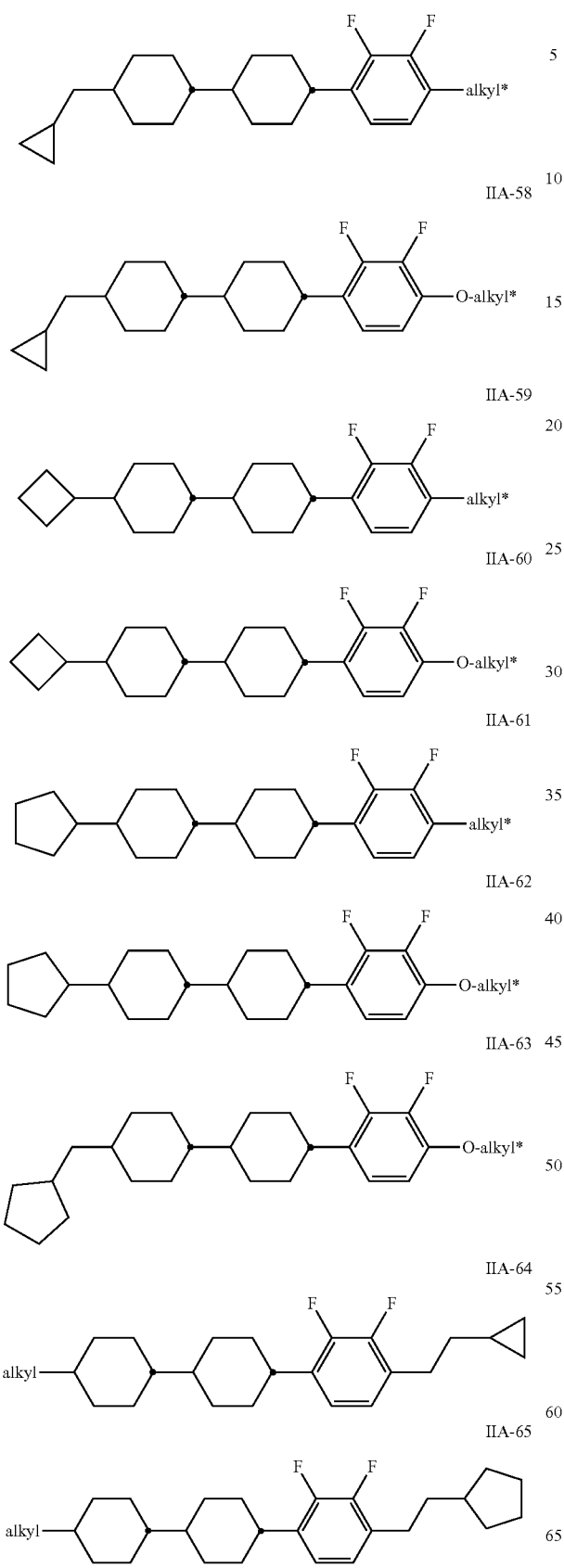

-continued

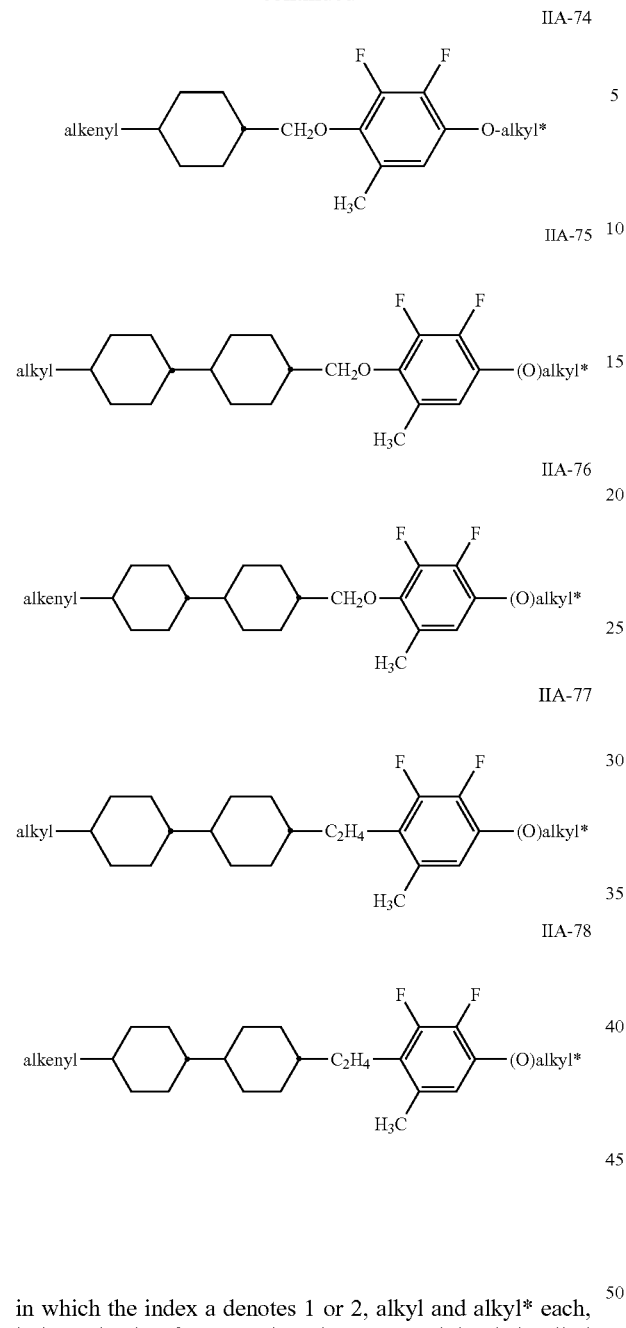

in which the index a denotes 1 or 2, alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond, and alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very preferably component B of the LC medium comprises one or more compounds selected from the group consisting of formulae IIA-2, IIA-8, IIA-10, IIA-16, II-18, IIA-40, IIA-41, IIA-42 and IIA-43.

Very preferably, component B of the LC medium comprises one or more compounds of the formula IIA-2 selected from the following subformulae:

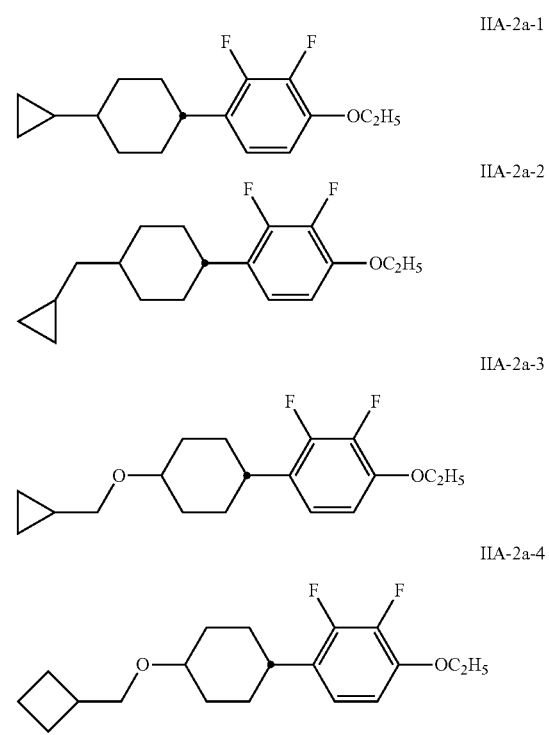

Alternatively, preferably in addition to the compounds of the formulae IIA-2-1 to IIA-2-5, component B of the LC medium comprises one or more compounds of the following subformulae:

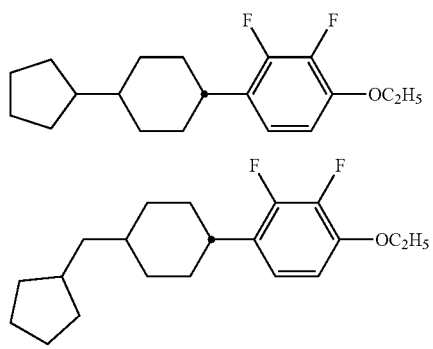

IIA-2a-5

IIA-2a-6

Further preferably, component B of the LC medium comprises one or more compounds of the formula IIA-10 selected from the following subformulae:

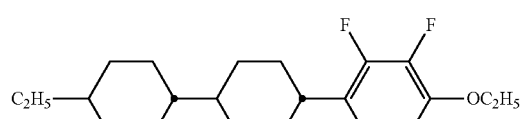

IIA-10-1

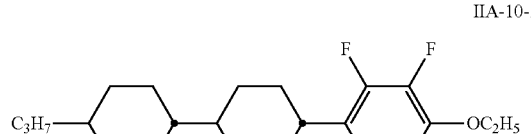

IIA-10-2

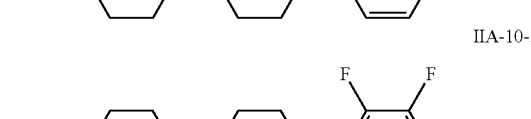

IIA-10-3

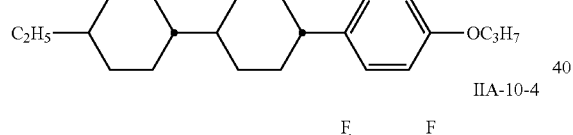

IIA-10-4

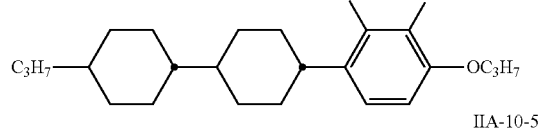

IIA-10-5

Alternatively, preferably in addition to the compounds of the formulae IIA-10-1 to IIA-10-5, component B of the LC medium comprises one or more compounds selected from the following subformulae:

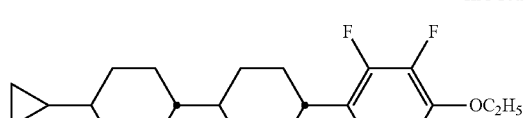

IIA-10a-1

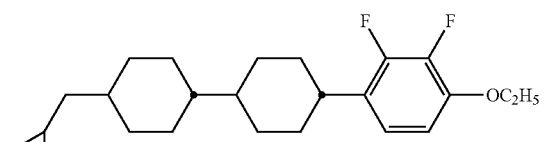

IIA-10a-2

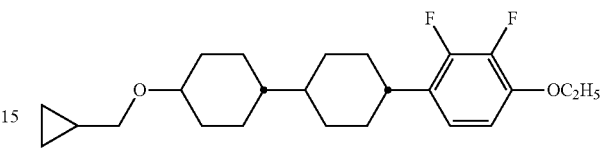

IIA-10a-3

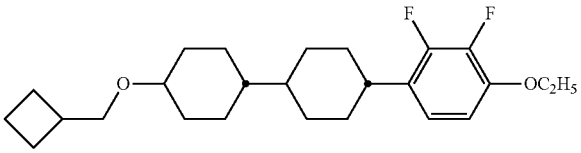

IIA-10a-4

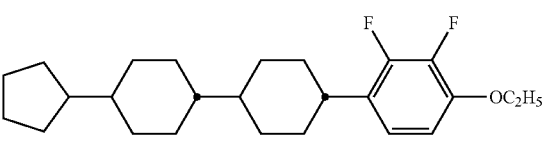

IIA-10a-5

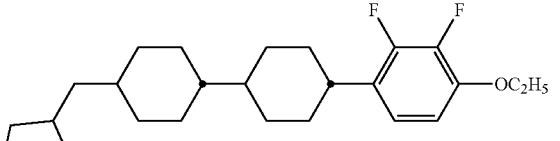

IIA-10a-6

Preferred compounds of formula IIB are selected from the group consisting of the following subformulae:

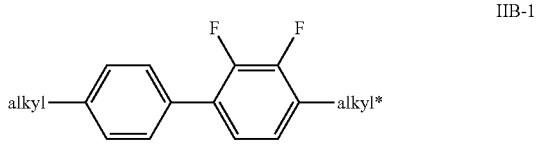

IIB-1

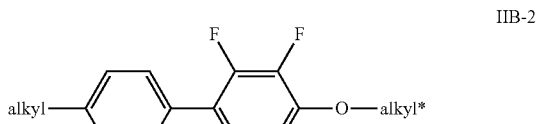

IIB-2

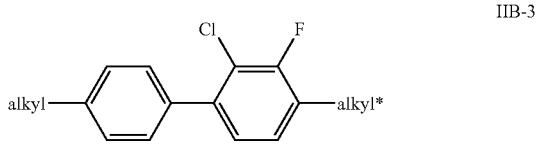

IIB-3

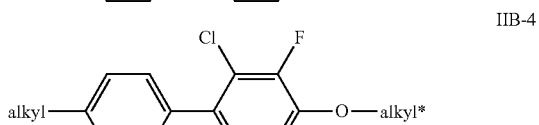

IIB-4

IIB-5
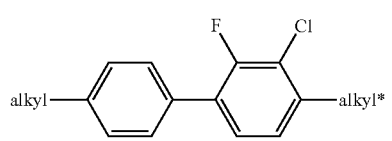
IIB-6
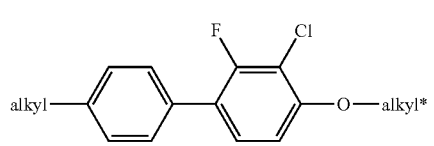
IIB-7
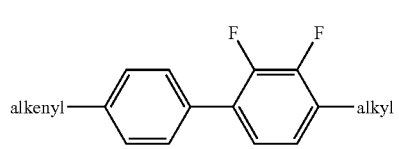
IIB-8
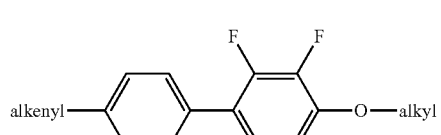
IIB-9
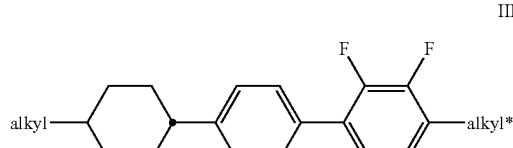
IIB-10
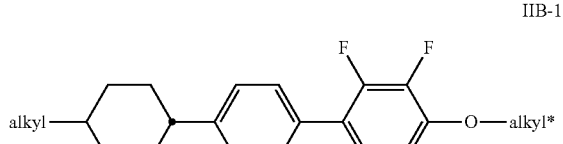
IIB-11
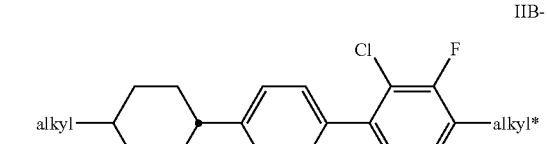
IIB-12
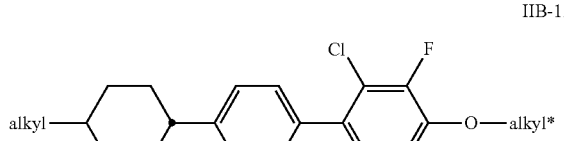
IIB-13
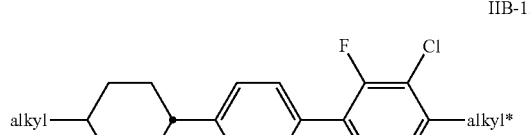
IIB-14
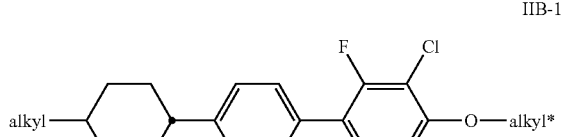
IIB-15
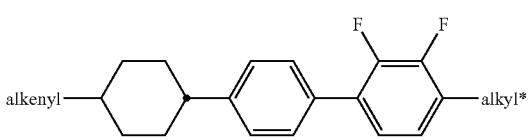
IIB-16
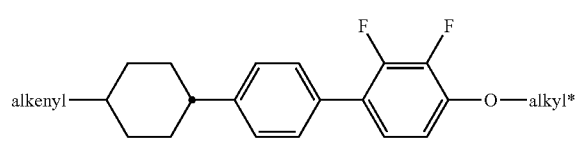
IIB-17
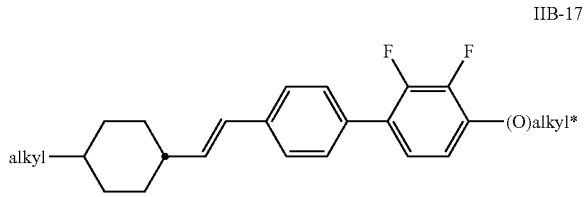
IIB-18
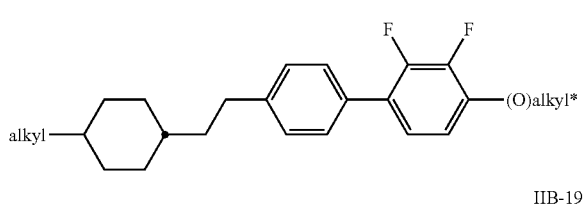
IIB-19
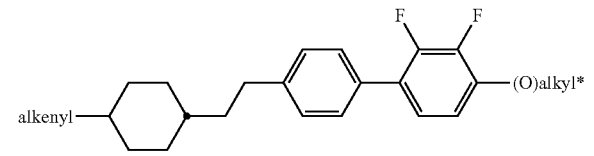
IIB-20
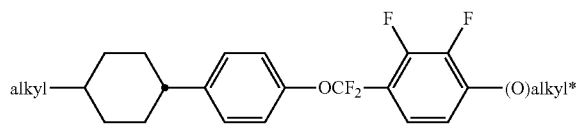
IIB-21
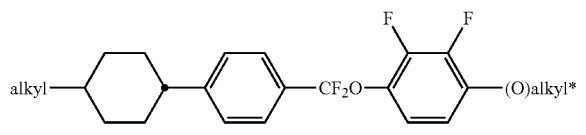
IIB-22
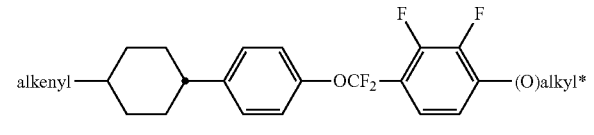
IIB-23
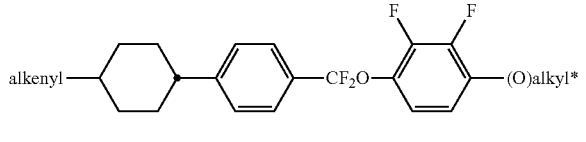

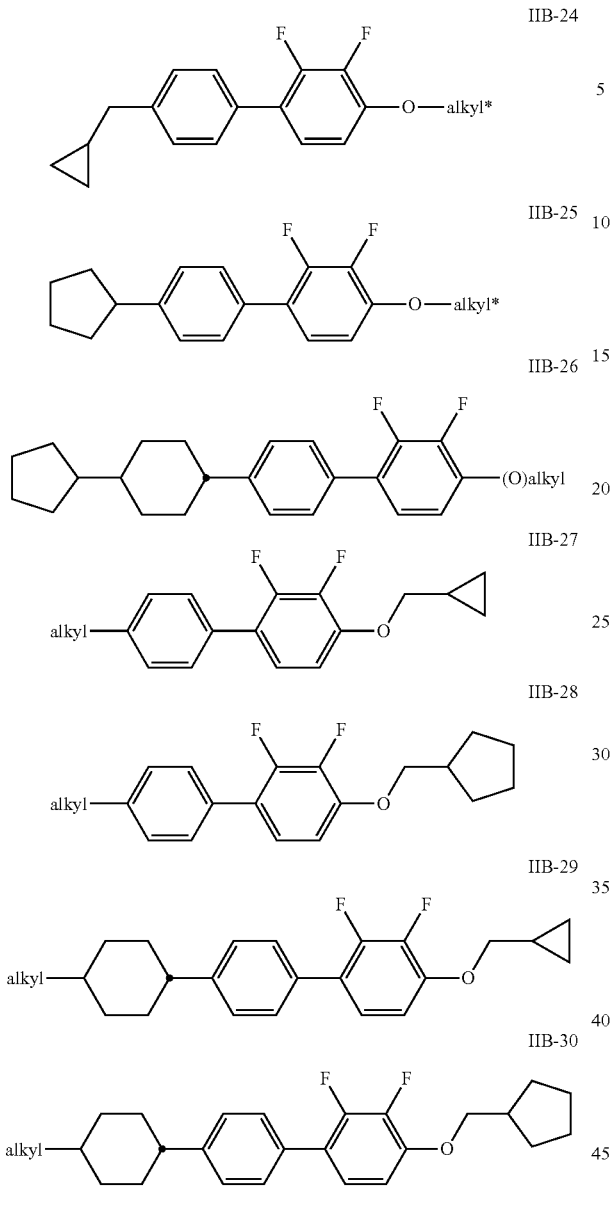

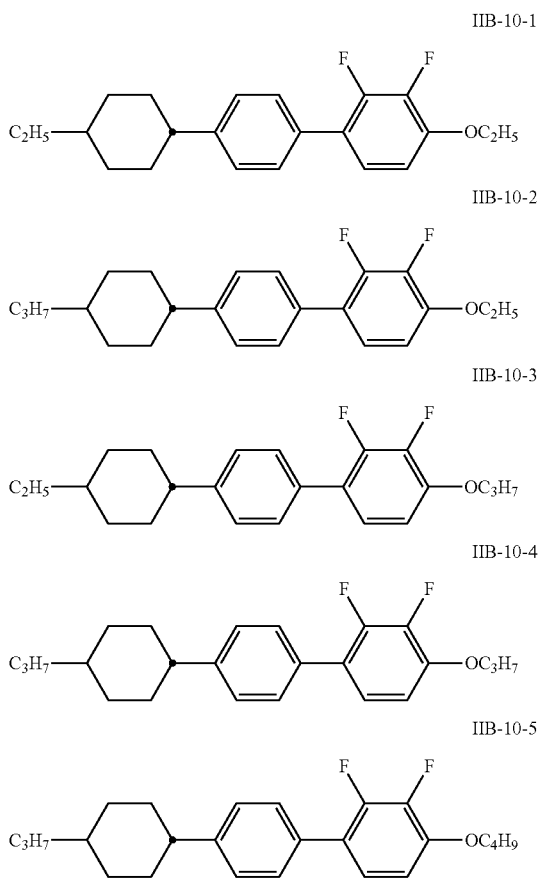

in which alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond, and alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very preferably component B of the LC medium comprises one or more compounds selected from the group consisting of formulae IIB-2, IIB-10 and IIB-16.

Preferably, component B of the LC medium comprises one or more compounds of the formula IIB-10 selected from the following subformulae:

Alternatively, preferably in addition to the compounds of the formulae IIB-10-1 to 11B-10-5, component B of the LC medium comprises one or more compounds selected from the following subformulae:

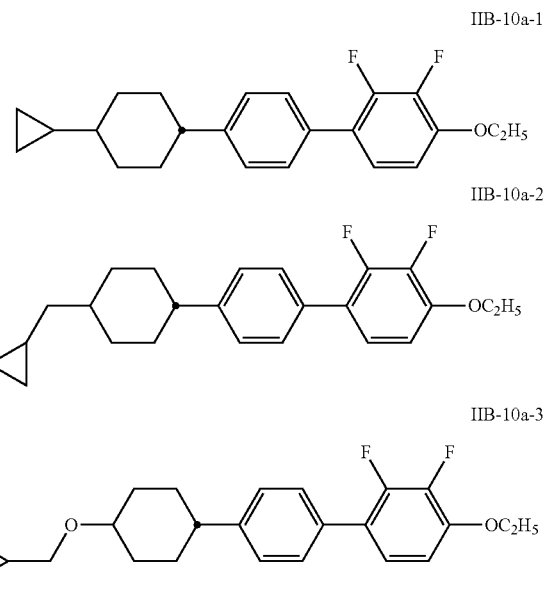

IIB-10a-4

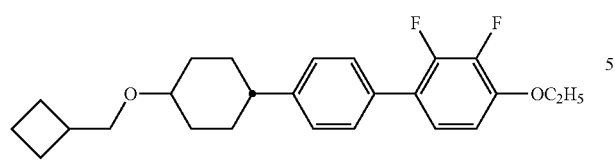

IIB-10a-5

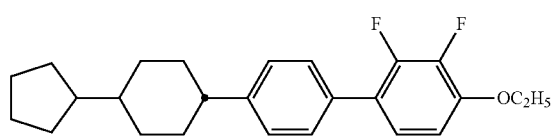

Preferred compounds of the formula IIC selected from subformula IC-1:

IIC-1

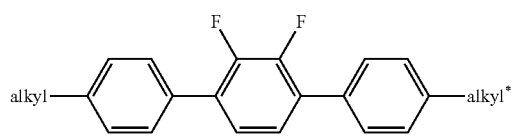

in which alkyl and alkyl* each, independently of one another, denote a straight-chain alkyl radical having 1-6 C atoms, preferably in amounts of 0.5% to 5% by weight, in particular 1% to 3% by weight.

Preferred compounds of the formula IID selected from the group consisting of the following subformulae:

IID-1

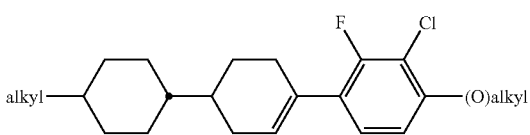

IID-2

IID-3

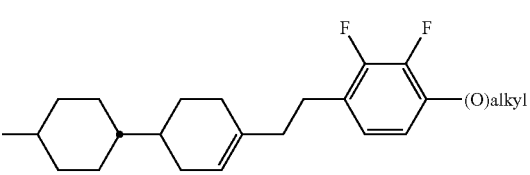

IID-4

IID-5

IID-6

IID-7

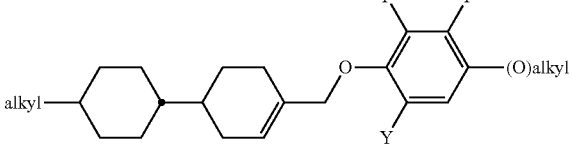

IID-8

IID-9

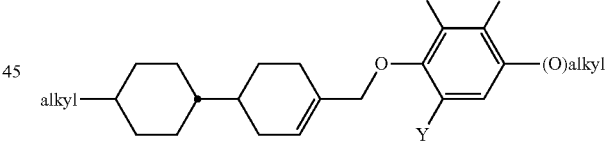

IID-10

IID-11

IID-12

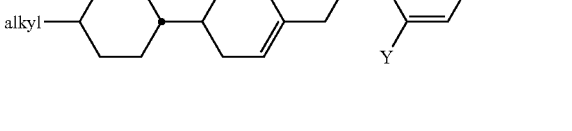

IID-13

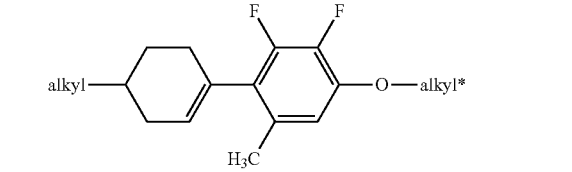

-continued

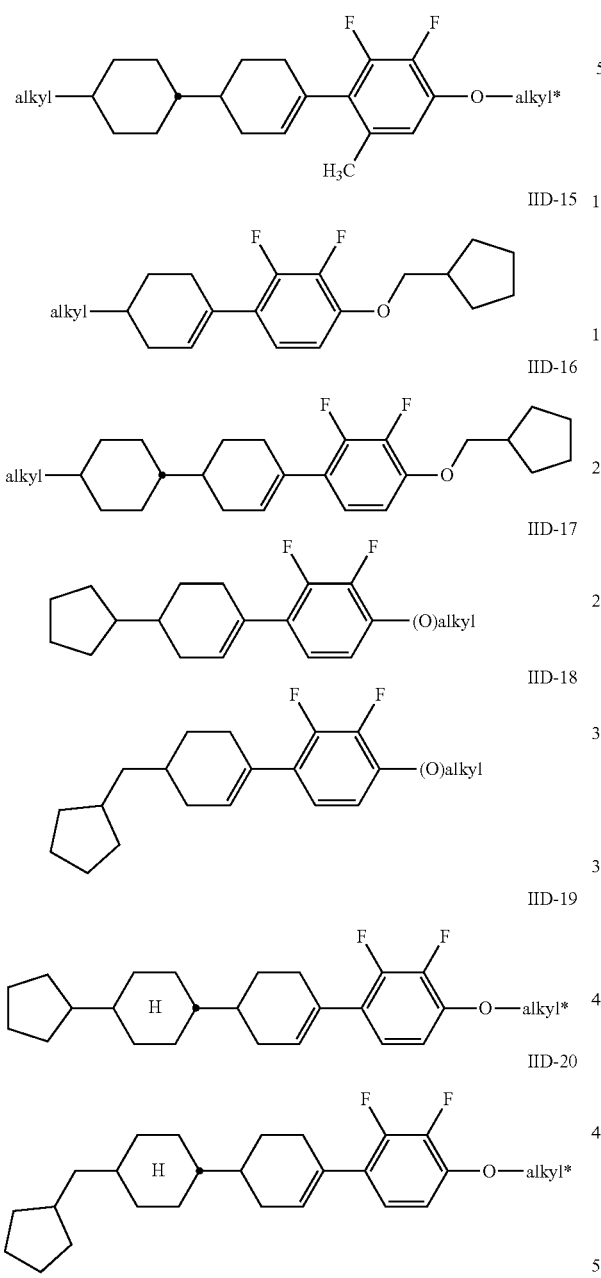

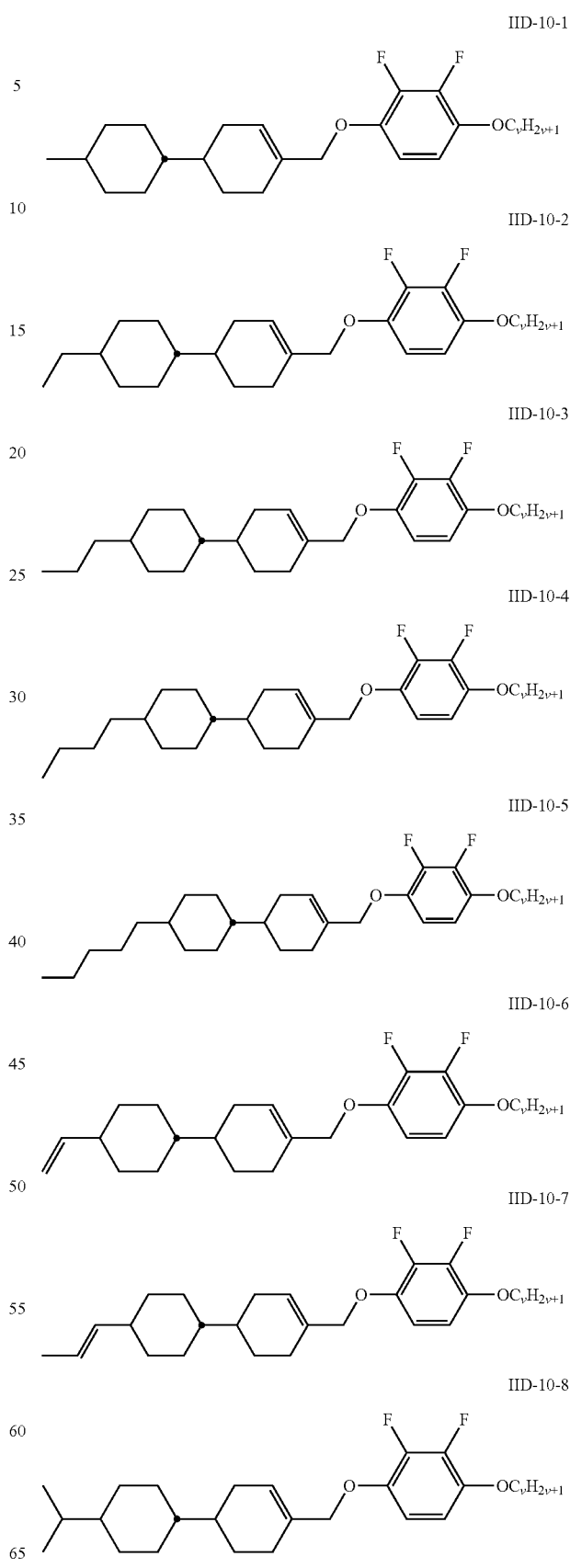

in which alkyl and alkyl* each, independently of one another, denote a straight-chain alkyl radical having 1-6 C atoms, alkenyl denotes a straight-chain alkenyl radical having 2-6 C atoms, (O) denotes an oxygen atom or a single bond, Y denotes H or CH$_3$ and alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very preferably component B of the LC medium comprises one or more compounds of the formula IID-1 and/or IID-4.

Very preferred compounds of the formula IID are selected from the following subformulae:

IID-10-9
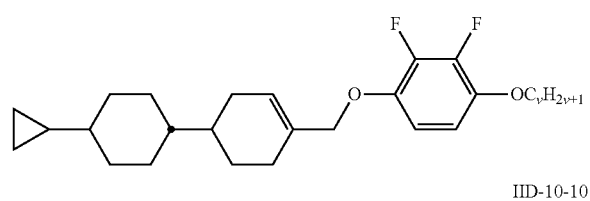
IID-10-10
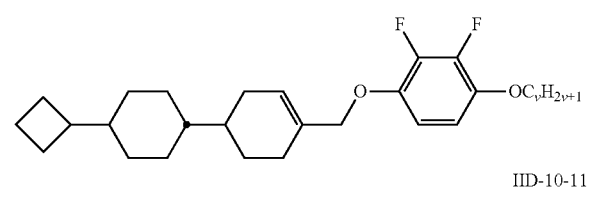
IID-10-11
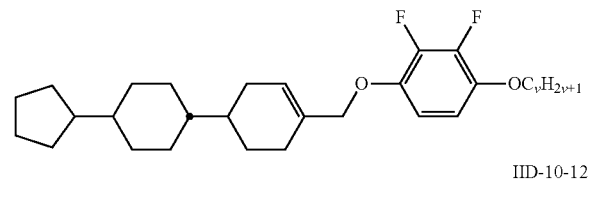
IID-10-12
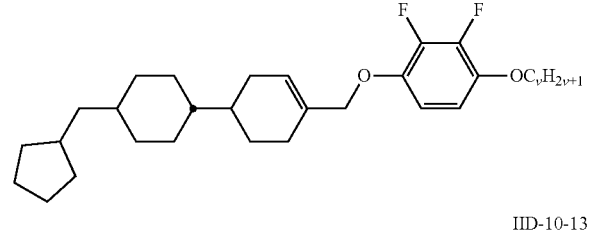
IID-10-13
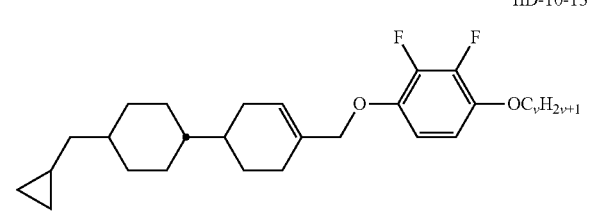
IID-10-14
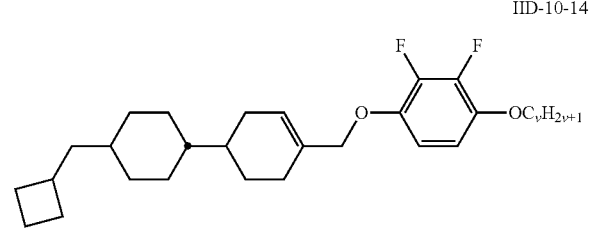
IID-10-15
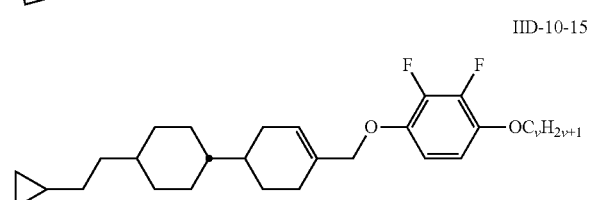
IID-10-16
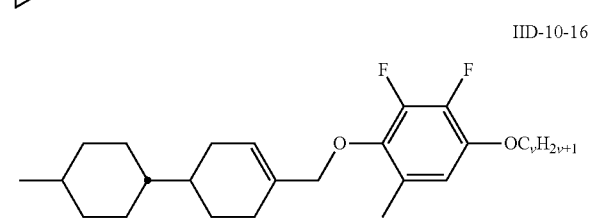
IID-10-17
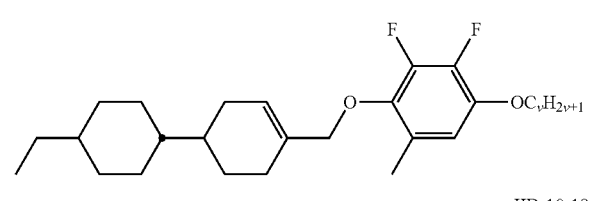
IID-10-18
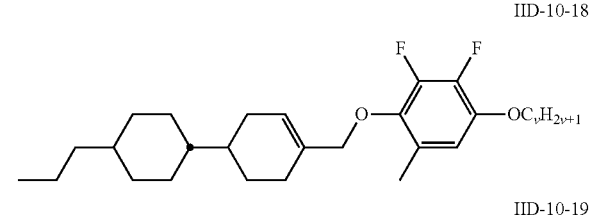
IID-10-19
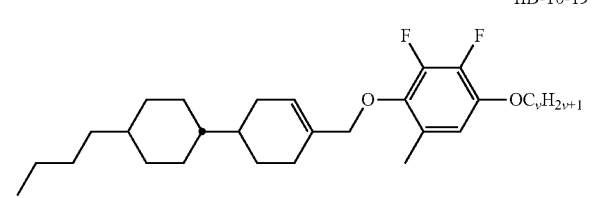
IID-10-20
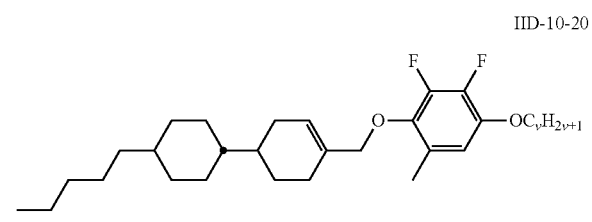
IID-10-21
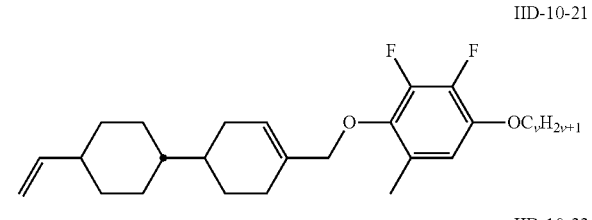
IID-10-22
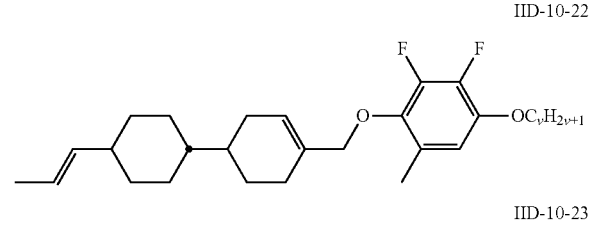
IID-10-23
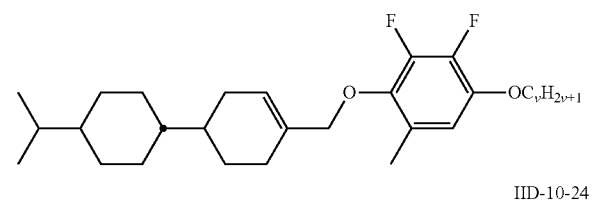
IID-10-24
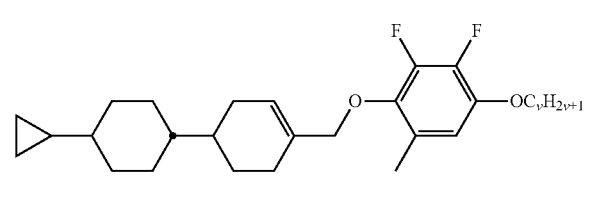

IID-10-25
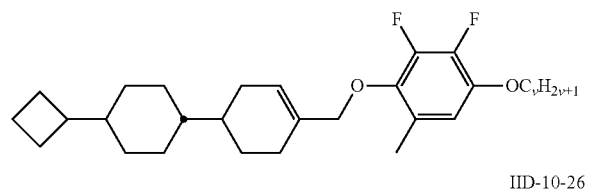
IID-10-26
IID-10-27
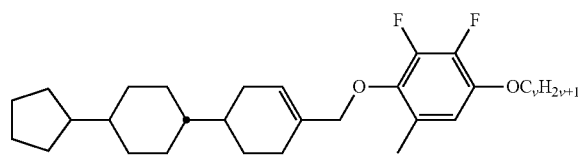
IID-10-28
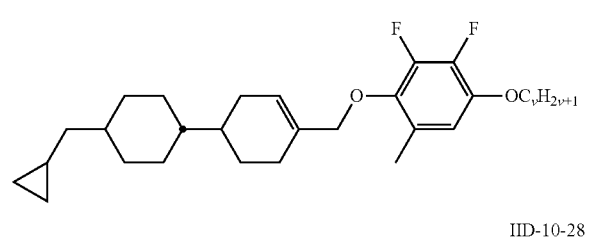
IID-10-29
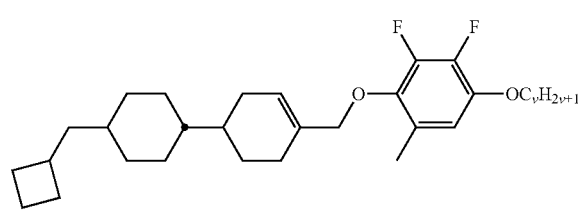
IID-10-30
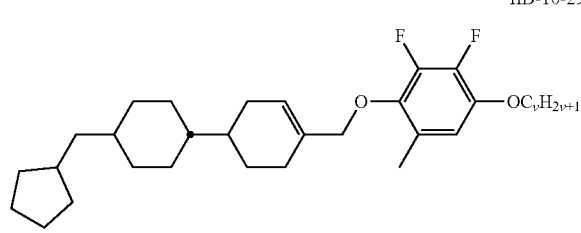
IID-10-31
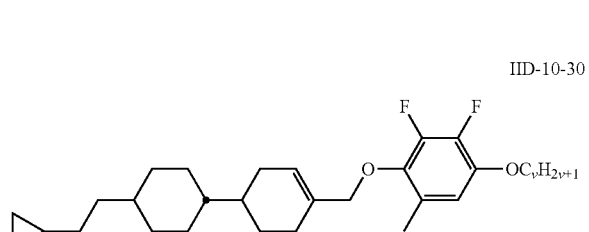
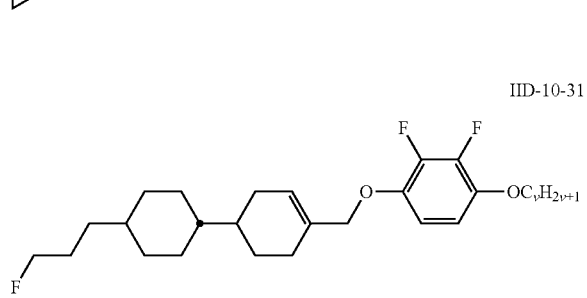
IID-10-32
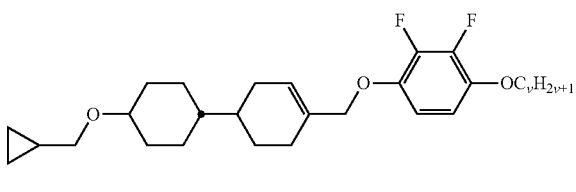
wherein v is 1, 2, 3, 4, 5 or 6.
In a preferred embodiment component B of the LC medium comprises one or more compounds of subformula IID-10a:
IID-10a
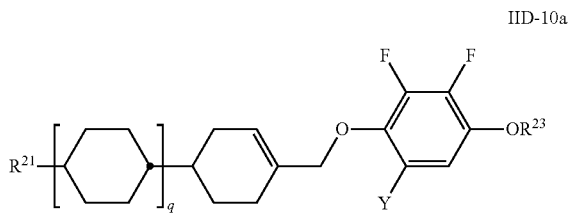
in which $R^{21}$, Y and q have the meanings given in formula IID, and $R^{23}$ is
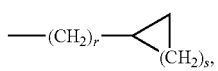
in which r is 0, 1, 2, 3, 4, 5 or 6 and s is 1, 2 or 3.
Preferred compounds of formula IID-10a are selected from the following subformulae:
IID-10a-1
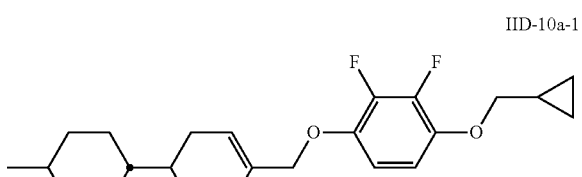
IID-10a-2
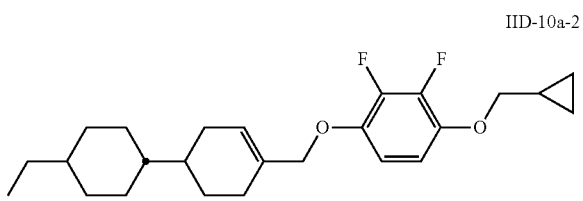
IID-10a-3
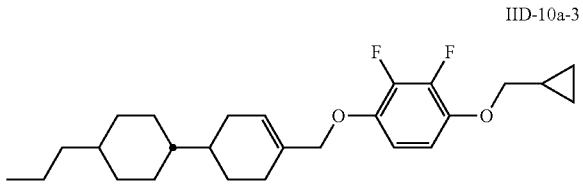

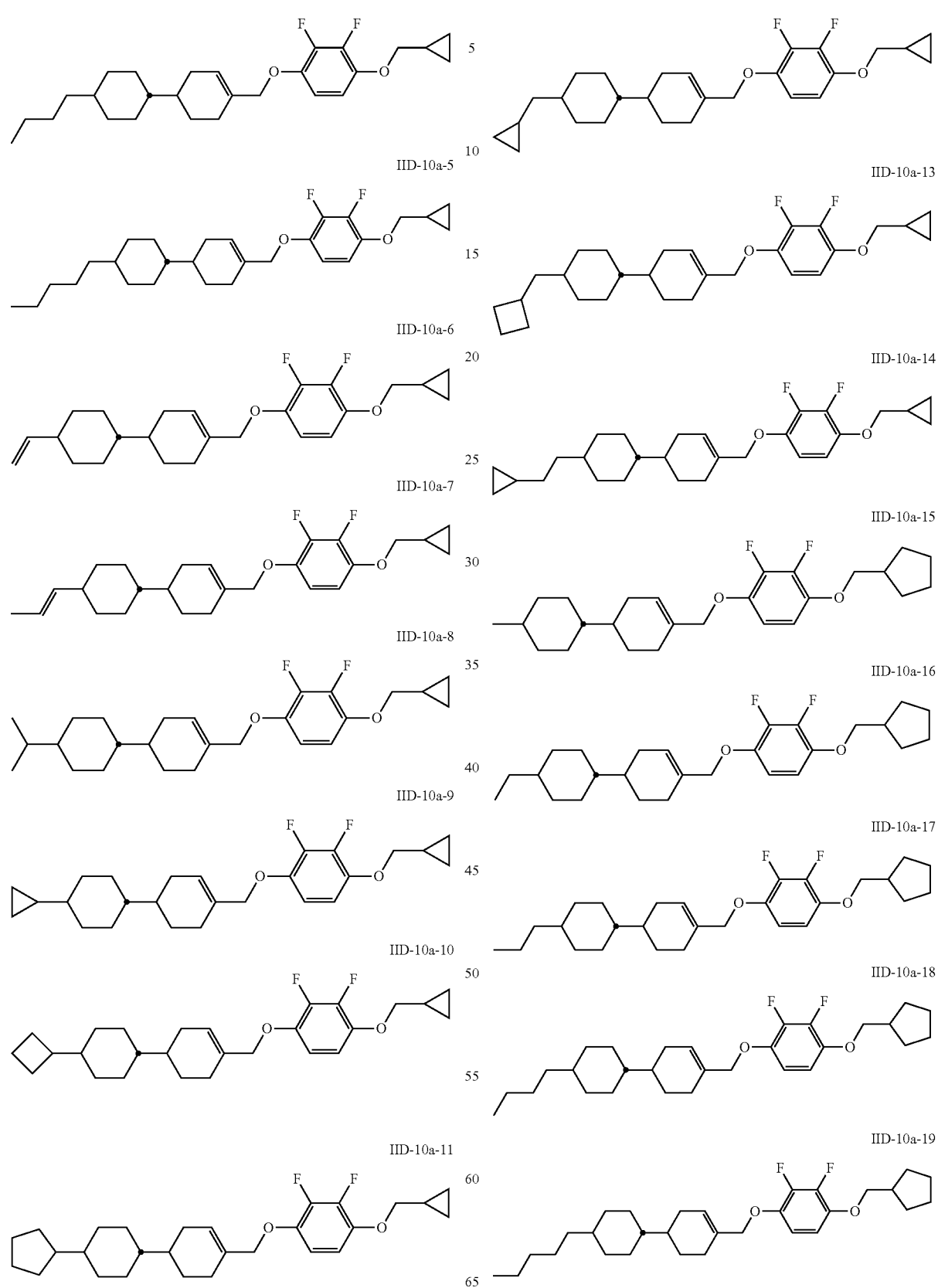

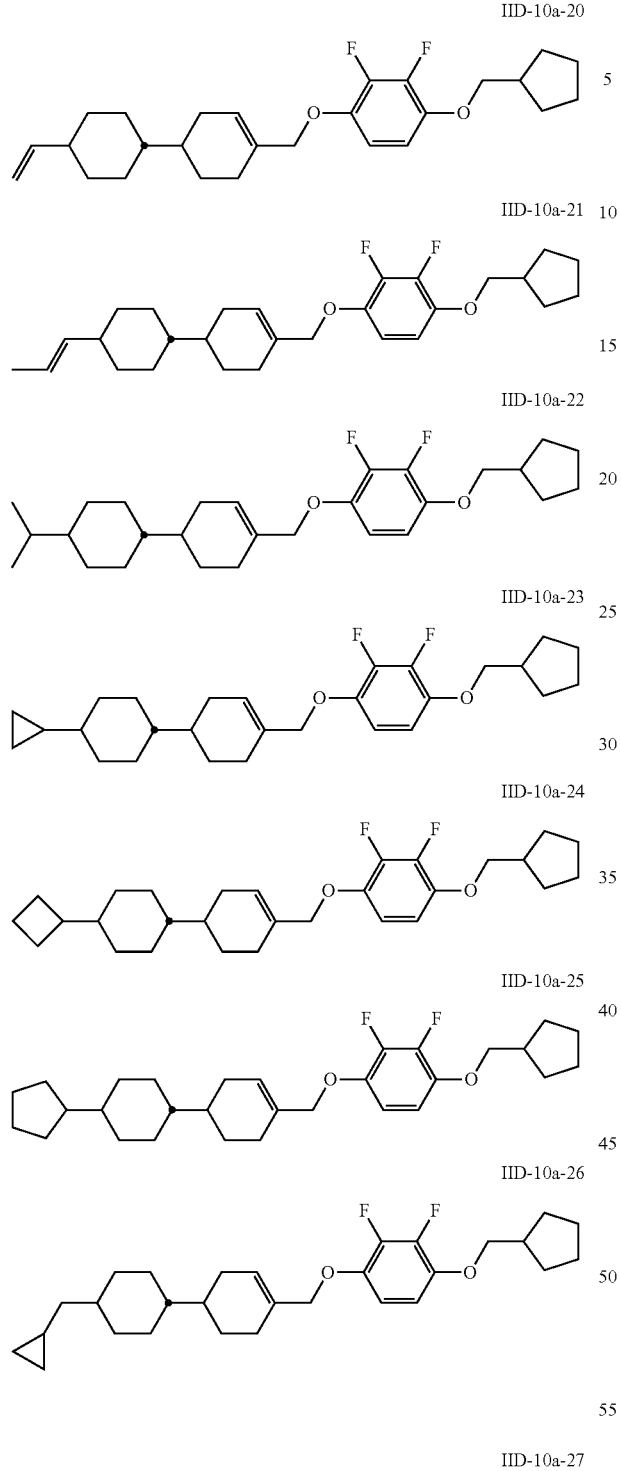

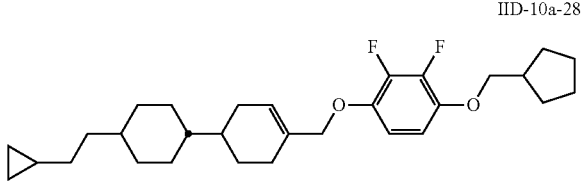

Very preferably component B of the LC medium comprises one or more compounds selected from the formulae IIA-2, IIA-8, IIA-10, IIA-16, II-18, IIA-40, IIA-41, IIA-42, IIA-43, IIB-2, IIB-10, IIB-16, IIC-1, and IID-4 and IID-10 or their subformulae.

The proportion of compounds of the formulae IIA and/or IIB in the mixture as a whole is preferably at least 20% by weight.

Preferred compounds of formula IV are selected from the following subformulae:

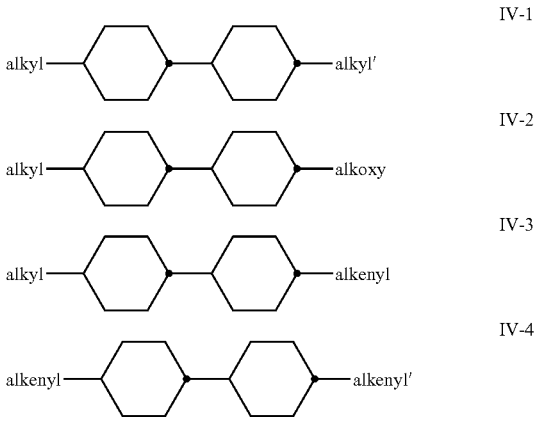

in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

Preferably, component C of the LC medium comprises one or more compounds of formula IV1, preferably selected from the following subformulae:

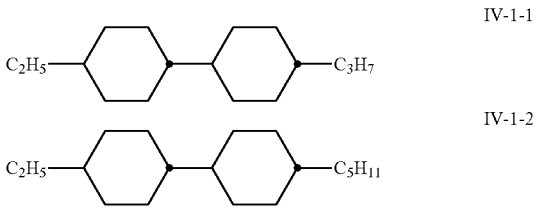

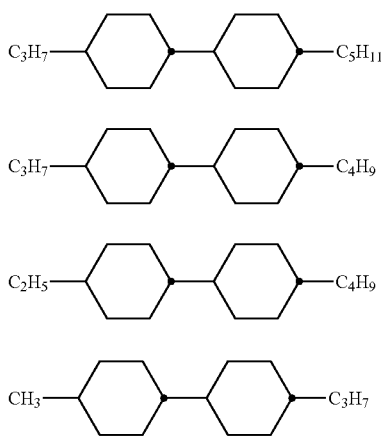

IV-1-3
IV-1-4
IV-1-5
IV-1-6

Further preferably, component C of the LC medium according to the invention comprises one or more compounds of the subformulae IV-2-1 and/or IV-2-2:

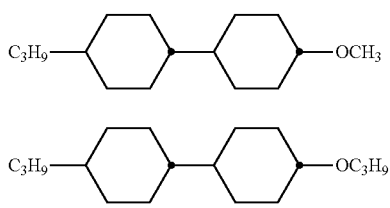

IV-2-1
IV-2-2

Further preferably, component C of the LC medium according to the invention comprises one or more compounds of formula IV-3 selected from the following subformulae:

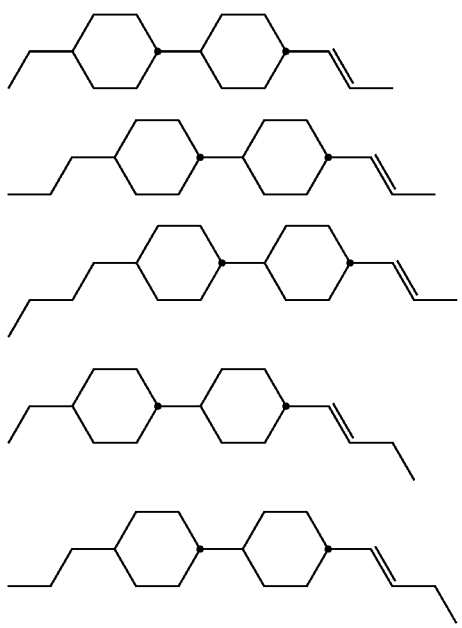

IV-3-1
IV-3-2
IV-3-3
IV-3-4
IV-3-5

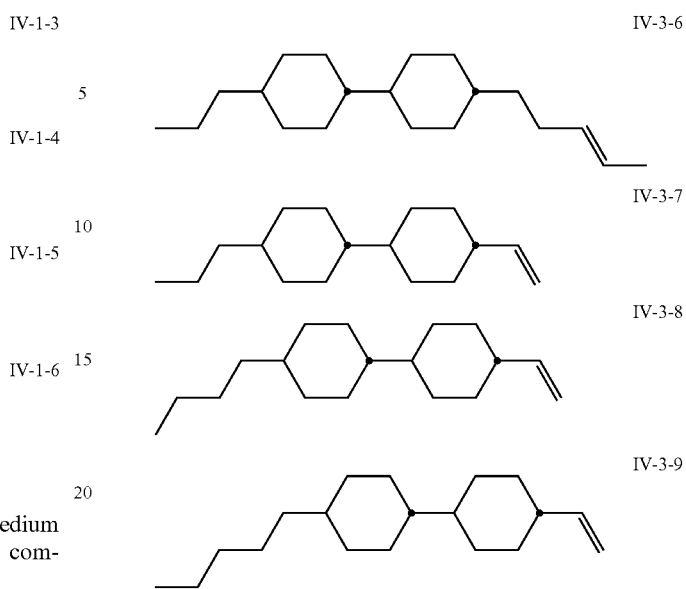

IV-3-6
IV-3-7
IV-3-8
IV-3-9

Further preferably, component C of the LC medium according to the invention comprises one or more compounds selected from the following subformulae:

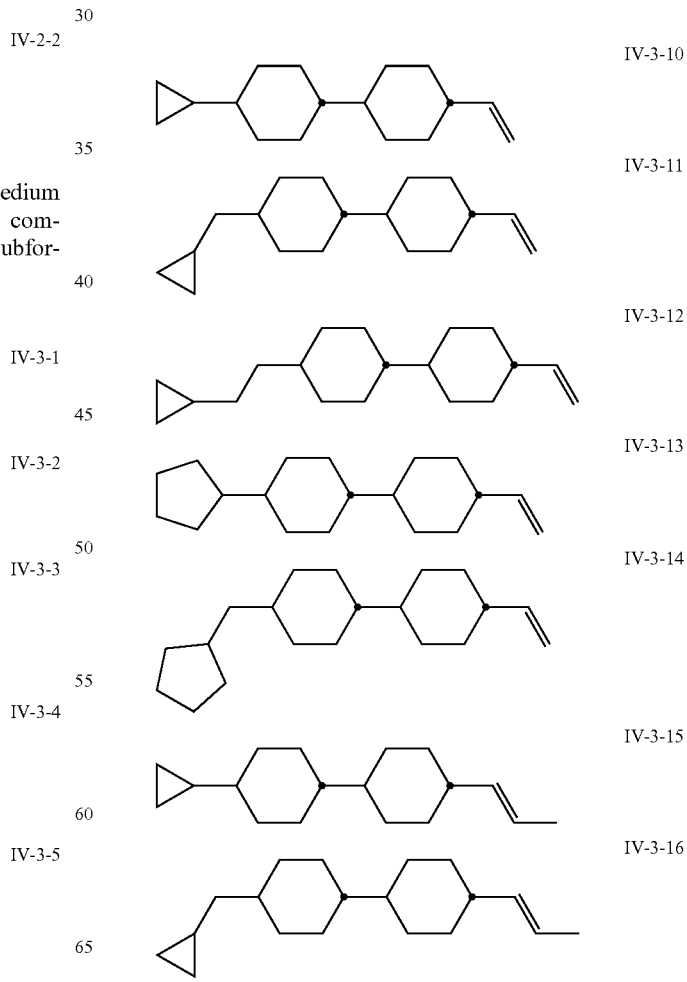

IV-3-10
IV-3-11
IV-3-12
IV-3-13
IV-3-14
IV-3-15
IV-3-16

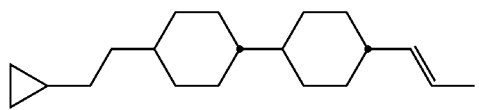
IV-3-17
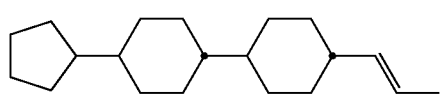
IV-3-18
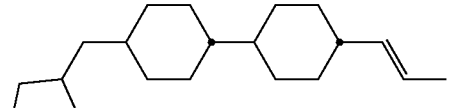
IV-3-19
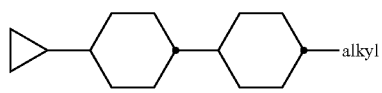
IV-3-20
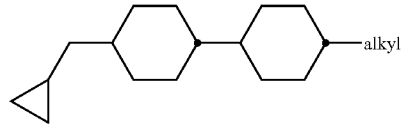
IV-3-21
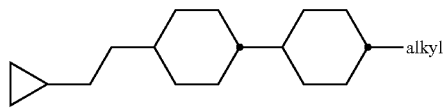
IV-3-22
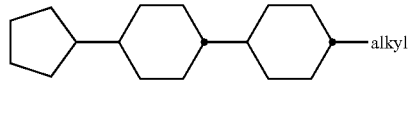
IV-3-23
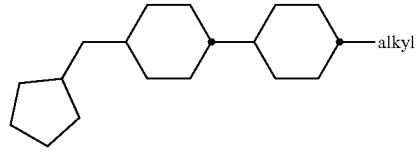
IV-3-24
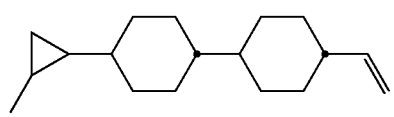
IV-3-25
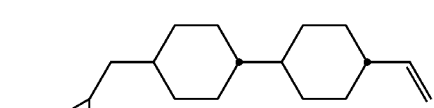
IV-3-26
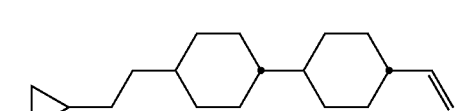
IV-3-27
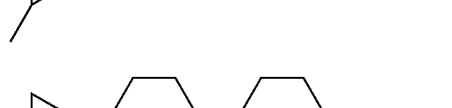
IV-3-28
IV-3-29
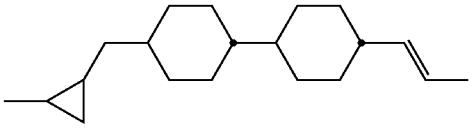
IV-3-30
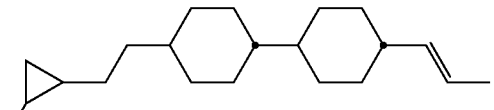
IV-3-31
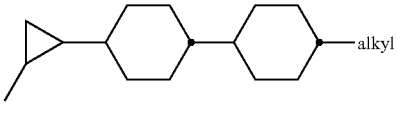
IV-3-32
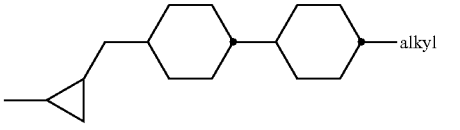
IV-3-33
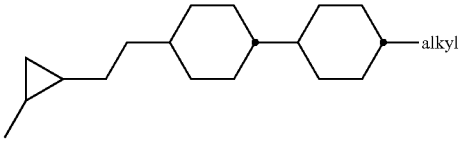
in which alkyl denotes methyl, ethyl, n-propyl, isopropyl, n-butyl, isobutyl, or n-pentyl.
Further preferably, component C of the LC medium according to the invention comprises a compound of formula IV-4, in particular selected from the following subformulae:
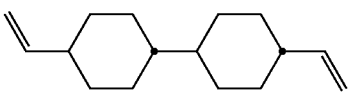
IV-4-1
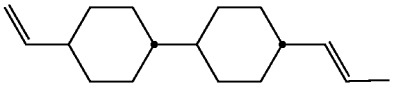
IV-4-2
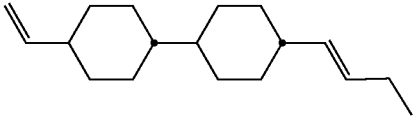
IV-4-3
IV-4-4
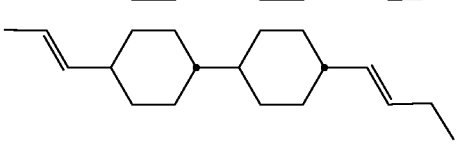
IV-4-5

-continued

IV-4-6

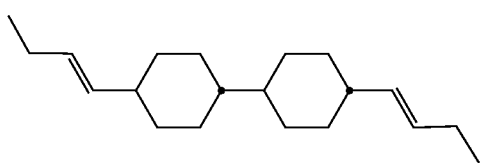

In another preferred embodiment component C of the LC medium comprises one or more compounds of formula IV-4 and its subformulae in which one or both of "alkenyl" and "alkenyl*" denote

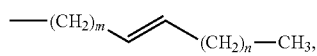

in which m is 0, 1 or 2, and n is 0, 1 or 2, very preferably selected from compounds of formulae IV-4-3 to IV-4-6.

Very preferably, component C of the LC medium comprises one or more compounds of the formula IV-1 or its subformulae and/or one or more compounds of the formula IV-3 or its subformulae and/or one or more compounds of the formula IV-4 or its subformulae, where the total concentration of these compounds of the formula IV-1 is in the range from 1% to 30%.

Preferred compounds of formula IVa are selected from the following subformulae:

IVa-1

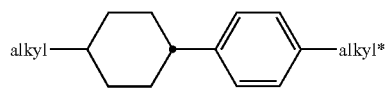

IVa-2

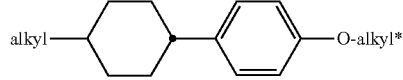

IVa-3

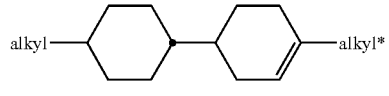

IVa-4

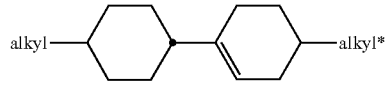

in which alkyl and alkyl* each, independently of one another, denote a straight-chain alkyl radical having 1 to 6 C atoms.

Component B of the LC medium preferably comprises at least one compound of the formula IVa-1 and/or formula IVa-2.

The proportion of compounds of the formula IVa in the mixture as a whole is preferably at least 5% by weight Preferred compounds of formula IVb are selected from the following subformulae:

IVb-1

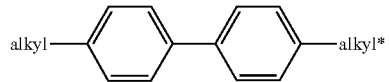

-continued

IVb-2

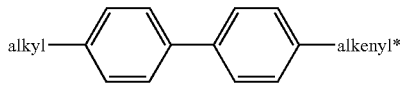

IVb-3

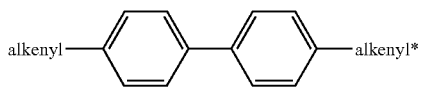

in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

The proportion of the compounds of the formulae IVb-1 to IVb-3 in the mixture as a whole is preferably at least 3% by weight, in particular ≥5% by weight.

Of the compounds of the formulae IVb-1 to IVb-3, the compounds of the formula IVb-2 are particularly preferred.

Particularly preferred compounds of the formulae IVb-1 to IVb-3 are selected from the group consisting of the following subformulae IVb-1-1

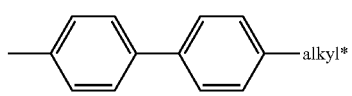

IVb-2-1

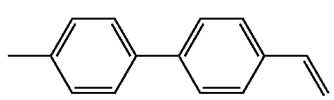

IVb-2-2

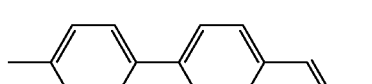

IVb-2-3

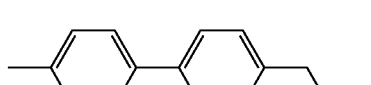

in which alkyl* denotes an alkyl radical having 1 to 6 C atoms and preferably denotes n-propyl.

Component C of the LC medium particularly preferably comprises one or more compounds of the formulae IVb-1-1 and/or IVb-2-3.

Preferred compounds of formula V are selected from the following subformulae:

V-1

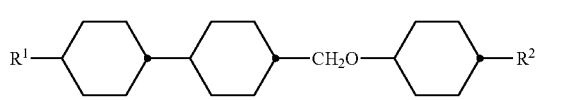

V-2

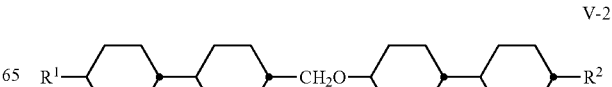

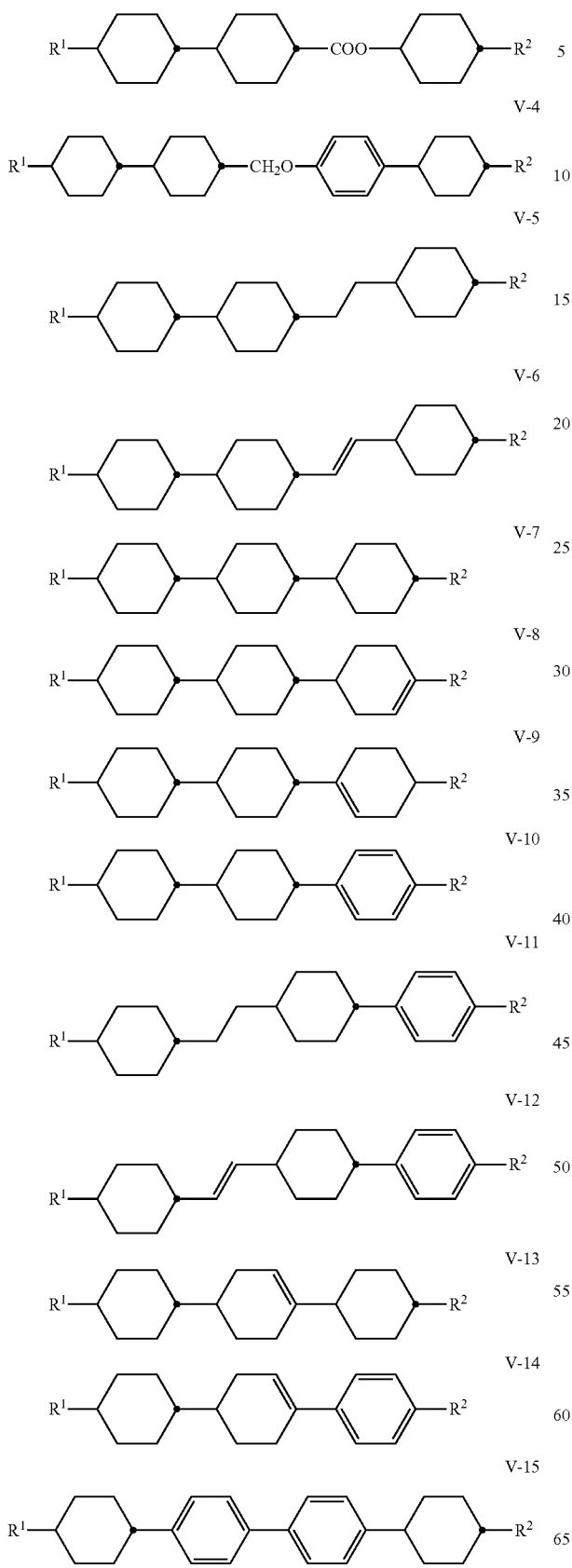

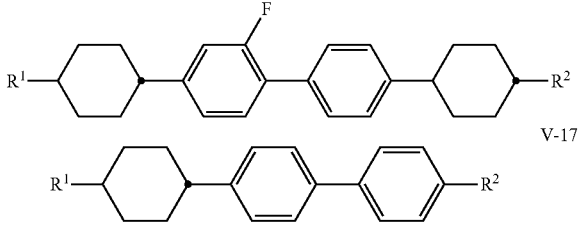

in which $R^1$ and $R^2$ have the meanings indicated for $R^{51}$ and $R^{52}$ above.

$R^1$ and $R^2$ preferably each, independently of one another, denote straight-chain alkyl or alkenyl.

Preferably component C of the LC medium comprises one or more compounds of the formulae V-1, V-3, V-4, V-6, V-7, V-10, V-11, V-12, V-14, V-15, and/or V-16.

Component C of the LC medium preferably comprises the compounds of the formula V-10 and/or IV-1, in particular in amounts of 5 to 30%.

Preferred compounds of the formulae V-10 are indicated below:

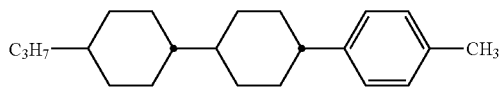

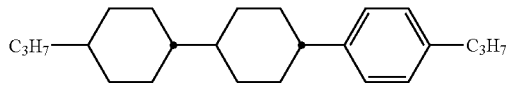

Component C of the LC medium very preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Very preferably component C of the LC medium comprises the compounds V-10a and/or IV-1-1:

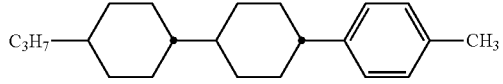

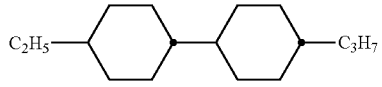

The compounds V-1 a and IV-1-1 are preferably present in the mixture in a concentration of 5 to 30%, very preferably 10 to 25%, based on the mixture as a whole.

Further preferably component C of the LC medium comprises at least one compound selected from the group of the compounds Very preferred compounds of the formulae V-7a to V-7e are selected from the compounds of the following subformulae:

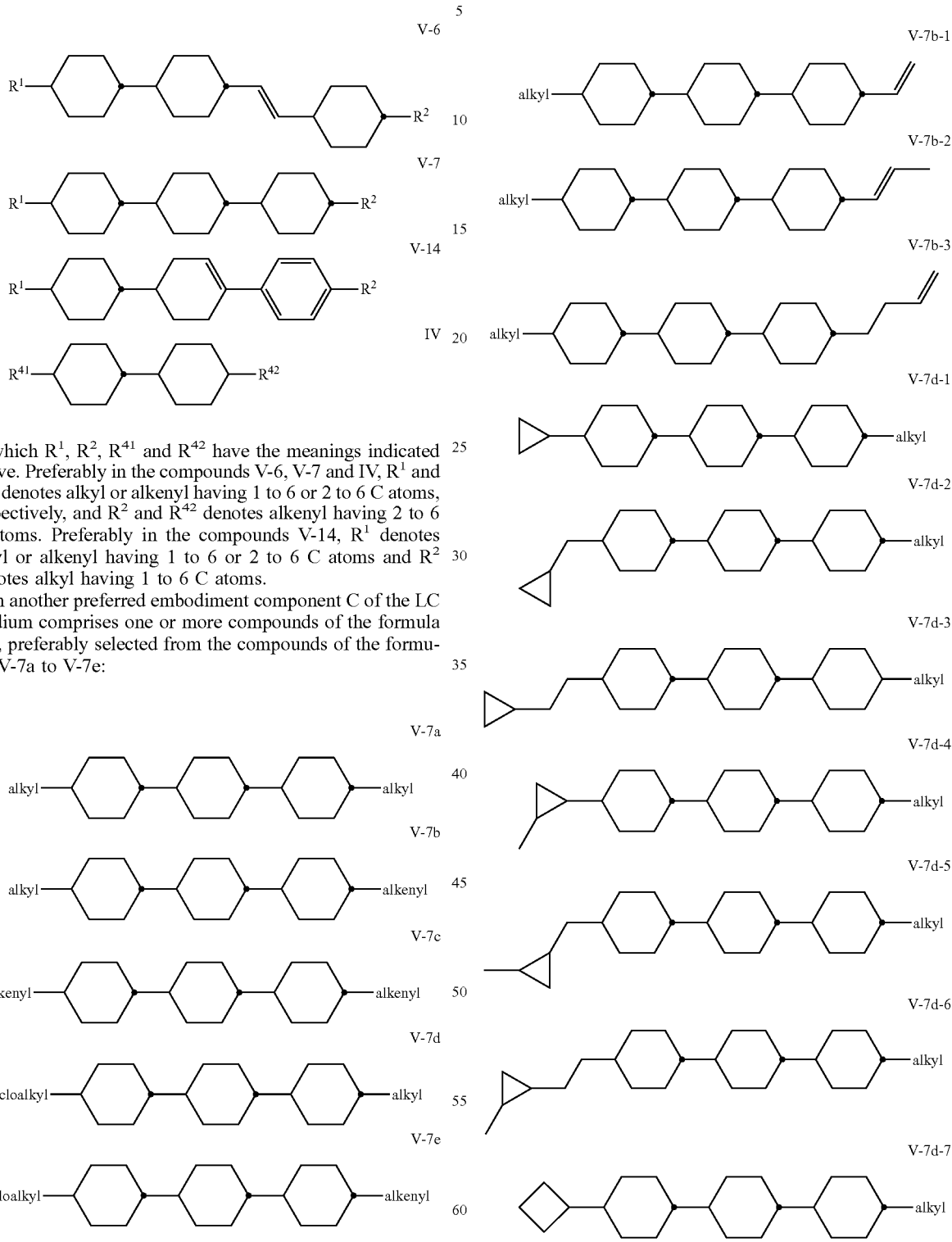

in which $R^1$, $R^2$, $R^{41}$ and $R^{42}$ have the meanings indicated above. Preferably in the compounds V-6, V-7 and IV, $R^1$ and $R^{41}$ denotes alkyl or alkenyl having 1 to 6 or 2 to 6 C atoms, respectively, and $R^2$ and $R^{42}$ denotes alkenyl having 2 to 6 C atoms. Preferably in the compounds V-14, $R^1$ denotes alkyl or alkenyl having 1 to 6 or 2 to 6 C atoms and $R^2$ denotes alkyl having 1 to 6 C atoms.

In another preferred embodiment component C of the LC medium comprises one or more compounds of the formula V-7, preferably selected from the compounds of the formulae V-7a to V-7e:

in which alkyl denotes an alkyl group having 1 to 7 C atoms, alkenyl denotes an alkenyl group having 2 to 7 C atoms, and cycloalkyl denotes a cyclic alkyl group having 3 to 12 C atoms, preferably cyclopropyl, cyclobutyl, cyclopentyl, cyclopropylalkyl, cyclobutylalkyl or cyclopentylalkyl.

V-7d-9
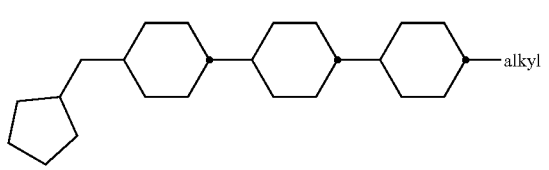
—alkyl

V-7e-1
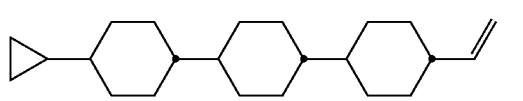

V-7e-2
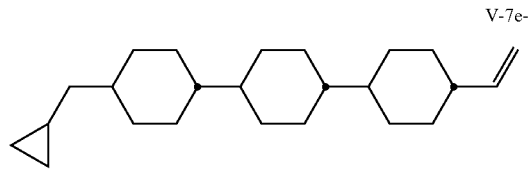

V-7e-3
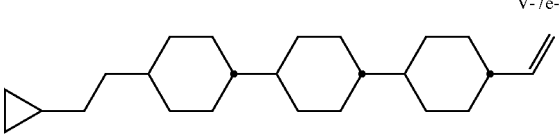

V-7e-4
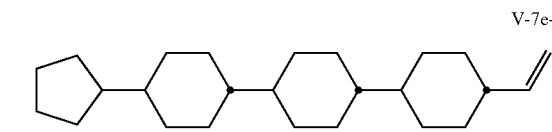

V-7e-5
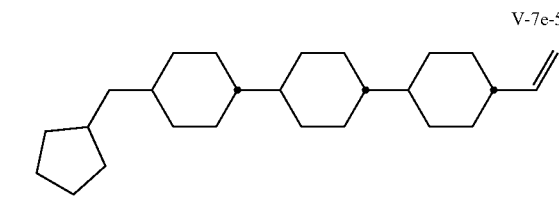

V-7e-6
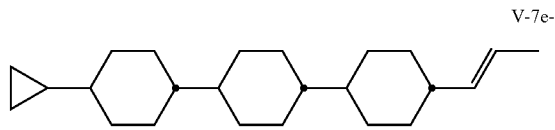

V-7e-7
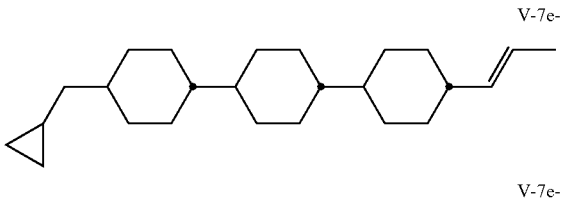

V-7e-8
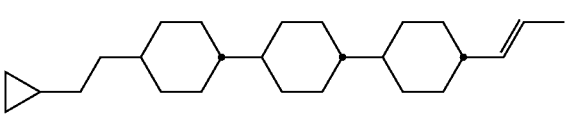

V-7e-9
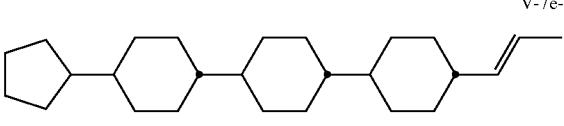

V-7e-10
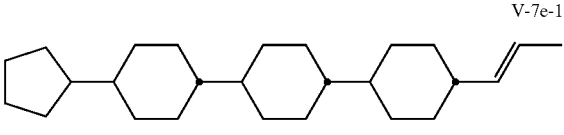

V-7e-11
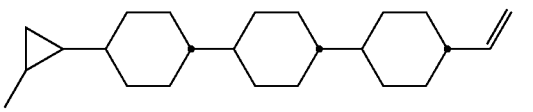

V-7e-12

V-7e-13

V-7e-14

V-7e-15

V-7e-16 in which alkyl denotes ethyl, n-propyl, n-butyl or n-pentyl, preferably n-propyl.

Further preferred are compounds of formula V, wherein $R^{51}$ and $R^{52}$ independently of one another denote straight-chain alkyl having 1 to 7 C atoms or alkenyl having 2 to 7 C atoms.

Further preferred embodiments of the LC medium according to the present invention are listed below, including any combination thereof:

a) Component B of the LC medium additionally comprises one or more compounds of formula III,

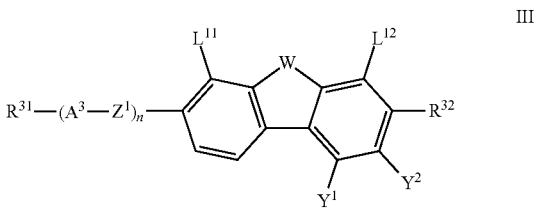

in which
$R^{31}, R^{32}$ each, independently of one another, denote H, an alkyl, alkoxy or alkenyl radical having up to 15 C atoms which is unsubstituted, monosubstituted by F, Cl, CN or $CF_3$ or at least monosubstituted by halogen, where, in addition, one or more CH$_2$ groups in these radicals may be replaced by —O—, —S—,

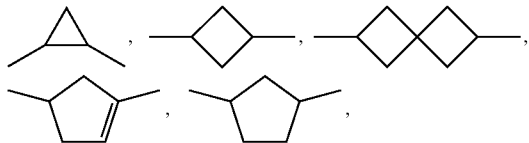

—C≡C—, —CF$_2$O—, —OCF$_2$—, —OC—O— or —O—CO— in such a way that O atoms are not linked directly to one another, Y$^1$, Y$^2$ H, F, Cl, CF$_3$, CHF$_2$, CH$_3$ or OCH$_3$, preferably H, CH$_3$ or OCH$_3$, very preferably H, A$^3$ on each occurrence, independently of one another, denotes
- a) 1,4-cyclohexenylene or 1,4-cyclohexylene radical, in which one or two non-adjacent CH$_2$ groups may be replaced by —O— or —S—,
- b) a 1,4-phenylene radical, in which one or two CH groups may be replaced by N, or
- c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, n denotes 0, 1 or 2, preferably 0 or 1, Z$^1$ on each occurrence independently of one another denotes —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, and L$^{11}$, L$^{12}$ each, independently of one another, denote F, Cl, CF$_3$ or CHF$_2$, preferably H or F, most preferably F, and W denotes O or S.

In the compounds of formula III R$^{31}$ and R$^{32}$ are preferably selected from straight-chain alkyl or alkoxy with 1 to 12, preferably 1 to 7 C atoms, straight-chain alkenyl with 2 to 12, preferably 2 to 7 C atoms and cyclic alkyl or alkoxy with 3 to 12, preferably 3 to 8 C atoms.

Preferred compounds of formula III are selected from subformulae III-1 and III-2,

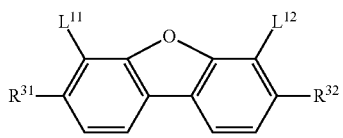

III-1

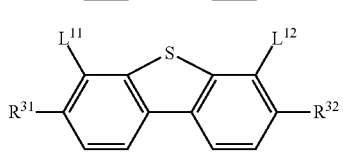

III-2 in which the occurring groups have the same meanings as given under formula III above and preferably R$^{31}$,R$^{32}$ each, independently of one another, an alkyl, alkenyl or alkoxy radical having up to 15 C atoms, more preferably one or both of them denote an alkoxy radical and L$^{11}$,L$^{12}$ each preferably denote F.

Preferred compounds of the formula III-1 are selected from the following subformulae, preferably of formula III-1-6:

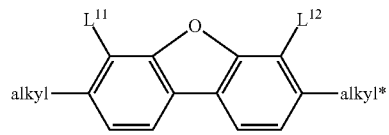

III-1-1

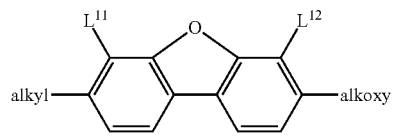

III-1-2

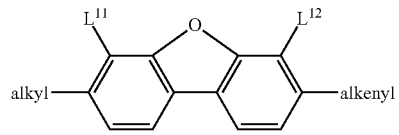

III-1-3

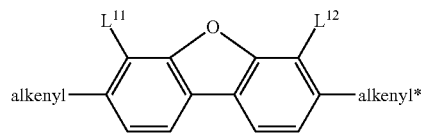

III-1-4

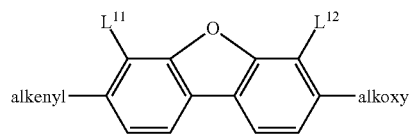

III-1-5

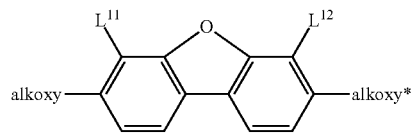

III-1-6

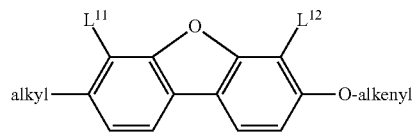

III-1-7

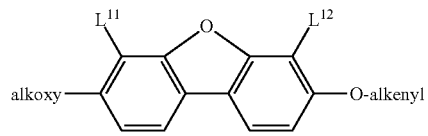

III-1-8

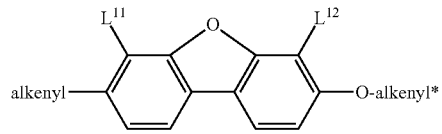

III-1-9

-continued

III-1-10

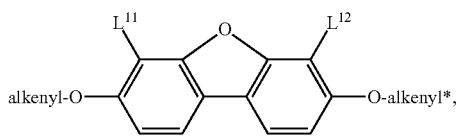

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

Preferred compounds of the formula III-2 are selected from the following subformulae, preferably of formula III-2-1:

III-2-1

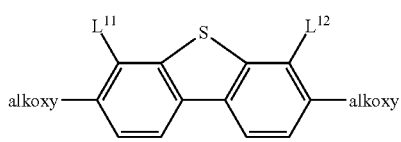

III-2-2

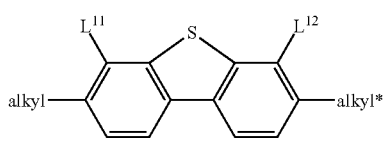

III-2-3

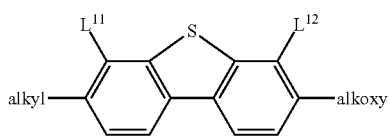

III-2-4

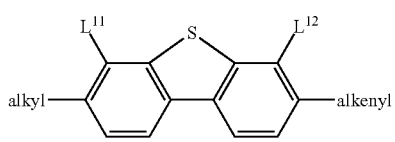

III-2-5

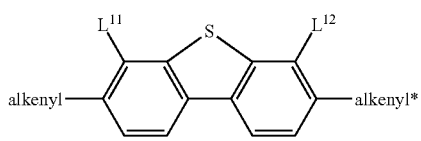

III-2-6

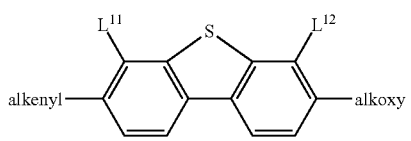

III-2-7

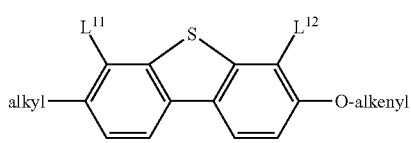

III-2-8

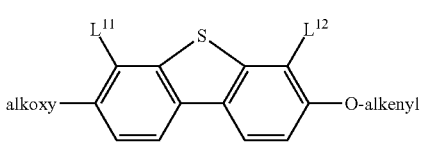

III-2-9

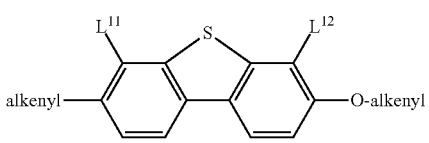

III-2-10

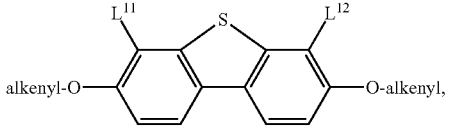

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

Preferred compounds of formula III-2-1 are selected from the group consisting of the following subformulae:

III-2-1-1

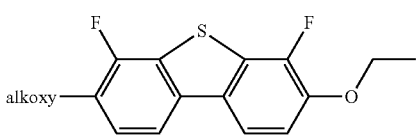

III-2-1-2

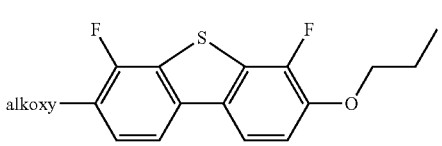

III-2-1-3

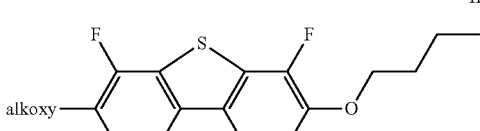

III-2-1-4

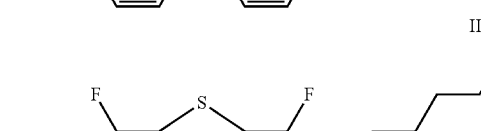

III-2-1-5

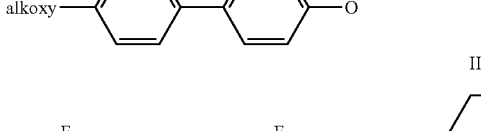

in which alkoxy denotes a straight-chain alkoxy radical having 1-6 C atoms, preferably ethoxy, propoxy, butoxy or pentoxy, very preferably ethoxy or propoxy.

Very preferred are the compounds of formula III-2-1-3, III-2-1-4 and III-2-1-5.

In another preferred embodiment of the present invention the LC medium comprises one or more compounds of formula III selected from the formulae III-3-1 and III-3-2

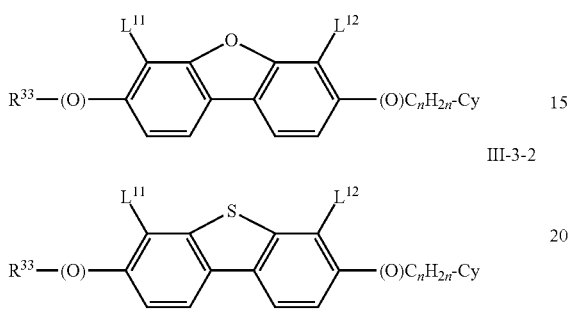

III-3-1

III-3-2 in which $L^{11}$ and $L^{12}$ have the same meanings as given under formula III, (O) denotes O or a single bond, $R^{33}$ denotes alkyl or alkenyl having up to 7 C atoms or a group $Cy-C_mH_{2m+1}$—, m and n are, identically or differently, 0, 1, 2, 3, 4, 5 or 6, preferably 1, 2 or 3, very preferably 1, and Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula III-3-1 and/or III-3-2 are contained in the LC medium either alternatively or additionally to the compounds of formula III-1 and/or III-2, preferably additionally.

Very preferred compounds of the formula III-3-1 are the following,

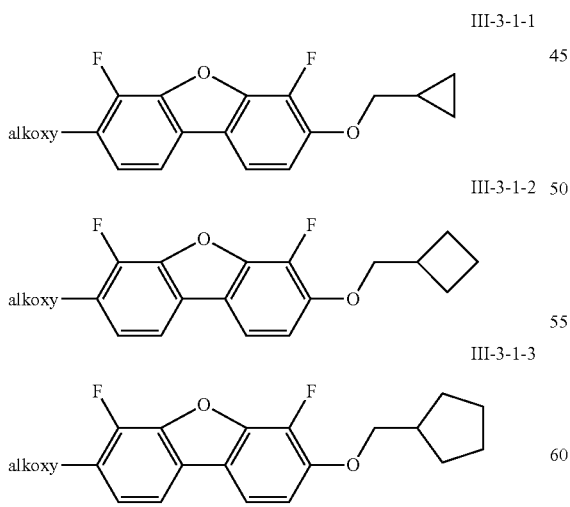

III-3-1-1

III-3-1-2

III-3-1-3 in which alkoxy denotes a straight-chain alkoxy radical having 1-6 C atoms.

Very preferred compounds of the formula III-3-2 are the following,

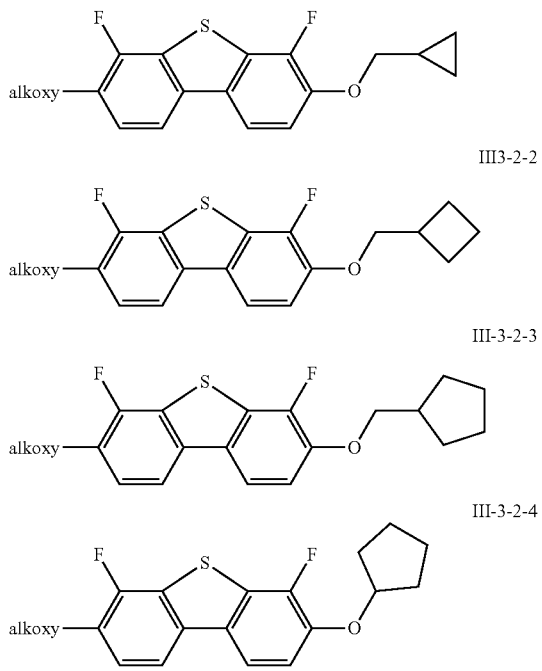

III-3-2-1

III3-2-2

III-3-2-3

III-3-2-4 in which alkoxy denotes a straight-chain alkoxy radical having 1-6 C atoms, preferably ethoxy, propoxy, butoxy or pentoxy, very preferably ethoxy or propoxy.

In another preferred embodiment of the present invention, component B of the LC medium comprises one or more compounds of the formulae III-4 to III-6, preferably of formula III-5,

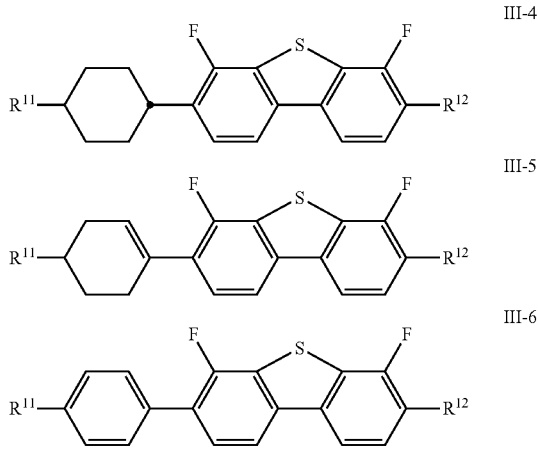

III-4

III-5

III-6 in which $R^{11}$ and $R^{12}$ have independently of each other one of the meanings of $R^{31}$ in formula III, $R^{11}$ preferably denotes straight-chain alkyl and $R^{12}$ preferably denotes alkoxy, each having 1 to 7 C atoms.

In another preferred embodiment component B of the LC medium comprises one or more compounds of the formula III selected from the group of compounds of formulae III-7 to III-12, preferably of formula III-8, III-7
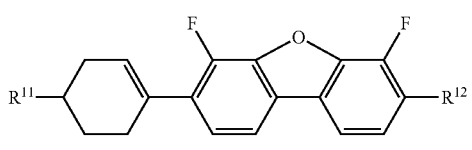
III-8
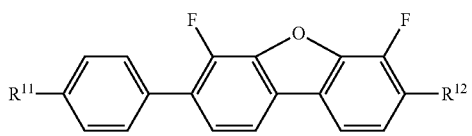
III-9
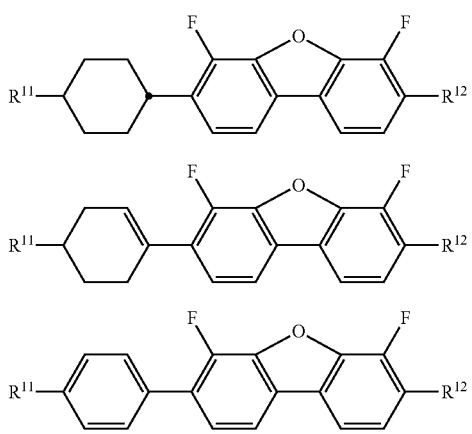
in which R[11] and R[12] have independently of each other one of the meanings of R[31] in formula III, R[11] preferably denotes straight-chain alkyl and R[12] preferably denotes alkoxy each having 1 to 7 C atoms.
b) Component B of the LC medium comprises one or more compounds selected from the formulae VI-1 to VI-25,
VI-1
VI-2
VI-3
VI-4
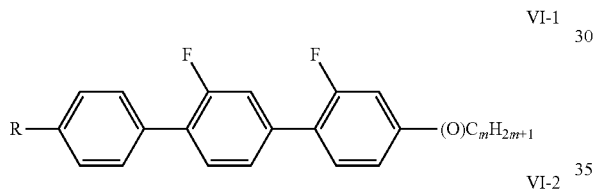
VI-5
VI-6
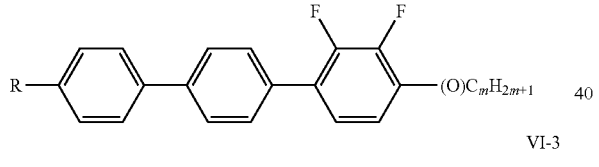
-continued
VI-7
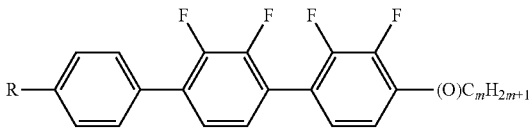
VI-8
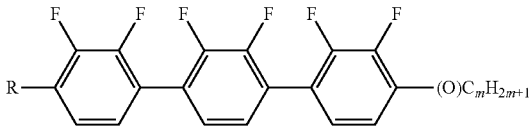
VI-9
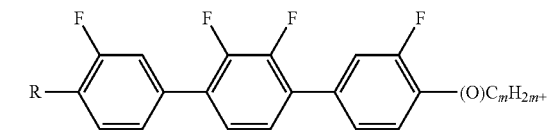
VI-10
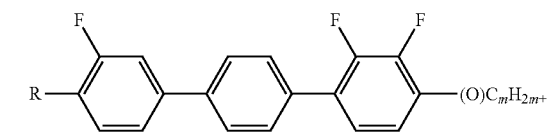
VI-11
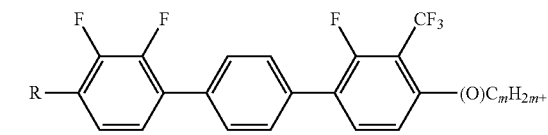
VI-12
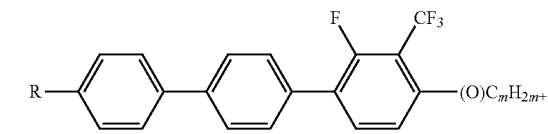
VI-13
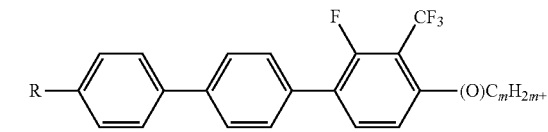
VI-14
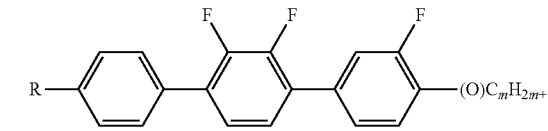
VI-15
VI-16
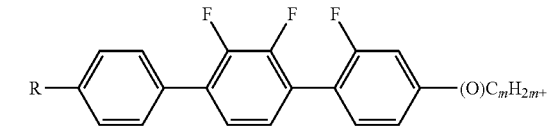

-continued

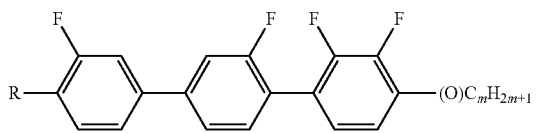
VI-17

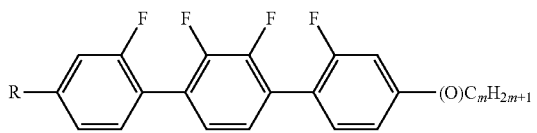
VI-18

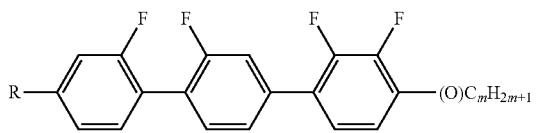
VI-19

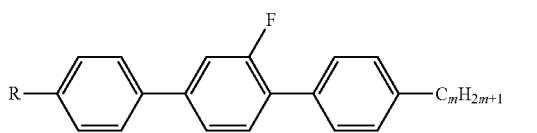
VI-20

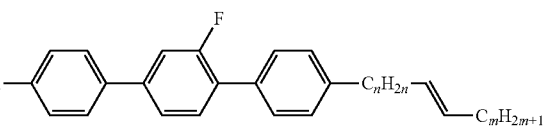
VI-21

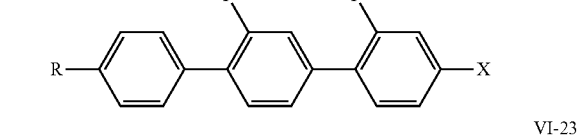
VI-22

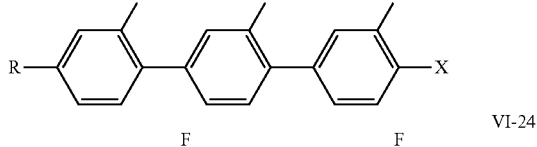
VI-23

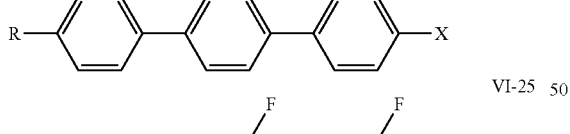
VI-24

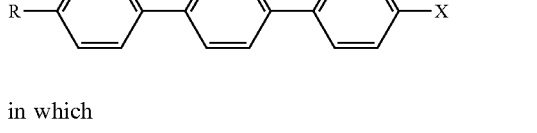
VI-25 in which
R denotes a straight-chain alkyl or alkoxy radical having 1 to 6 C atoms, (O) denotes —O— or a single bond, X denotes F, Cl, OCF$_3$ or OCHF$_2$, L$^x$ denotes H or F, m is 0, 1, 2, 3, 4, 5 or 6 and n is 0, 1, 2, 3 or 4.

R preferably denotes methyl, ethyl, propyl, butyl, pentyl, hexyl, methoxy, ethoxy, propoxy, butoxy, pentoxy.

X preferably denotes F or OCH$_3$, very preferably F.

The LC medium according to the invention preferably comprises the terphenyls of the formulae VI-1 to VI-25 in amounts of 2 to 30% by weight, in particular 5 to 20% by weight.

Particular preference is given to compounds of the formulae VI-1, VI-2, VI-4, VI-20, VI-21, and VI-22 wherein X denotes F. In these compounds, R preferably denotes alkyl, furthermore alkoxy, each having 1 to 5 C atoms. In the compounds of the formula VI-20, R preferably denotes alkyl or alkenyl, in particular alkyl. In the compounds of the formula VI-21, R preferably denotes alkyl. In the compounds of the formulae VI-22 to VI-25, X preferably denotes F.

The terphenyls of formula VI-1 to VI-25 are preferably employed in the LC media according to the invention if the Δn value of the mixture is to be ≥0.1. Preferred LC media comprise 2 to 20% by weight of one or more terphenyl compounds selected from the group of the compounds of formulae VI-1 to VI-25.

c) Component B of the LC medium comprises one or more compounds selected from the formulae VII-1 to VII-9

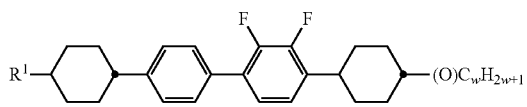
VII-1

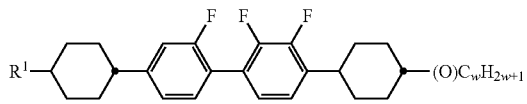
VII-2

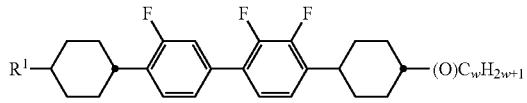
VII-3

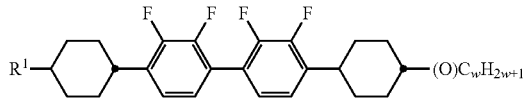
VII-4

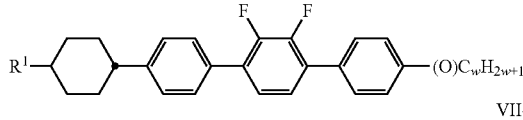
VII-5

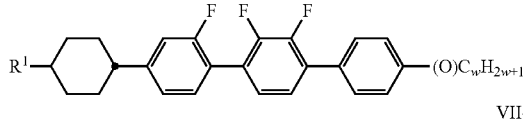
VII-6

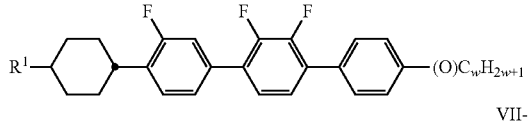
VII-7

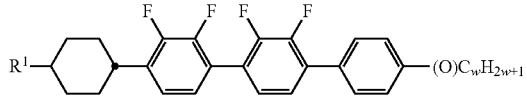
VII-8

-continued

VII-9

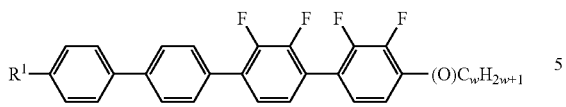

in which
R¹ each, independently of one another, have one of the meanings indicated for R²¹ in formula IIA, and
w, x each, independently of one another, denote 1 to 6.
Particular preference is given to compounds of the formula VII-9.

d) Component B of the LC medium comprises one or more substances which contain a tetrahydronaphthyl or naphthyl unit, preferably selected from the formulae N-1 to N-5,

N-1

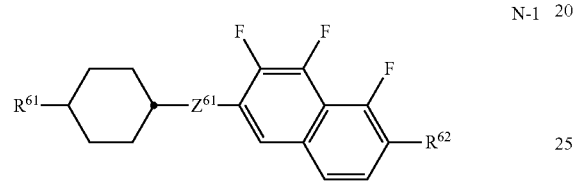

N-2

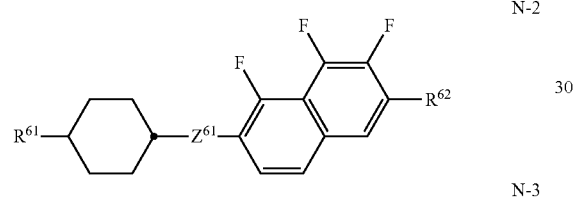

N-3

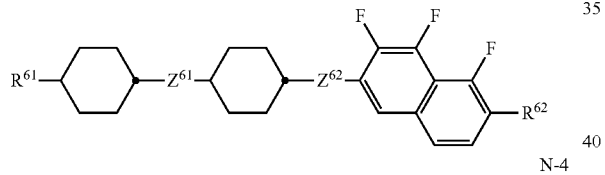

N-4

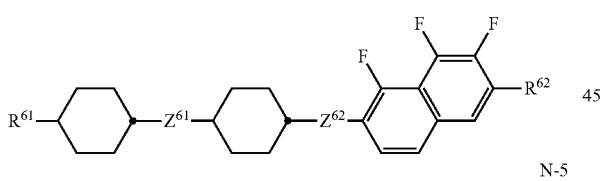

N-5

in which R⁶¹ and R⁶² each, independently of one another, have the meanings indicated for R²¹, preferably denote straight-chain alkyl, straight-chain alkoxy or straight-chain alkenyl, and
Z⁶¹ and Z⁶² each, independently of one another, denote —C₂H₄—, —CH=CH—, —(CH₂)₄—, —(CH₂)₃O—, —O(CH₂)₃—, —CH=CHCH₂CH₂—, —CH₂CH₂CH=CH—, —CH₂O—, —OCH₂—, —COO—, —OCO—, —C₂F₄—, —CF=CF—, —CF=CH—, —CH=CF—, —CF₂O—, —OCF₂—, —CH₂— or a single bond.

e) Component B of the LC medium comprises one or more compounds selected from the group of the difluorodibenzochroman compounds of the formula BC, chromans of the formula CR, and fluorinated phenanthrenes of the formulae PH-1 and PH-2,

BC

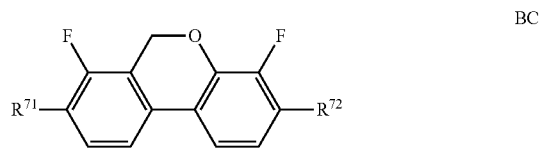

CR

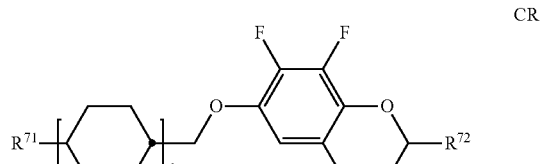

PH-1

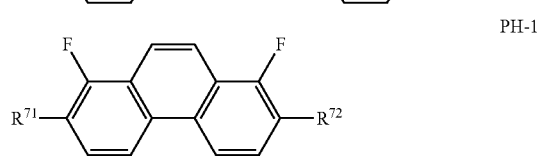

PH-2

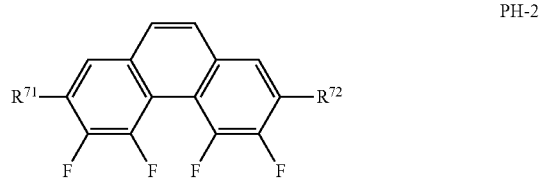

in which
R⁷¹ and R⁷² each, independently of one another, have the meaning of R²¹ and c is 0, 1 or 2. R⁷¹ and R⁷² preferably, independently of one another, denote alkyl or alkoxy having 1 to 6 C atoms.

The LC medium according to the invention preferably comprises the compounds of the formulae BC, CR, PH-1, PH-2 in amounts of 3 to 20% by weight, in particular in amounts of 3 to 15% by weight.

Particularly preferred compounds of the formulae BC and CR are the compounds BC-1 to BC-7 and CR-1 to CR-5,

BC-1

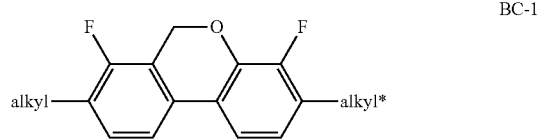

BC-2

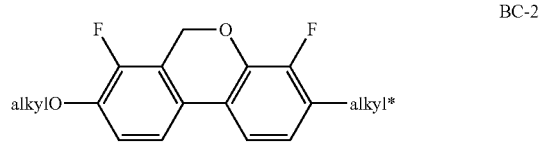

BC-3

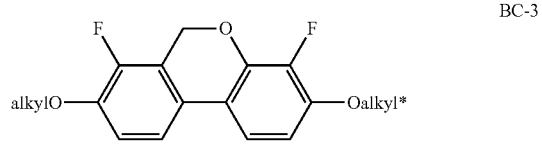

-continued

BC-4
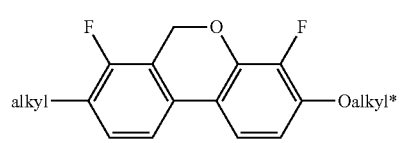

BC-5
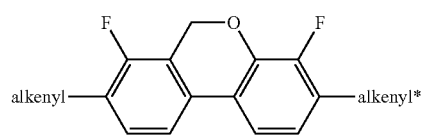

BC-6
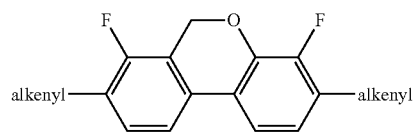

BC-7
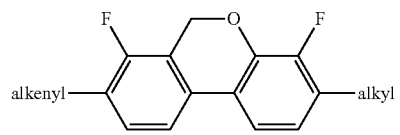

CR-1
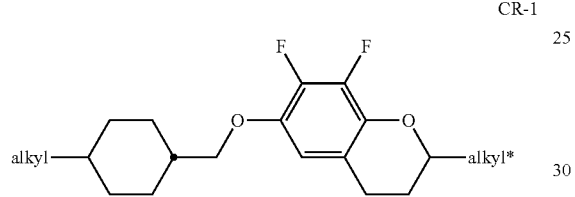

CR-2
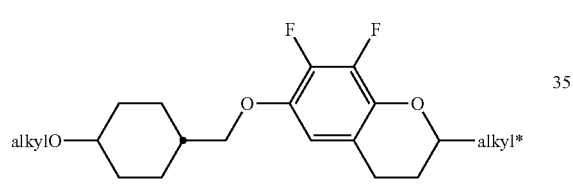

CR-3
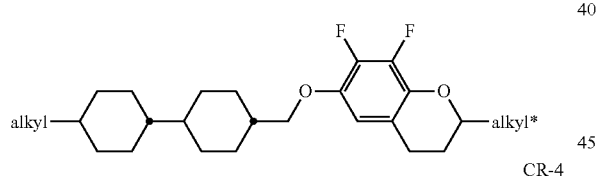

CR-4
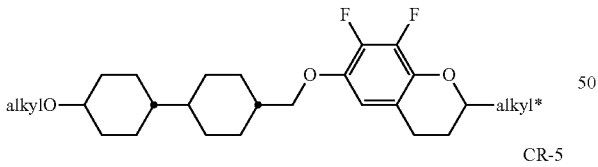

CR-5
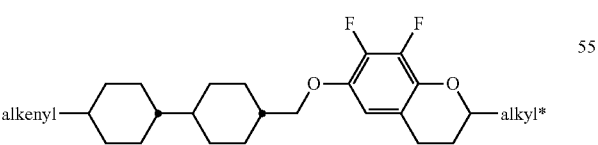

in which
alkyl and alkyl* each, independently of one another, denote a straight-chain alkyl radical having 1 to 6 C atoms, and
alkenyl and
alkenyl* each, independently of one another, denote a straight-chain alkenyl radical having 2 to 6 C atoms.

Very particular preference is given to an LC medium comprising one, two or three compounds of the formula BC-2.

f) Component B of the LC medium comprises one or more indane compounds the formula In,

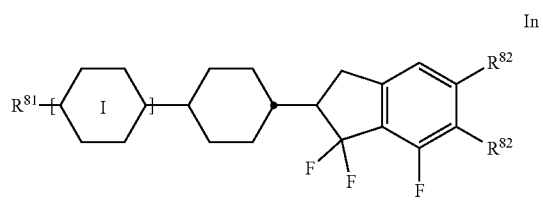
In in which
$R^{81}$, $R^{82}$,
$R^{83}$ each, independently of one another, denote a straight-chain alkyl, alkoxy, alkoxyalkyl or alkenyl radical having 1 to 6 C atoms,
$R^{82}$ and $R^{83}$ may also denote halogen, preferably F,

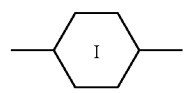

denotes

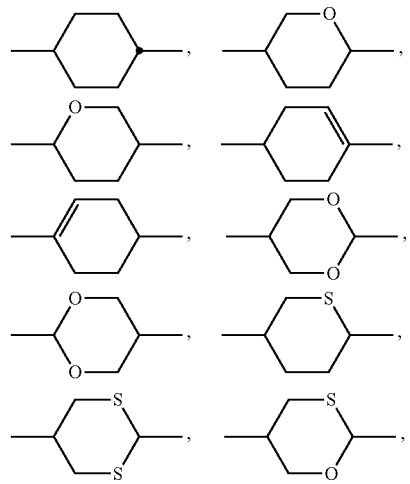

i denotes 0, 1 or 2.

Preferred compounds of the formula In are the compounds of the formulae In-1 to In-16 indicated below:

In-1
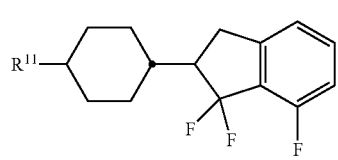

In-2
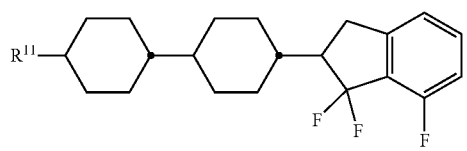

In-3
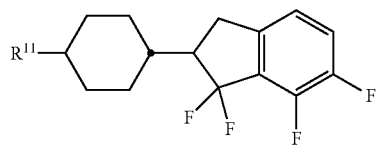

In-4
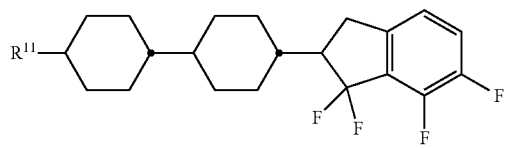

In-5
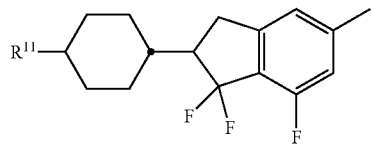

In-6
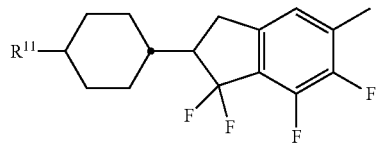

In-7
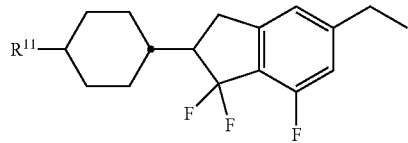

In-8
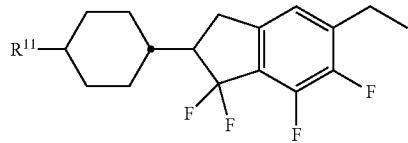

In-9
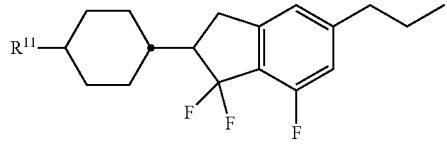

In-10
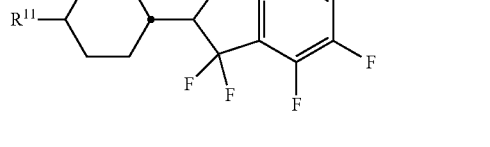

In-11
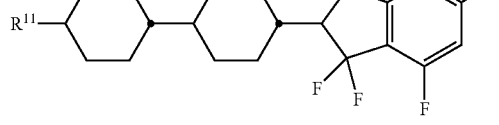

In-12
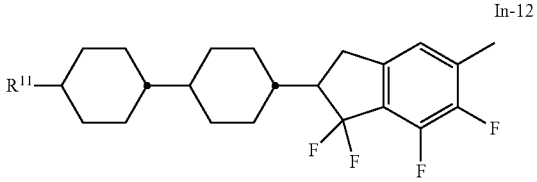

In-13
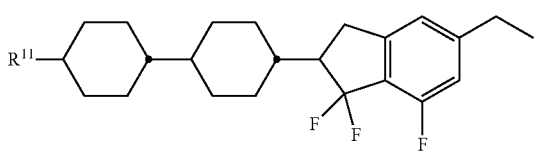

In-14
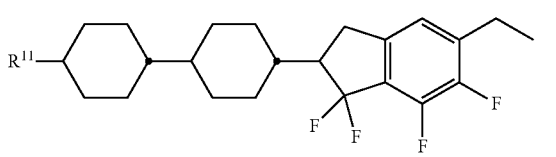

In-15
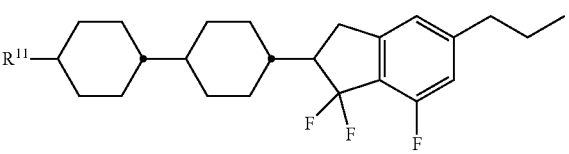

In-16
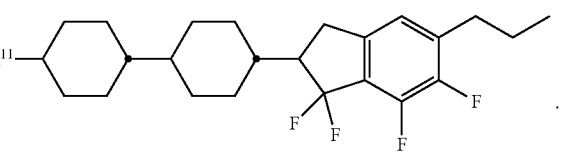

Particular preference is given to the compounds of the formulae In-1, In-2, In-3 and In-4.

The compounds of the formula In and the sub-formulae In-1 to In-16 are preferably employed in the LC media according to the invention in concentrations 5% by weight, in particular 5 to 30% by weight and very particularly preferably 5 to 25% by weight.

g) Component B of the LC medium comprises one or more compounds selected from the formulae L-1 to L-8, L-1
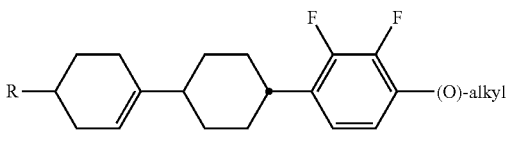

L-2
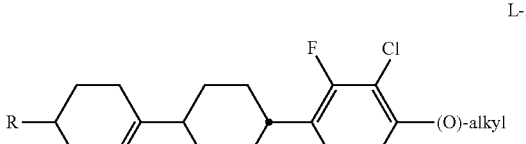

-continued

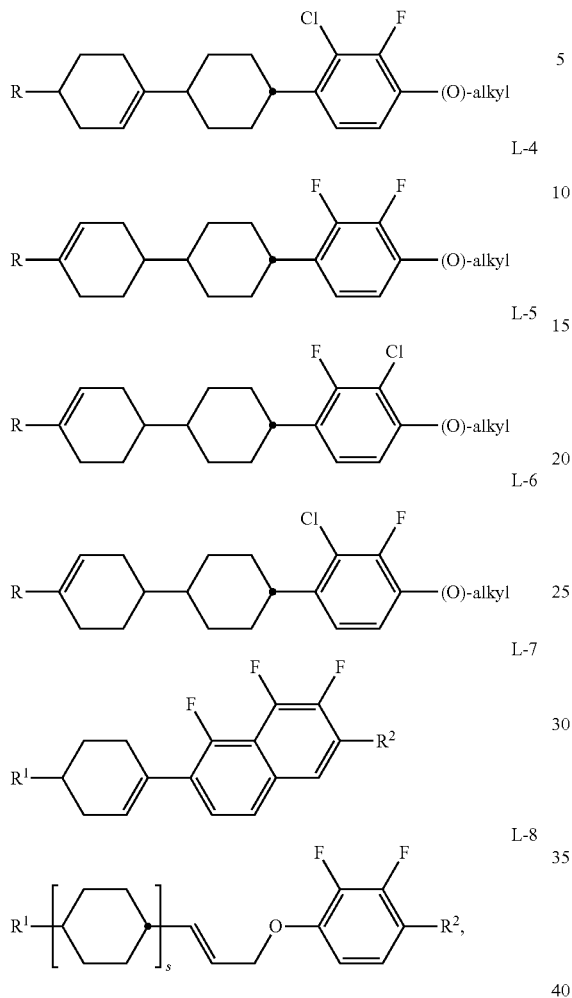

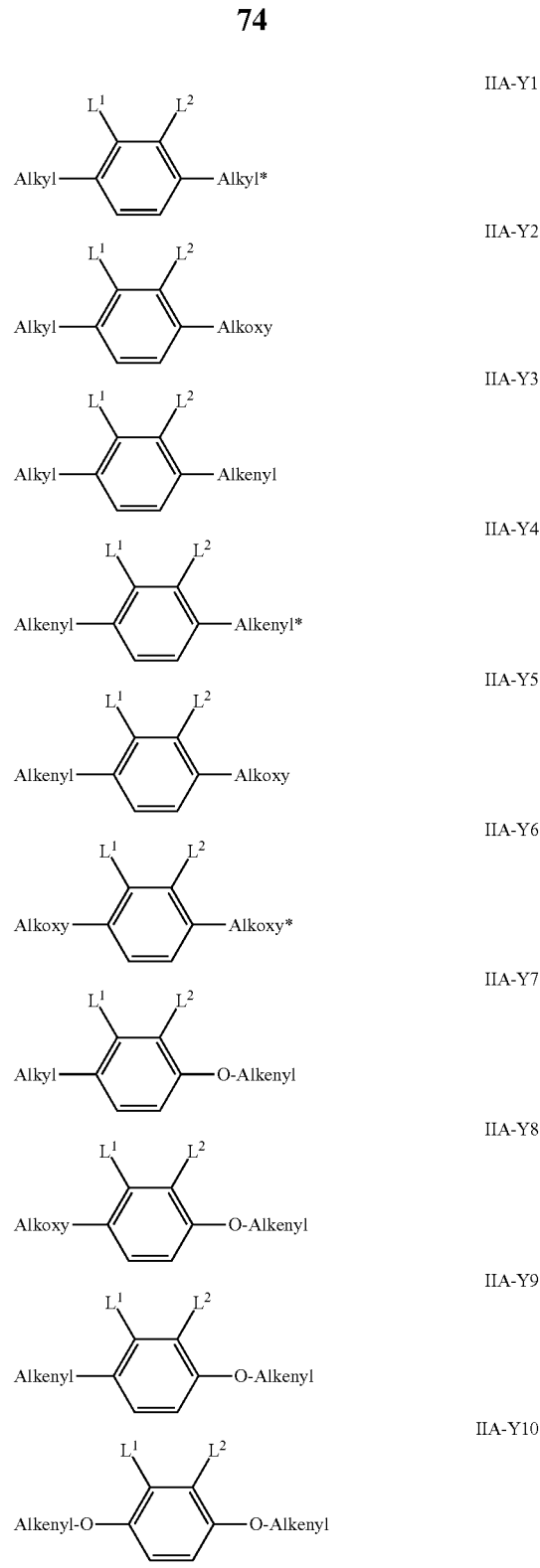

in which
R and $R^1$ each, independently of one another, have the meanings indicated for $R^{21}$ in formula IIA above, and alkyl denotes an alkyl radical having 1 to 6 C atoms. The parameter s denotes 1 or 2.

The compounds of the formulae L-1 to L8 are preferably employed in concentrations of 5 to 15% by weight, in particular 5 to 12% by weight and very particularly preferably 8 to 10% by weight.

h) Component B of the LC medium comprises one or more compounds of formula IIA-Y

in which $R^{11}$ and $R^{12}$ have one of the meanings given for $R^{21}$ in formula IIA above, and $L^1$ and $L^2$, identically or differently, denote F or Cl.

Preferred compounds of the formula IIA-Y are selected from the group consisting of the following subformulae in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$=CH—, $CH_2$=$CHCH_2CH_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Particularly preferred compounds of the formula IIA-Y are selected from the group consisting of following subformulae:

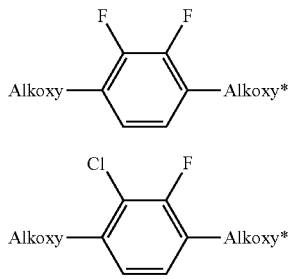

IIA-Y6a

IIA-Y6b in which Alkoxy and Alkoxy* have the meanings defined above and preferably denote methoxy, ethoxy, n-propyloxy, n-butyloxy or n-pentyloxy.

i) Component A of the LC medium comprises one or more compounds selected from the following formulae:

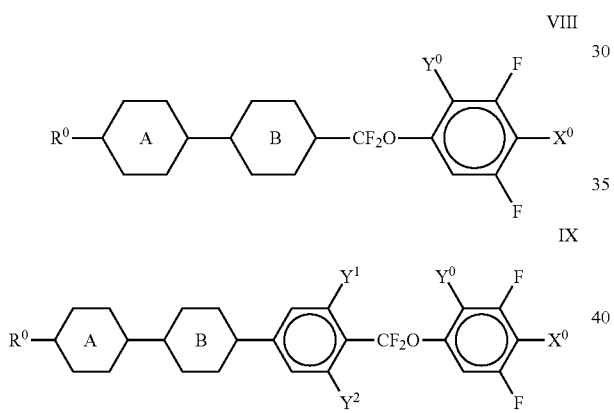

VIII

IX wherein the individual radicals, independently of each other and on each occurrence identically or differently, have the following meanings

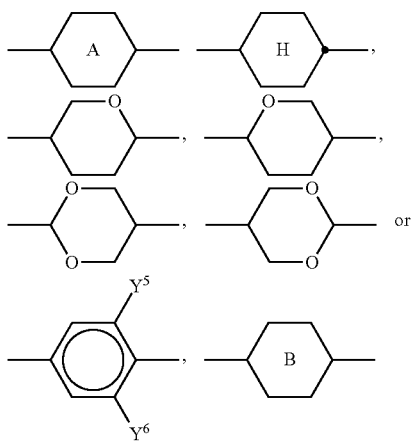

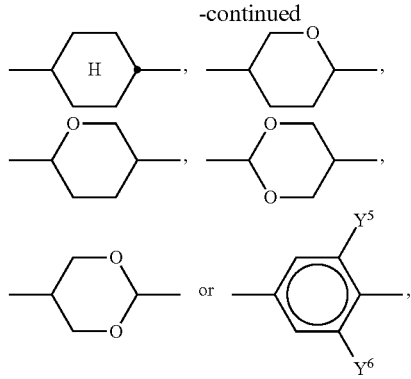

$R^0$ one of the meanings given in formula IA or one of the preferred meanings as given above and below, $X^0$ F, Cl, CN, SF$_5$, SCN, NCS, a halogenated alkyl radical, a halogenated alkenyl radical, a halogenated alkoxy radical or a halogenated alkenyloxy radical having up to 6 C atoms, $Y^{1-6}$ H or F, $Y^0$ H or CH$_3$.

Preferred compounds of formula VIII and IX are those wherein $Y^0$ is H.

Further preferred compounds of formula VIII and IX are those wherein $R^0$ denotes alkyl having 1 to 6 C atoms, very preferably ethyl or propyl, and $X^0$ denotes F or OCF$_3$, very preferably F.

Component A of the LC medium preferably comprises one or more compounds of formula VIII selected from the following subformulae:

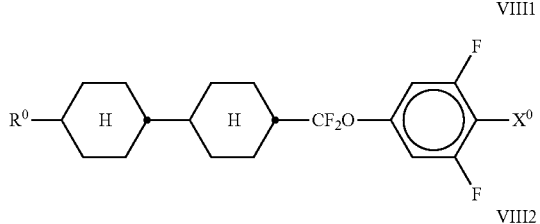

VIII1

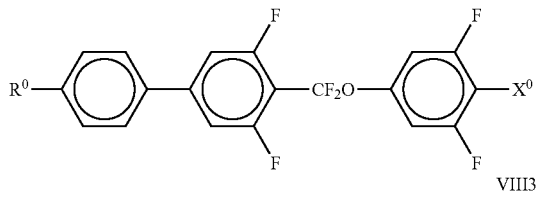

VIII2

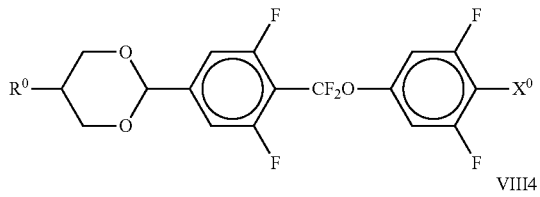

VIII3

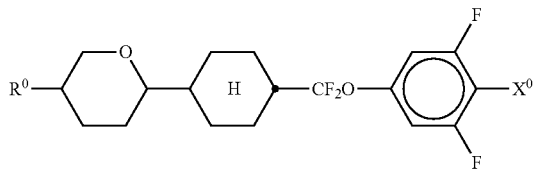

VIII4

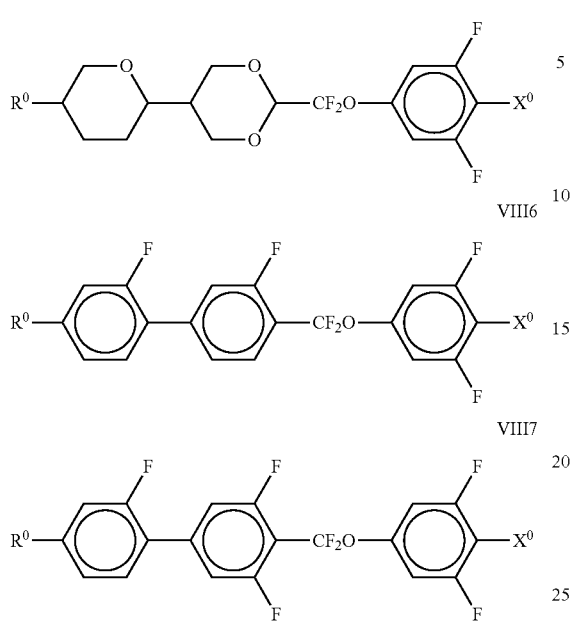

in which R⁰ and X⁰ have the meanings given in formula VIII or one of the preferred meanings given above and below.

Preferred compounds are those of formula VIII1, VIII2 and VIII3, very preferred those of formula VIII1 and VIII2.

In the compounds of formulae VIII1 to VIII7 R⁰ preferably denotes alkyl having 1 to 6 C atoms, very preferably ethyl or propyl, and X⁰ preferably denotes F or OCF₃, very preferably F.

In a further preferred embodiment, component A of the LC medium contains one or more compounds of formula VIII or its subformulae as described above and below wherein Y⁰ is CH₃. Very preferably the component A of the LC medium according to this preferred embodiment comprises one or more compounds of formula VIII selected from the following subformulae:

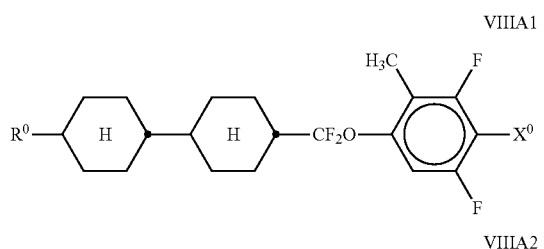

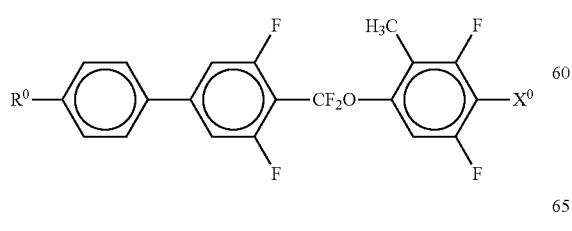

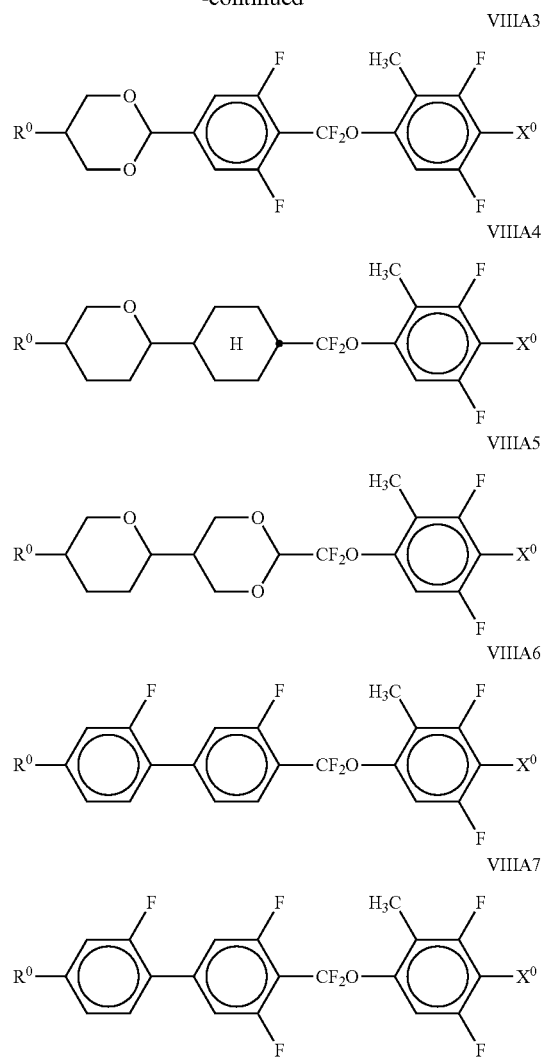

in which R⁰ and X⁰ have the meanings given in formula VIII or one of the preferred meanings given above and below.

Preferred compounds are those of formula VIIIA1, VIIIA2 and VIIIA3, very preferred those of formula VIIIA1 and VIIIA2.

In the compounds of formulae VIIIA1 to VIIIA7 R⁰ preferably denotes alkyl having 1 to 6 C atoms, very preferably ethyl or propyl, and X⁰ preferably denotes F or OCF₃, very preferably F.

Component A of the LC medium preferably comprises one or more compounds of formula IX selected from the following subformulae:

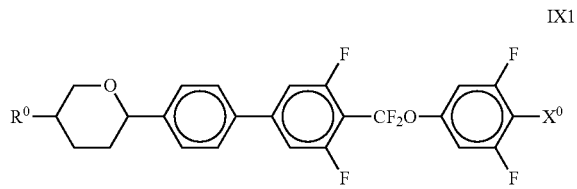

IX2
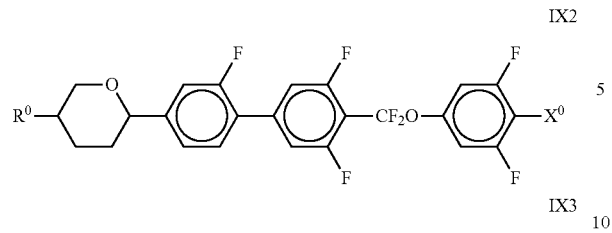
IX3
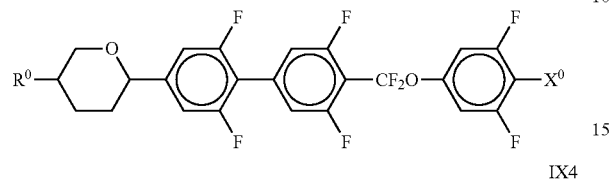
IX4
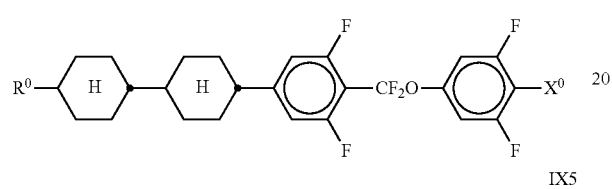
IX5
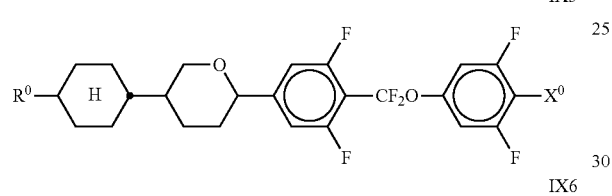
IX6
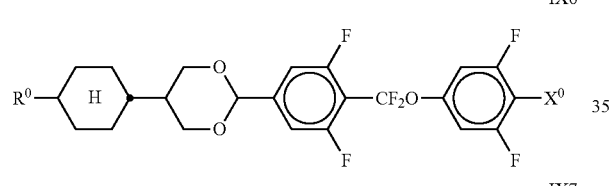
IX7
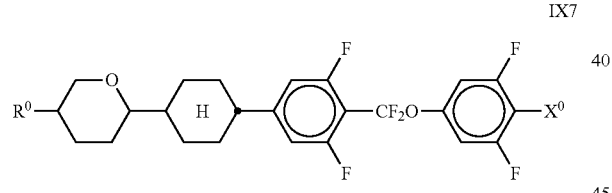
IX8
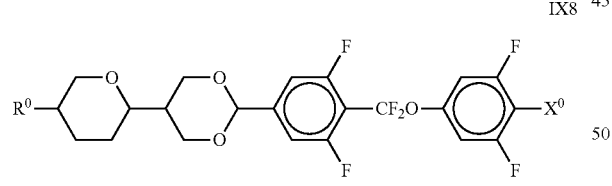
IX9
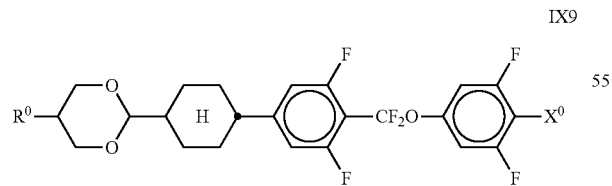
IX10
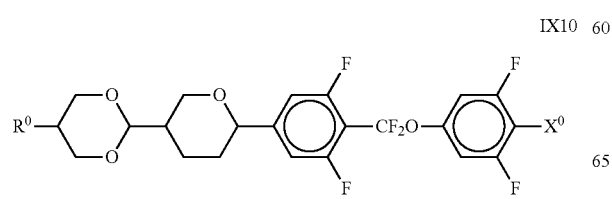
IX11
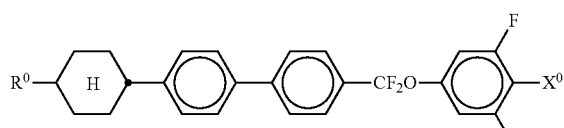
IX12
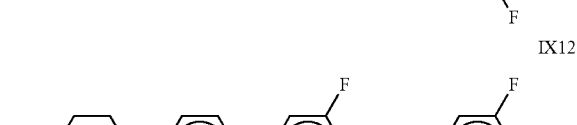
IX13
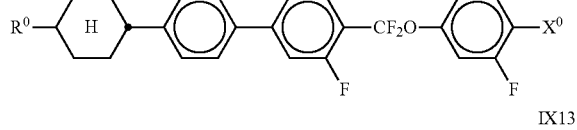
IX14
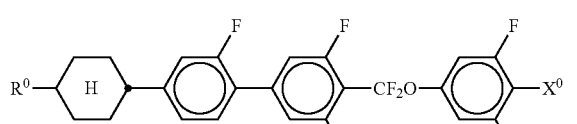
IX15
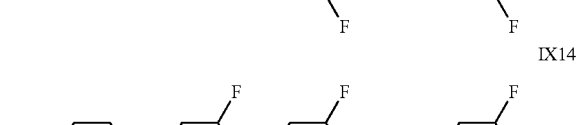
IX16
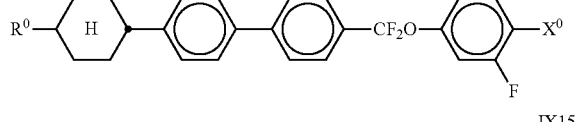
IX17
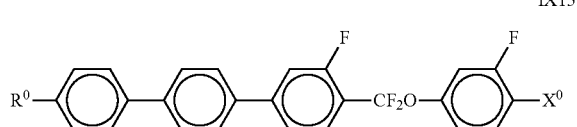
IX18
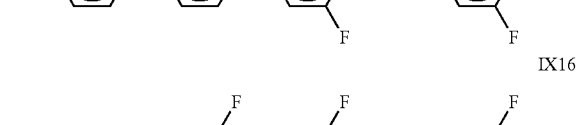
IX19
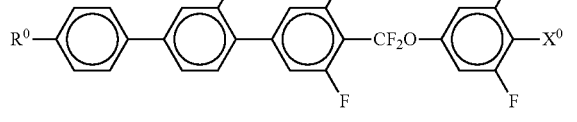

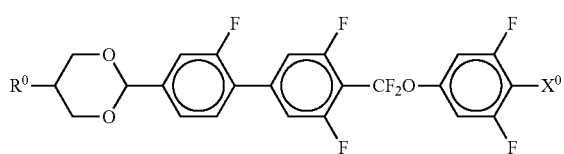
IX20

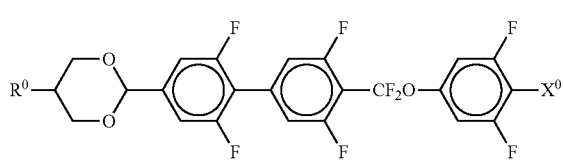
IX21 in which R⁰ and X⁰ have the meanings given in formula VIII or one of the preferred meanings given above and below.

Preferred compounds are those of formula IX1, IX4, IX6, IX16, IX19 and IX20.

In the compounds of formulae IX1 to IX21 R⁰ preferably denotes alkyl having 1 to 6 C atoms, very preferably ethyl or propyl, X⁰ preferably denotes F or OCF₃, very preferably F, and Y² preferably denotes F.

In a further preferred embodiment, component A of the LC medium contains one or more compounds of formula IX or its subformulae as described above and below wherein Y⁰ is CH₃. Very preferably the component A of the LC medium according to this preferred embodiment comprises one or more compounds of formula IX selected from the following subformulae:

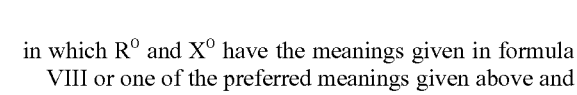
IXA1

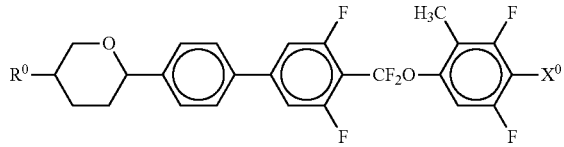
IXA2

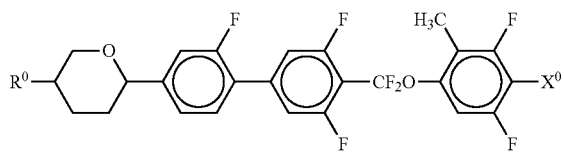
IXA3

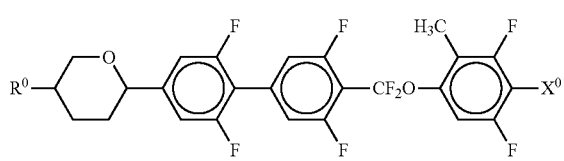
IXA4

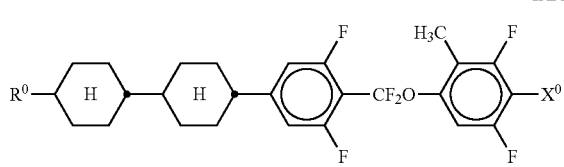

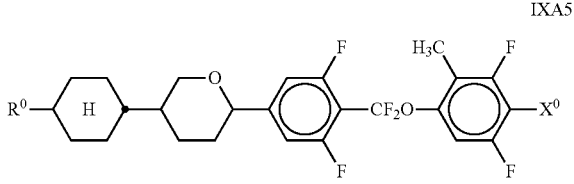
IXA5

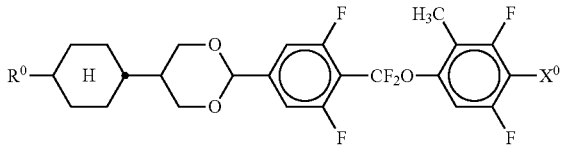
IXA6

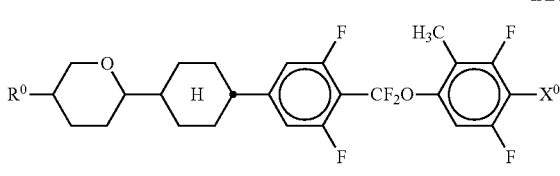
IXA7

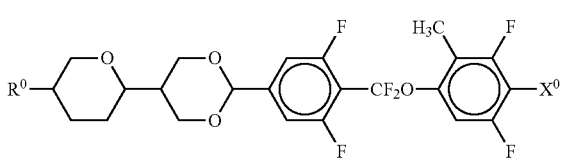
IXA8

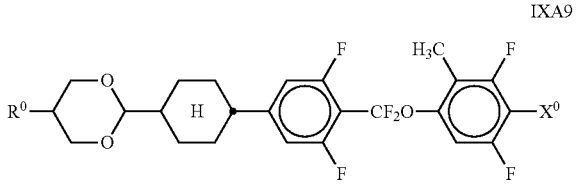
IXA9

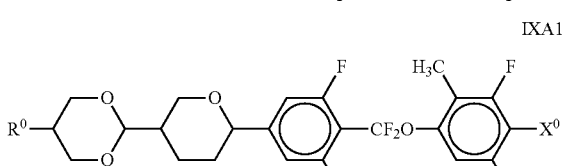
IXA10

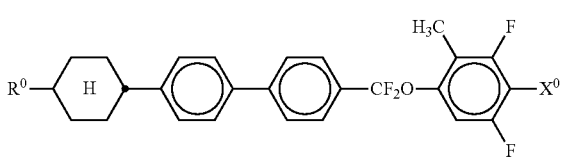
IXA11

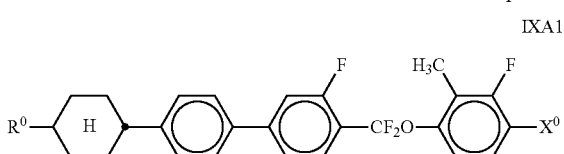
IXA12

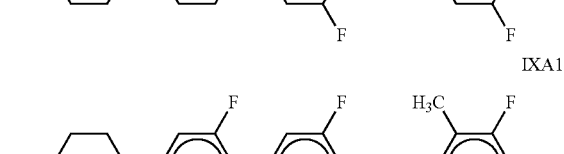
IXA13

-continued

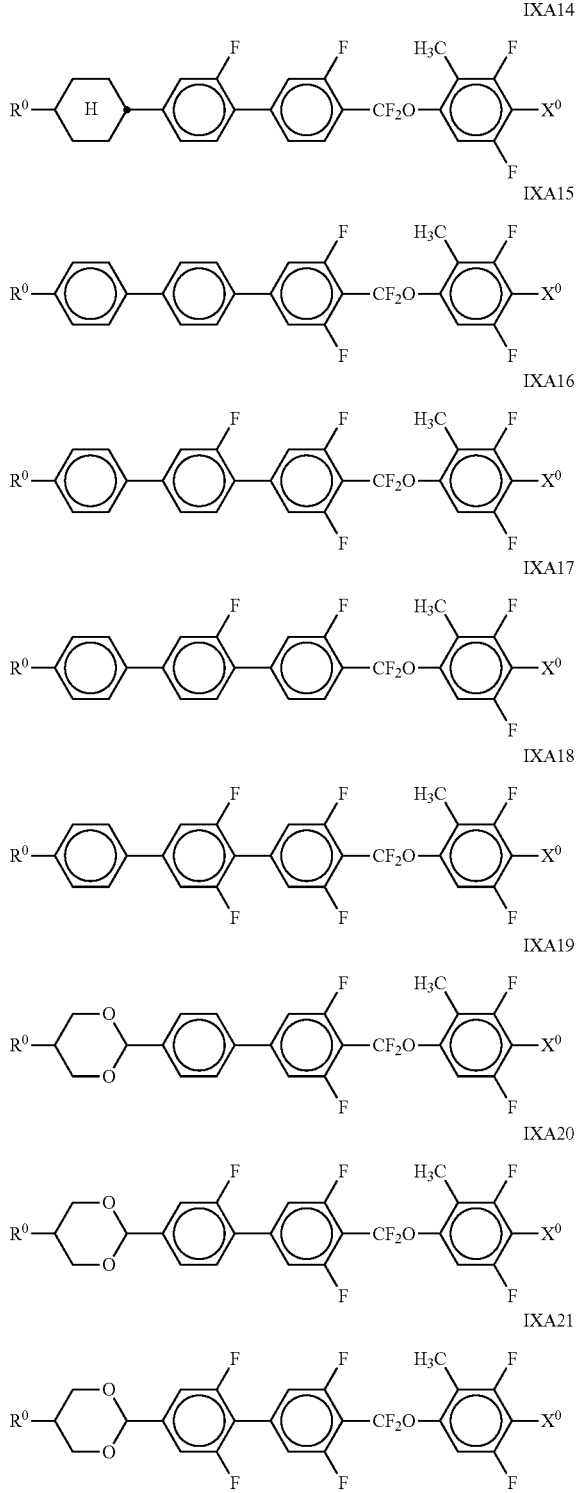

in which R⁰ and X⁰ have the meanings given in formula IX or one of the preferred meanings given above and below.

Preferred compounds are those of formula IXA1, IXA4, IXA6, IXA16, IXA19 and IXA20.

In the compounds of formulae IXA1 to IXA21 R⁰ preferably denotes alkyl having 1 to 6 C atoms, very preferably ethyl or propyl, $X^0$ preferably denotes F or $OCF_3$, very preferably F, and $Y^2$ preferably denotes F.

k) Component A of the LC medium additionally comprises one or more compounds selected from the following formulae:

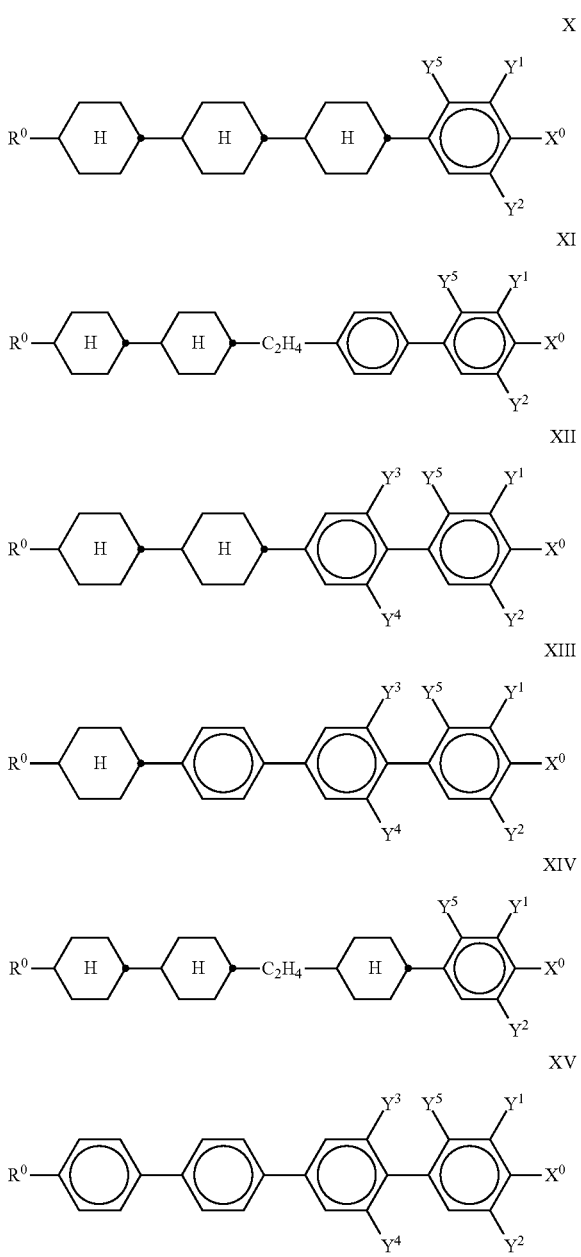

in which $R^0$ and $X^0$ each, independently of one another, have one of the meanings indicated above, and $Y^{1-4}$ each, independently of one another, denote H or F and $Y^5$ denotes H or $CH_3$, preferably H. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 6 C atoms.

Very preferably component A of the LC medium comprises one or more compounds of formula XII selected from subformula XIIa,

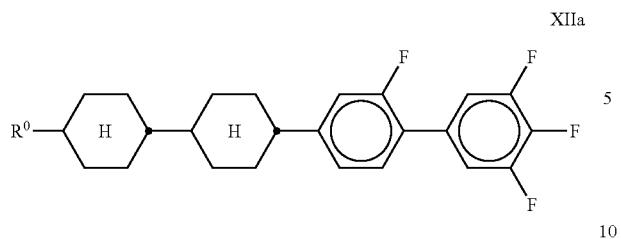
XIIa in which R⁰ has the meanings indicated above. R⁰ preferably denotes straight-chain alkyl, in particular ethyl, n-propyl, n-butyl or n-pentyl and very particularly preferably n-propyl.

The compound(s) of the formula XII, in particular of the formula XIIa, is (are) preferably employed in the mixtures according to the invention in amounts of 1-15% by weight, particularly preferably 2-10% by weight.

Further preferably component A of the LC medium comprises one or more compounds of formula XIII selected from subformula XIIIa,

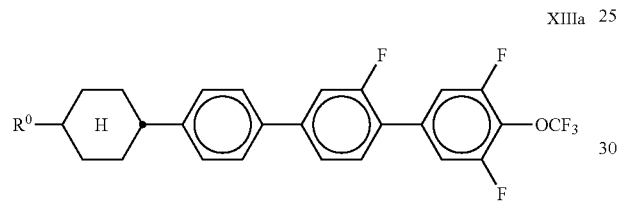
XIIIa in which R⁰ has the meanings indicated above. R⁰ preferably denotes straight-chain alkyl, in particular ethyl, n-propyl, n-butyl or n-pentyl and very particularly preferably n-propyl.

The compound(s) of the formula XIII, in particular of the formula XIIIa, is (are) preferably employed in the mixtures according to the invention in amounts of 1-15% by weight, particularly preferably 2-10% by weight.

Further preferably component A of the LC medium comprises one or more compounds of formula XV selected from subformula XVa,

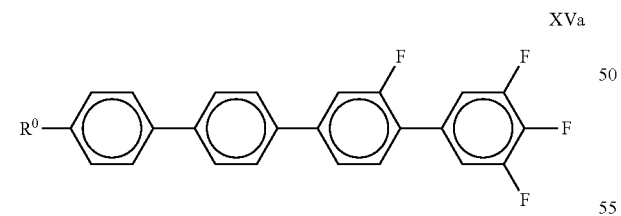
XVa in which R⁰ has the meanings indicated above. R⁰ preferably denotes straight-chain alkyl, in particular ethyl, n-propyl, n-butyl or n-pentyl and very particularly preferably n-propyl.

The compound(s) of the formula XV, in particular of the formula XVa, is (are) preferably employed in the mixtures according to the invention in amounts of 0.5-5% by weight, particularly preferably 0.5-2% by weight.

l) Component A of the LC medium additionally comprises one or more compounds of the formula XVI,

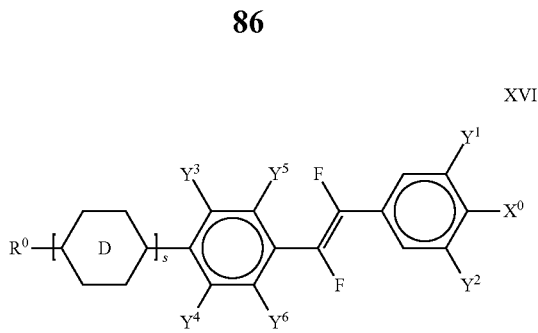
XVI in which R⁰, X⁰ and Y¹⁻⁶ have the meanings indicated in formula I, s denotes 0 or 1, and

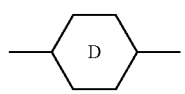

denotes

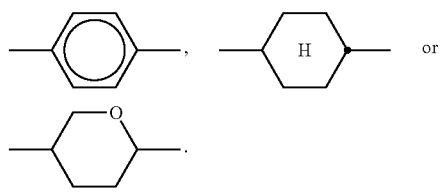

In the formula XVI, X⁰ may also denote an alkyl radical having 1-6 C atoms or an alkoxy radical having 1-6 C atoms. The alkyl or alkoxy radical is preferably straight-chain.

R⁰ preferably denotes alkyl having 1 to 6 C atoms. X⁰ preferably denotes F;

The compounds of the formula XVI are preferably selected from the following subformulae:

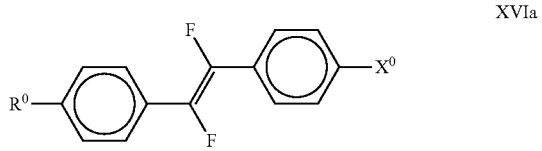
XVIa

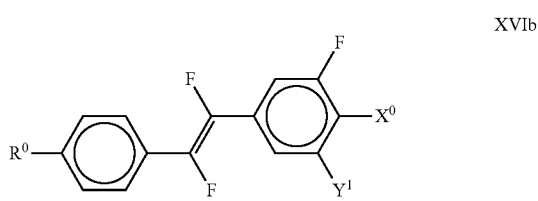
XVIb

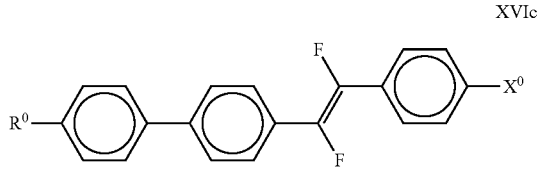
XVIc

-continued
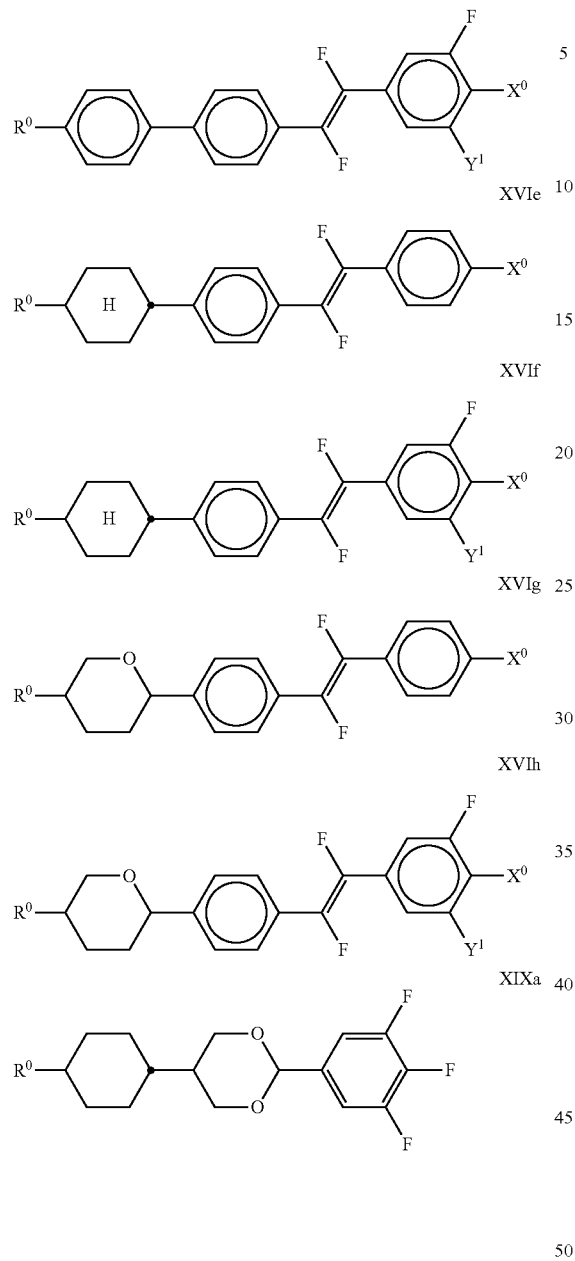
in which $R^0$, $X^0$ and $Y^1$ have the meanings indicated above. $R^0$ preferably denotes alkyl having 1 to 6 C atoms. $X^0$ preferably denotes F, and $Y^1$ is preferably F;
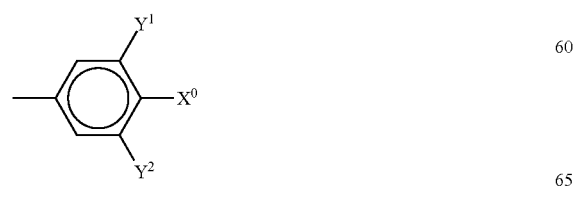
is preferably
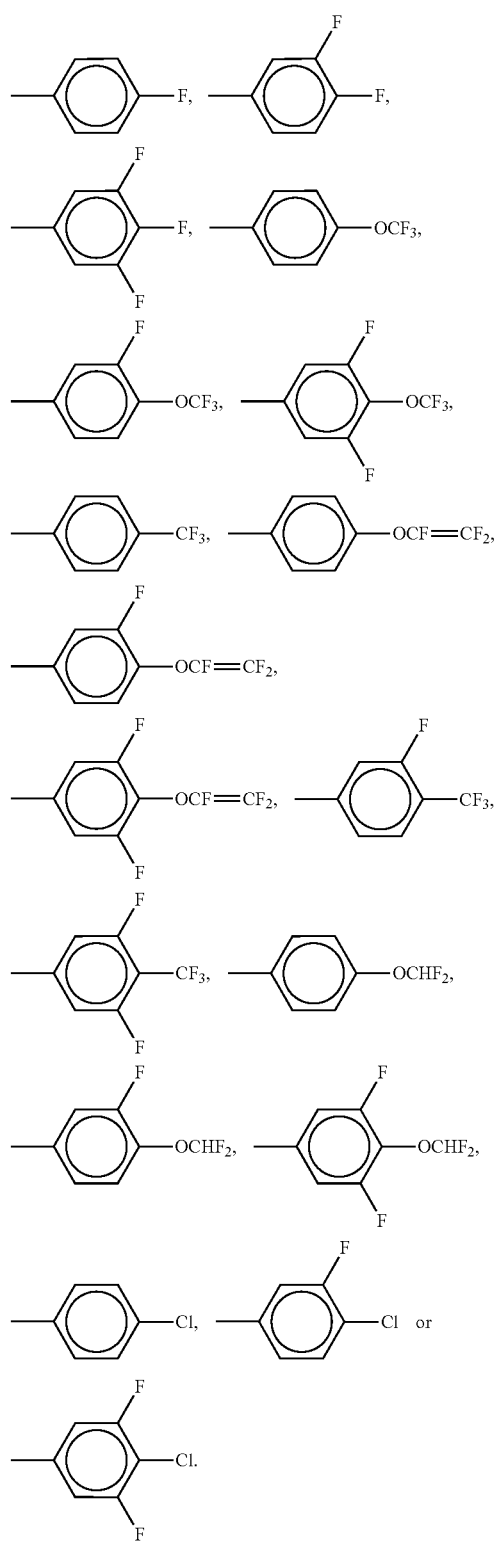
$R^0$ is straight-chain alkyl or alkenyl having 2 to 6 C atoms;
m) Component A of the LC medium additionally comprises one or more compounds selected from the following formulae:

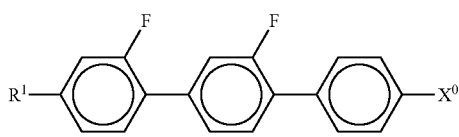

XVII

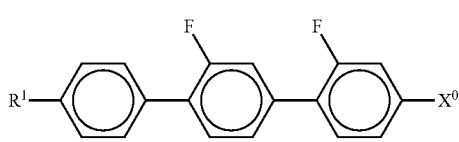

XVIII in which R¹ and X⁰ have the meanings indicated above. R¹ preferably denotes alkyl having 1 to 6 C atoms. X⁰ preferably denotes F or Cl. In the formula XVIII, X⁰ very particularly preferably denotes Cl.

n) Component A of the LC medium additionally comprises one or more compounds selected from the following formulae:

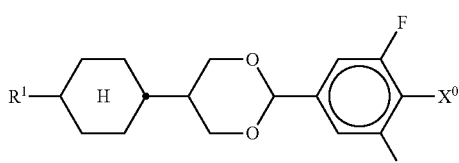

XIX

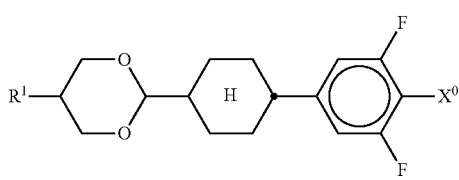

XX

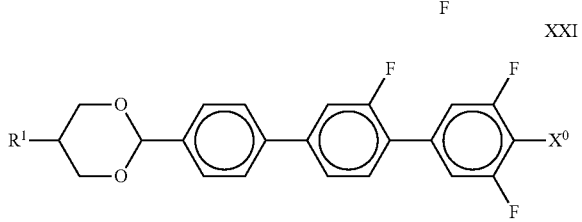

XXI in which R¹ has one of the meanings even for R⁰ and X⁰ has the meanings indicated above. R¹ preferably denotes alkyl having 1 to 6 C atoms. X⁰ preferably denotes F. The medium according to the invention particularly preferably comprises one or more compounds of the formula XIX and/or XXI in which X⁰ preferably denotes F.

The compound(s) of the formulae XVII-XXI is (are) preferably employed in the mixtures according to the invention in amounts of 1-20% by weight, particularly preferably 1-15% by weight. Particularly preferred mixtures comprise at least one compound of the formula XXI.

Very preferably component A of the LC medium comprises one or more compounds of formula XXI selected from subformula XIXa,

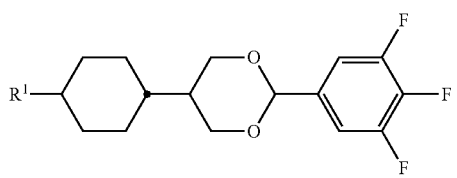

XIXa in which R¹ has the meanings indicated above, and preferably denotes straight-chain alkyl, in particular ethyl, n-propyl, n-butyl or n-pentyl and very particularly preferably ethyl or n-propyl.

Further preferably component A of the LC medium comprises one or more compounds of formula XXI selected from subformula XXIa,

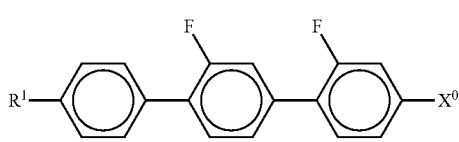

XXIa in which R¹ has the meanings indicated above, and preferably denotes straight-chain alkyl, in particular ethyl, n-propyl, n-butyl or n-pentyl and very particularly preferably n-propyl.

The compound(s) of the formula XXIa is (are) preferably employed in the mixtures according to the invention in amounts of 1-15% by weight, particularly preferably 2-10% by weight.

o) Component A of the LC medium additionally comprises one or more compounds selected from the following formulae:

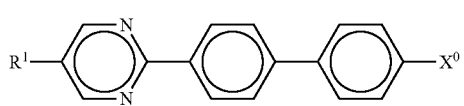

XXII1

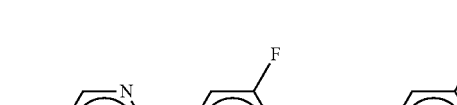

XXII2

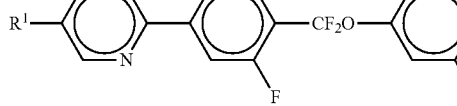

XXII3

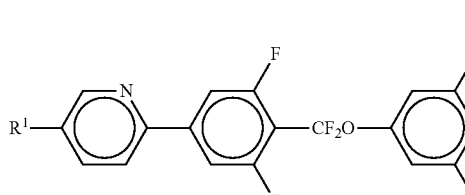

in which R¹ and X⁰ have the meanings indicated above. R¹ preferably denotes alkyl having 1 to 6 C atoms. X⁰ preferably denotes F. The medium according to the invention particularly preferably comprises one or more compounds of the formula XXII1, in which $X^0$ preferably denotes F. The compound(s) of the formulae XXII1 to XXII3 is (are) preferably employed in the mixtures according to the invention in amounts of 1-20% by weight, particularly preferably 1-15% by weight.

p) Component A of the LC medium additionally comprises one or more compounds selected from the following formulae:

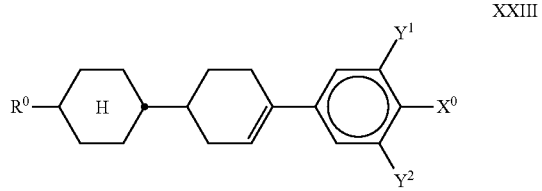

XXIII in which $R^0$ and $X^0$ and $Y^{1-4}$ have the meanings indicated above with $X^0$ being different from F.

$X^0$ is preferably Cl, $CF_3$, $OCF_3$ or $OCHF_2$. $Y^{1-4}$ each, independently of one another, preferably denote H or F. $R^0$ preferably denotes alkyl, alkoxy, oxaalkyl, fluoroalkyl or alkenyl, each having up to 6 C atoms.

Very preferably component A of the LC medium comprises one or more compounds of formula XXIII selected from subformula XXIIIa,

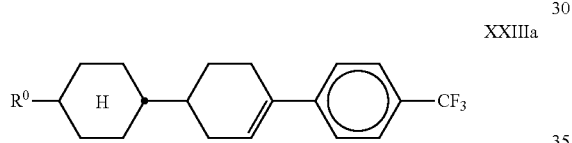

XXIIIa in which $R^0$ has the meanings indicated above. $R^0$ preferably denotes straight-chain alkyl, in particular ethyl, n-propyl, n-butyl or n-pentyl and very particularly preferably n-propyl.

The compound(s) of the formula XXIII, in particular of the formula XXIIIa, is (are) preferably employed in the mixtures according to the invention in amounts of 1-15% by weight, particularly preferably 2-10% by weight.

The LC medium according to the invention preferably comprises
one or more compounds selected from formulae IA, IB, IC, ID and IE, and optionally formula XIX, or their subformulae, preferably selected from subformuale IAa1, IAc1, ICb1, IDa1 and XIXa, preferably in a total concentration from 10 to 50%, very preferably from 10 to 35%, most preferably from 12 to 30% by weight;
and/or
one or more compounds selected from formulae IIA, IIB, IIC and IID or their subformulae, preferably in a total concentration from 15 to 70%, very preferably from 20 to 65%, most preferably from 25 to 50% by weight;
and/or
one or more compounds of formula IV, IVa, IVb and V or their subformulae, preferably in a total concentration from 5 to 65%, very preferably from 10 to 60%, most preferably from 15 to 55%;
and/or
one or more compounds of formula III, preferably of formula III-2, very preferably of formula III-2-1, preferably in a total concentration from 2% to 25%, very preferably 4% to 15%.

In particular, the LC medium comprises
one or more compounds CCP-nF.F.F and/or CCP-n0CF3, in particular CCP-1F.F.F, CCP-2F.F.F, CCP-3F.F.F and/or CCP-30CF3, preferably in a total concentration from 5% to 35%, preferably 10% to 30%, based on the mixture as a whole;
and/or
one or more compounds PGU-n-F, in particular PGU-2-F and/or PGU-3-F, preferably in a total concentration from 5% to 35%, preferably 10% to 30%, based on the mixture as a whole;
and/or
one or more compounds CCZU-n-F, in particular CCZU-2-F, CCZU-3-F and/or CCZU-5-F, preferably in a total concentration from 5% to 25%, preferably 5% to 15%, based on the mixture as a whole;
and/or
one or more compounds CDU-n-F, in particular CDU-2-F and/or CDU-3-F, preferably in a total concentration from 2% to 15%, preferably 3% to 10%, based on the mixture as a whole;
and/or
one or more compounds CY-n-Om, in particular CY-3-O4, CY-5-O4 and/or CY-3-O2, preferably in a total concentration from 5% to 30%, preferably 10% to 20%, based on the mixture as a whole;
and/or
one or more compounds PY-n-Om, in particular PY-1-O2, PY-2-O2 and/or PY-3-O2, preferably in a total concentration from 5% to 40%, preferably 10% to 30%, based on the mixture as a whole;
and/or
one or more compounds CPY-n-Om, in particular CPY-2-O2, CPY-3-O2 and/or CPY-5-O2, preferably in concentrations >5%, in particular 7% to 20%, based on the mixture as a whole,
and/or
one or more compounds CCY-n-Om, preferably CCY-4-O2, CCY-3-O2, CCY-3-O3, CCY-3-O1 and/or CCY-5-O2, preferably in concentrations >3%, in particular 5 to 15%, based on the mixture as a whole;
and/or
one or more compounds CPY-n-Om and CY-n-Om, preferably in concentrations of 10 to 60%, based on the mixture as a whole,
and/or
one or more compounds CPY-n-Om and PY-n-Om, preferably CPY-2-O2 and/or CPY-3-O2 and PY-3-O2 or PY-1-O2, preferably in concentrations of 5 to 20%, more preferably 10 to 15% to based on the mixture as a whole,
and/or
one or more compound(s) selected from the group consisting of CC-1-3, CC-2-3, CC-3-4, CC-3-5, CC-3-O1, CC-3-O3 and CC-5-O1, preferably in a total concentration of 3 to 40%, preferably 3 to 25% based on the mixture as a whole,
and/or
one or more compounds selected from the group consisting of CC-2-V1, CC-3-V1, CC-3-V2, CC-4-V1, CC-3-V, CC-4-V and CC-5-V, preferably in a total concentration of 3 to 40%, more preferably from 5% to 30% based on the mixture as a whole,
and/or
one or more compound(s) CCP-n-m and/or CCP-Vn-m and/or CPP-n-m, preferably selected from the group consisting of CCP-3-1, CCP-V-1, CCP-V2-1 and CPP- 3-2, preferably in a total concentration of 4 to 35%, preferably 5 to 25% based on the mixture as a whole, and/or one or more compound(s) CP-n-m and/or CP-n-Om, preferably selected from the group consisting of CP-5-3, CP-3-1, CP-3-O1 and CP-5-O3, preferably in a total concentration of 2 to 15%, preferably 3 to 10% based on the mixture as a whole, and/or one or more compound(s) CCZC-n-m, preferably selected from the group consisting of CCZC-3-3, CCZC-3-5 and CCZC-4-3, preferably in a total concentration of 2 to 15%, preferably 3 to 10% based on the mixture as a whole, and/or one or more compound(s) CLP-n-m and/or CLP-Vn-m, preferably selected from the group consisting of CLP-3-1, CLP-3-2 and CLP-V-1, preferably in a total concentration of 2 to 15%, preferably 2 to 10% based on the mixture as a whole, and/or one or more compounds selected from the group consisting of PYP-n-m, PGIY-n-Om and PGP-n-2V, preferably in a total concentration of 2 to 20%, more preferably 2% to 15%, most preferably 2 to 10%, based on the mixture as a whole, and/or one or more compound(s) PP-n-m and/or PP-n-nVm, preferably selected from the group consisting of PP-1-3, PP-1-4, PP-1-5, PP-1-2V and PP-1-2V1, preferably in a total concentration of 1 to 15%, preferably 2 to 10% based on the mixture as a whole.

The LC media for us as optical retarder or compensator according to the invention generally comprise components A and B and optionally component C, each of which does itself consist of one or more individual compounds.

Component A has significantly positive dielectric anisotropy and imparts to the LC medium a dielectric anisotropy of $\geq +0.5$. It preferably comprises the compounds selected from formulae IA, IB, IC, ID and ID, and preferably further comprises one or more compounds selected from the formulae VIII, IX, XX, XI, XII, XIII, XIV, XV, XVI, XVII, XVIII, XIX, XX, XXI, XXII, XXIII or their subformulae.

For component A, one (or more) individual compound(s) which has (have) a value of $\Delta\varepsilon \geq +0.8$ is (are) preferably selected. This value must be more positive, the smaller the proportion A in the mixture as a whole.

The total proportion of the component A in the LC medium is preferably from 8 to 50%, very preferably from 10 to 35%, most preferably from 10 to 30% by weight.

Component B has significantly negative dielectric anisotropy and imparts to the LC medium a dielectric anisotropy of $\leq -0.5$. It preferably comprises the compounds selected from formulae IIA, IIB, IIC and IID, and preferably further comprises one or more compounds selected from the formulae III, VI-1 to VI-25, VII-1 to VII-9, BC, CR, PH-1, PH-2, In, L-1 to L-8 and IIA-Y or their subformulae.

For component B, one (or more) individual compound(s) which has (have) a value of $\Delta\varepsilon \leq -0.8$ is (are) preferably selected. This value must be more negative, the smaller the proportion BA in the mixture as a whole.

The total proportion of the component B in the LC medium is preferably from 15 to 70%, very preferably from 20 to 65%, most preferably from 25 to 50% by weight.

Preferably the total proportion of the component B in the LC medium is higher than the total proportion of the component A in the LC medium.

Component C is substantially dielectrically neutral and preferably does not have a significant effect on the dielectric anisotropy of the LC medium. Component C has a pronounced nematogeneity and a flow viscosity of not greater than 30 mm$^2 \cdot$s$^{-1}$, preferably not greater than 25 mm$^2 \cdot$s$^{-1}$, at 20° C. It preferably comprises one or more compounds selected from formulae IV, Va, Vb, V or their subformulae. Particular preference is given to compounds of the formula IV.

Component C is monotropically or enantiotropically nematic, has no smectic phases and is able to prevent the occurrence of smectic phases down to very low temperatures in LC media. For example, if various materials of high nematogeneity are added to a smectic liquid-crystal mixture, the nematogeneity of these materials can be compared through the degree of suppression of smectic phases that is achieved.

The total proportion of the component C in the LC medium is preferably from 5 to 70%, very preferably from 10 to 65%, most preferably from 15 to 60% by weight.

The LC medium preferably comprises 3 to 12, very preferably <10, compounds selected from the formulae IA, IB, IC, ID and/or IE or their subformulae, and further comprises 3 to 12, very preferably <10, compounds selected from the formulae IIA, IIB, IIC and/or IID or their subformulae, and preferably further comprises one or more compounds of the formula IV, IVa, IVb, V or their subformulae.

In another preferred embodiment of the present invention the LC medium contains one or more stabilisers.

Preferred stabilisers are selected from the compounds of formula H $$\text{Ar} - [\text{Sp} - \overset{Z^S\text{-HA}}{\underset{G}{\overset{|}{C}}} - R^S]_q \quad \text{H}$$

in which

Ar denotes an aromatic or heteroaromatic hydrocarbon group having 4 to 40 C atoms, preferably 6 to 30 C atoms;

Sp denotes a spacer group;

$R^S$ denotes H, alkyl having 1 to 12 C atoms or alkenyl having 2 to 12 C atoms;

$Z^S$ denotes —O—, —C(O)O—, —(CH$_2$)$_z$— or —(CH$_2$)$_z$O—, or a single bond;

HA denotes $R^H$ denotes H, O$^-$, CH$_3$, OH or OR$^S$, preferably H or O$^-$;

$R^{S1}$, $R^{S2}$, $R^{S3}$ and $R^{S4}$, identically or differently, denote alkyl having 1 to 6 C atoms, preferably having 1 to 3 C atoms, very preferably CH$_3$;

G denotes H or R$^S$ or a group $Z^S$-HA;

z is an integer from 1 to 6; and q is 3 or 4.

The compounds of formula H are described in EP3354710 A1 and EP3354709 A1.

Preferred compounds of formula H are selected from the formulae H-1, H-2 and H-3:
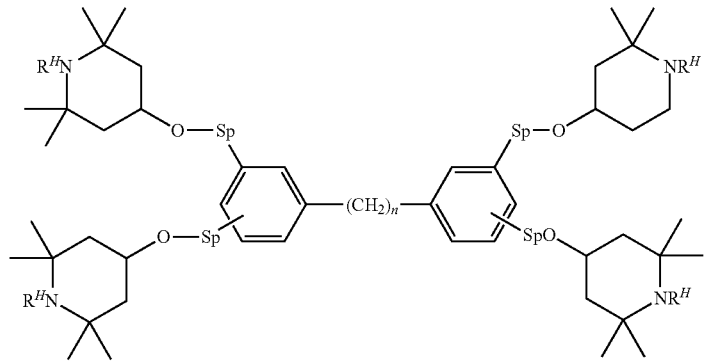
H-1
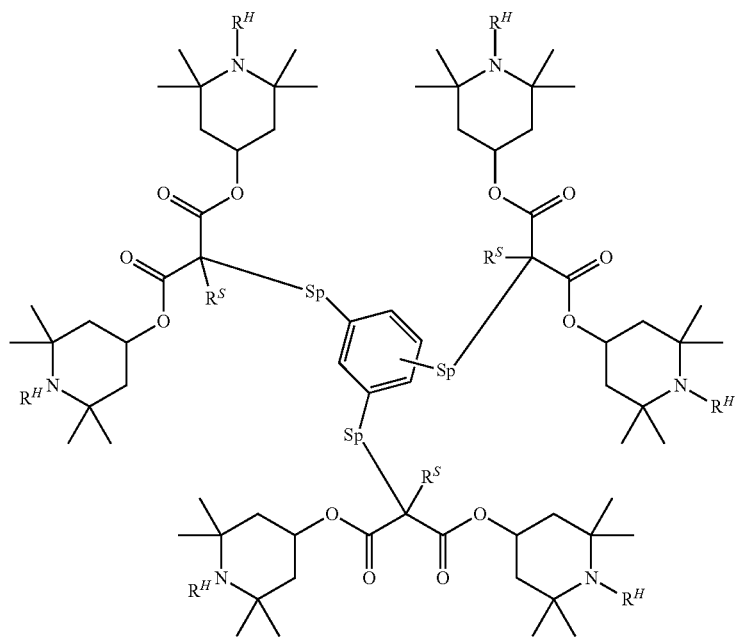
H-2

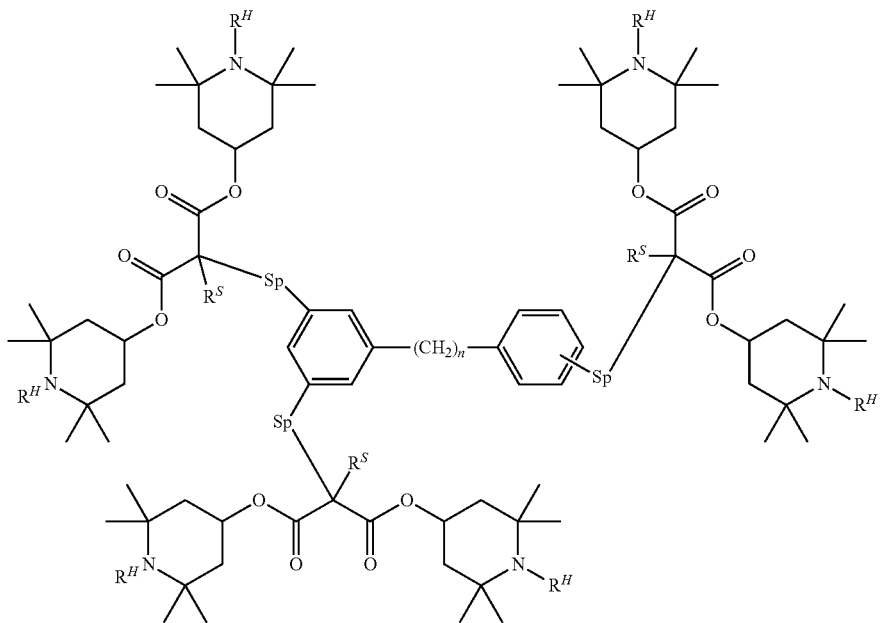

H-3 in which $R^H$ has the meanings given above and preferably denotes H or O⁻, and n is an integer from 0 to 12, preferably 5, 6, 7, 8 or 9, very preferably 7, and Sp denotes a spacer group, preferably alkylene having 1 to 12 C atoms in which one or more non-adjacent —CH₂— groups may be replaced with —O—.

Preferred compounds of formula H-1 are those of formula H-1-1:

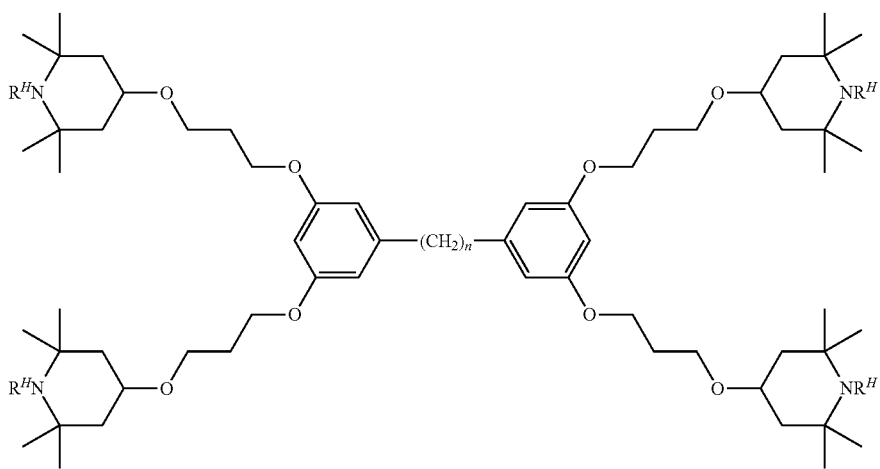

H-1-1 in which $R^H$ has the meanings given above and preferably denotes H or O⁻, and n is an integer from 0 to 12, preferably 5, 6, 7, 8 or 9, very preferably 7.

Very preferred compounds of formula H-1-1 are those of formula H-1-1-1

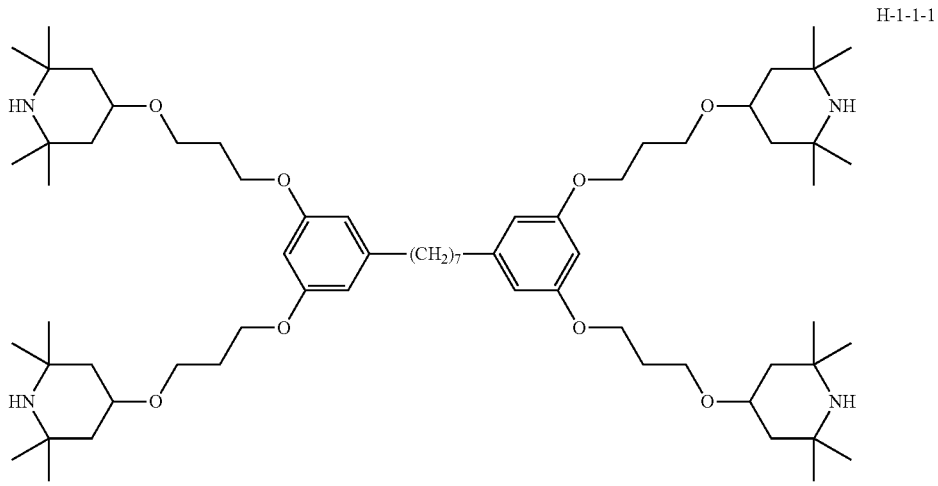

H-1-1-1

Preferred compounds of formula H-2 are those of formula H-2-1:

Very preferred compounds of formula H-2-1 are those of formula H-2-1-1:

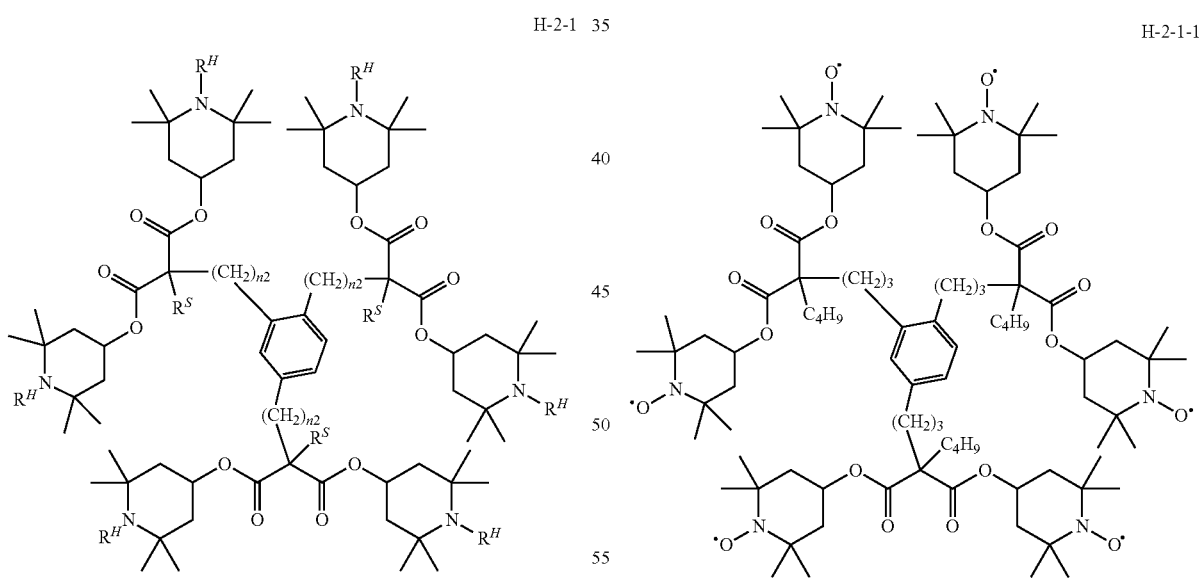

in which $R^H$ has the meanings given above and preferably denotes H or O⁻, and n2, on each occurrence identically or differently, preferably identically, is an integer from 1 to 12, preferably 2, 3, 4, 5, or 6, very preferably 3, and $R^S$ on each occurrence identically or differently, preferably identically, denotes alkyl having 1 to 6 C atoms, preferably n-butyl.

Preferred compounds of formula H-3 are selected from the formula H-3-1:

H-3-1
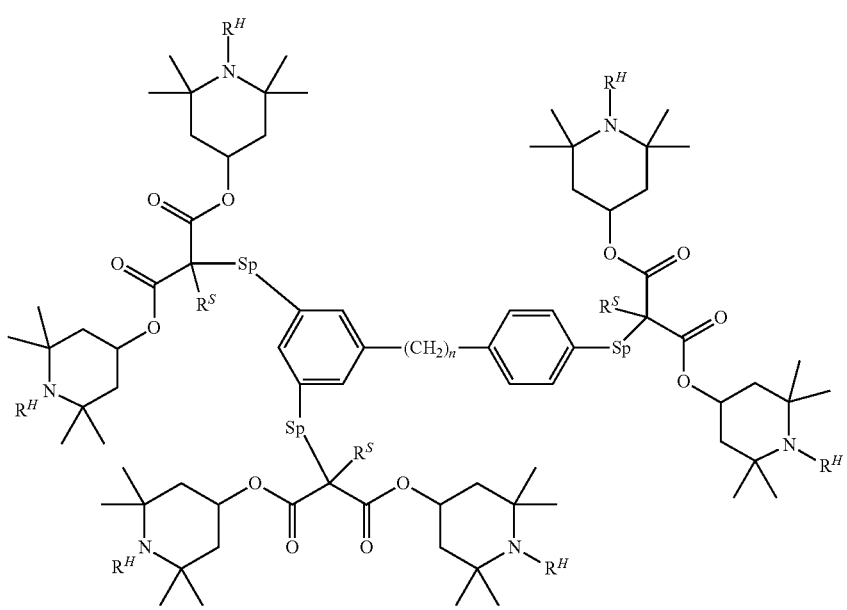
in which Sp and $R^H$ have the meanings given above and $R^H$ preferably denotes H or $O^-$, and n is an integer from 0 to 12, preferably 5, 6, 7, 8 or 9, very preferably 7.
Further preferred stabilisers are selected from the group consisting of the formulae ST-1 to ST-18:
ST-1
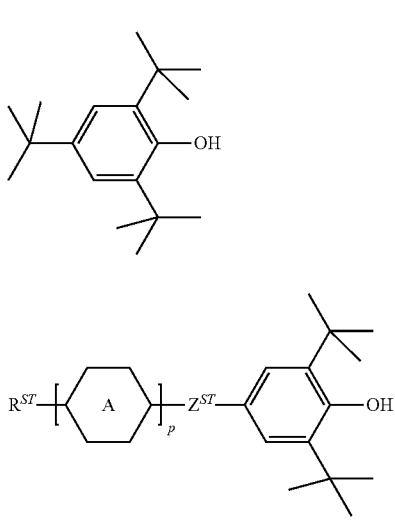
ST-2
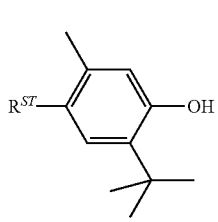
ST-3
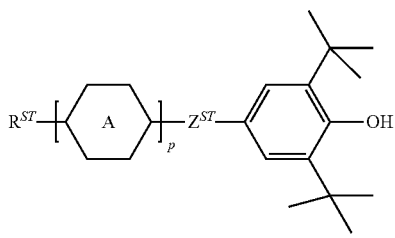
ST-4
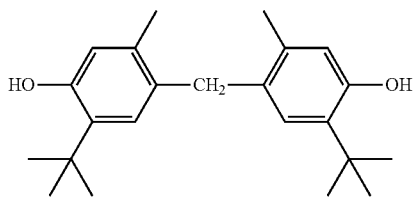
ST-5
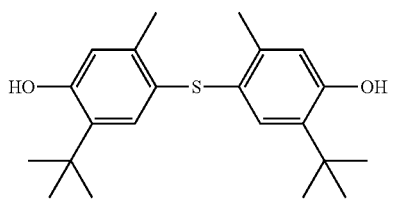
ST-6
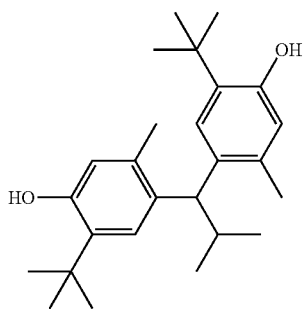

-continued
ST-7
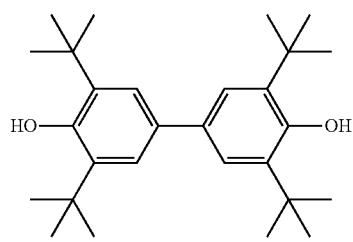
ST-8
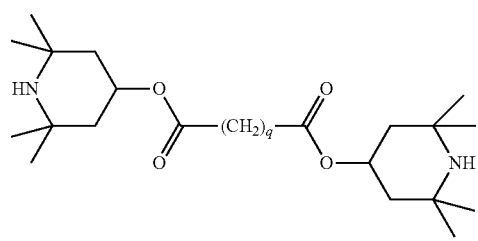
ST-9
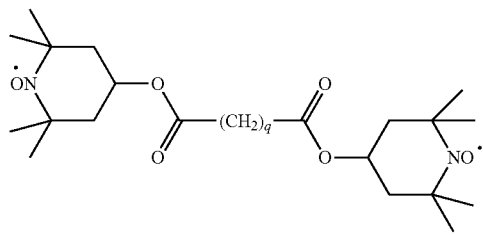
ST-10
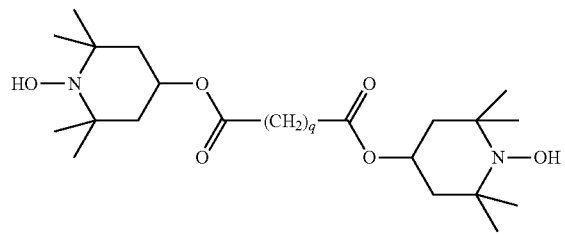
ST-11
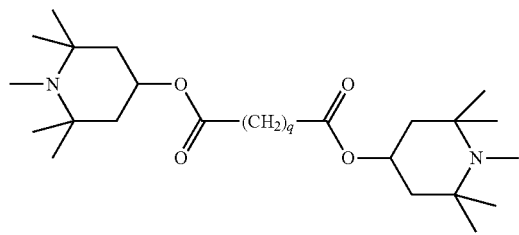
ST-12
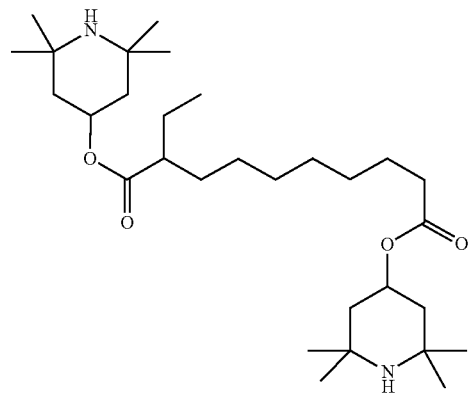
ST-13
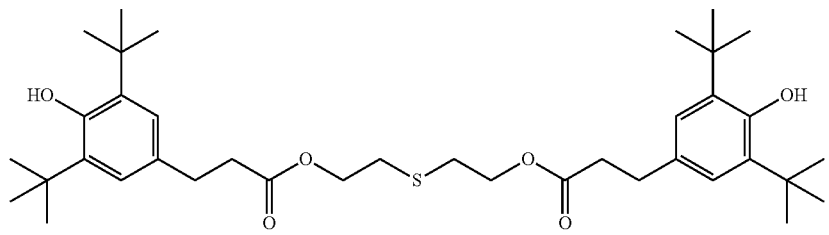
ST-14
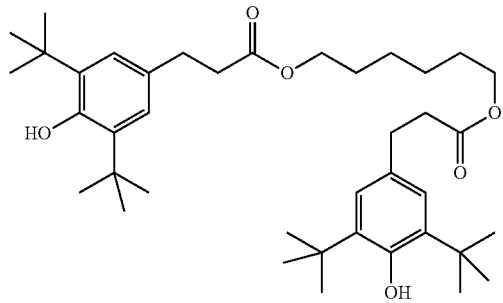
ST-15
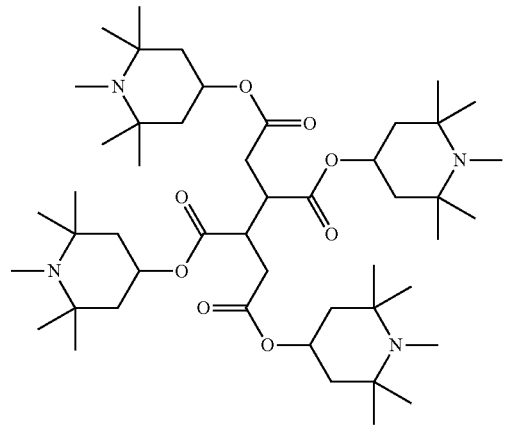

-continued

ST-16

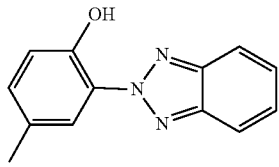

ST-17

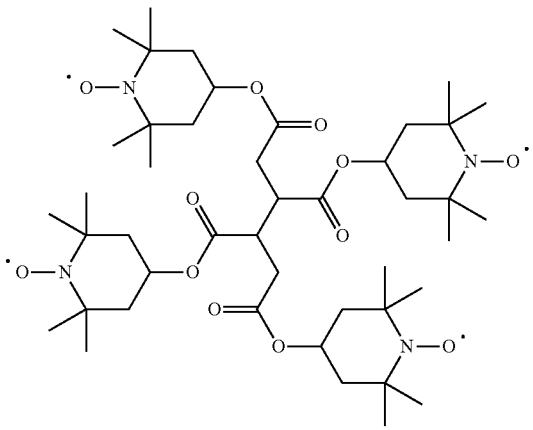

ST-18

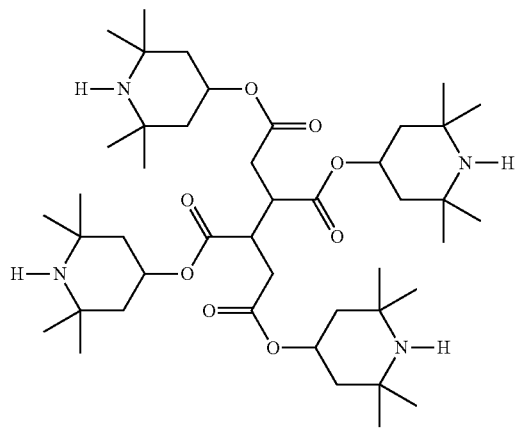

in which

R$^{ST}$ denotes H, an alkyl or alkoxy radical having 1 to 15 C atoms, wherein, in addition, one or more CH$_2$ groups may each be replaced, independently of one another, by —C≡C—, —CF$_2$O—, —OCF$_2$—, —CH=CH—,

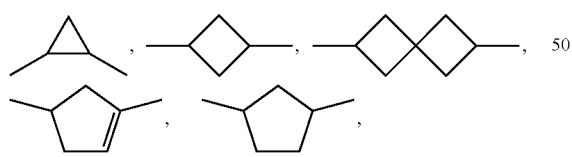

—O—, —CO—O—, —O—CO— in such a way that O atoms are not linked directly to one another, and in which, in addition, one or more H atoms may be replaced by halogen,

on each occurrence, identically or differently, denotes

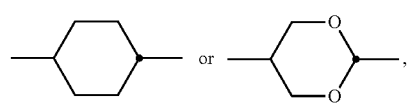

Z$^{ST}$ each, independently of one another, denote —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—, —CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, L$^1$ and L$^2$ each, independently of one another, denote F, Cl, CH$_3$, CF$_3$ or CHF$_2$, p denotes 0, 1 or 2, q denotes 1, 2, 3, 4, 5, 6, 7, 8, 9 or 10.

Preferred compounds of formula ST are those selected from the formulae ST-3 and in particular:

ST-1
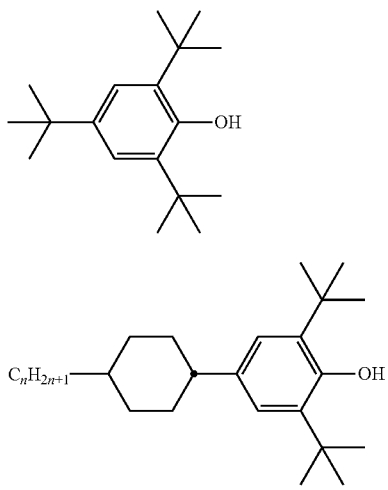
ST-3a
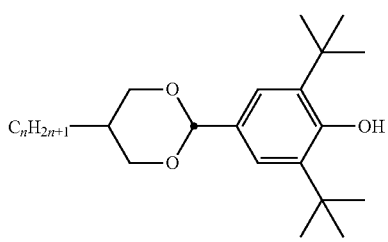
in which n=1, 2, 3, 4, 5, 6 or 7, preferably n=3
ST-3b
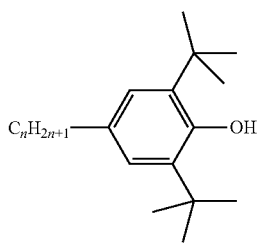
in which n=1, 2, 3, 4, 5, 6 or 7, preferably n=3
ST-3c
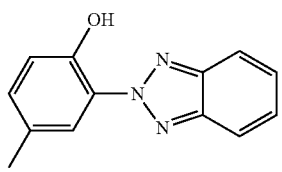
in which n=1, 2, 3, 4, 5, 6 or 7, preferably n=1 or 7
ST-8-1
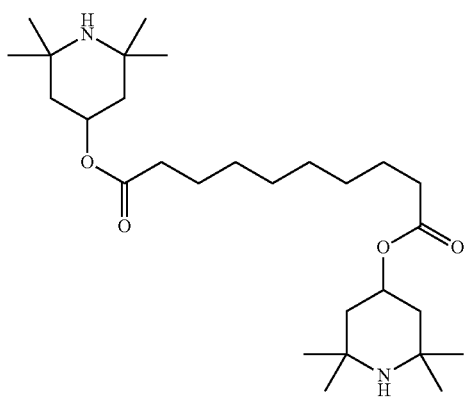
-continued
ST-9-1
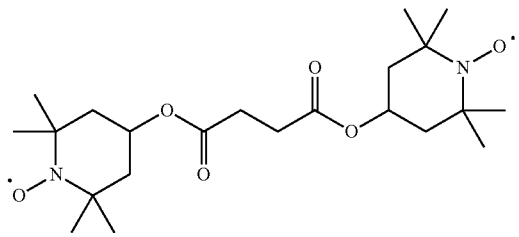
ST-12
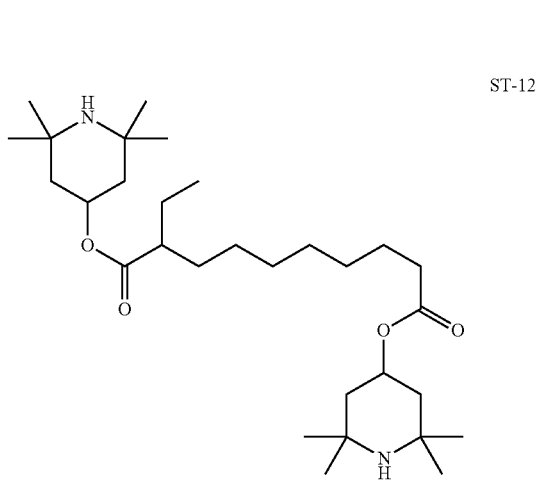
ST-16
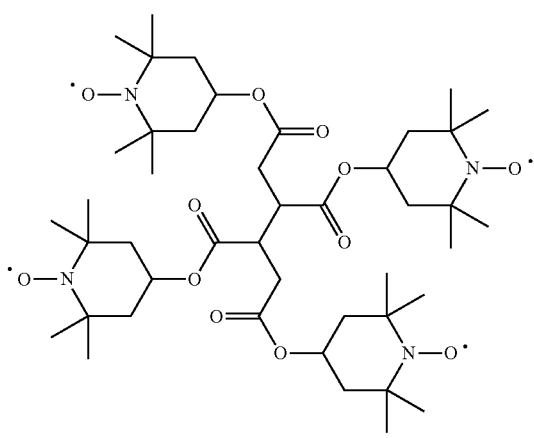
ST-17

ST-18

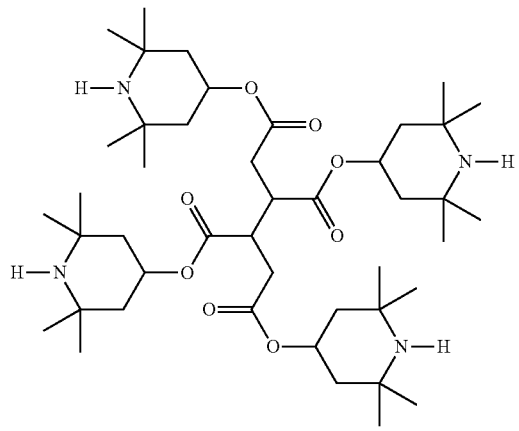

ST-8-1

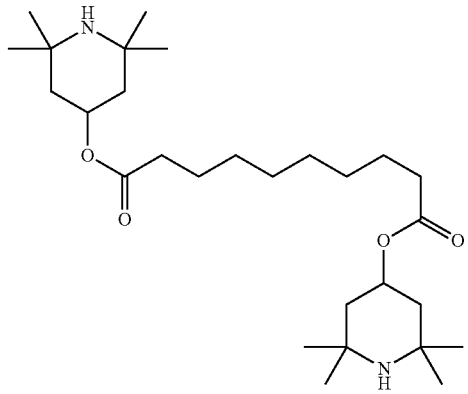

In the compounds of the formulae ST-3a and ST-3b, n preferably denotes 3. In the compounds of the formula ST-2a, n preferably denotes 7.

Very preferred stabilisers are selected from the group of the compounds of the formulae ST-2a-1, ST-3a-1, ST-3b-1, ST-8-1, ST-9-1 and ST-12:

ST-3a-1

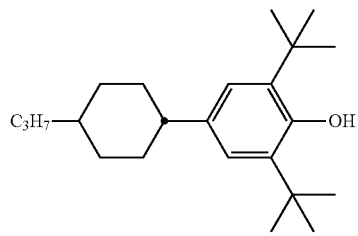

ST-9-1

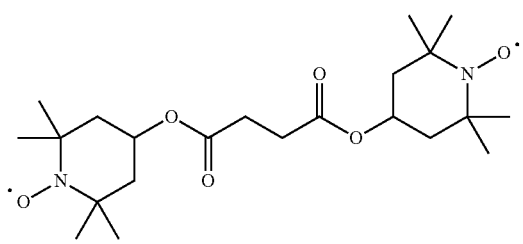

ST-12

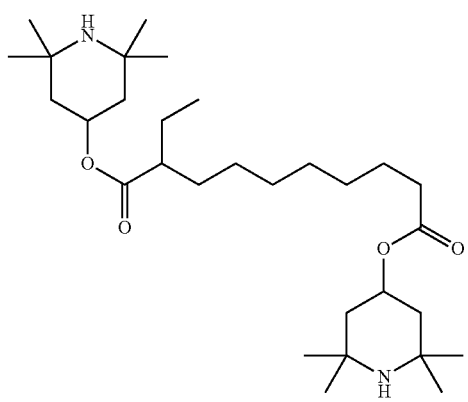

ST-3b-1

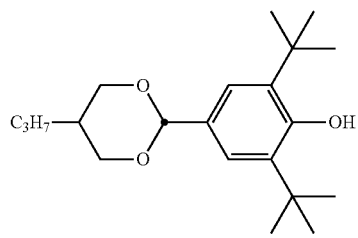

In another preferred embodiment the LC medium comprises one or more stabilisers selected from Table D below.

Preferably the proportion of stabilisers in the LC medium is from 10 to 500 ppm, very preferably from 20 to 100 ppm.

The LC medium according to the present invention may additionally comprise one or more further components or additives, preferably selected from the list including but not limited to stabilisers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

ST-3c-1

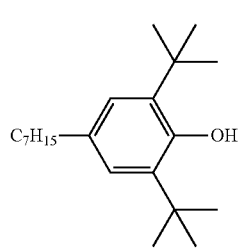

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the above-listed preferred embodiments of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

Another object of the present invention is a process for preparing an LC medium as described above and below, comprising the steps of mixing one or more compounds selected from formulae IA to IE and/or selected from formulae IIA to IID and/or selected from formulae IV and V with further compounds and/or additives.

It is advantageous for the LC medium according to the invention to preferably have a nematic phase from $\leq -20°$ C. to $\geq 70°$ C., particularly preferably from $\leq -30°$ C. to $\geq 80°$ C., very particularly preferably from $\leq -40°$ C. to $\geq 90°$ C.

The LC medium according to the invention has a clearing temperature of 65° C. or more, preferably of 70° C. or more.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in bulk at the corresponding temperature and checked by storage in test cells having a layer thickness corresponding to the use for at least 120 hours. If the storage stability at a temperature of −20° C. in a corresponding test cell is 1000 h or more, the LC medium is referred to as stable at this temperature. At temperatures of −30° C. and −40° C., the corresponding times are 500 h and 250 h respectively. At high temperatures, the clearing point is measured by conventional methods in capillaries.

The LC medium according to the invention preferably has a nematic phase range of at least 60 K and a flow viscosity $v_{20}$ of at most 30 mm$^2$·s$^{-1}$ at 20° C.

The LC medium according to the invention is nematic at a temperature of −20° C. or less, preferably at −30° C. or less, very preferably at −40° C. or less.

The value of the birefringence $\Delta n$ of the LC medium according to the invention at 20° C. and 589 nm is preferably from 0.06 to 0.15, more preferably from 0.07 to <0.13, most preferably from 0.09 to <0.12.

The LC medium according to the invention has a dielectric anisotropy $\Delta\varepsilon$ from −0.5 to +0.5, preferably from −0.3 to +0.3, more preferably from −0.1 to +0.1, very preferably from −0.05 to +0.05, most preferably of 0, determined at 20° C. and 1 kHz.

The rotational viscosity $\gamma_1$ at 20° C. of the LC medium according to the invention is preferably $\leq 120$ mPa·s, in particular $\leq 105$ mPa·s. In a preferred embodiment, the rotational viscosity $\gamma_1$ at 20° C. is $\leq 100$ mPa·s, in particular $\leq 95$ mPa·s.

All temperature values indicated for the present invention are in ° C.

Another object of the invention is a layer of an LC medium according to the invention which is situated between two substrates, which are preferably plane parallel and preferably transparent, and wherein one or both of the substrates is(are) preferably equipped with an alignment layer that provides the desired orientation in the LC medium.

The thickness of the layer of the LC medium is preferably from 0.1 to 10 μm, very preferably from 0.2 to 8 μm, most preferably from 0.5 to 5 μm.

Another object of the invention is an optical retarder or optical compensator (hereinafter briefly referred to as "retarder") comprising a layer of an LC medium according to the present invention as described above and below (hereinafter also briefly referred to as "LC layer").

Another object of the invention is the use of an LC medium or an optical retarder or optical compensator as described above and below, preferably as viewing angle compensator, in optical, electrooptical or electronic components or devices, preferably in electrooptical displays like LC displays or organic light emitting diodes (OLEDs).

Another object of the invention is an optical, electrooptical or electronic component or device comprising an LC medium or an optical retarder or optical compensator as described above and below.

Said components include, without limitation, optical retardation films, polarizers, compensators, beam splitters, reflective films, antistatic protection sheets, electromagnetic interference protection sheets, polarization controlled lenses for example for autostereoscopic 3D displays, IR reflection films for example for window applications, spatial light modulators, and lenses for light guides, focusing or other optical effects, eg. 3D, holography, telecomms.

Said devices include, without limitation, electrooptical displays, preferably LC displays, autostereoscopic 3D displays, OLEDs, optical data storage devices, goggles for AR/VR applications and windows, very preferably LC displays or OLEDs.

The retarder according to the present invention is preferably an +A plate or +C plate retarder.

In another preferred embodiment the retarder is a half wave retarder (HWF) or quarter wave retarder (QWF) or achromatic quarter wave retarder (AQWF).

Since the LC layer is not switched between two different alignment states, the retardation of the retarder can easily be controlled by selecting the birefringence and the thickness of the LC layer in accordance with equation (1) as indicated above. It is therefore not necessary to use an LC material with a very high birefringence.

Thus, in a preferred embodiment of the present invention the birefringence of the LC medium at 20° C. and 589 nm is from 0.06 to 0.15, more preferably from 0.06 to 0.12, very preferably from 0.06 to <0.10, most preferably from 0.06 to <0.08.

The alignment of the LC molecules in the LC layer, e.g. planar or homeotropic alignment, can be controlled by an alignment layer that is in contact with the LC mixture. Depending on the chosen alignment, an +A plate, a +C plate or a −C plate retarder can thus be realized. By changing the birefringence Δn of the LC mixture, e.g. via special mixture design, it is possible to adapt the retardation of the LC layer to common cell gaps of the LC display to realize the desired application, e.g. as QWF, HWF or AQWF. Moreover, the permittivity of the LC layer can be adjusted by the specific mixture design, e.g. by varying the proportions of components A, B and optionally C in the mixture composition as described above.

The retarder preferably comprises, most preferably consists of, an LC layer as described above and below which is provided between two transparent, plane parallel substrates, for example two glass plates or two plastic substrates, which are sealed at the edges and preferably contain a transparent spacer material to keep a constant layer thickness. The principle construction of the retarder is thus similar to that of an LC display cell (except that electrodes and/or electric addressing means are necessary as further described below). The LC material can be provided between the substrates by methods which are known to the skilled person and which are similar to the methods for providing a switchable LC layer in an LC display cell, for example by filling in vacuum or by one drop filling (ODF).

Since the LC material is substantially diectrically neutral and should not change its orientation during its use by applying an applied electric field, the substrates do not need to be equipped with electrode layers. Depending on the use of the retarder or its position in an electrooptical device, the substrates may be equipped with an electrode layer, for example on the side facing away from the LC medium, if this is necessary for the operation of the device. Preferably the substrates are not equipped with an electrode layer at the side facing the layer of the LC medium, more preferably not equipped with an electrode layer on either side.

Preferably at least one of the substrates is equipped with an alignment layer which induces the desired alignment depending on the desired type of the optical retarder. For example, in case of an A plate an alignment layer inducing a planar alignment of the LC molecules is preferably used, and in case of a C plate an alignment layer inducing a homeotropic alignment of the LC molecules is preferably used.

The alignment layer may comprise for example a polyimide or another material known to the skilled person, and may in addition be subjected to a unidirectional rubbing process. Alternatively, an alignment layer prepared from a photoaligned and photocured material may be used.

In a preferred embodiment the retarder is directly applied on a switchable display cell and shares a common substrate with display cell, as will be further illustrated below.

In another preferred embodiment the LC display comprises two or more retarders according to the present invention, for example one of which is a +A plate retarder and one of which is a +C or −C plate retarder. Optionally the retarders are provided directly onto each other and share a common substrate, as will be further illustrated below.

FIG. 1 schematically and exemplarily illustrates a retarder according to the present invention, comprising a layer (12) of an LC medium as described above and below which is substantially dielectrically neutral and is positioned between two glass substrates (11a, 11b), each equipped with an alignment layer (13a, 13b) inducing the desired alignment in the LC layer (12).

Preferably the alignment of the LC molecules is uniform throughout the layer, very preferably either planar or homeotropic. The optical retardation of the LC material is substantially constant during its use.

Figure 2:
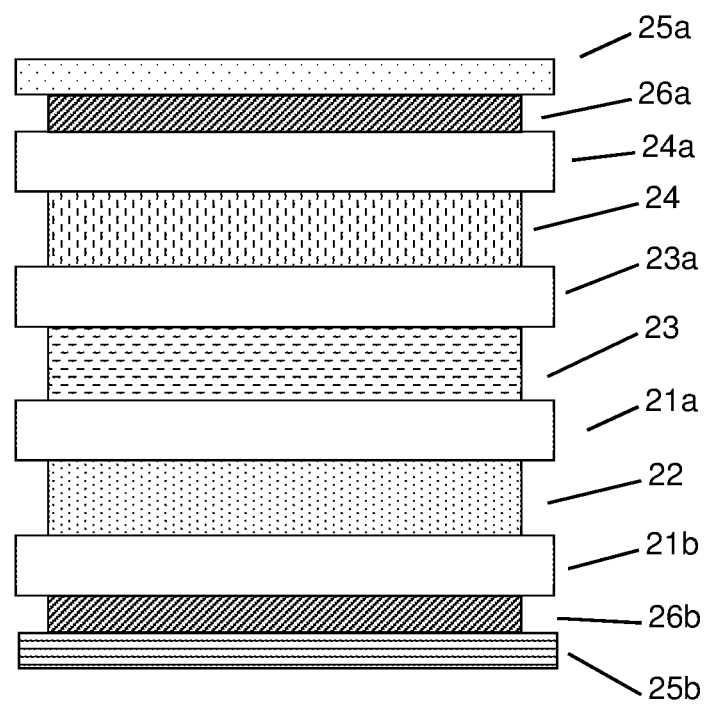
FIG. 2 schematically and exemplarily illustrates an LCD according to the present invention.

FIG. 2 schematically and exemplarily illustrates an LC display according to the present invention, comprising two glass substrates (21a, 21b) and inbetween a layer (22) of an LC medium having either negative or positive dielectric anisotropy and being switchable between two differently aligned states upon applying an electric field. The substrates (21a, 21b) may be further equipped with alignment layers and transparent electrode layers (not shown) at the surfaces that are in contact with the LC layer (22). The display further comprises, provided on the switchable layer (22), a +A plate retarder comprising a layer (23) of an LC medium according to the invention which is substantially dielectrically neutral (and is thus non-switchable) and has planar alignment, and a +C plate retarder (24) comprising a layer of an LC medium according to the invention which is substantially dielectrically neutral (and is thus non-switchable) and has homeotropic alignment. The switchable LC layer (22) and the non-switchable LC layers (23) and (24) are separated by glass substrates (21a, 23a, 24a), which may be further equipped with alignment layers (not shown) at the surfaces that are in contact with the respective LC layers (23) and (24) and induce the desired alignment therein.

To ensure that the alignment of the LC molecules in the non-switchable layers (23) and (24) is uniform throughout the layer, and is either homeotropic or planar, the substrates (21a, 23a, 24a) are equipped with the respective alignment layers, i.e. the upper surface of substrate (21a) and the lower surface of substrate (23a) are each equipped with an alignment layer inducing planar alignment, and the upper surface of substrate (23a) and the lower surface of substrate (24a) are each equipped with an alignment layer inducing homeotropic alignment. The terms "upper surface" and "lower surface" herein refer to the positions of the substrates as depicted in FIG. 2. The optical retardation of the LC material in the layers (23) and (24) is thus substantially constant during operation of the display.

The display further comprises two polarizers (25a, 25b) with crossed optical axes, which are fixed to the display by TAC layers (26a, 26b).

The optical retarder or optical compensator according to the present invention provides several advantages compared to the hitherto used RM films known from prior art. For example, in case of multilayer stacks with two or more retarders it is possible to use the same LC mixture for an A plate and a C plate retarder by using different alignment layers on the substrates. Moreover, no UV treatment, photopolymerization or photoalignment methods are needed. Also, the retardation can easily be adjusted by varying the cell thickness.

The manufacture of a display according to the present invention can be achieved by means and methods known to the skilled person.

The LC media and optical retarders and compensators according to the invention are in principle suitable for use in all LC display modes, including but not limited to
  positive modes like the TN (twisted nematic), STN (supertwisted nematic), IPS (in-plane switching), FFS (fringe field switching), HB-FFS, positive VA or OCB (optically compensated birefringence) mode,
  negative modes like the VA (vertical alignment), MVA (multidomain VA), ECB (electrically controlled birefringence), ASV (advanced super view, or axially symmetric VA), PSVA (polymer sustained/polymer stabilised VA) SA-VA (self-aligned VA) mode or the FFS, IPS or UB-FFS mode using LC media having negative Δε.

Preferably the display according to the invention is a display of the TN, STN, IPS, FFS, HB-FFS, positive VA, OCB, VA, MVA, ECB, ASV, PSVA, SA-VA or UB-FFS mode.

The LC medium and the retarder according to the present invention may also be used in other optical, electrooptical or electronic components or devices, including, without limitation, component such as optical retardation films, polarizers, compensators, beam splitters, reflective films, anti-static protection sheets, electromagnetic interference protection sheets, polarization controlled lenses for example for autostereoscopic 3D displays, IR reflection films for example for window applications, spatial light modulators, and lenses for light guides, focusing or other optical effects, eg. 3D, holography, telecoms, and devices such as electrooptical displays, 3D displays, OLEDs, optical data storage devices, goggles for AR/VR applications and windows, very preferably LC displays or OLEDs.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

For the present invention and in the following examples, the structures of the liquid-crystal compounds are indicated by means of acronyms. Unless stated otherwise, the transformation into chemical formulae is done in accordance with Tables A.1 to A.3 below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Preferably n, m and l are independently of each other 1, 2, 3, 4, 5, 6, or 7. Table A.1 shows the codes for the ring elements of the nuclei of the compound, Table A.2 lists the bridging units, and Table A.3 lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group.

TABLE A.1

| Ring elements | |
|---|---|
| C | (cyclohexane ring) |
| D | (dioxane ring with O at 2-position) |
| DI | (dioxane ring, isomer) |
| A | (tetrahydropyran ring) |

TABLE A.1-continued

| Ring elements | |
|---|---|
| AI | (tetrahydropyran ring, isomer) |
| P | (phenyl ring) |
| G | (fluorophenyl ring) |
| GI | (fluorophenyl, isomer) |
| U | (difluorophenyl) |
| UI | (difluorophenyl, isomer) |
| Y | (difluorophenyl) |
| P(F,Cl)Y | (F,Cl-phenyl) |
| P(Cl,F)Y | (Cl,F-phenyl) |
| np | (naphthalene) |

TABLE A.1-continued
| Ring elements | |
|---|---|
| n3f | 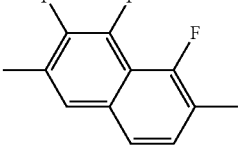 |
| nN3fl | 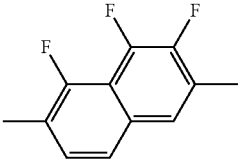 |
| th | 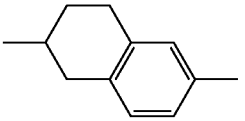 |
| thl | 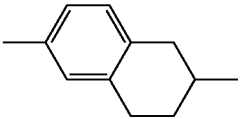 |
| tH2f | 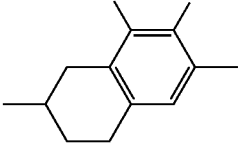 |
| tH2fl | 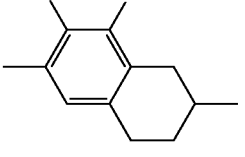 |
| o2f | 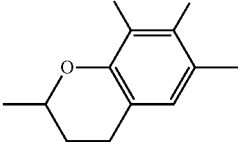 |
| o2fl | 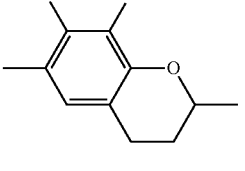 |
| dh | 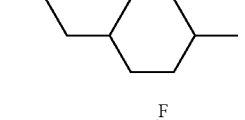 |
| nf |  |
| B | 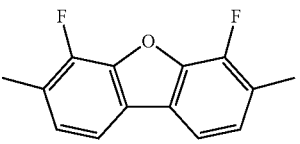 |
| B(S) | 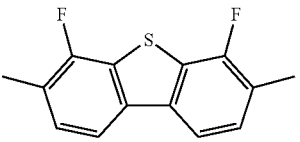 |
| O | 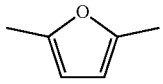 |
| S | 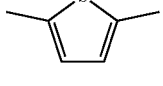 |
| K | 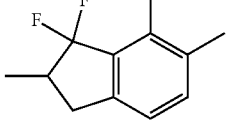 |
| Kl | 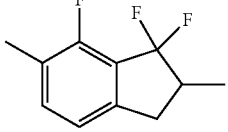 |
| L | 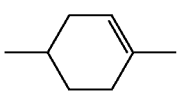 |
| Ll |  |
| F | 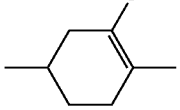 |
| Fl | 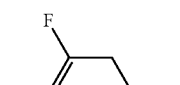 |
| Bh | 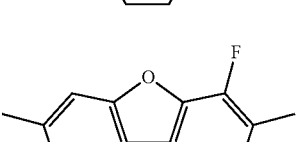 |

TABLE A.1-continued

Ring elements

- Bh(S)
- Bf
- Bf(S)
- Bfi
- Bfi(S)

TABLE A.2

Bridging units

| | | | |
|---|---|---|---|
| E | —CH$_2$—CH$_2$— | | |
| V | —CH=CH— | | |
| T | —C≡C— | | |
| W | —CF$_2$—CF$_2$— | | |
| B | —CF=CF— | | |
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE A.3

End groups

| On the left individually or in combination | | On the right individually or in combination | |
|---|---|---|---|
| -n- | C$_n$H$_{2n+1}$— | -n | —C$_n$H$_{2n+1}$ |
| —nO— | C$_n$H$_{2n+1}$—O— | —On | —O—C$_n$H$_{2n+1}$ |
| —V— | CH$_2$=CH— | -m | —C$_m$H$_{2m+1}$ |
| —nV— | C$_n$H$_{2n+1}$—CH=CH— | —Om | —O—C$_m$H$_{2m+1}$ |
| —Vn— | CH$_2$=CH—C$_n$H$_{2n}$— | —V | —CH=CH$_2$ |
| —nVm— | C$_n$H$_{2n+1}$—CH=CH—C$_m$H$_{2m}$— | —nV | —C$_n$H$_{2n}$—CH=CH$_2$ |
| —N— | N≡C— | —Vn | —CH=CH—C$_n$H$_{2n+1}$ |
| —S— | S=C=N— | —nVm | —C$_n$H$_{2n}$—CH=CH—C$_m$H$_{2m+1}$ |
| —F— | F— | —N | —C≡N |
| —CL— | Cl— | —S | —N=C=S |
| —M— | CFH$_2$— | —F | —F |
| —D— | CF$_2$H— | —CL | —Cl |
| —T— | CF$_3$— | —M | —CFH$_2$ |
| —MO— | CFH$_2$O— | —D | —CF$_2$H |
| —DO— | CF$_2$HO— | —T | —CF$_3$ |
| —TO— | CF$_3$O— | —OM | —OCFH$_2$ |
| —A— | H—C≡C— | —OD | —OCF$_2$H |
| —nA— | C$_n$H$_{2n+1}$—C≡C— | —OT | —OCF$_3$ |
| —NA— | N≡C  C≡C— | —A | —C≡C—H |
| —(cn)— | (CH$_2$)$_{n-2}$ cyclopropyl | —An | —C≡C—C$_n$H$_{2n+1}$ |
| —(cn)m— | (CH$_2$)$_{n-2}$ cyclopropyl—(CH$_2$)$_m$— | —AN | —C≡C—C≡N |
| | | —(cn) | (CH$_2$)$_{n-2}$ cyclopropyl |
| | | —m(cn) | —(CH$_2$)$_m$—(CH$_2$)$_{n-2}$ cyclopropyl |

TABLE A.3-continued

| End groups | | | |
|---|---|---|---|
| On the left only in combination | | On the right only in combination | |
| —...n...— | —$C_nH_{2n}$— | —...n...— | —$C_nH_{2n}$— |
| —...M...— | —CFH— | —...m...— | —$C_mH_{2m}$— |
| —...D...— | —$CF_2$— | —...M...— | —CFH— |
| —...V...— | —CH=CH— | —...D...— | —$CF_2$— |
| —...Z...— | —CO—O— | —...V...— | —CH=CH— |
| —...Zl...— | —O—CO— | —...Z...— | —CO—O— |
| —...K...— | —CO— | —...Zl...— | —O—CO— |
| —...W...— | —CF=CF— | —...K...— | —CO— |
| —...O...— | —O— | —...W...— | —CF=CF— |
| | | —...O...— | —O— | in which n and m are each integers, and the three dots "..." are placeholders for other abbreviations from this table.

Tables B and C show illustrative structures of compounds together with their respective abbreviations.

TABLE B

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
(O)$C_mH_{2m+1}$ means $C_mH_{2m+1}$ or $OC_mH_{2m+1}$.

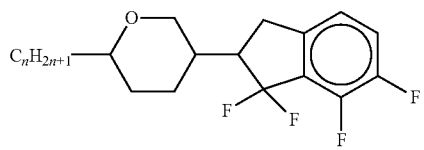

AIK-n-F

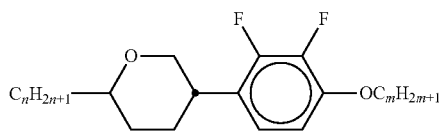

AIY-n-Om

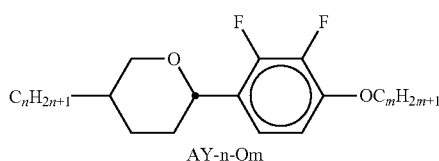

AY-n-Om

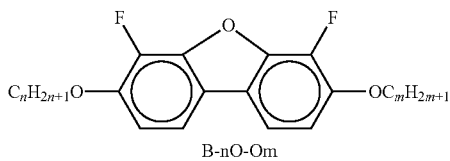

B-nO-Om

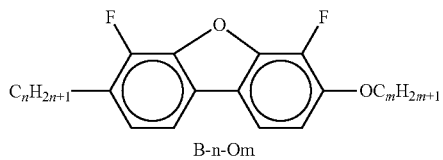

B-n-Om

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

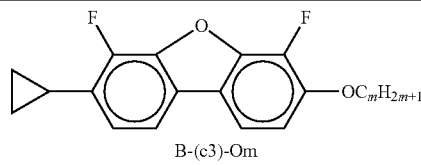

B-(c3)-Om

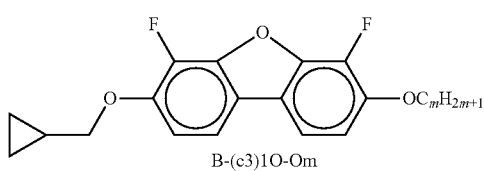

B-(c3)1O-Om

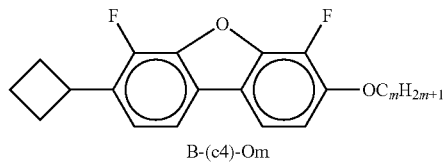

B-(c4)-Om

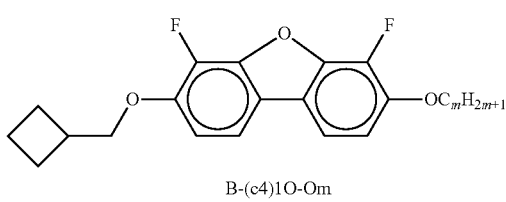

B-(c4)1O-Om

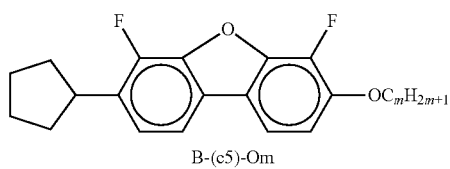

B-(c5)-Om

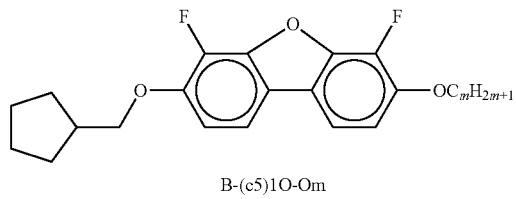

B-(c5)1O-Om

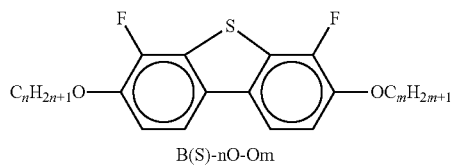

B(S)-nO-Om

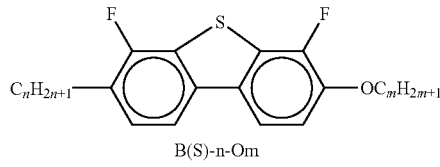

B(S)-n-Om

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
(O)$C_mH_{2m+1}$ means $C_mH_{2m+1}$ or $OC_mH_{2m+1}$.

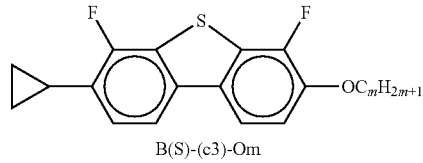

B(S)-(c3)-Om

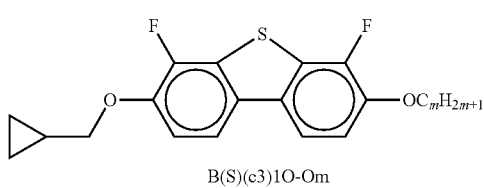

B(S)(c3)1O-Om

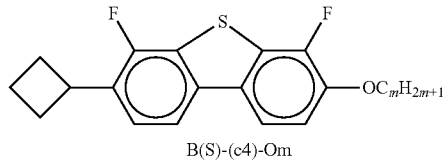

B(S)-(c4)-Om

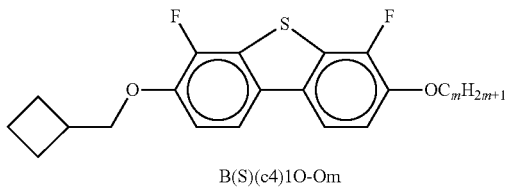

B(S)(c4)1O-Om

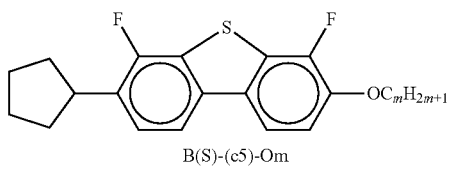

B(S)-(c5)-Om

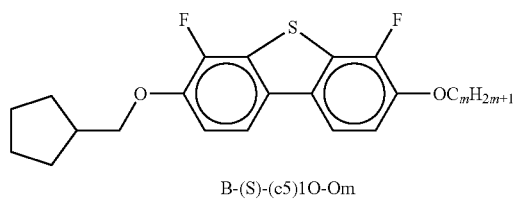

B-(S)-(c5)1O-Om

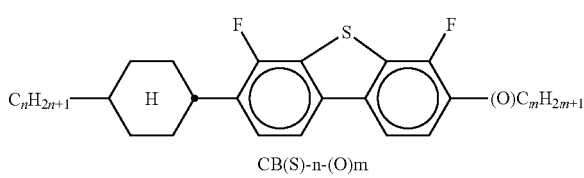

CB(S)-n-(O)m

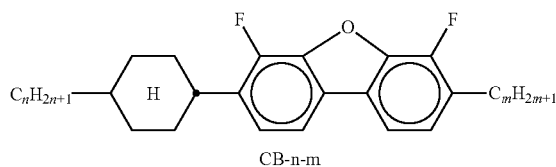

CB-n-m

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

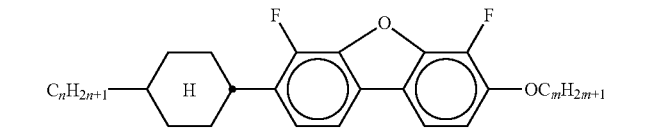

CB-n-Om

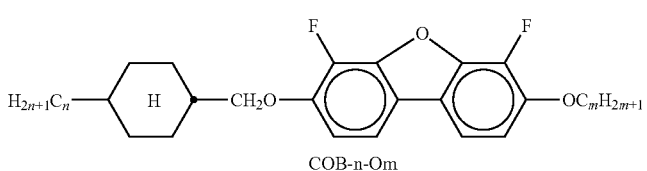

COB-n-Om

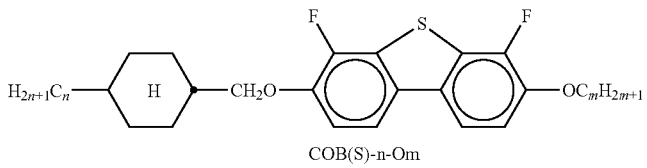

COB(S)-n-Om

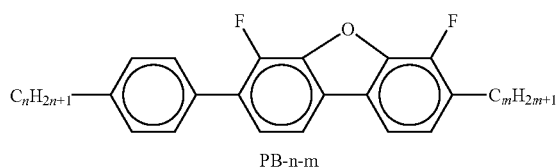

PB-n-m

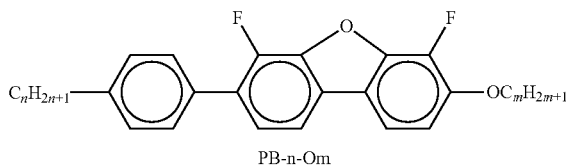

PB-n-Om

BCH-nm

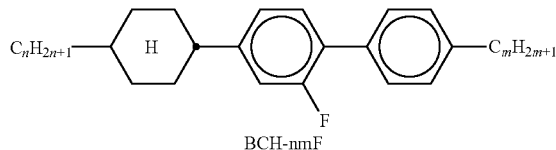

BCH-nmF

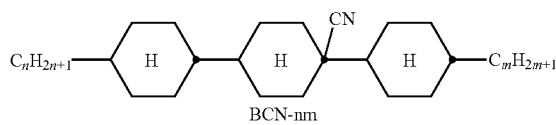

BCN-nm

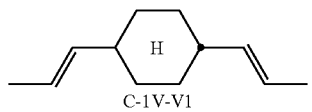

C-1V-V1

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

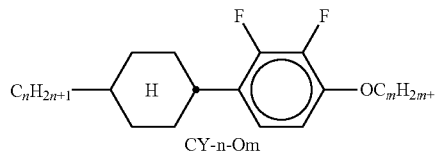

CY-n-Om

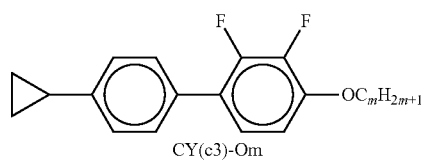

CY(c3)-Om

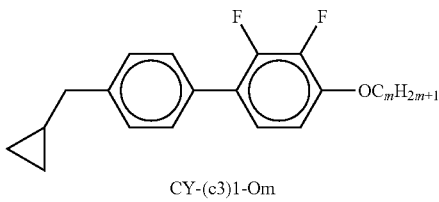

CY-(c3)1-Om

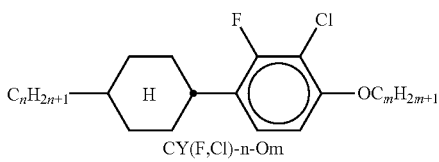

CY(F,Cl)-n-Om

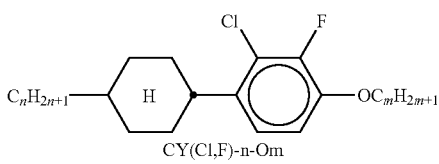

CY(Cl,F)-n-Om

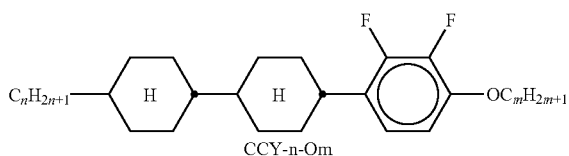

CCY-n-Om

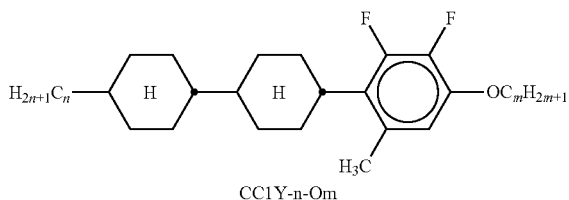

CC1Y-n-Om

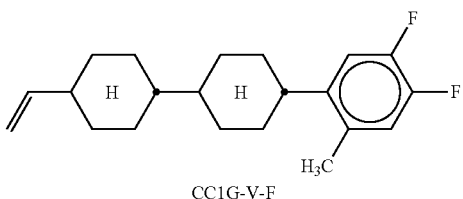

CC1G-V-F

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

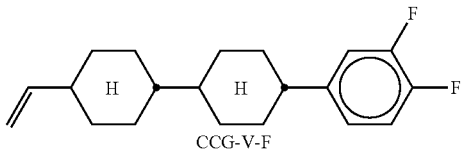
CCG-V-F

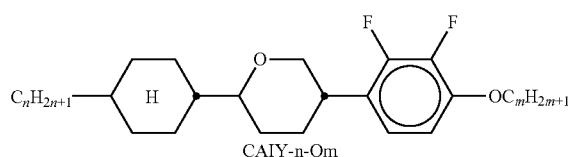
CAIY-n-Om

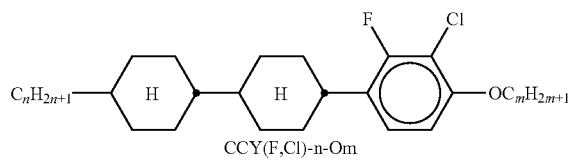
CCY(F,Cl)-n-Om

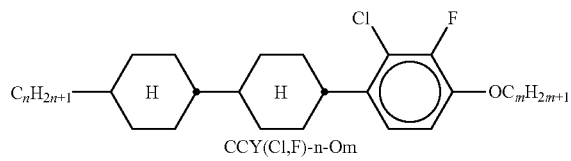
CCY(Cl,F)-n-Om

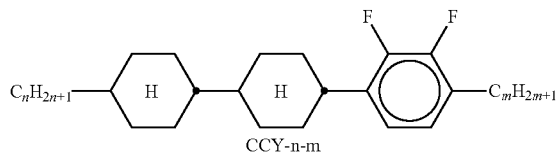
CCY-n-m

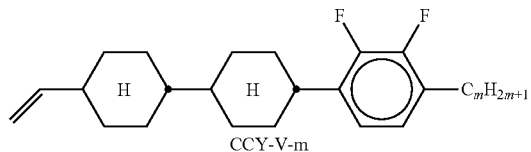
CCY-V-m

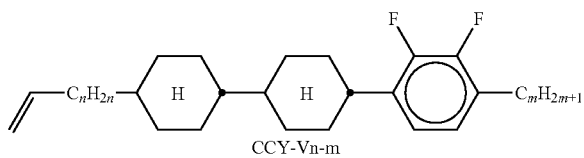
CCY-Vn-m

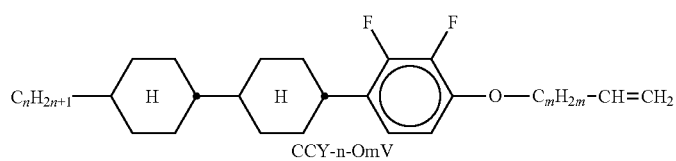
CCY-n-OmV

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

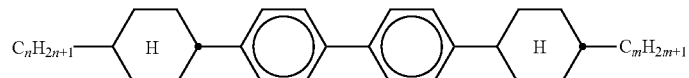

CGPC-n-m, CBC-nmF

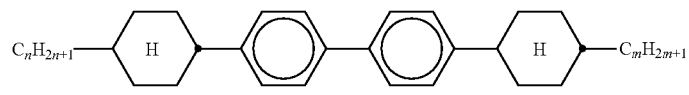

CPPC-n-m, CBC-nm

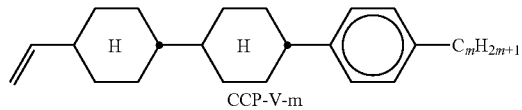

CCP-V-m

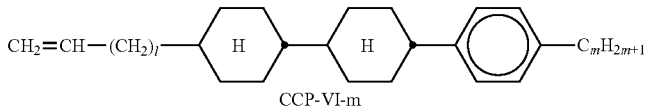

CCP-Vl-m

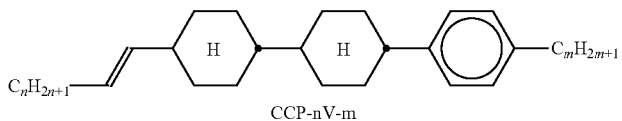

CCP-nV-m

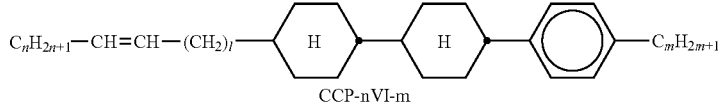

CCP-nVl-m

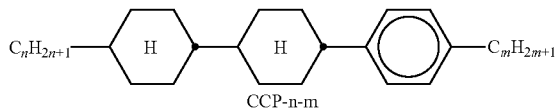

CCP-n-m

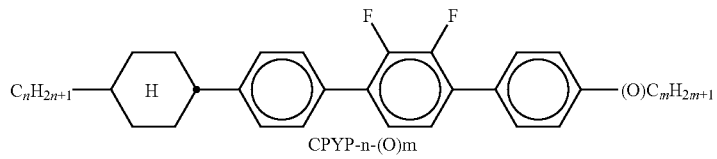

CPYP-n-(O)m

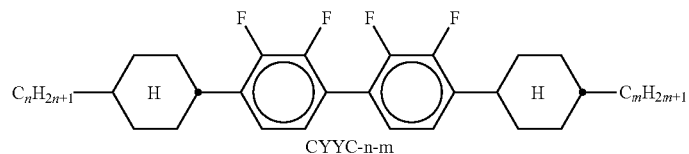

CYYC-n-m

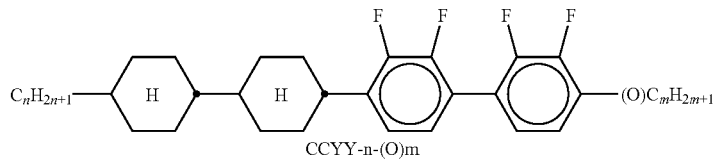

CCYY-n-(O)m

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

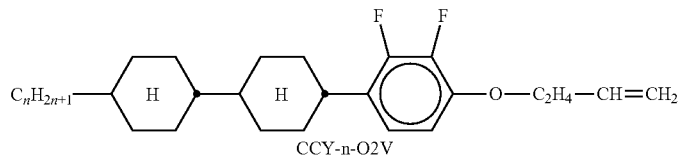
CCY-n-O2V

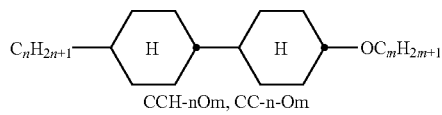
CCH-nOm, CC-n-Om

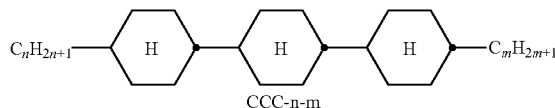
CCC-n-m

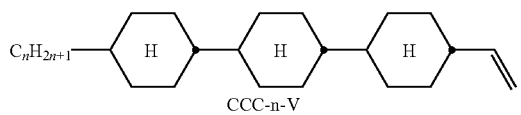
CCC-n-V

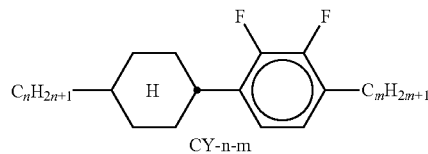
CY-n-m

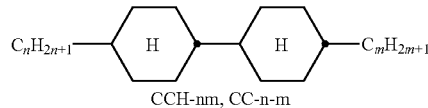
CCH-nm, CC-n-m

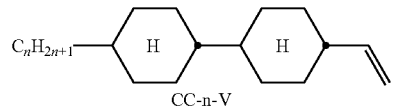
CC-n-V

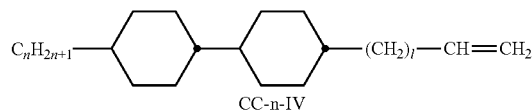
CC-n-IV

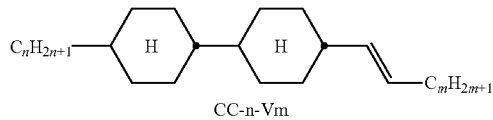
CC-n-Vm

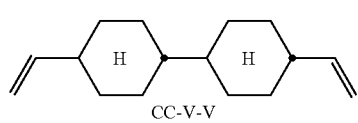
CC-V-V

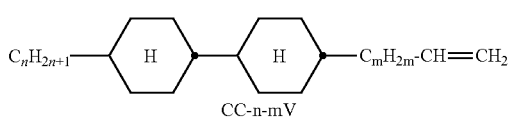
CC-n-mV

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

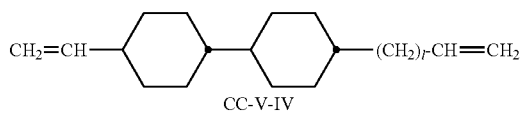
CC-V-IV

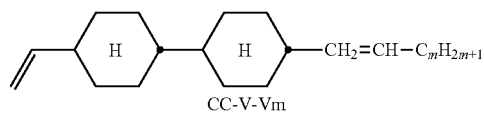
CC-V-Vm

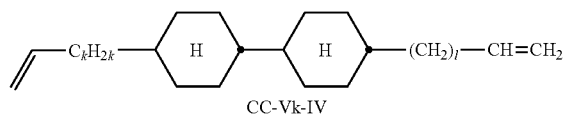
CC-Vk-IV

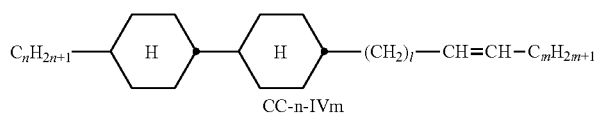
CC-n-IVm

CC-nV-Vm

CC-nV-IV

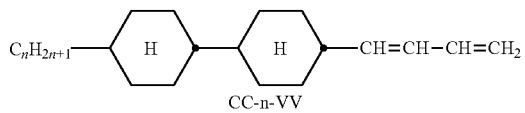
CC-n-VV

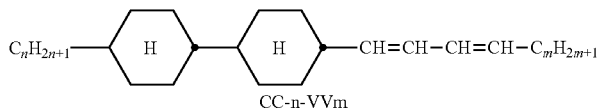
CC-n-VVm

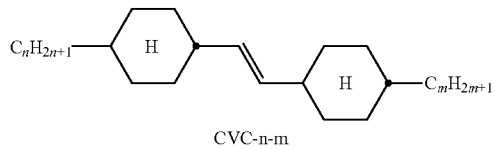
CVC-n-m

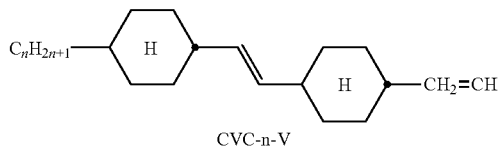
CVC-n-V

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
(O)$C_mH_{2m+1}$ means $C_mH_{2m+1}$ or $OC_mH_{2m+1}$.

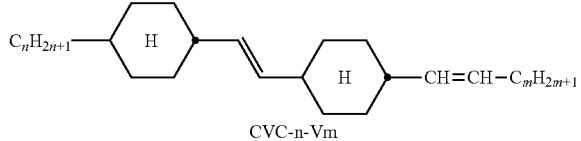
CVC-n-Vm

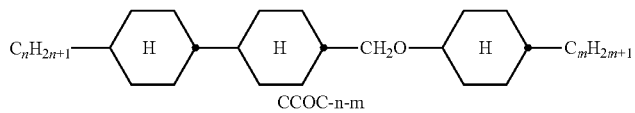
CCOC-n-m

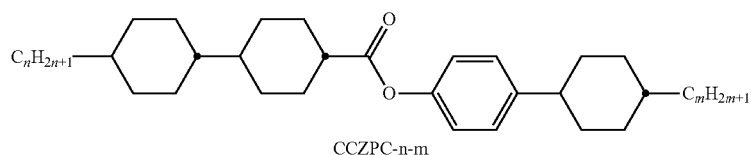
CCZPC-n-m

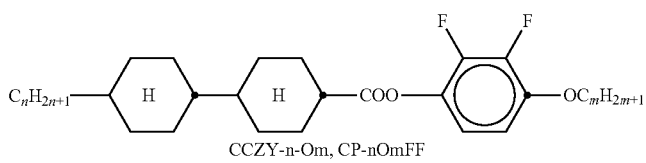
CCZY-n-Om, CP-nOmFF

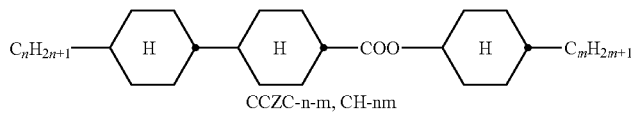
CCZC-n-m, CH-nm

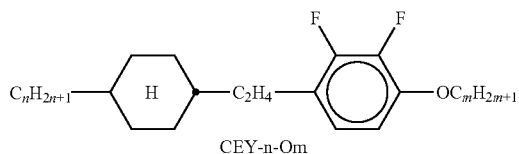
CEY-n-Om

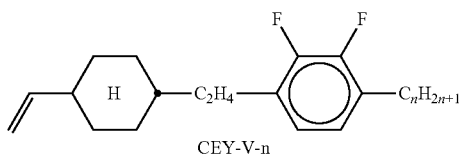
CEY-V-n

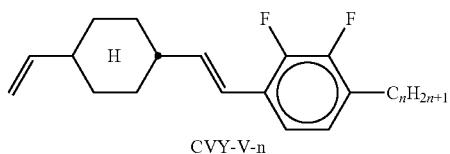
CVY-V-n

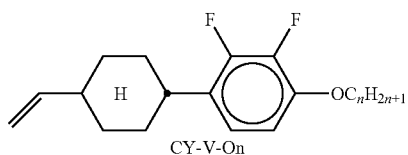
CY-V-On

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

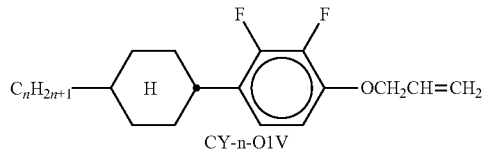
CY-n-O1V

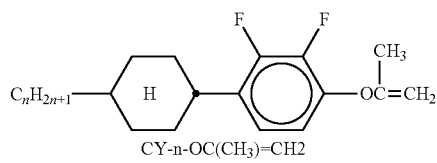
CY-n-OC(CH3)=CH2

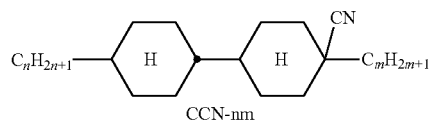
CCN-nm

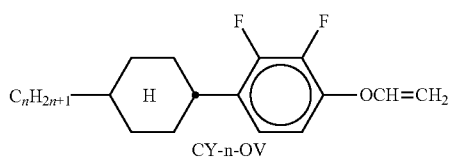
CY-n-OV

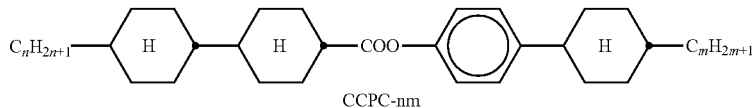
CCPC-nm

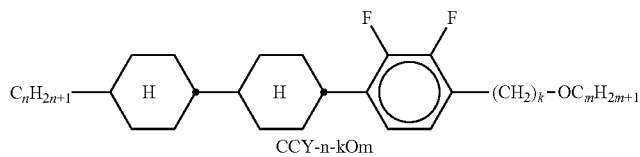
CCY-n-kOm

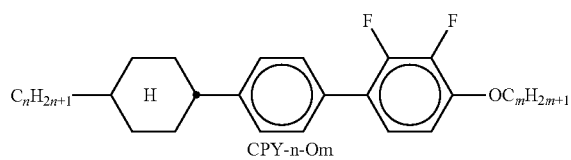
CPY-n-Om

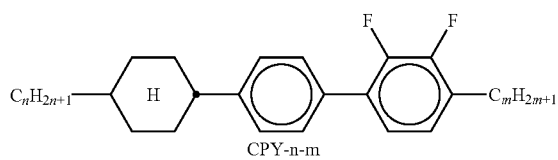
CPY-n-m

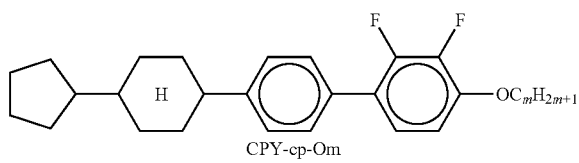
CPY-cp-Om

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

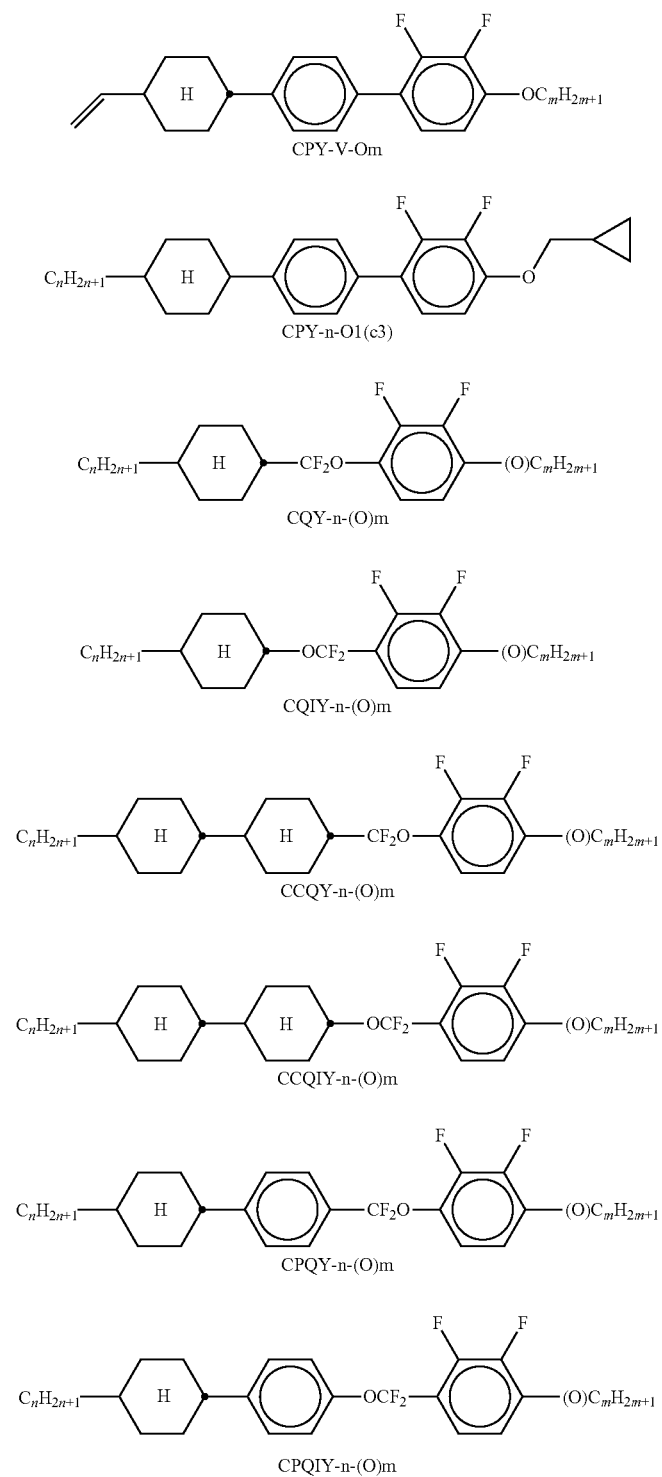

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

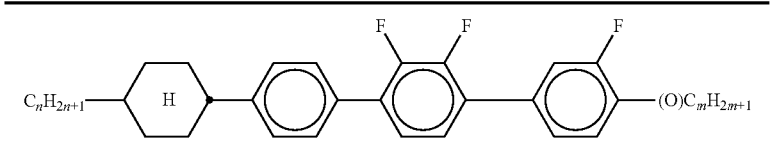

CPYG-n-(O)m

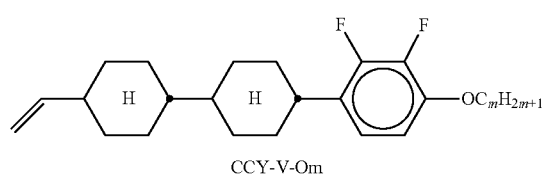

CCY-V-Om

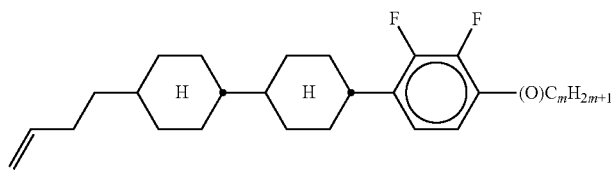

CCY-V2-(O)m

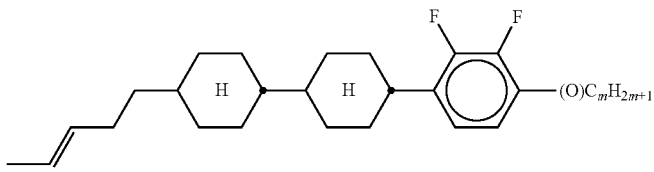

CCY-1V2-(O)m

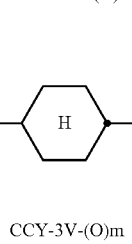

CCY-3V-(O)m

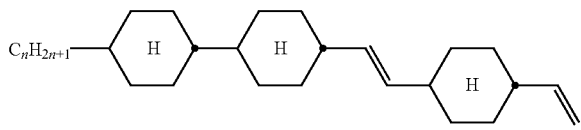

CCVC-n-V

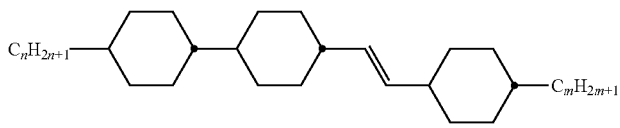

CCVC-n-m

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

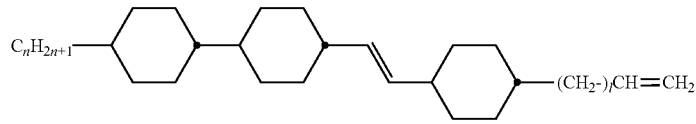

CCVC-n-IV

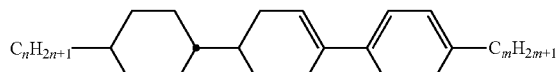

CLP-n-m

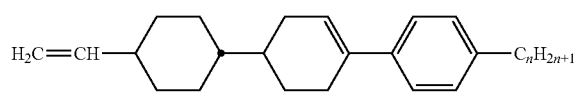

CLP-V-n

CPP-n-m

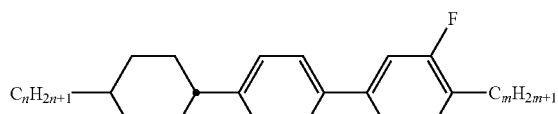

CPG-n-m

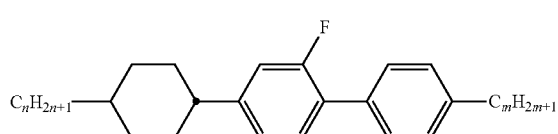

CPG-n-m

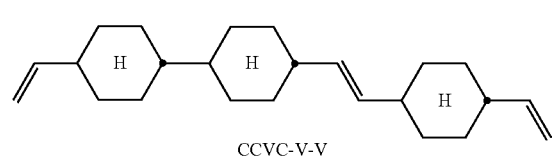

CCVC-V-V

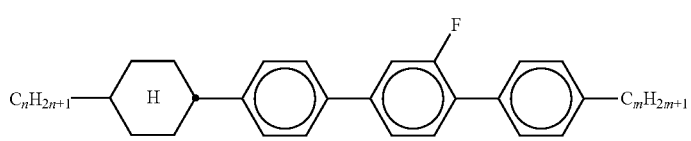

CPGP-n-m

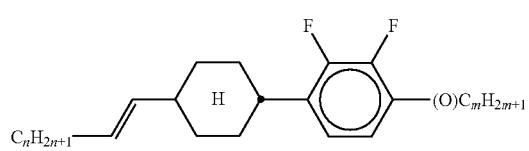

CY-nV-(O)m

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

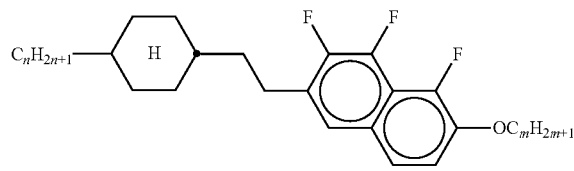

CENaph-n-Om

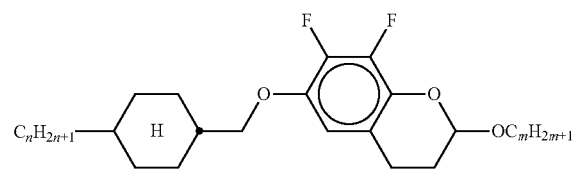

COChrom-n-Om

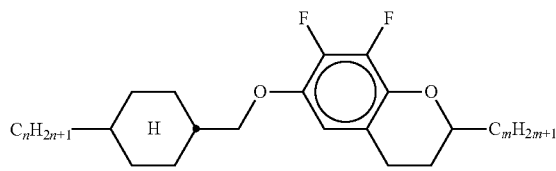

COChrom-n-m

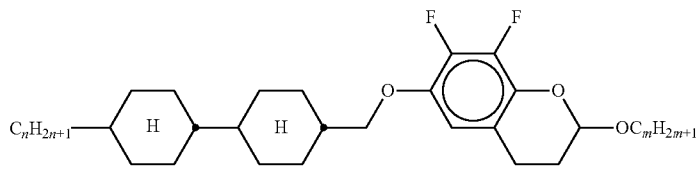

CCOChrom-n-Om

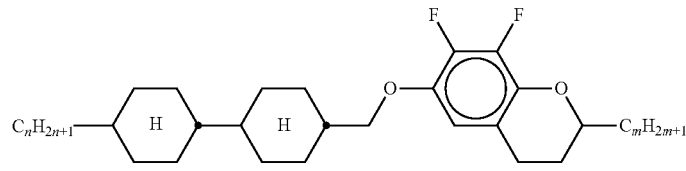

CCOChrom-n-m

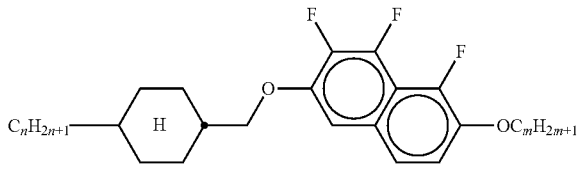

CONaph-n-Om

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

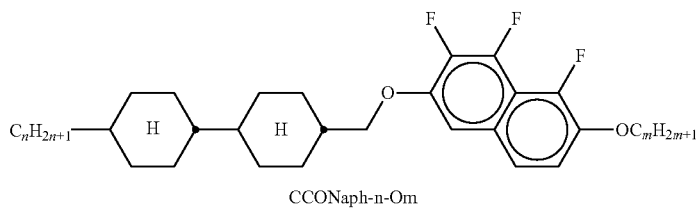

CCONaph-n-Om

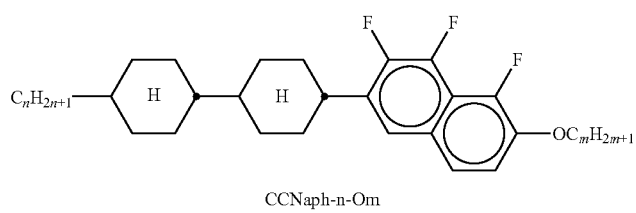

CCNaph-n-Om

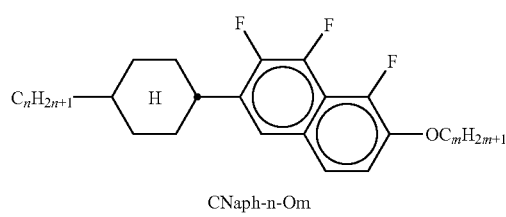

CNaph-n-Om

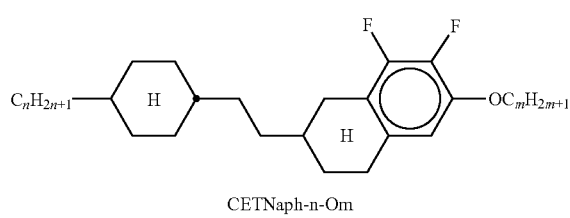

CETNaph-n-Om

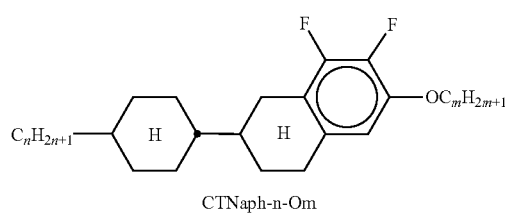

CTNaph-n-Om

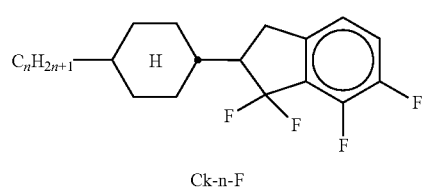

Ck-n-F

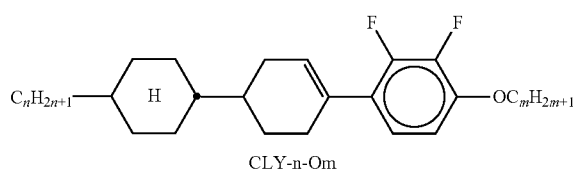

CLY-n-Om

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

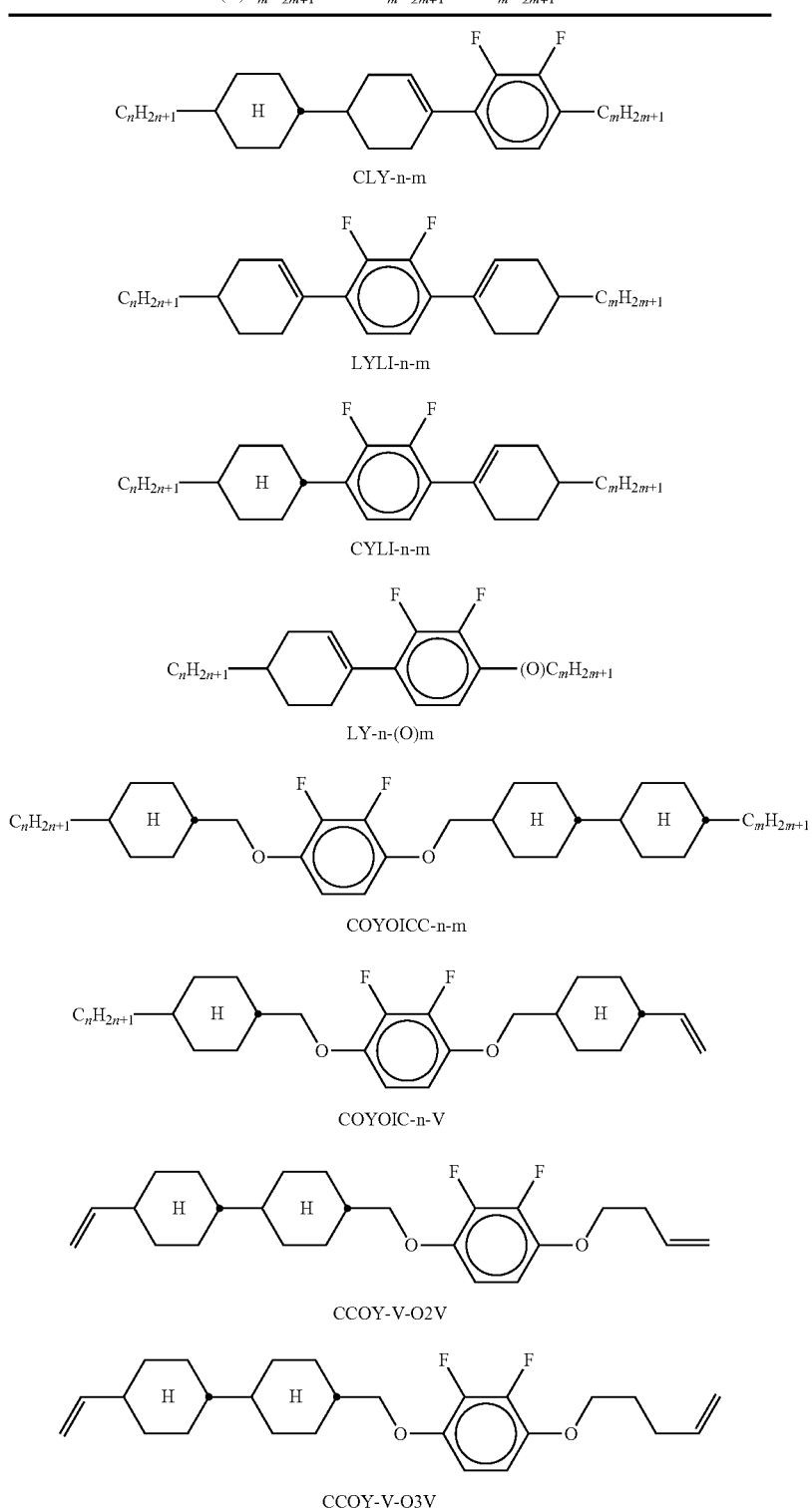

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

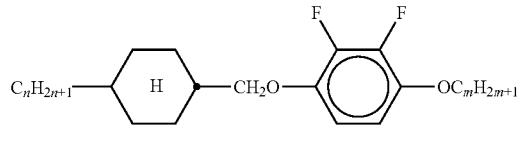

COY-n-Om

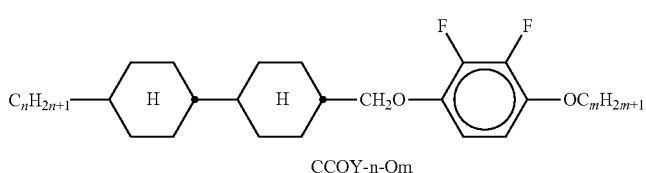

CCOY-n-Om

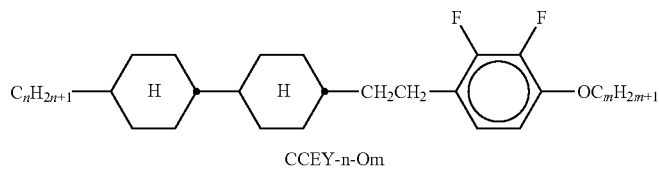

CCEY-n-Om

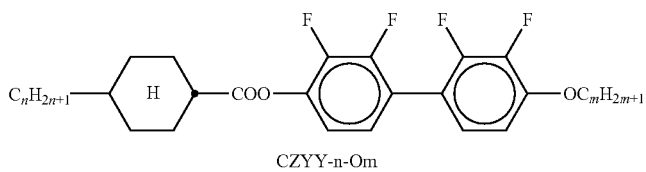

CZYY-n-Om

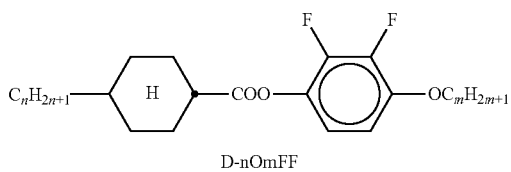

D-nOmFF

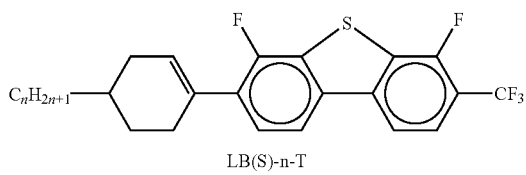

LB(S)-n-T

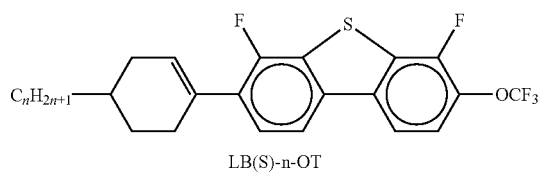

LB(S)-n-OT

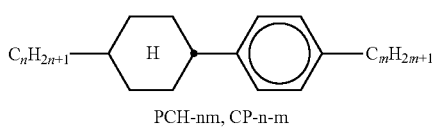

PCH-nm, CP-n-m

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

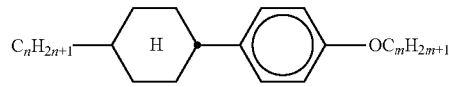

PCH-nOm, CP-n-Om

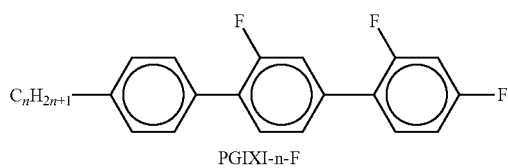

PGIXI-n-F

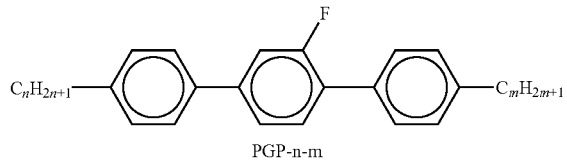

PGP-n-m

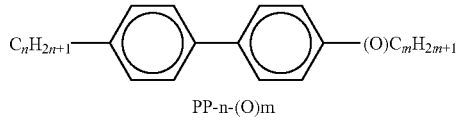

PP-n-(O)m

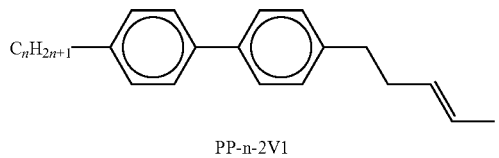

PP-n-2V1

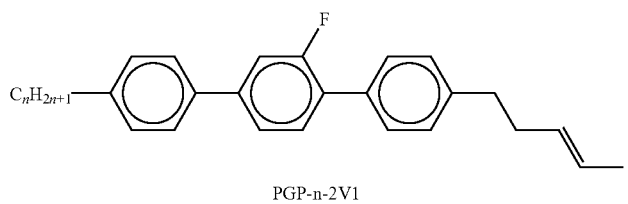

PGP-n-2V1

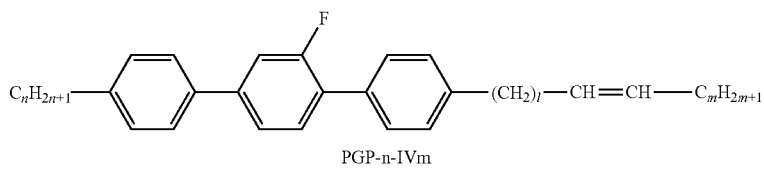

PGP-n-IVm

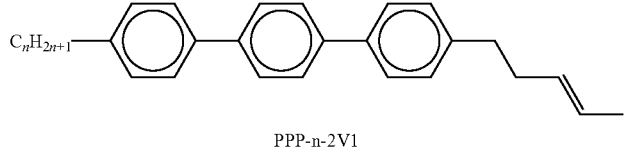

PPP-n-2V1

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".

$(O)C_mH_{2m+1}$ means $C_mH_{2m+1}$ or $OC_mH_{2m+1}$.

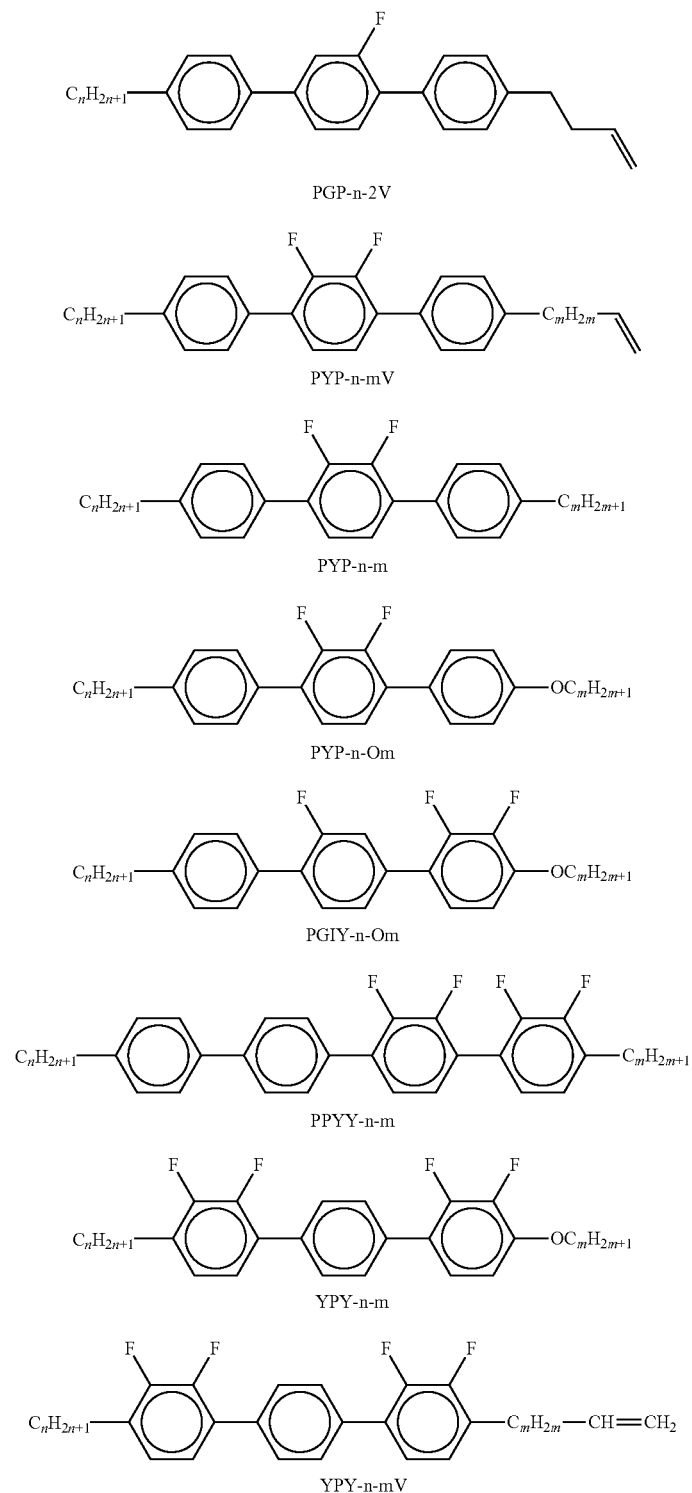

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

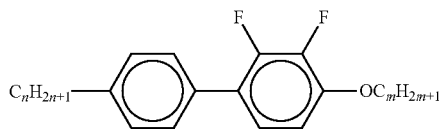

PY-n-Om

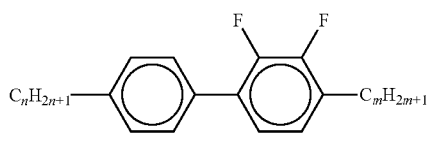

PY-n-m

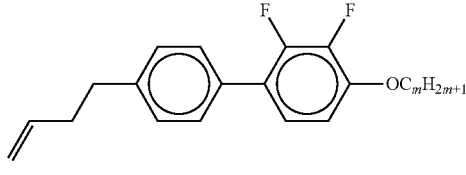

PY-V2-Om

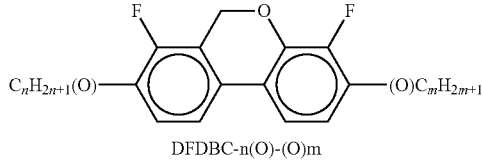

DFDBC-n(O)-(O)m

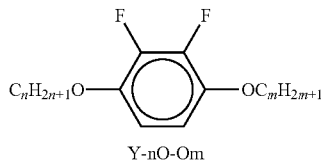

Y-nO-Om

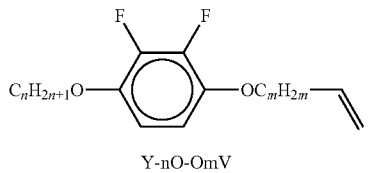

Y-nO-OmV

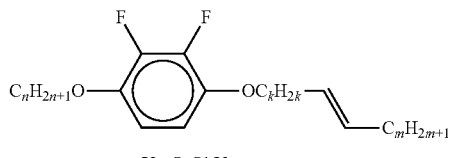

Y-nO-OkVm

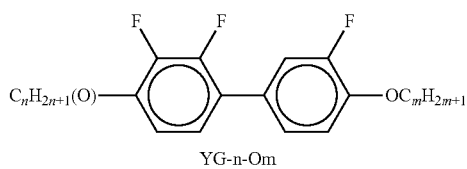

YG-n-Om

TABLE B-continued

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO-", n is preferably 1, 2, 3 or 4, very preferably 2 or 4, m is preferably 1, 2, 3, 4 or 5 or, in the combination "-Om", m is preferably 1, 2, 3 or 4, more preferably 2 or 4. The combination "-nVm" preferably is "2V1".
$(O)C_mH_{2m+1}$ means $C_mH_{2m+1}$ or $OC_mH_{2m+1}$.

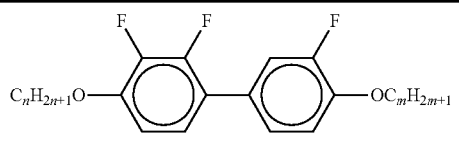

YG-nO-Om

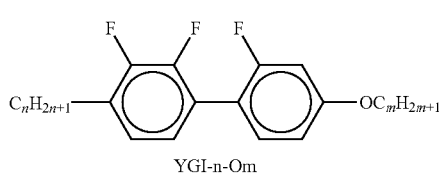

YGI-n-Om

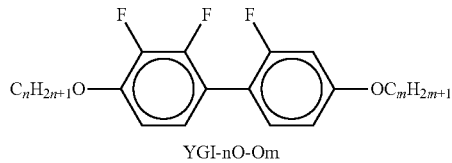

YGI-nO-Om

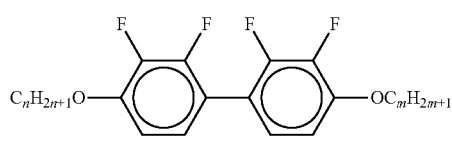

YY-n-Om

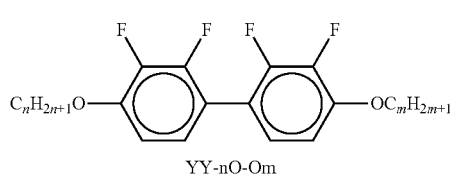

YY-nO-Om

In a preferred embodiment of the present invention, the LC media according to the invention comprise one or more compounds selected from the group consisting of compounds from Table B.

TABLE C

In the following formulae, n and m each, independently of one another, denote 0, 1, 2, 3, 4, 5, 6, 7, 8, 9, 10, 11 or 12, in particular 2, 3, 5, furthermore 0, 4, 6.

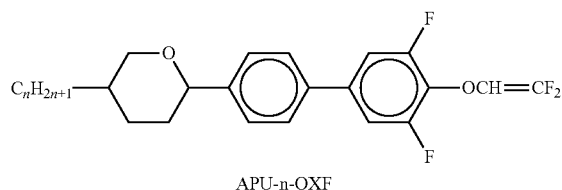

APU-n-OXF

TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
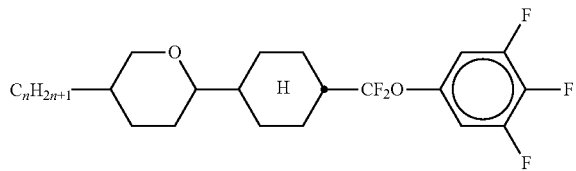
ACQU-n-F
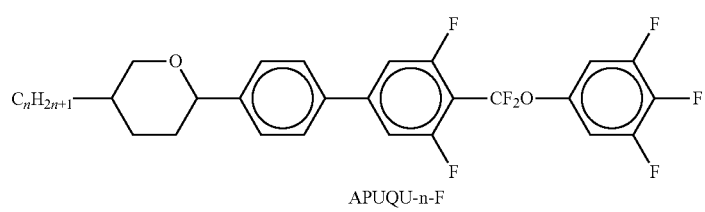
APUQU-n-F
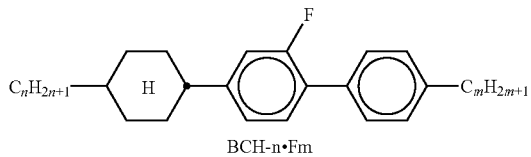
BCH-n•Fm
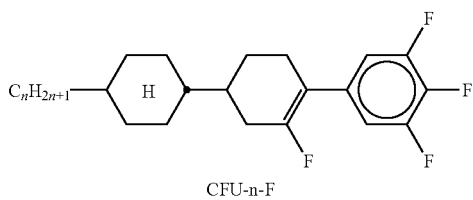
CFU-n-F
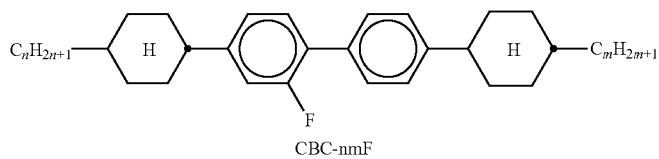
CBC-nmF
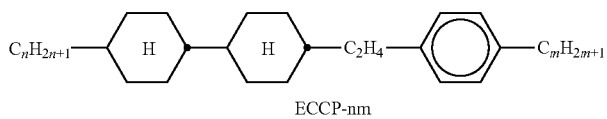
ECCP-nm
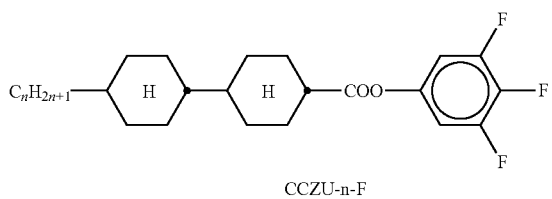
CCZU-n-F
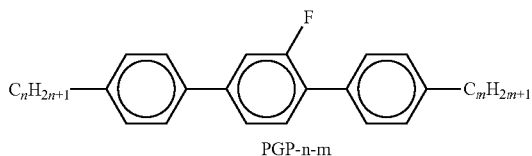
PGP-n-m TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
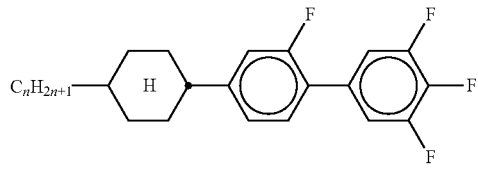
CGU-n-F
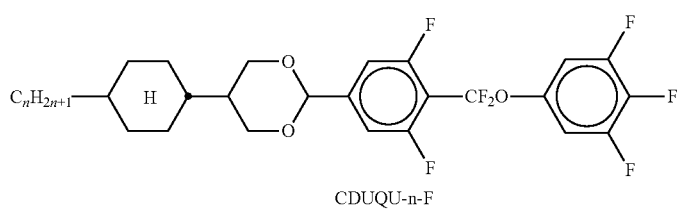
CDUQU-n-F
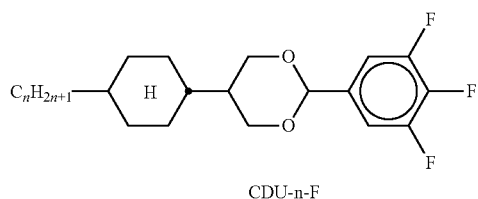
CDU-n-F
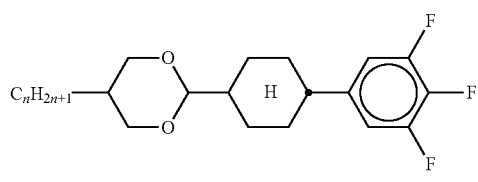
DCU-n-F
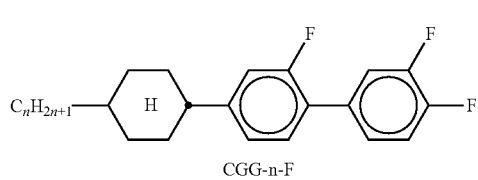
CGG-n-F
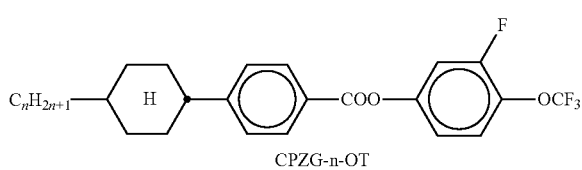
CPZG-n-OT
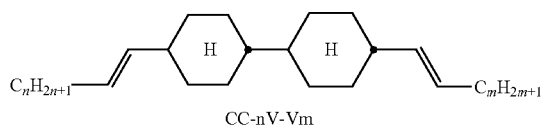
CC-nV-Vm
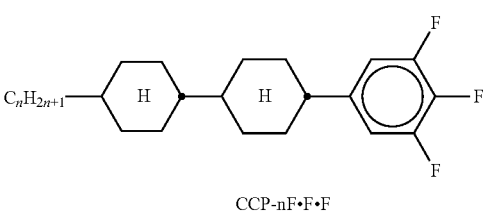
CCP-nF·F·F TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
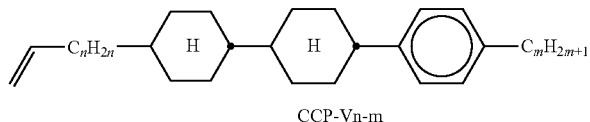
CCP-Vn-m
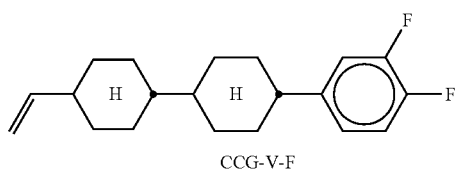
CCG-V-F
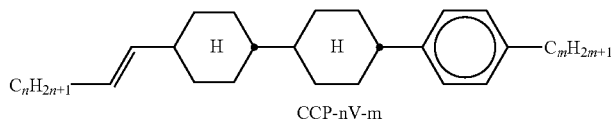
CCP-nV-m
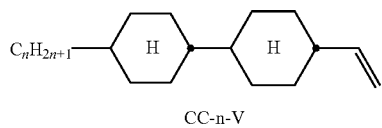
CC-n-V
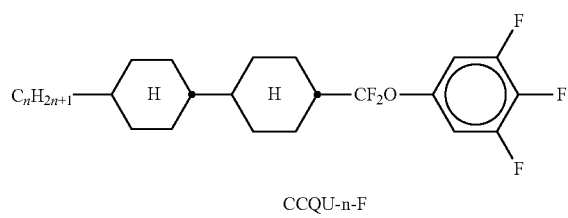
CCQU-n-F
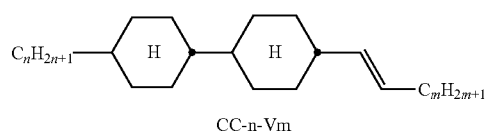
CC-n-Vm
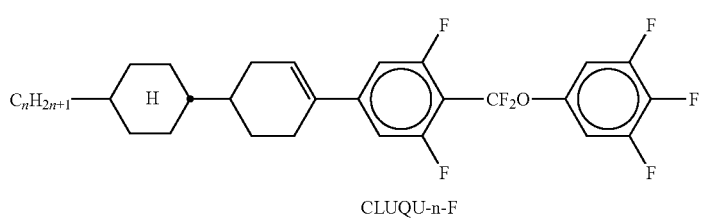
CLUQU-n-F
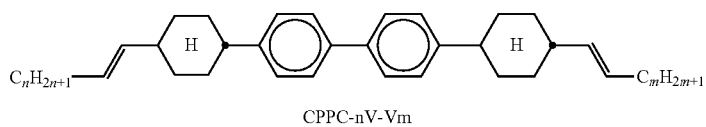
CPPC-nV-Vm
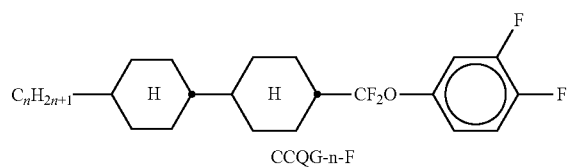
CCQG-n-F TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
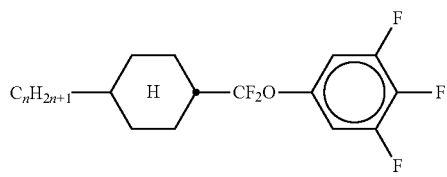
CQU-n-F
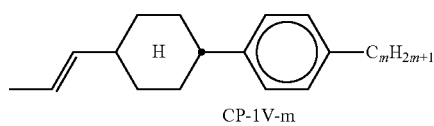
CP-1V-m
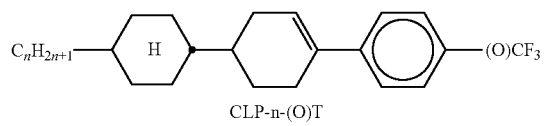
CLP-n-(O)T
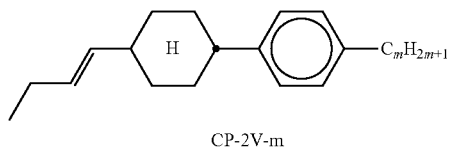
CP-2V-m
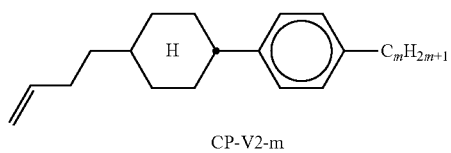
CP-V2-m
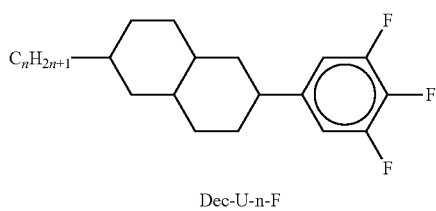
Dec-U-n-F
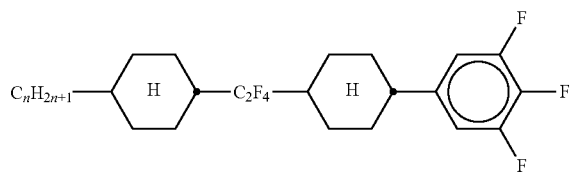
CWCU-n-F
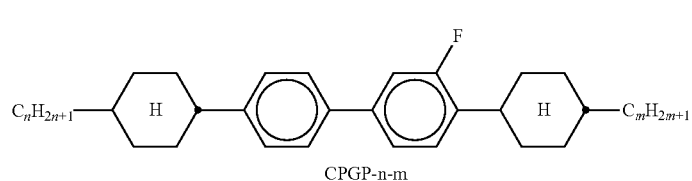
CPGP-n-m TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
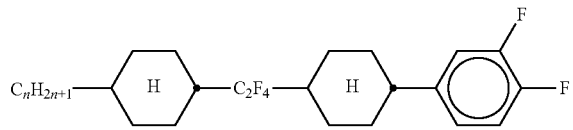
CWCG-n-F
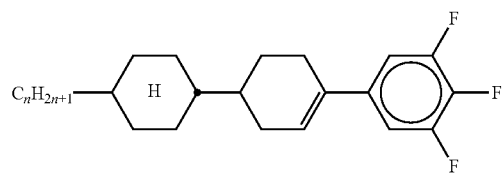
CLU-n-F
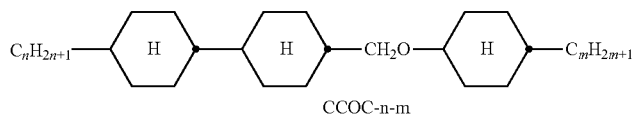
CCOC-n-m
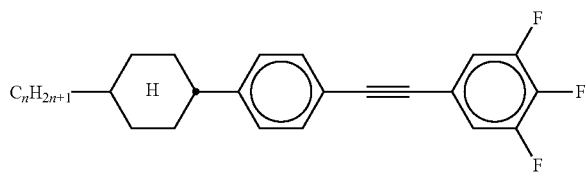
CPTU-n-F
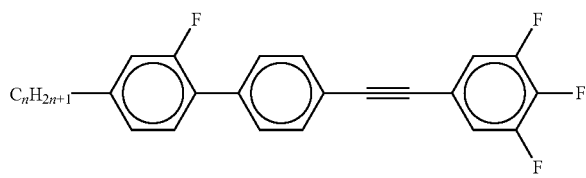
GPTU-n-F
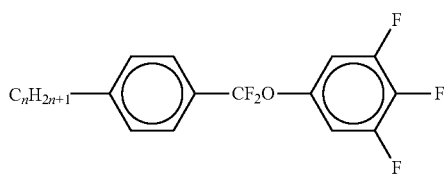
PQU-n-F
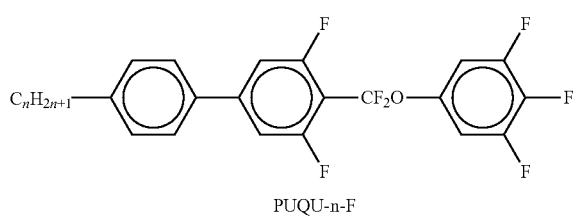
PUQU-n-F TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
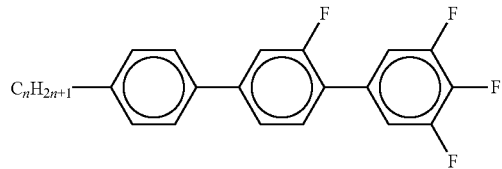
PGU-n-F
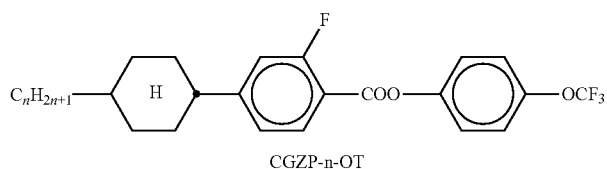
CGZP-n-OT
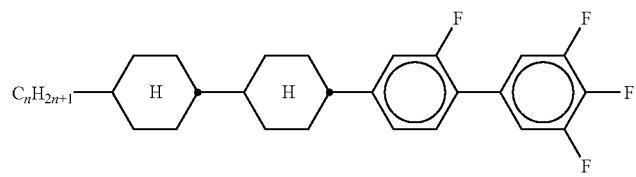
CCGU-n-F
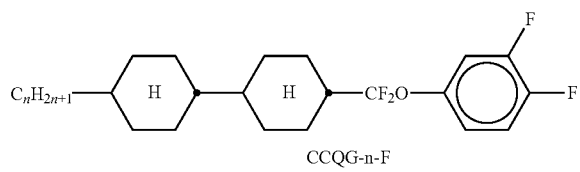
CCQG-n-F
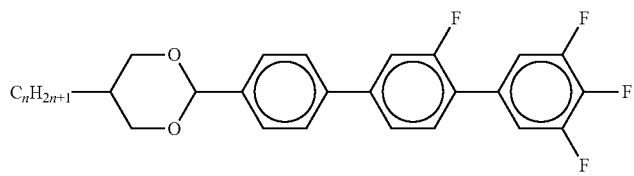
DPGU-n-F
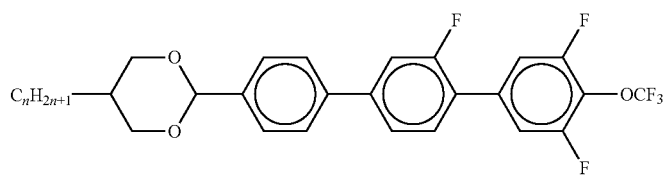
DPGU-n-OT
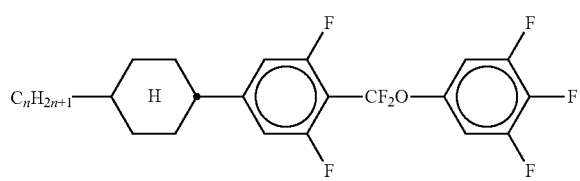
CUQU-n-F TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
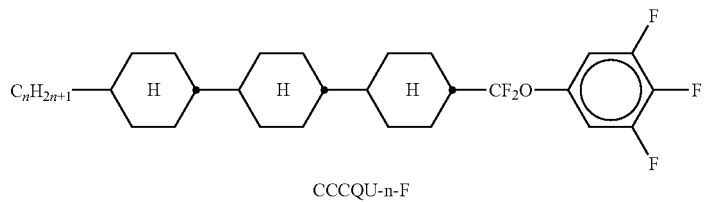
CCCQU-n-F
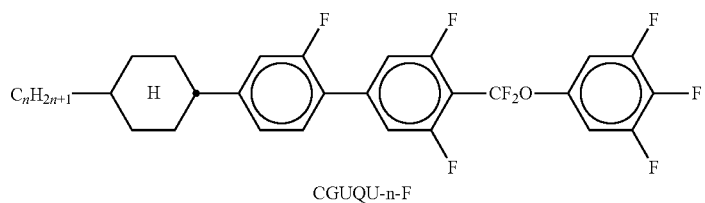
CGUQU-n-F
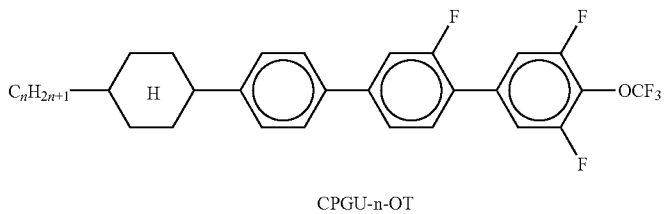
CPGU-n-OT
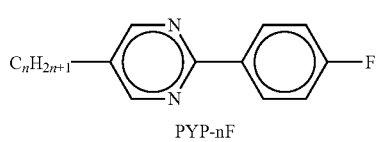
PYP-nF
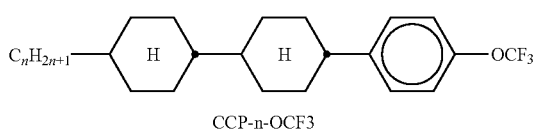
CCP-n-OCF3
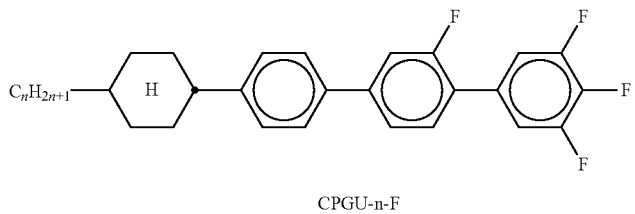
CPGU-n-F
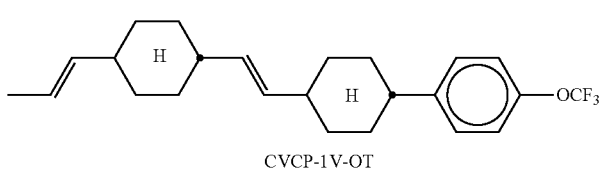
CVCP-1V-OT
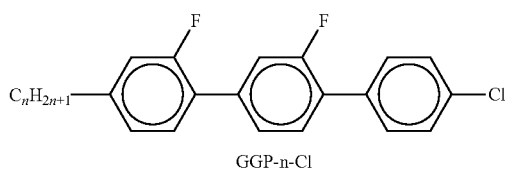
GGP-n-Cl TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
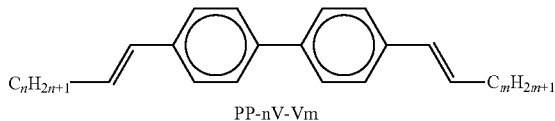
PP-nV-Vm
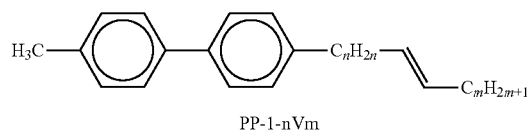
PP-1-nVm
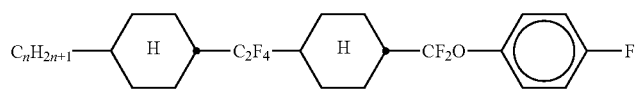
CWCQU-n-F
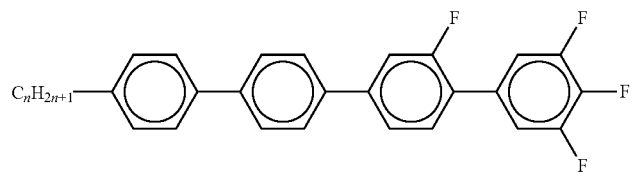
PPGU-n-F
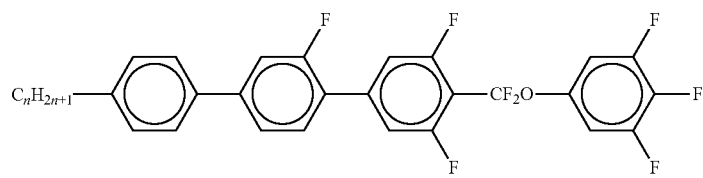
PGUQU-n-F
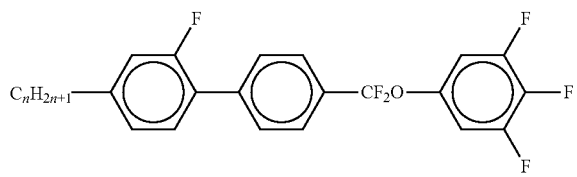
GPQU-n-F
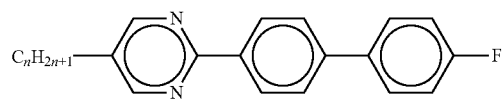
MPP-n-F
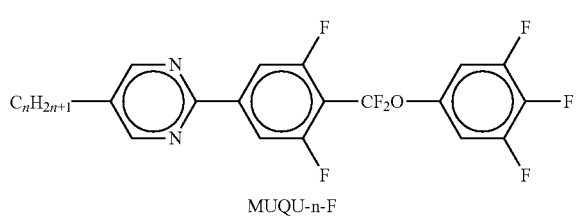
MUQU-n-F TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
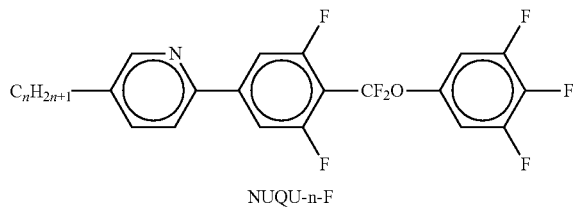
NUQU-n-F
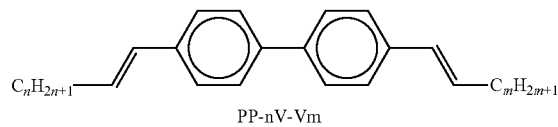
PP-nV-Vm
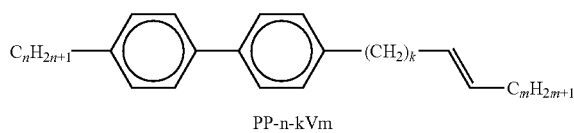
PP-n-kVm
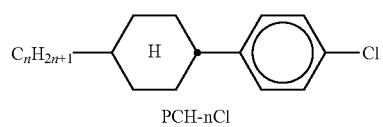
PCH-nCl
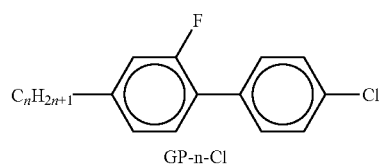
GP-n-Cl
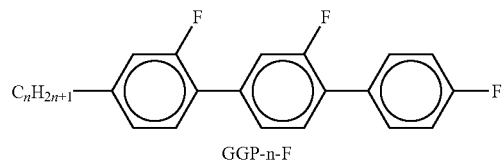
GGP-n-F
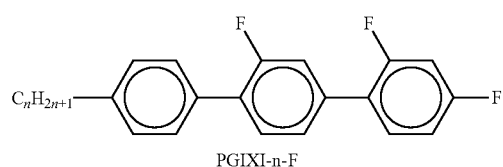
PGIXI-n-F
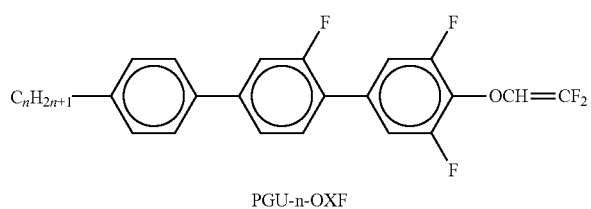
PGU-n-OXF

TABLE C-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
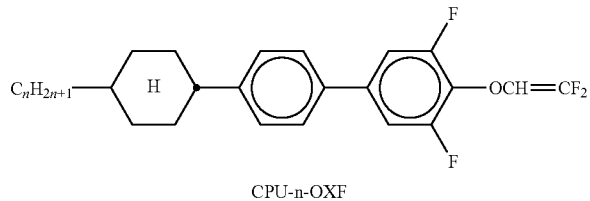
CPU-n-OXF
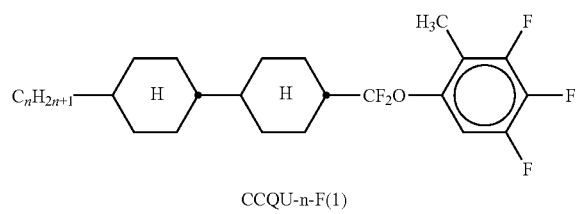
CCQU-n-F(1)
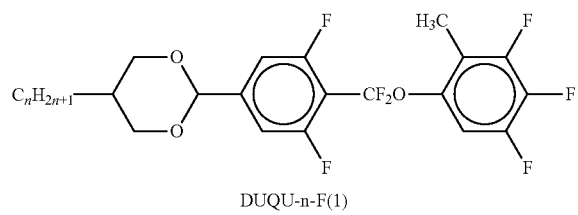
DUQU-n-F(1)
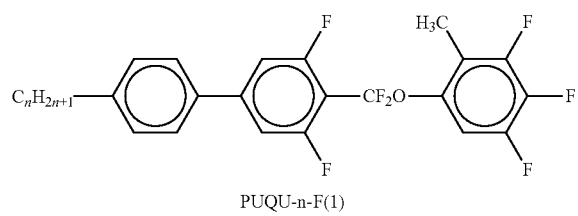
PUQU-n-F(1)
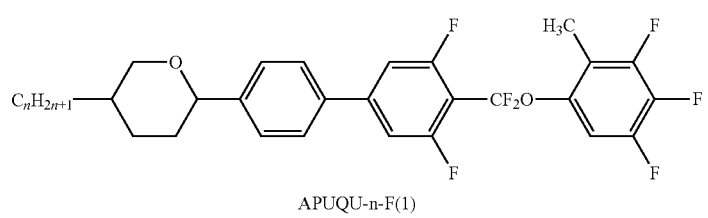
APUQU-n-F(1)
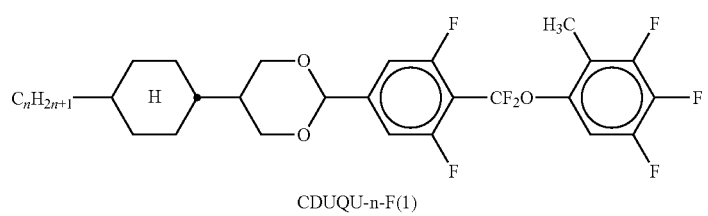
CDUQU-n-F(1)
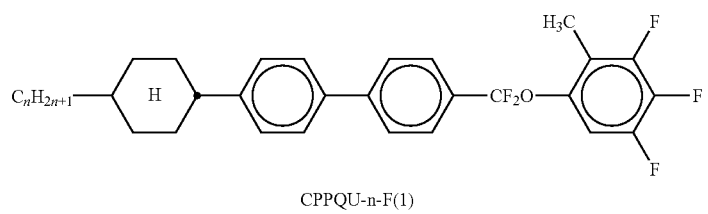
CPPQU-n-F(1)

TABLE C-continued

In the following formulae, n and m each, independently of one another, denote 0, 1, 2, 3, 4, 5, 6, 7, 8, 9, 10, 11 or 12, in particular 2, 3, 5, furthermore 0, 4, 6.

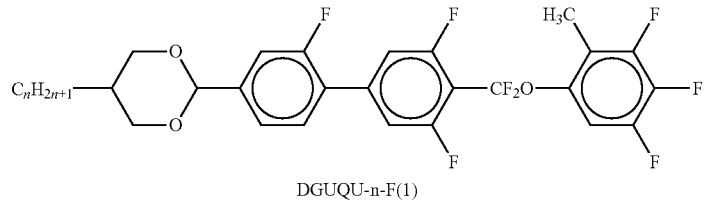

DGUQU-n-F(1)

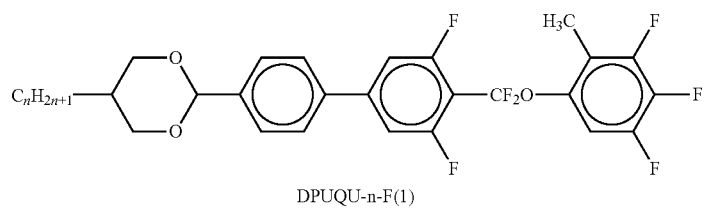

DPUQU-n-F(1)

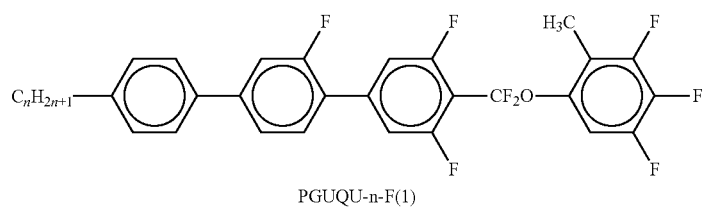

PGUQU-n-F(1)

In a preferred embodiment of the present invention, the LC media according to the invention comprise one or more compounds selected from the group consisting of compounds from Table C.

TABLE D

Table D shows possible stabilisers which can be added to the LC media according to the invention. Therein n denotes an integer from 1 to 12, preferably 1, 2, 3, 4, 5, 6, 7 or 8, and terminal methyl groups are not shown.

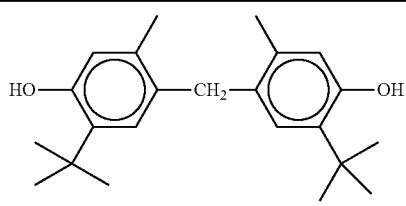

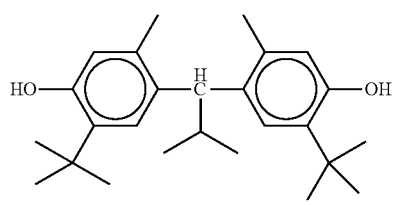

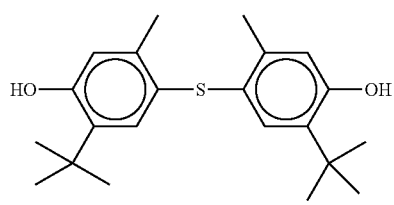

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
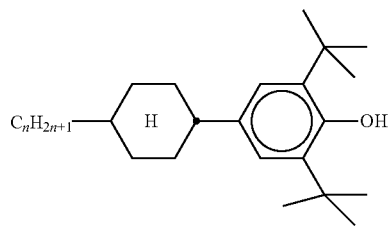
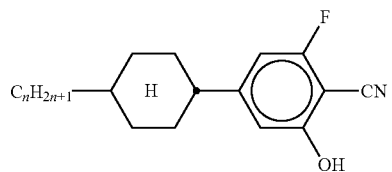
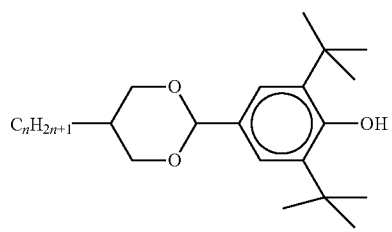
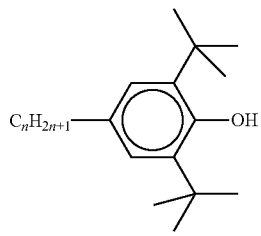
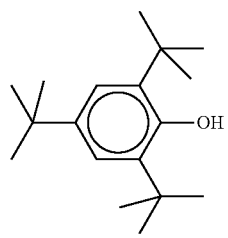
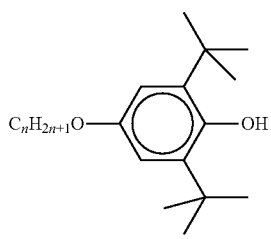

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
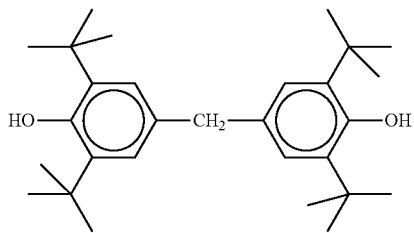
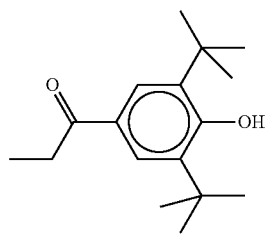
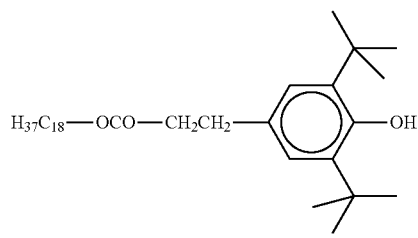
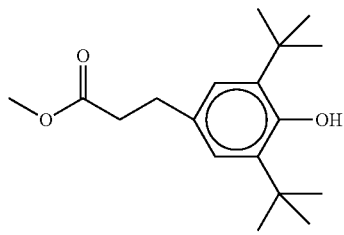
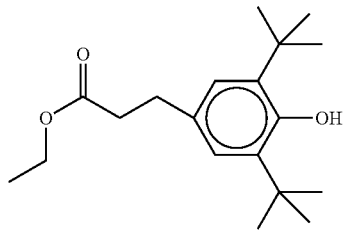
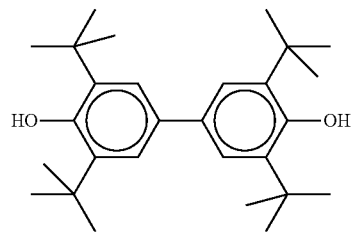

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
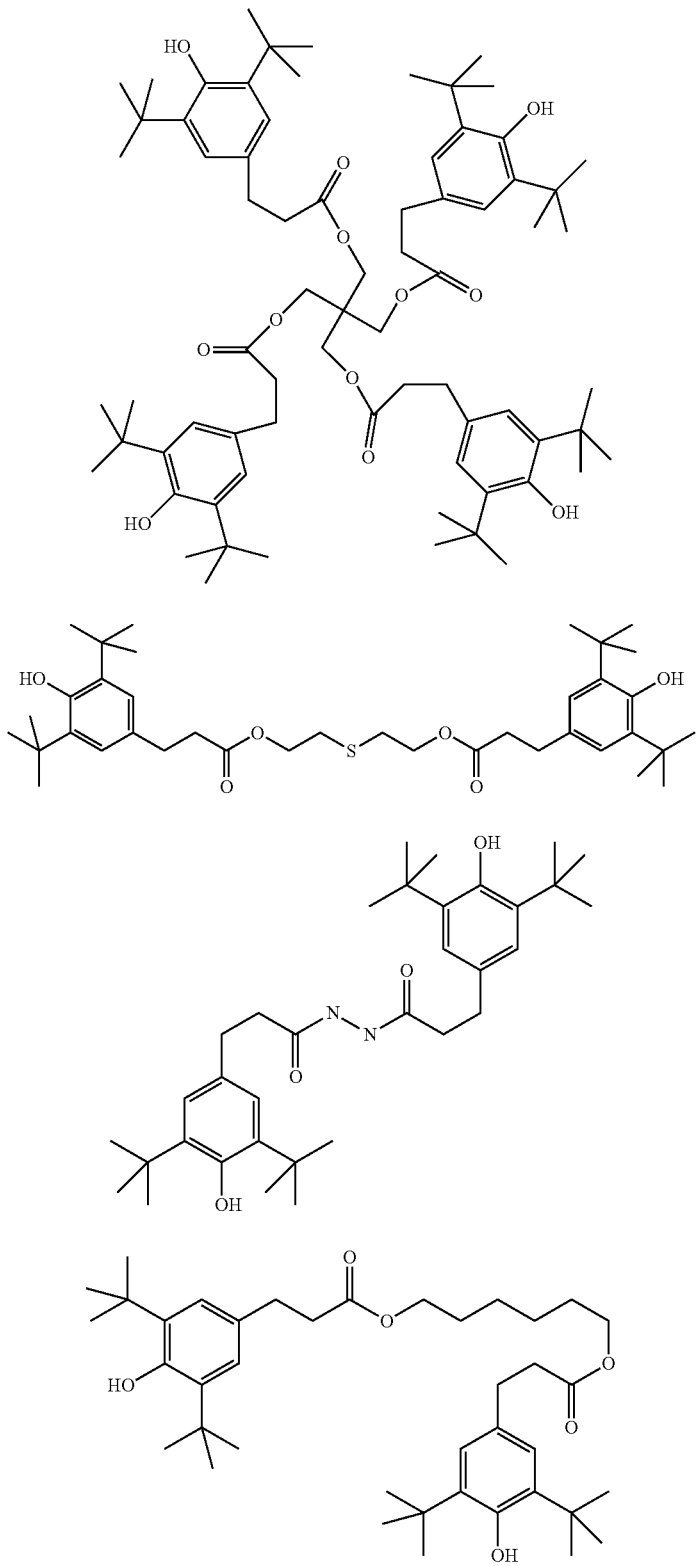

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
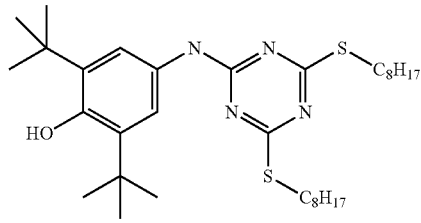
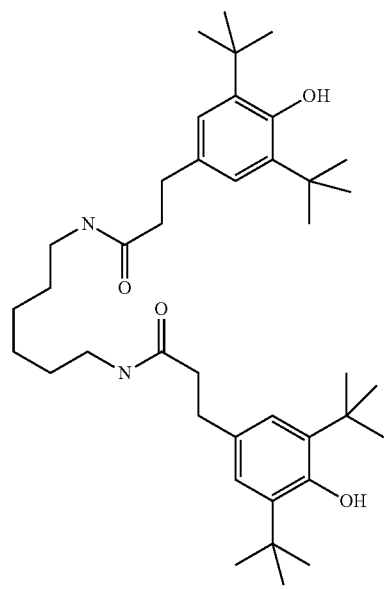 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
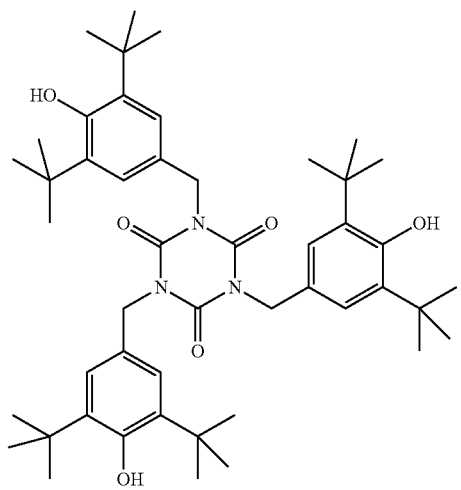 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
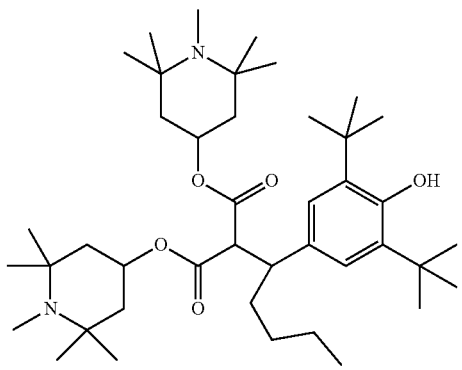 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
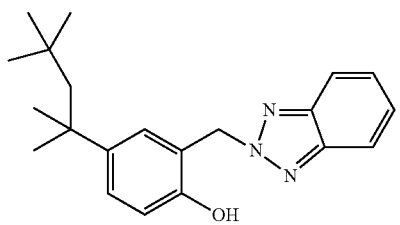 [SMILES: CC(C)(C)CC(C)(C)c1ccc(O)c(Cn2nc3ccccc3n2)c1]
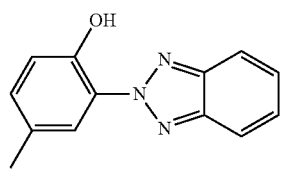 [SMILES: Cc1ccc(O)c(-n2nc3ccccc3n2)c1]
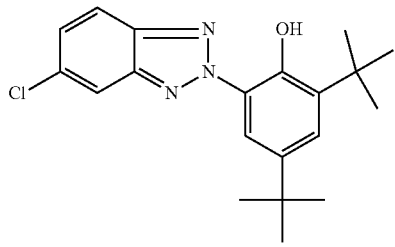 [SMILES: CC(C)(C)c1cc(-n2nc3ccc(Cl)cc3n2)c(O)c(C(C)(C)C)c1]
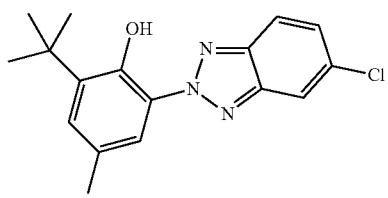 [SMILES: Cc1cc(-n2nc3ccc(Cl)cc3n2)c(O)c(C(C)(C)C)c1]

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
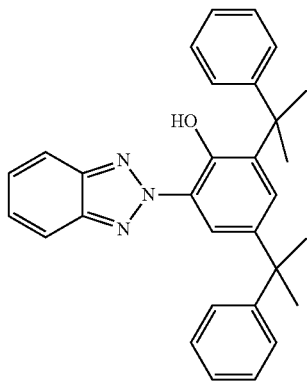 [SMILES: CC(C)(c1ccccc1)c1cc(-n2nc3ccccc3n2)c(O)c(C(C)(C)c2ccccc2)c1]
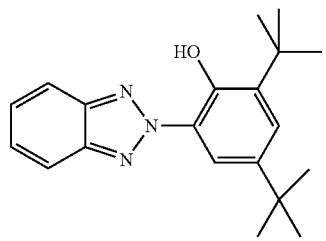 [SMILES: CC(C)(C)c1cc(-n2nc3ccccc3n2)c(O)c(C(C)(C)C)c1]
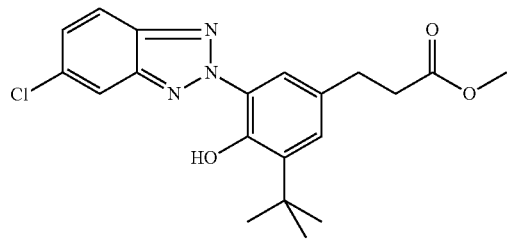 [SMILES: COC(=O)CCc1cc(-n2nc3ccc(Cl)cc3n2)c(O)c(C(C)(C)C)c1]
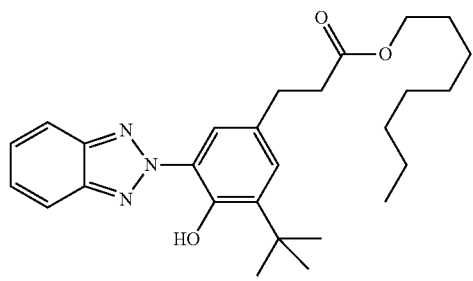 [SMILES: CCCCCCCCOC(=O)CCc1cc(-n2nc3ccccc3n2)c(O)c(C(C)(C)C)c1]

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
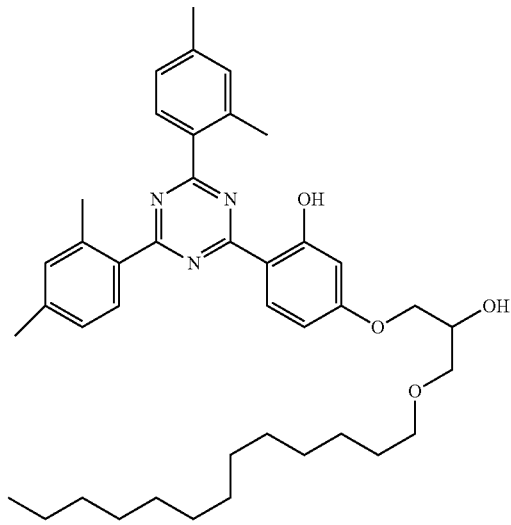 [SMILES: CCCCCCCCCCCCCOCC(O)COc1ccc(-c2nc(-c3ccc(C)cc3C)nc(-c3ccc(C)cc3C)n2)c(O)c1]
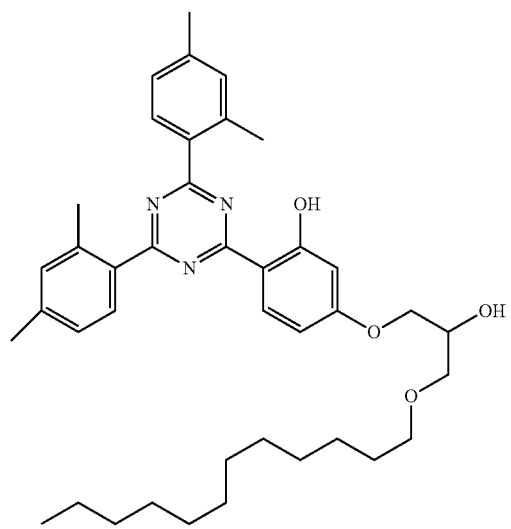 [SMILES: CCCCCCCCCCCCOCC(O)COc1ccc(-c2nc(-c3ccc(C)cc3C)nc(-c3ccc(C)cc3C)n2)c(O)c1]
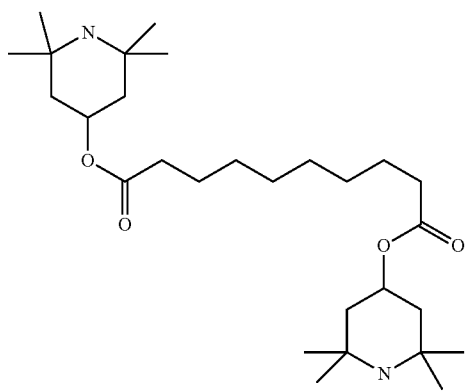

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
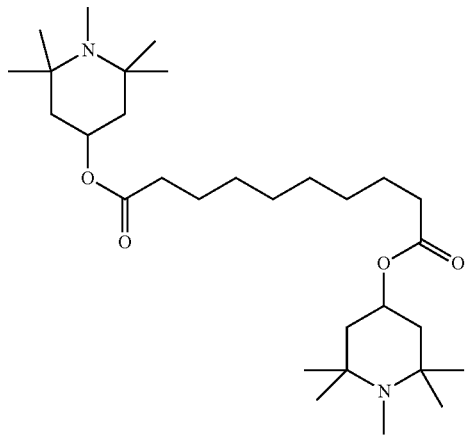
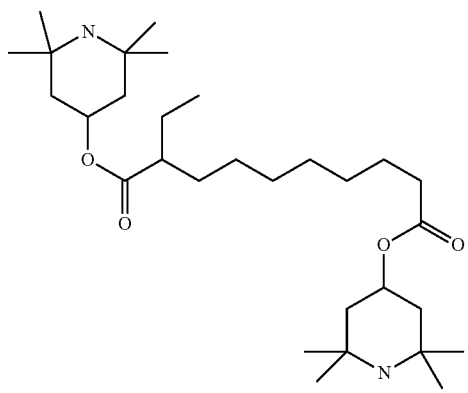
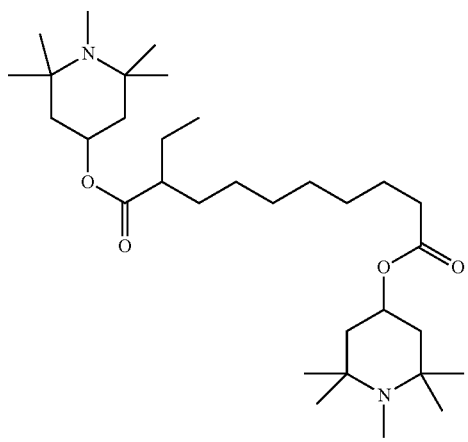

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
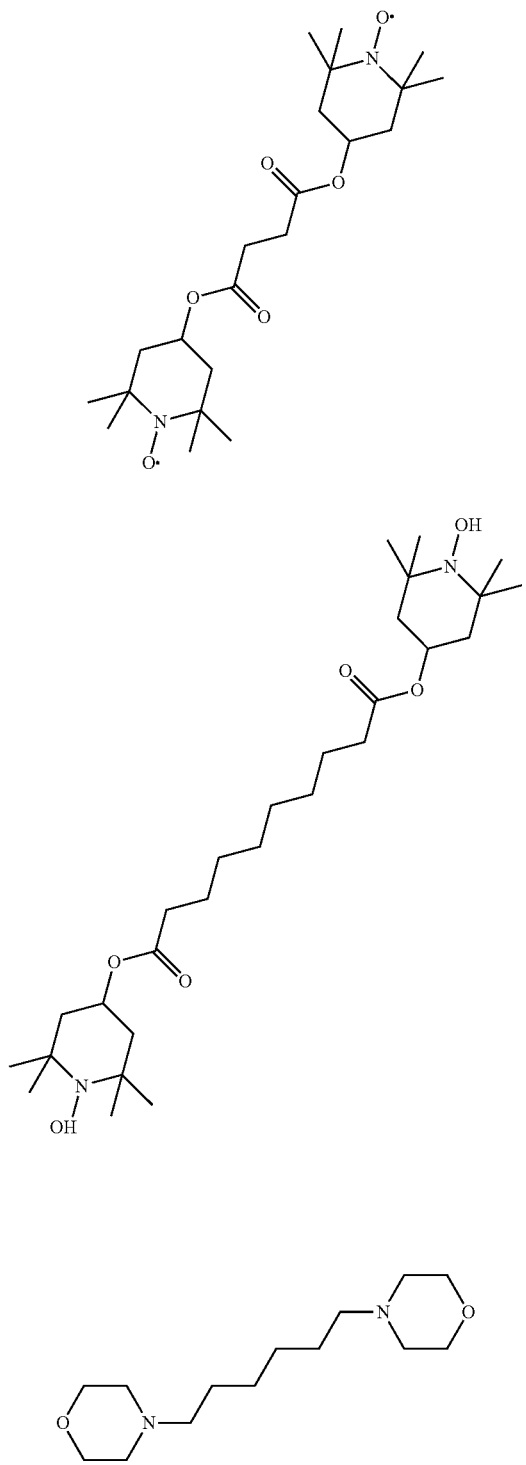

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
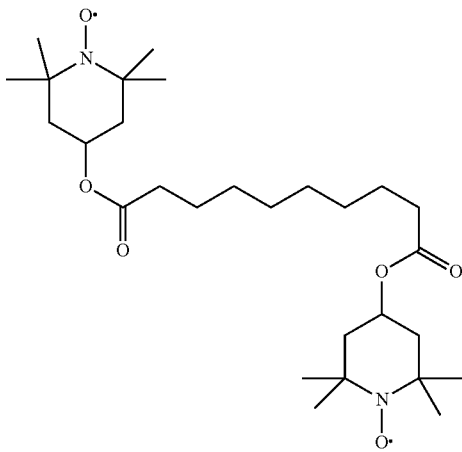
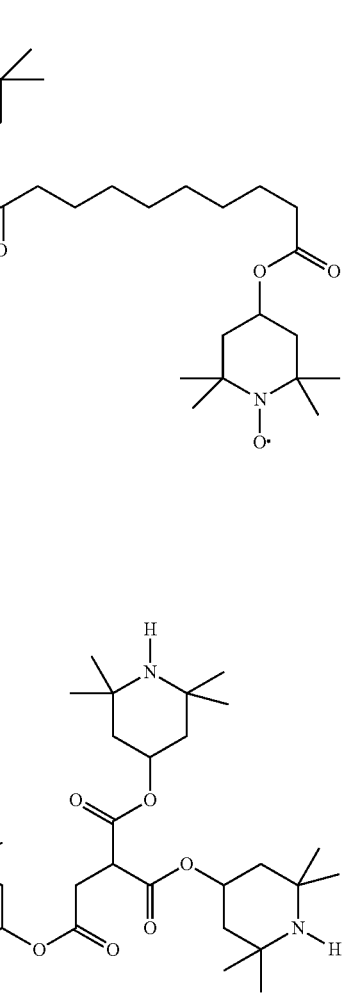
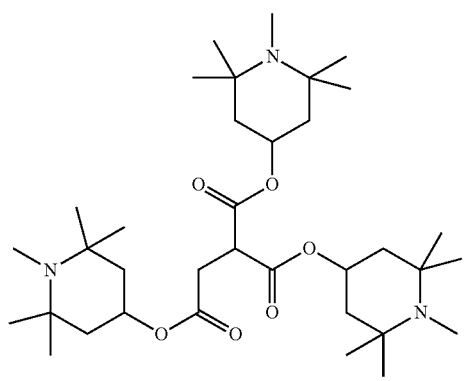

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
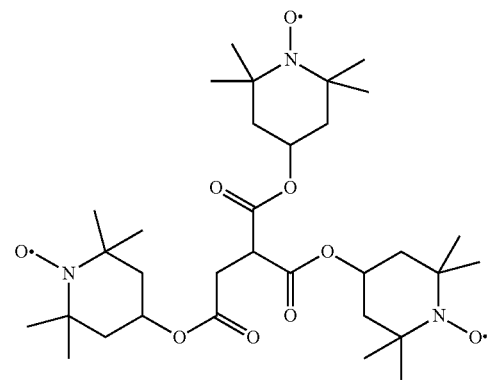
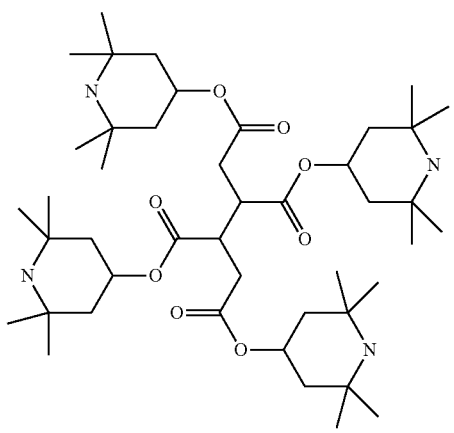
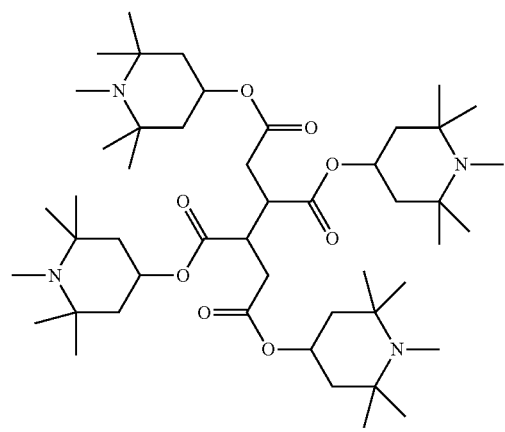

TABLE D-continued
Table D shows possible stabilisers which can be added to the LC media according to the invention. Therein n denotes an integer from 1 to 12, preferably 1, 2, 3, 4, 5, 6, 7 or 8, and terminal methyl groups are not shown.
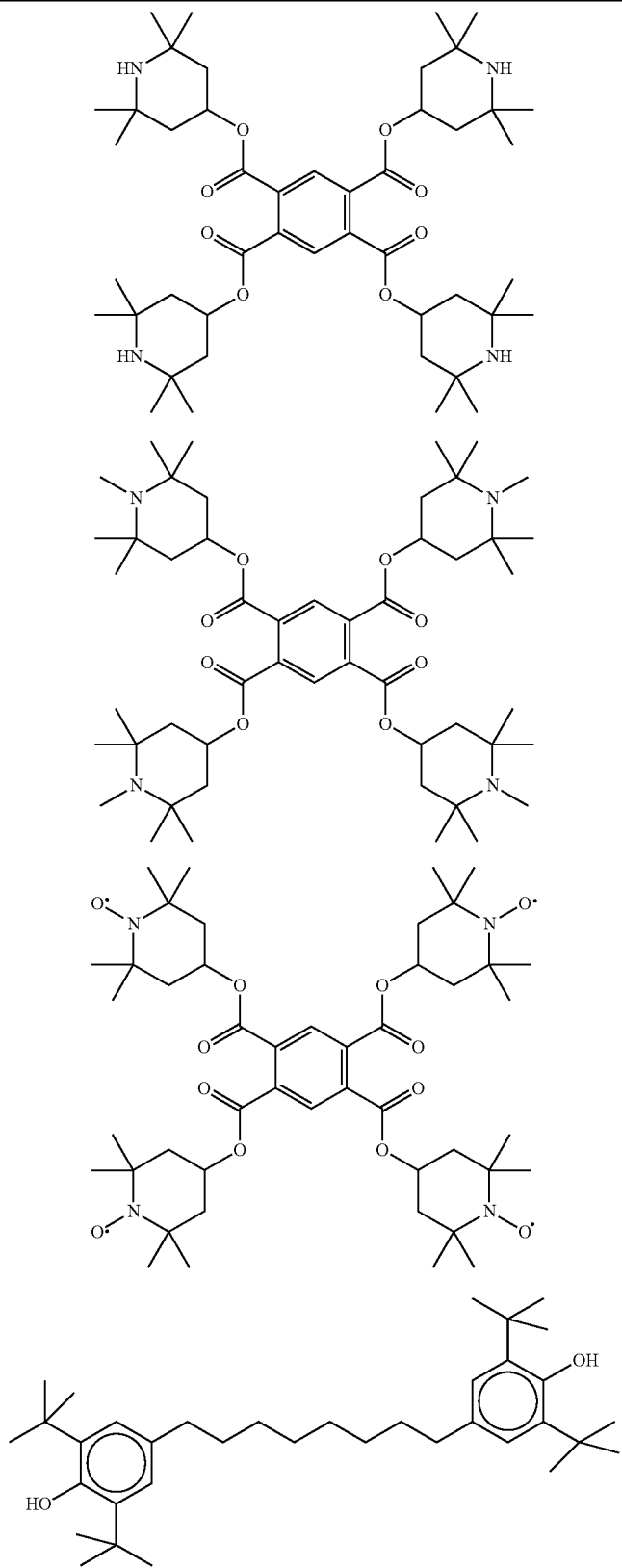

TABLE D-continued

Table D shows possible stabilisers which can be added to the LC media according to the invention. Therein n denotes an integer from 1 to 12, preferably 1, 2, 3, 4, 5, 6, 7 or 8, and terminal methyl groups are not shown.

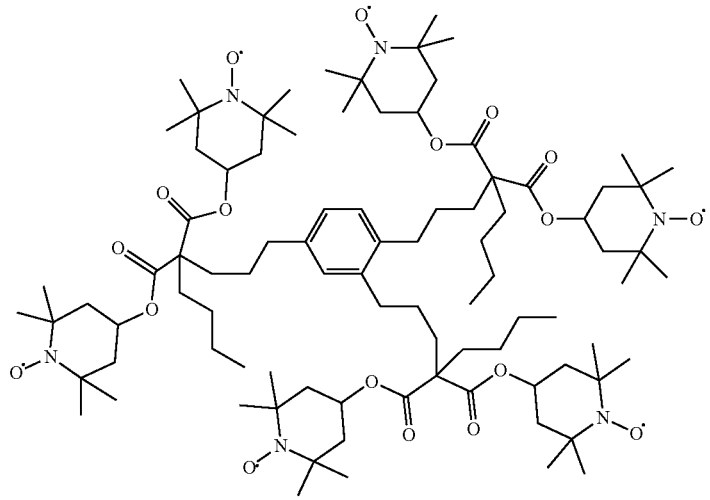

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table D.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:
$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\epsilon\perp$ dielectric permittivity perpendicular to the director at 20° C. and 1 kHz,
$\epsilon\|$ dielectric permittivity parallel to the director at 20° C. and 1 kHz,
$\Delta\epsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN]
$K_{av}$ average elastic constant at 20° C. [pN] defined here as $K_{av.}\equiv(3/2\ K_1+K_3)/3\approx(K_1+K_2+K_3)/3$,
LTS low-temperature stability of the phase, determined in test cells,
VHR voltage holding ratio.

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\epsilon$ at 1 kHz, unless explicitly indicated otherwise in each case.

Unless stated otherwise, methods of preparing test cells and measuring their electrooptical and other properties are carried out by the methods as described hereinafter or in analogy thereto.

Example 1

The nematic LC mixture N1 is formulated as follows.

| BCH-32 | 10.0% | Cl.p. [° C.]: | 79.1 |
|---|---|---|---|
| CC-3-V | 39.5% | $\Delta n$ [589 nm, 20° C.]: | 0.0995 |
| CC-3-V1 | 7.0% | $n_e$ [589 nm, 20° C.]: | 1.5860 |
| CCP-2F.F.F | 6.5% | $n_o$ [589 nm, 20° C.]: | 1.4865 |
| CCP-3F.F.F | 7.0% | $\Delta\epsilon$ [1 kHz, 20° C.]: | 0.0 |
| CPY-2-O2 | 11.0% | $\epsilon_\|$ [1 kHz, 20° C.]: | 4.5 |
| CPY-3-O2 | 11.0% | $\epsilon_\perp$ [1 kHz, 20° C.]: | 4.5 |
| PY-3-O2 | 8.0% | | |
| Σ | 100.0% | | |

To the mixture N1 are added 300 ppm of the stabiliser ST-3a-1.

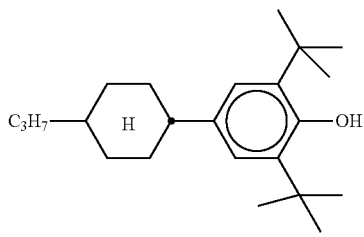

ST-3a-1

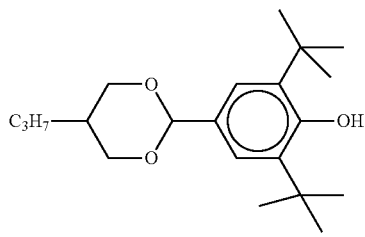

ST-3b-1

The birefringence Δn, dielectric anisotropy Δε and dielectric permittivity ε∥ parallel to the director are measured for the LC mixture N1 at different frequencies and temperatures. The results are shown in Table 1 below.

Example 3

The nematic LC mixture N3 is formulated as follows.

TABLE 1

| Mixture | N1 | | |
|---|---|---|---|
| Temperature | 20° C. | 25° C. | 30° C. |
| Tni (° C.) | | 79.1 | |
| Δn (589 nm) | 0.0995 | 0.0978 | 0.0958 |
| Δε (0.1 kHz) | 0.0 | 0.0 | 0.1 |
| Δε (1.0 kHz) | 0.0 | 0.1 | 0.1 |
| Δε (10 kHz) | 0.0 | 0.0 | 0.1 |
| Δε (100 kHz) | 0.0 | 0.0 | 0.0 |
| Δε (1.0 kHz, 50 mV) | 0.0 | — | — |
| Δε (1.0 kHz, 5 V) | 0.0 | — | — |
| Δε (1.0 kHz, 10 V) | 0.0 | — | — |
| ε∥ (0.1 kHz) | 4.5 | 4.4 | 4.4 |
| ε∥ (1.0 kHz) | 4.5 | 4.5 | 4.4 |
| ε∥ (10 kHz) | 4.5 | 4.4 | 4.4 |
| ε∥ (100 kHz) | 4.5 | 4.4 | 4.4 |
| ε∥ (1.0 kHz, 50 mV) | 4.5 | — | — |
| ε∥ (1.0 kHz, 5 V) | 4.5 | — | — |
| ε∥ (1.0 kHz, 10 V) | 4.5 | — | — |
| LC viscosity (mm²/s) | 12 | 10 | 8 |

| | | | |
|---|---|---|---|
| CY-3-O2 | 12.0% | Cl.p. [° C.]: | 85.5 |
| CY-5-O2 | 5.0% | Δn [589 nm, 20° C.]: | 0.1131 |
| BCH-32 | 12.0% | $n_e$ [589 nm, 20° C.]: | 1.5986 |
| CPY-2-O2 | 14.0% | $n_o$ [589 nm, 20° C.]: | 1.4855 |
| CPY-3-O2 | 14.0% | Δε [1 kHz, 20° C.]: | 0.0 |
| CC-5-V | 12.0% | $ε_∥$ [1 kHz, 20° C.]: | 6.8 |
| CC-3-V1 | 4.0% | $ε_⊥$ [1 kHz, 20° C.]: | 6.8 |
| CCP-1F.F.F | 9.0% | | |
| CCP-2F.F.F | 9.0% | | |
| CCP-3F.F.F | 9.0% | | |
| Σ | 100.0% | | |

To the mixture N3 are added 200 ppm of the stabiliser ST-8-1.

It can be seen that the LC mixture N1 has a dielectric anisotropy that is substantially zero under varying conditions, while still showing an almost constant birefringence.

Figure 3:
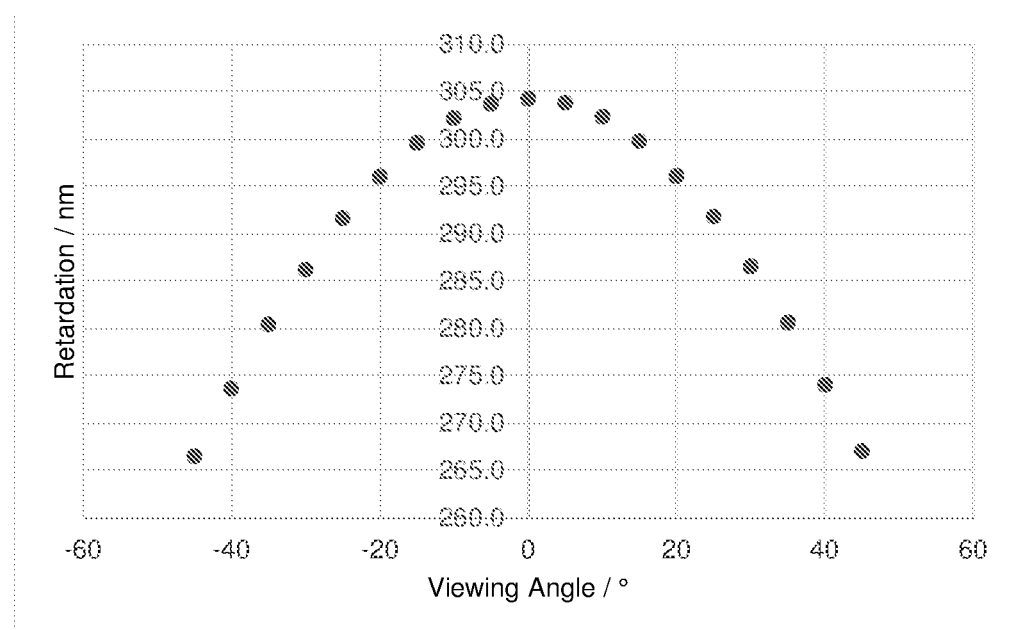
FIG. 3 shows the optical retardation for light with a wavelength of 600 nm versus viewing angle for a layer of LC medium N1 according to Example 1.

A layer of the LC mixture N1 is provided between two glass substrates, each being equipped with a polyimide alignment layer providing planar alignment. The layer thickness is 3 microns. The optical retardation of the layer of LC mixture N1 is measured at varying viewing angles and wavelengths of light. The retardation at 600 nm versus viewing angle is depicted in FIG. 3 and shows symmetrical behaviour.

The LC mixture N1 is therefore suitable for use as optical retarder.

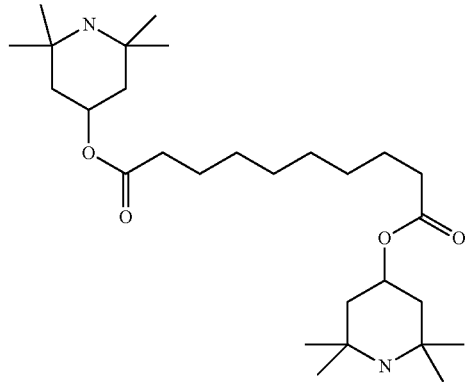

ST-8-1

Example 2

The nematic LC mixture N2 is formulated as follows.

| | | | |
|---|---|---|---|
| CC-3-V | 30.0% | Cl.p. [° C.]: | 76 |
| CY-3-O4 | 20.0% | Δn [589 nm, 20° C.]: | 0.0778 |
| CCY-3-O2 | 10.0% | $n_e$ [589 nm, 20° C.]: | 1.5523 |
| CCY-4-O2 | 10.0% | $n_o$ [589 nm, 20° C.]: | 1.4745 |
| CPY-2-O2 | 5.0% | Δε [1 kHz, 20° C.]: | −0.3 |
| CCP-2F.F.F | 5.0% | $ε_∥$ [1 kHz, 20° C.]: | 5.7 |
| CCP-3F.F.F | 10.0% | $ε_⊥$ [1 kHz, 20° C.]: | 5.9 |
| CCP-3OCF3 | 10.0% | | |
| Σ | 100.0% | | |

To the mixture N2 are added 150 ppm of the stabiliser ST-3b-1.

Example 4

The nematic LC mixture N4 is formulated as follows.

| | | | |
|---|---|---|---|
| CY-3-O2 | 12.0% | Cl.p. [° C.]: | 81.5 |
| CY-5-O2 | 9.0% | Δn [589 nm, 20° C.]: | 0.1431 |
| CCY-3-O3 | 11.0% | $n_e$ [589 nm, 20° C.]: | 1.6357 |
| CCY-4-O2 | 2.0% | $n_o$ [589 nm, 20° C.]: | 1.4926 |
| CPY-2-O2 | 12.0% | Δε [1 kHz, 20° C.]: | −0.2 |
| CPY-3-O2 | 12.0% | $ε_∥$ [1 kHz, 20° C.]: | 8.1 |
| PYP-2-4 | 10.0% | $ε_⊥$ [1 kHz, 20° C.]: | 8.3 |
| CC-5-V | 14.0% | LTS bulk [h, −20° C.]: | 24 |
| PGU-3-F | 9.0% | | |
| PGU-2-F | 9.0% | | |
| Σ | 100.0% | | |

To the mixture N4 are added 150 ppm of the stabiliser ST-9-1.

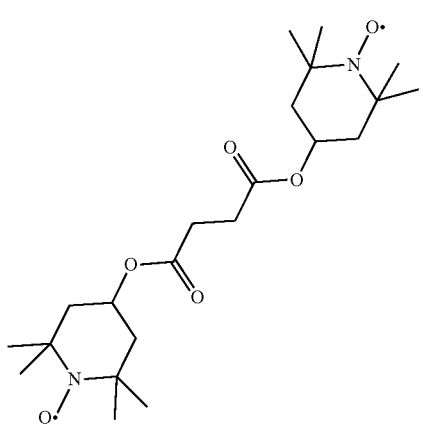

ST-9-1

Example 5

The nematic LC mixture N5 is formulated as follows.

| | | | |
|---|---|---|---|
| CC-5-O1 | 14.5% | Cl.p. [° C.]: | 68 |
| CC-3-5 | 9.0% | Δn [589 nm, 20° C.]: | 0.0668 |
| CP-5-3 | 4.0% | $n_e$ [589 nm, 20° C.]: | 1.5399 |
| CY-3-O4 | 7.0% | $n_o$ [589 nm, 20° C.]: | 1.4731 |
| CY-5-O4 | 6.5% | Δε [1 kHz, 20° C.]: | 0.3 |
| CY-3-O2 | 4.0% | $ε_∥$ [1 kHz, 20° C.]: | 5.5 |
| CCY-5-O2 | 4.0% | $ε_⊥$ [1 kHz, 20° C.]: | 5.2 |
| CCY-2-1 | 4.5% | | |
| CCYP-3-1 | 4.5% | | |
| CPY-2-O2 | 4.0% | | |
| CC-3-O1 | 10.0% | | |
| CC-5-V | 8.0% | | |
| CCZC-3-3 | 1.5% | | |
| CCZC-3-5 | 1.5% | | |
| CCZC-4-3 | 1.5% | | |
| CCZU-2-F | 1.5% | | |
| CCZU-3-F | 7.5% | | |
| CCZU-5-F | 1.5% | | |
| CDU-2-F | 5.0% | | |
| Σ | 100.0% | | |

To the mixture N5 are added 150 ppm of the stabiliser ST-12.

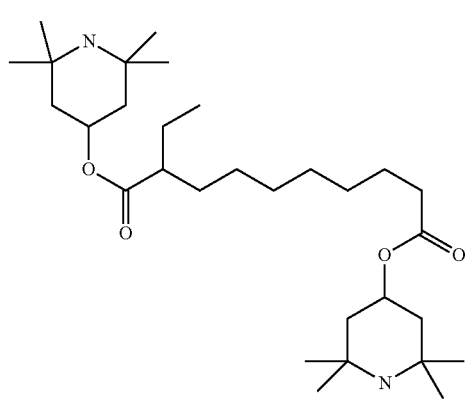

ST-12

Example 6

The nematic LC mixture N6 is formulated as follows.

| | | | |
|---|---|---|---|
| CC-5-O1 | 13.95% | Cl.p. [° C.]: | 68 |
| CC-3-5 | 9.5% | Δn [589 nm, 20° C.]: | 0.0682 |
| CP-5-3 | 4.4% | $n_e$ [589 nm, 20° C.]: | 1.5422 |
| CY-3-O4 | 7.7% | $n_o$ [589 nm, 20° C.]: | 1.4740 |
| CY-5-O4 | 7.15% | Δε [1 kHz, 20° C.]: | 0.0 |
| CCY-3-O2 | 4.4% | $ε_∥$ [1 kHz, 20° C.]: | 5.3 |
| CCY-5-O2 | 4.4% | $ε_⊥$ [1 kHz, 20° C.]: | 5.3 |
| CCY-21 | 4.95% | | |
| CCY-31 | 4.95% | | |
| CPY-2-O2 | 4.4% | | |
| CC-3-O1 | 9.0% | | |
| CC-5-V | 7.2% | | |
| CCZC-3-3 | 1.35% | | |
| CCZC-3-5 | 1.35% | | |
| CCZC-4-3 | 1.35% | | |
| CCZU-2-F | 1.35% | | |
| CCZU-3-F | 6.75% | | |
| CCZU-5-F | 1.35% | | |
| CDU-2-F | 4.5% | | |
| Σ | 100.0% | | |

To the mixture N6 are added 200 ppm of the stabiliser H-1-1-1.

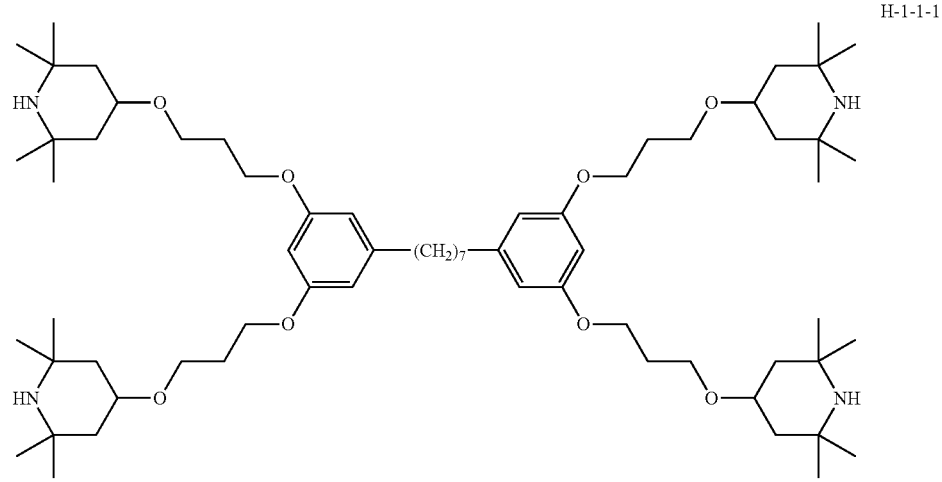

H-1-1-1

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding EP application No. 22176299.0, filed May 31, 2023, are incorporated by reference herein.

The invention claimed is:

1. An LC medium which comprises a first component A which has a dielectric anisotropy Δε of ≥+0.5, and a second component B which has a dielectric anisotropy Δε of ≤−0.5, wherein the proportions of the components A and B are selected such that the resulting dielectric anisotropy Δε of the LC medium is −0.3 to +0.3, and wherein the LC medium shows uniform alignment, wherein the dielectric anisotropies are all determined at 20° C. and 1 KHz.

2. An LC medium which comprises a first component A which has a dielectric anisotropy Δε of ≥+0.5, a second component B which has a dielectric anisotropy Δε of ≤−0.5, and a third component C which has a dielectric anisotropy Δε from −0.5 to +0.5, wherein the proportions of the components A, B and C are selected such that the resulting dielectric anisotropy Δε of the LC medium is −0.3 to +0.3, wherein the dielectric anisotropies are all determined at 20° C. and 1 KHz.

3. The LC medium according to claim 1, wherein the first component A comprises one or more compounds selected from the group consisting of compounds of formulae IA, IB, IC, ID and IE and wherein the second component B comprises one or more compounds selected from the group consisting of compounds of formulae IIA, IIB, IIC and IID

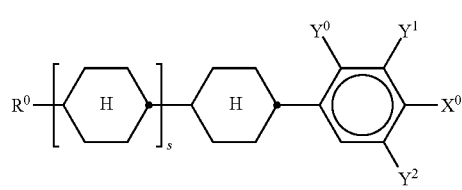

IA

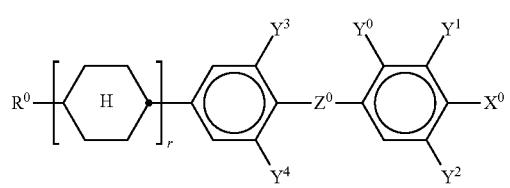

IB

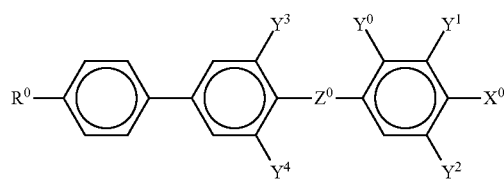

IC

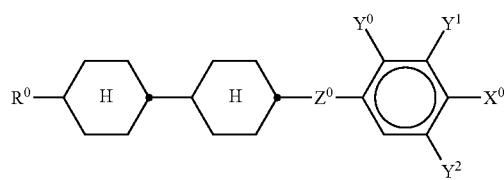

ID

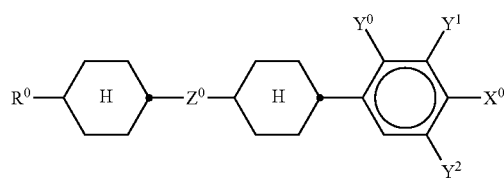

IE

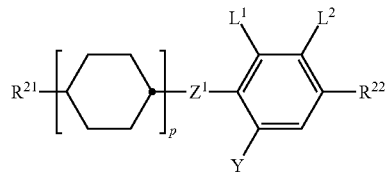

IIA

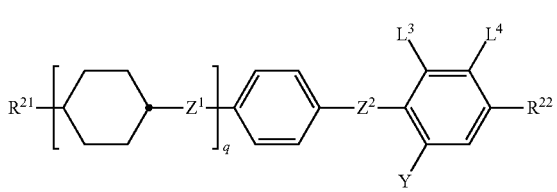

IIB

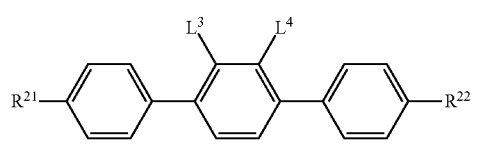

IIC

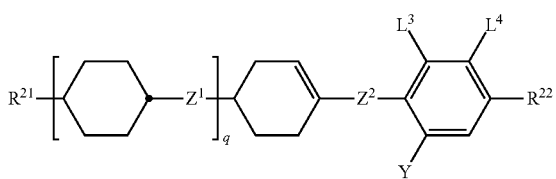

IID in which the individual radicals, on each occurrence identically or differently, and each, independently of one another, have the following meaning:

$R^0$, $R^{21}$, $R^{22}$ are H, or an alkyl or alkoxy radical having 1 to 15 C atoms or an alkenyl radical having 2 to 15 C atoms, which are un-substituted or monosubstituted by F, Cl, CN or $CF_3$ and in which one or more $CH_2$ groups may be replaced by —O—, —S—, —C≡C—, —$CF_2$O—, —$OCF_2$-, —OC—O—, —O—CO—

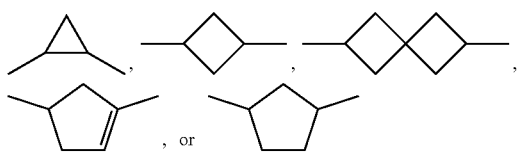

, or in such a way that O- and/or S-atoms are not linked directly to one another, $Z^0$, $Z^1$, $Z^2$ are —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH═CH—CH$_2$O—, —C$_2$F$_4$—, —CH$_2$CF$_2$—, —CF$_2$CH$_2$—, —CF═CF—, —CH═CF—, —CF═CH—, —CH═CH—, —C≡C— or a single bond, $X^0$ is F, Cl, CN, SF$_5$, SCN, NCS, or a halogenated alkyl radical or a halogenated alkoxy radical having 1 to 6 C atoms, or a halogenated alkenyl radical or a halogenated alkenyloxy radical having 2 to 6 C atoms, $Y^{1-4}$ are H or F, $L^1$ to $L^4$ are F, Cl, CF$_3$ or CHF$_2$, Y, $Y^0$ are H, F, Cl, CF$_3$, CHF$_2$, CH$_3$ or OCH$_3$, p is 0, 1 or 2, q is 0 or 1, r is 0 or 1, and S is 0 or 1.

4. The LC medium according to claim 2, wherein the third component C comprises one or more compounds selected from the group consisting of compounds of formulae IV, IVa, IVb and V

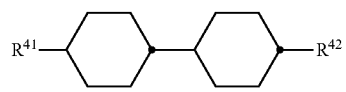  IV

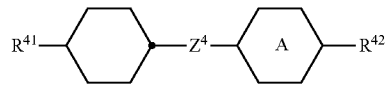  IVa

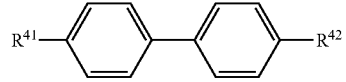  IVb

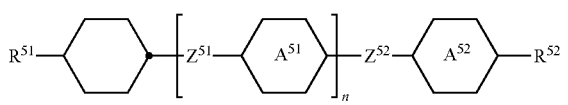  V in which the individual radicals, on each occurrence identically or differently, and each, independently of one another, have the following meaning $R^{41}$ is an unsubstituted alkyl radical having 1 to 7 C atoms, in which one or more CH$_2$ groups may be replaced by

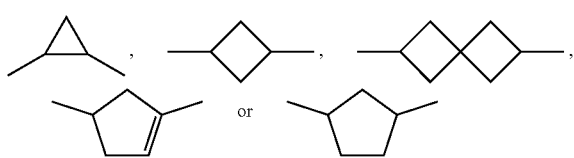

or an unsubstituted alkenyl radical having 2 to 7 C atoms, $R^{42}$ is an unsubstituted alkyl radical having 1 to 7 C atoms or an unsubstituted alkoxy radical having 1 to 6 C atoms, or an unsubstituted alkenyl radical having 2 to 7 C atoms,

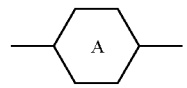

denotes

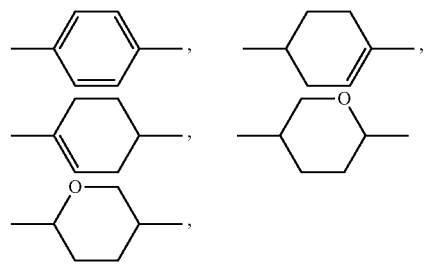

$Z^4$ is a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_8$— or —CF═CF—, $R^{51}$, $R^{52}$ are H, an alkyl or alkoxy radical having 1 to 15 C atoms or an alkenyl radical having 2 to 15 C atoms, which are unsubstituted, monosubstituted by F, Cl, CN or CF$_3$ or at least monosubstituted by halogen, in which one or more CH$_2$ groups may be replaced by —O—, —S—, —C≡C—, —CF$_2$O—, —OCF$_2$—, —OC—O—, —O—CO—

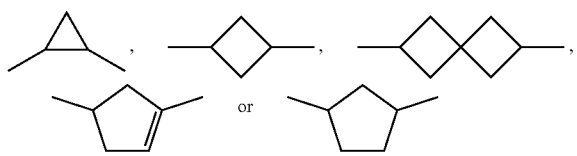

in such a way that O atoms are not linked directly to one another,

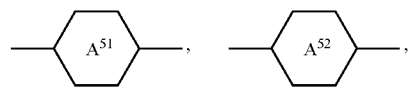

identically or differently, denote

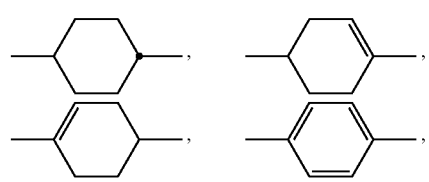

-continued
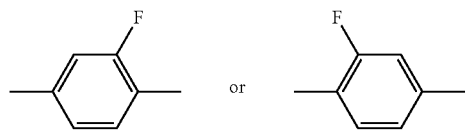
Z⁵¹, Z⁵² are —CH₂—CH₂—, —CH₂—O—, —CH=CH—, —C≡C—, —COO— or a single bond, and
n 1 or 2.
5. The LC medium according to claim 1, wherein the first component A comprises one or more compounds selected from compounds of the following formulae:
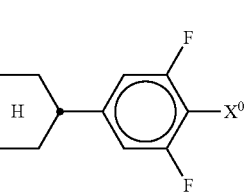
IAa
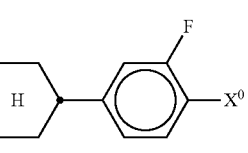
IAb
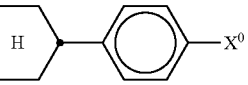
IAc
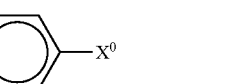
IAd
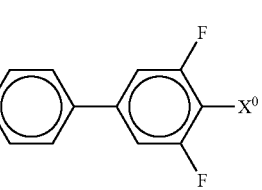
IBa
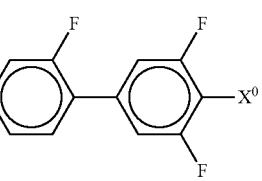
IBb
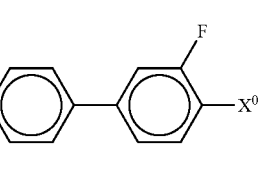
IBc
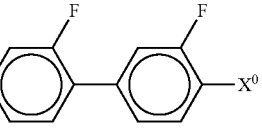
IBd
-continued
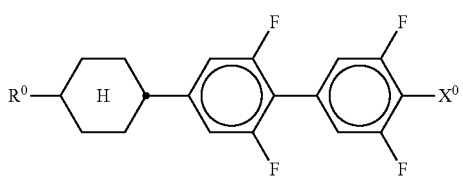
IBe
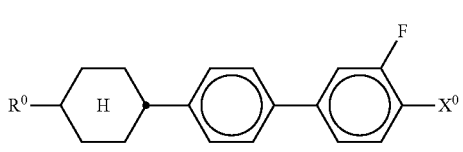
IBf
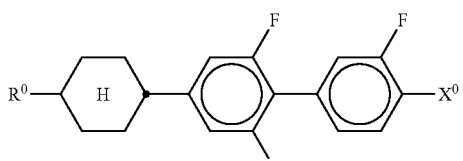
IBg
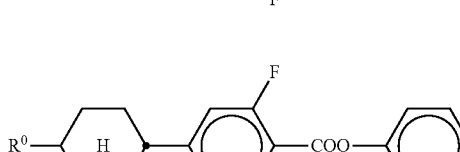
IBh
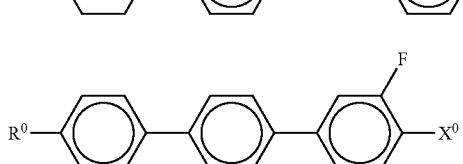
ICa
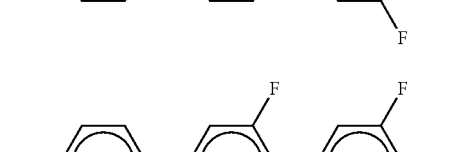
ICb
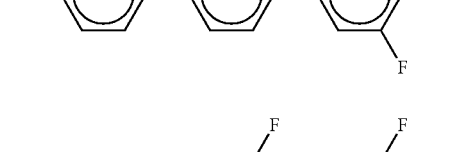
ICc
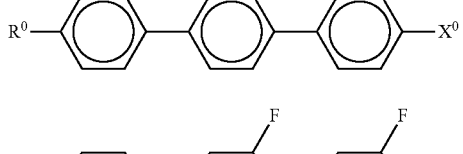
ICd
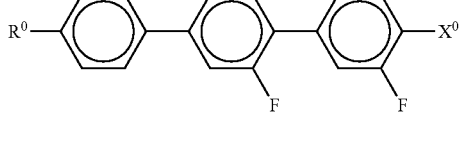
IDa
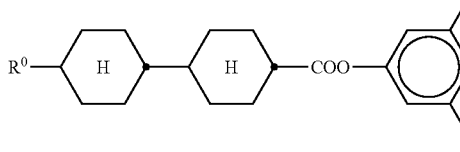

IDb

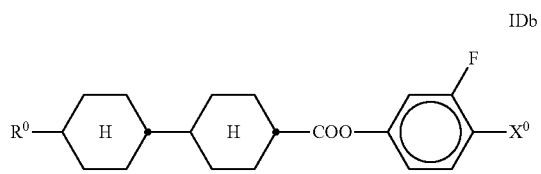

in which
- R⁰ is H, or an alkyl or alkoxy radical having 1 to 15 C atoms or an alkenyl radical having 2 to 15 C atoms, which are unsubstituted or monosubstituted by F, Cl, CN or CF₃ and in which one or more CH₂ groups may be replaced by —O—, —S—, —C≡C—, —CF₂O—, —OCF₂—, —OC—O—, —O—CO—

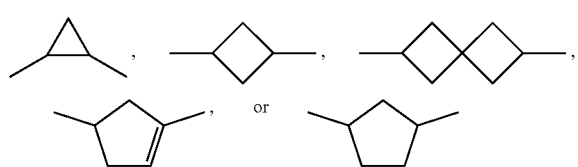

in such a way that O- and/or S-atoms are not linked directly to one another, and X⁰ is F, Cl, CN, SF₅, SCN, NCS, or a halogenated alkyl radical or a halogenated alkoxy radical having 1 to 6 C atoms, or a halogenated alkenyl radical or a halogenated alkenyloxy radical having 2 to 6 C atoms.

6. The LC medium according to claim 1, wherein the first component A comprises one or more compounds selected from compounds of the following formulae:

IAa1

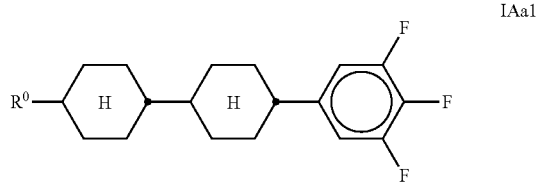

IAc1

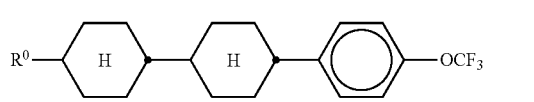

ICa1

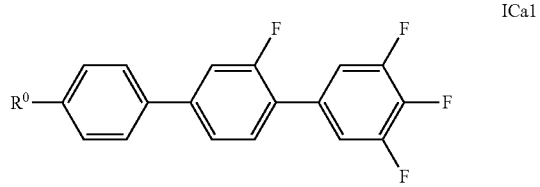

IDa1

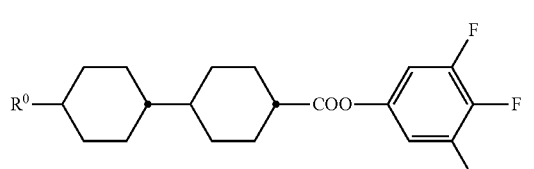

XIXa

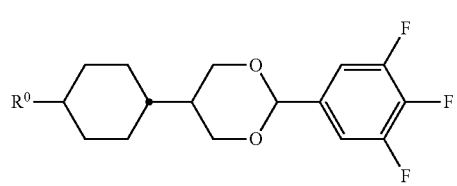

in which
- R⁰, R¹ are H, or an alkyl or alkoxy radical having 1 to 15 C atoms or an alkenyl radical having 2 to 15 C atoms, which are unsubstituted or monosubstituted by F, Cl, CN or CF₃ and in which one or more CH₂ groups may be replaced by —O—, —S—, —C≡C—, —CF₂O—, —OCF₂—, —OC—O—, —O—CO—

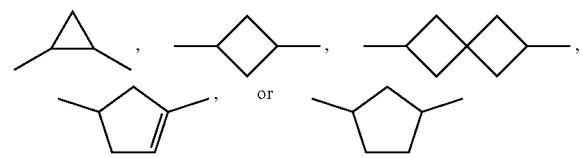

in such a way that O- and/or S-atoms are not linked directly to one another.

7. The LC medium according to claim 1, wherein the second component B comprises one or more compounds selected from compounds of the following formulae:

IIA-1

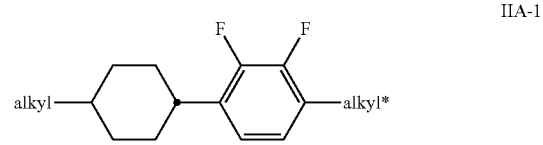

IIA-2

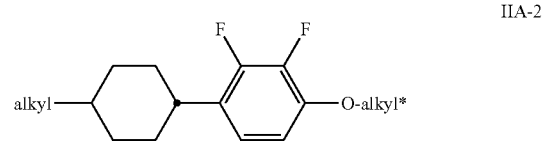

IIA-3

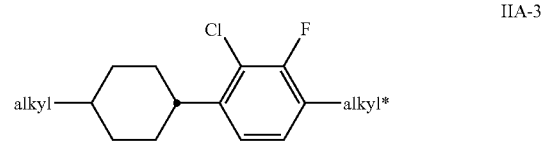

IIA-4

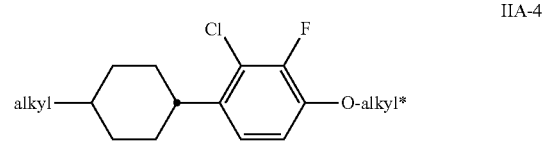

IIA-5

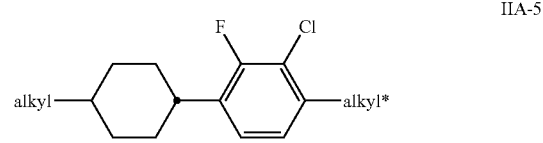

IIA-6

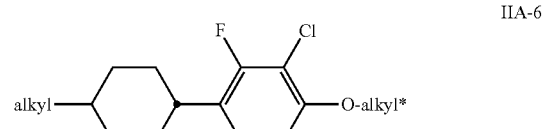

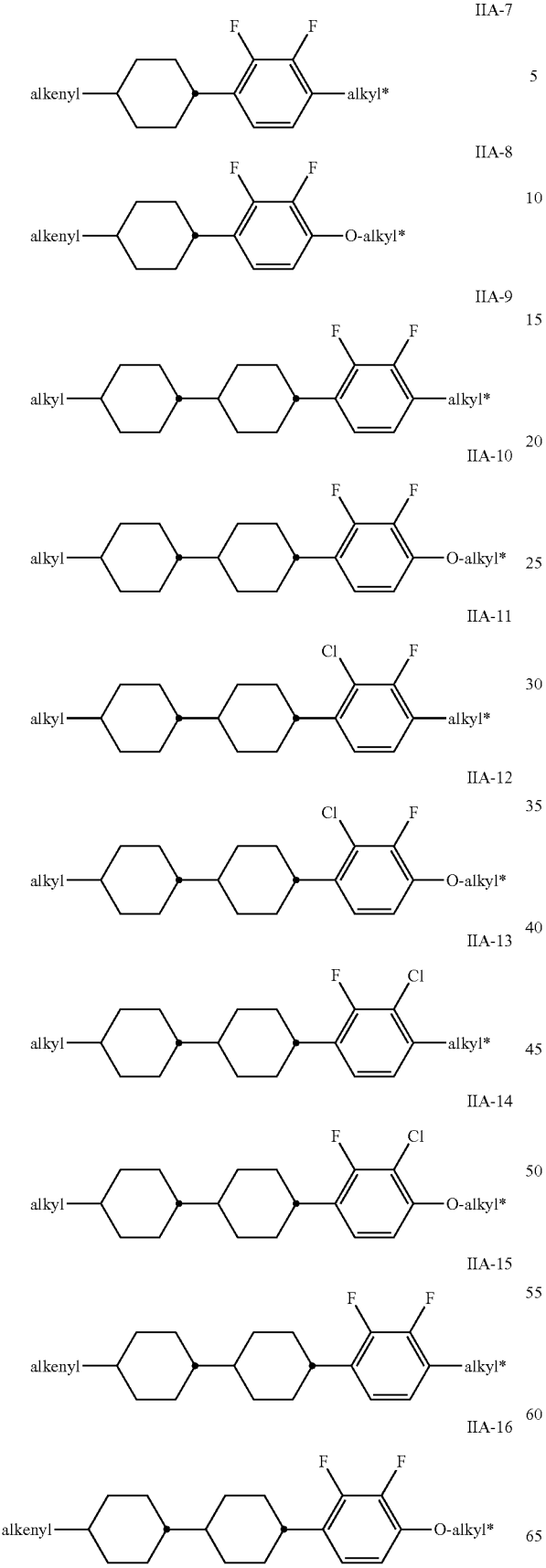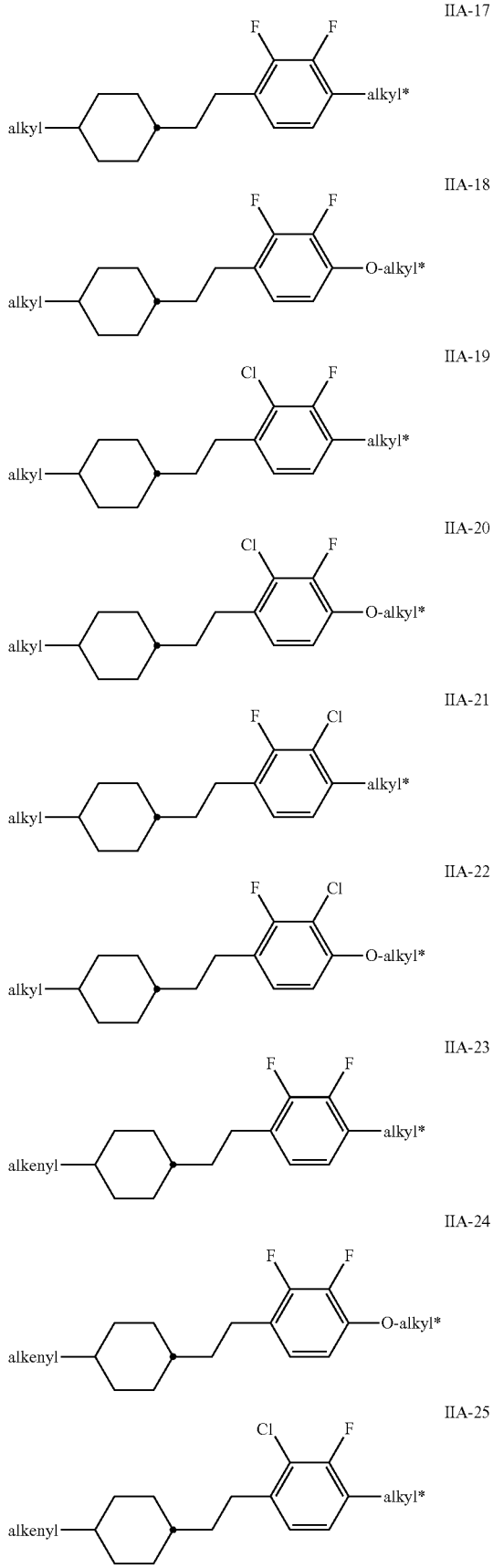

IIA-26
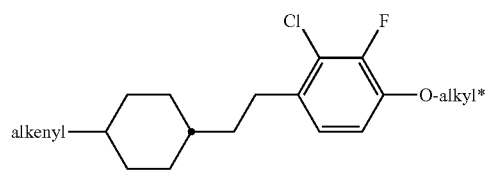
IIA-27
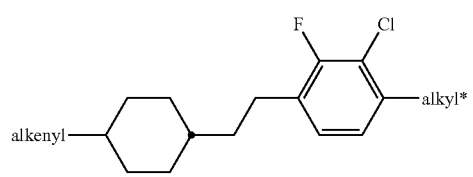
IIA-28
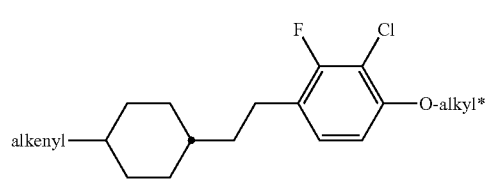
IIA-29
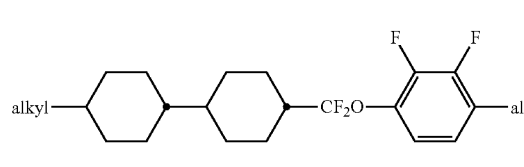
IIA-30
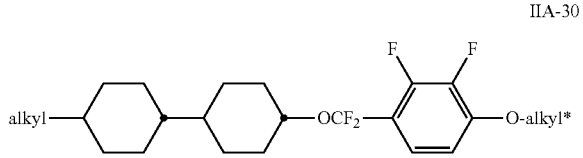
IIA-31
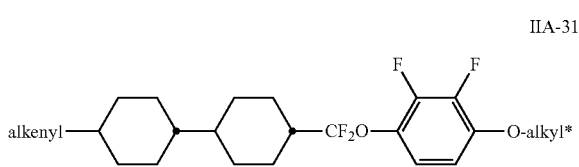
IIA-32
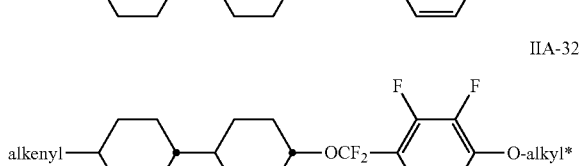
IIA-33
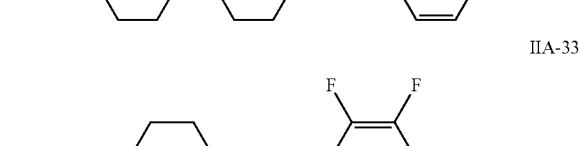
IIA-34
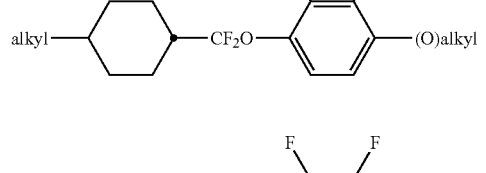
IIA-35
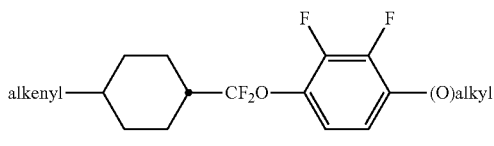
IIA-36
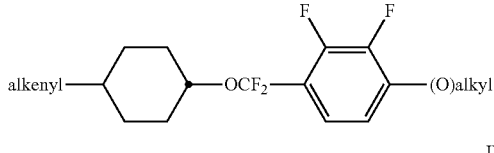
IIA-37
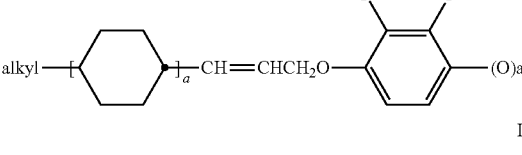
IIA-38
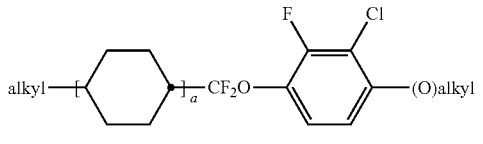
IIA-39
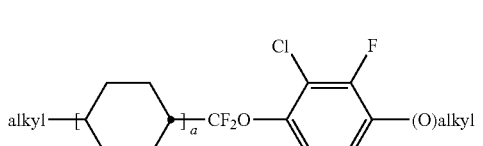
IIA-40
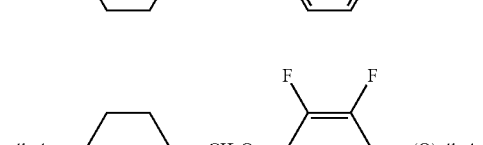
IIA-41
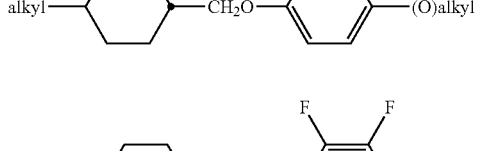
IIA-42
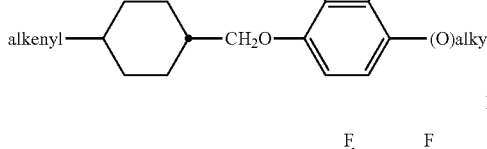
IIA-43
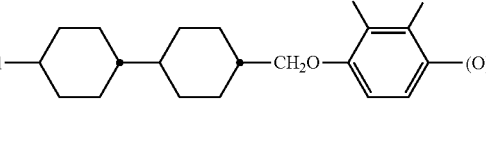
IIA-44
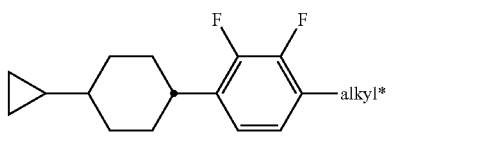

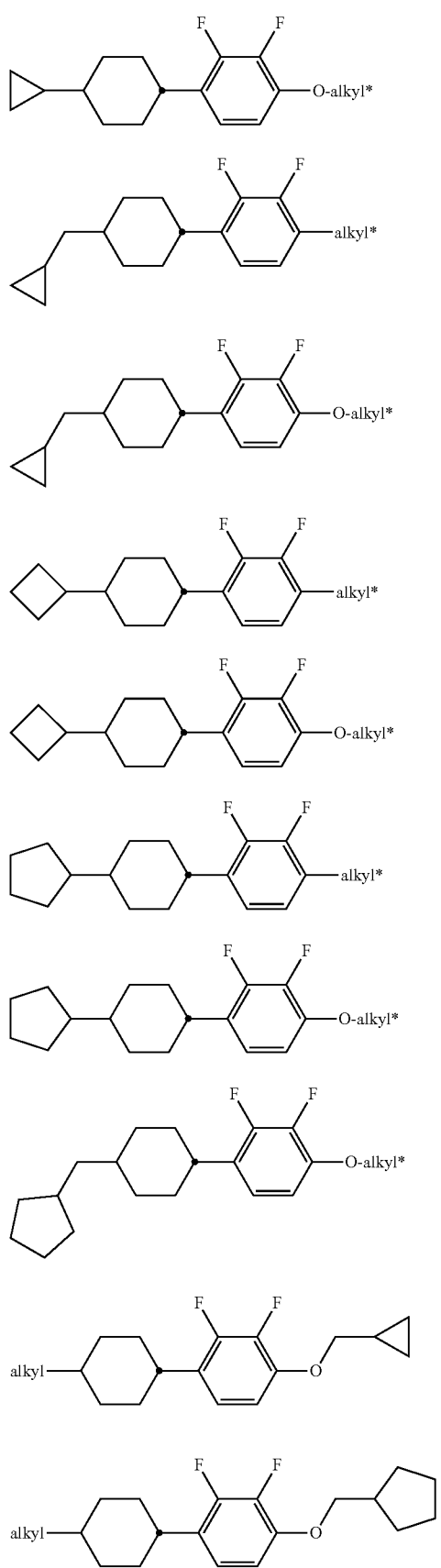
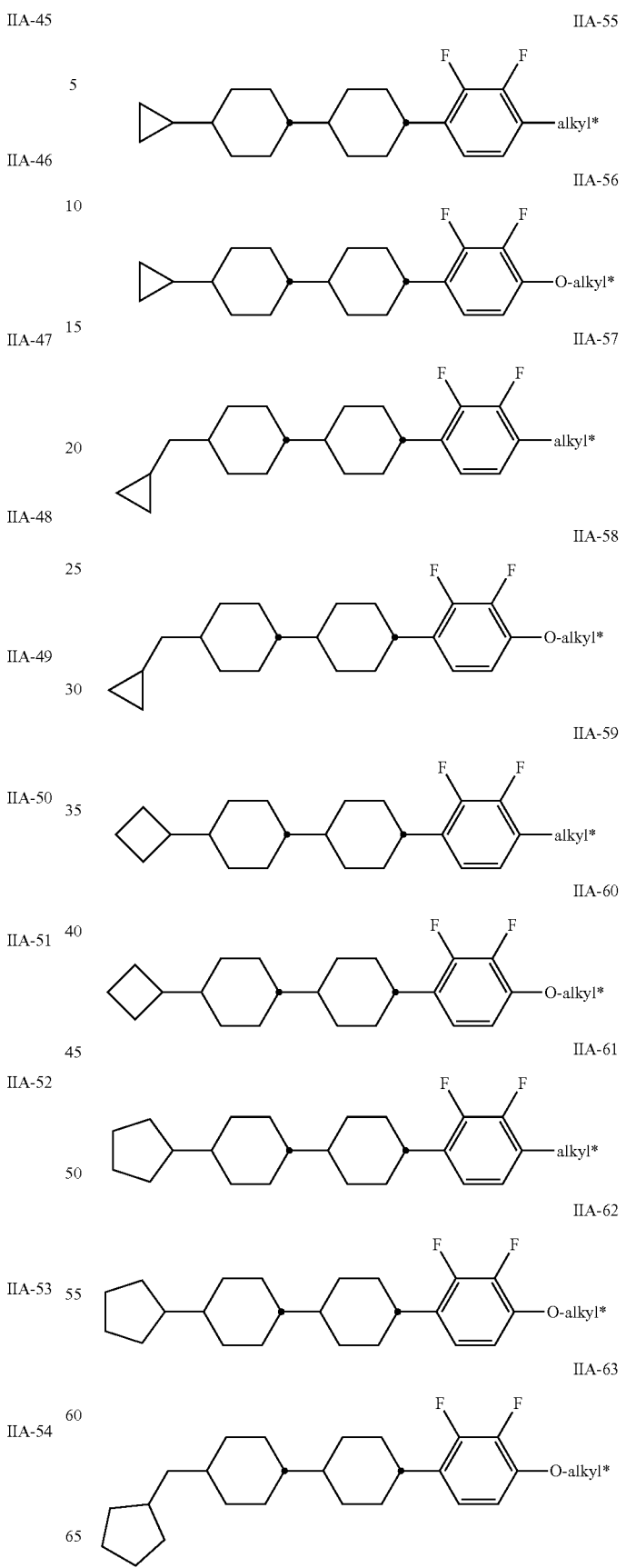

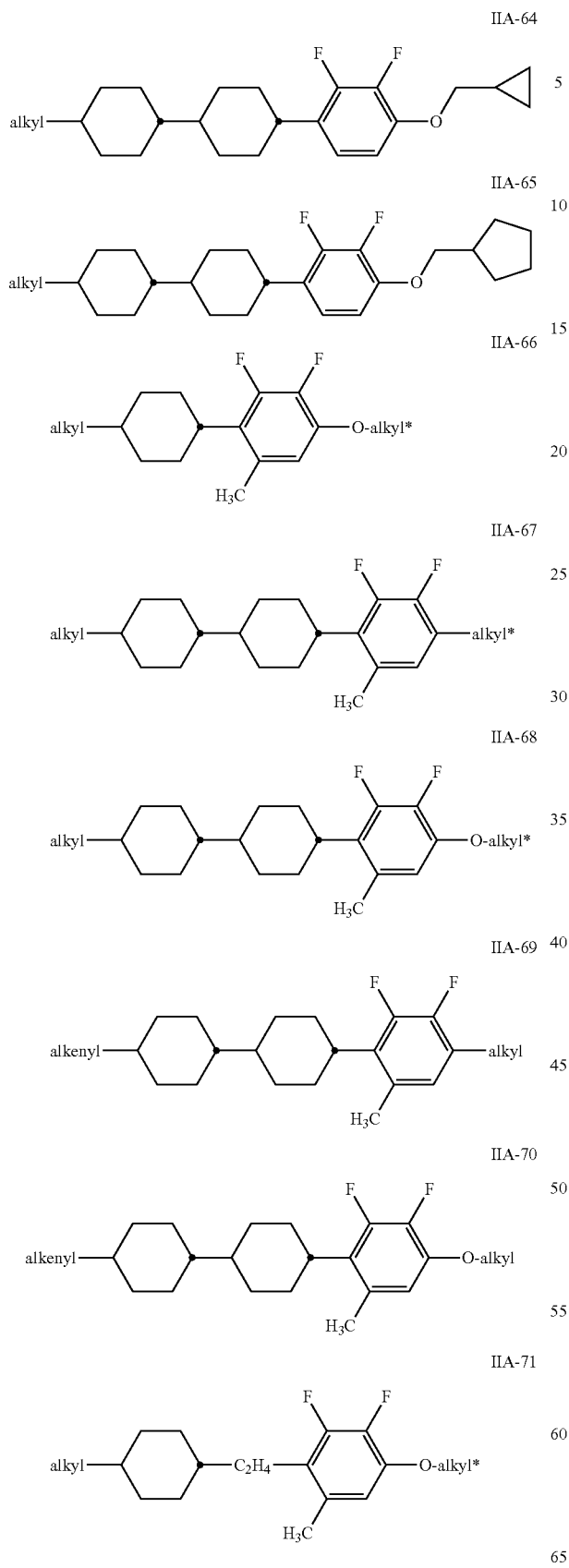

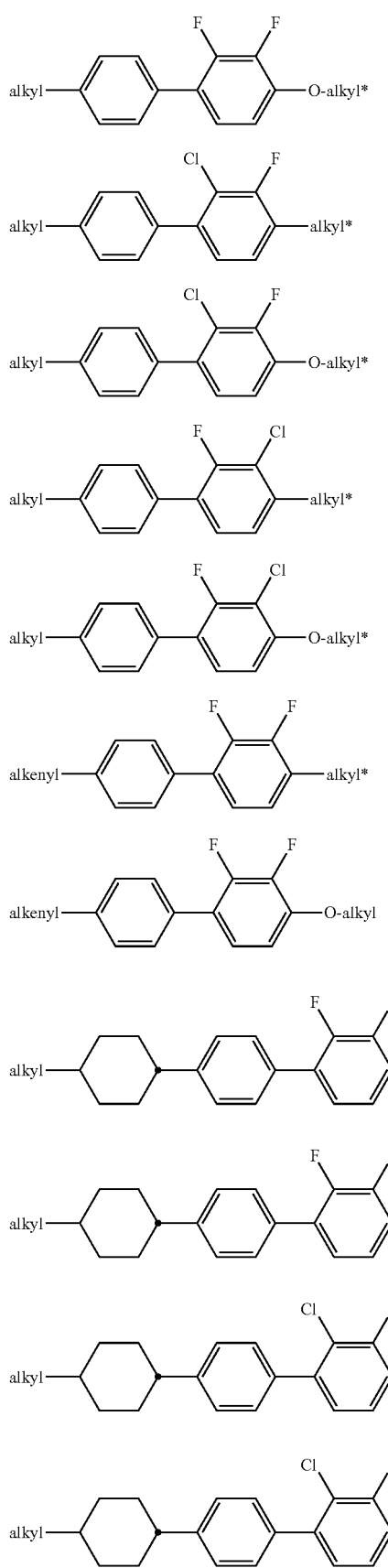
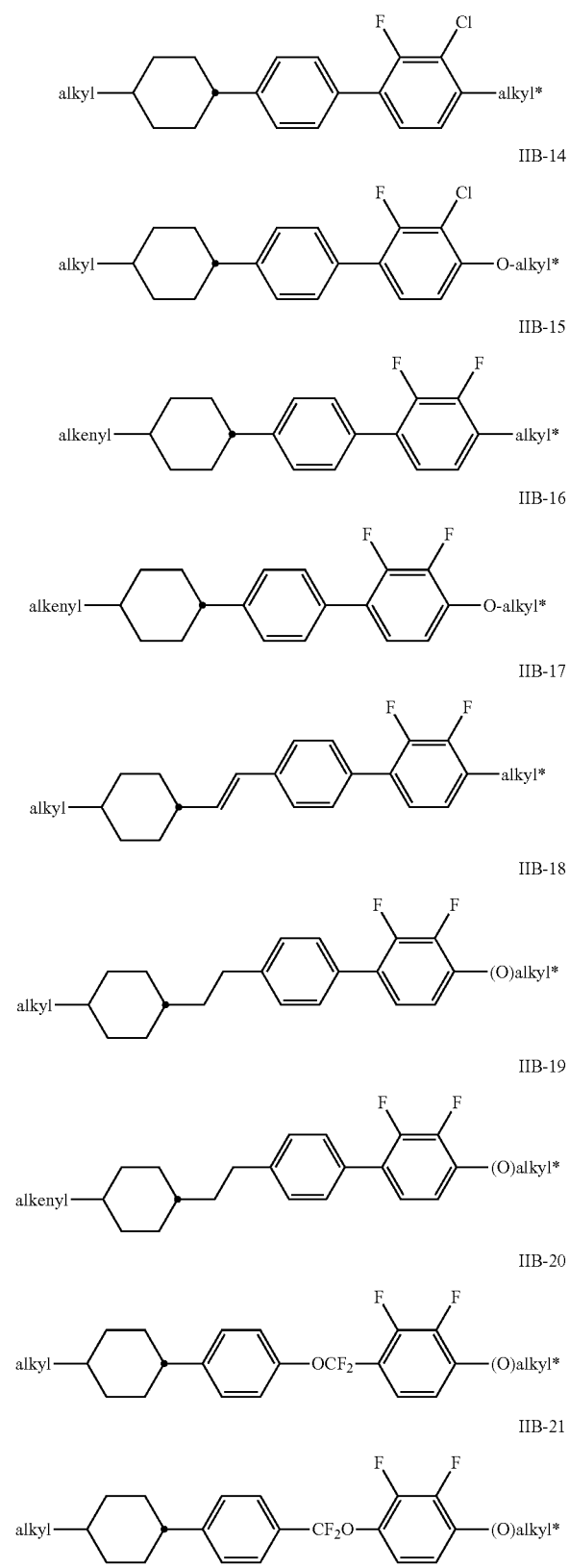

IIB-22
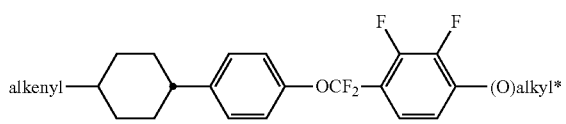
IIB-23
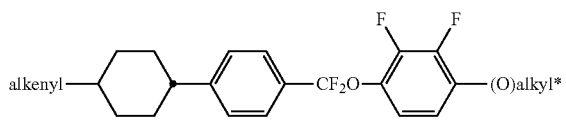
IIB-24
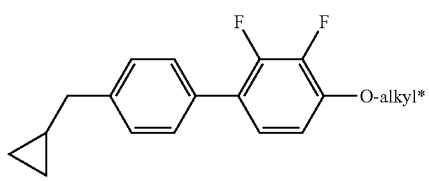
IIB-25
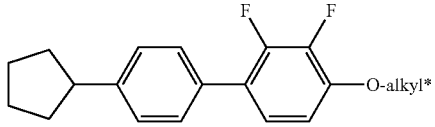
IIB-26
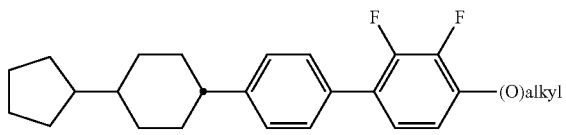
IIB-27
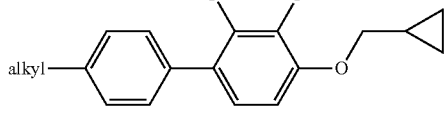
IIB-28
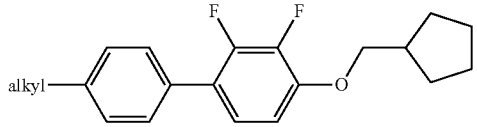
IIB-29
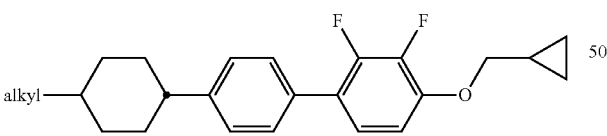
IIB-30
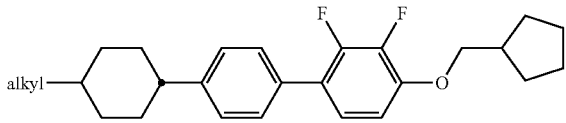
IIC-1
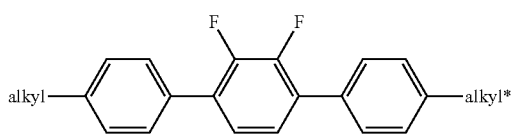
IID-1
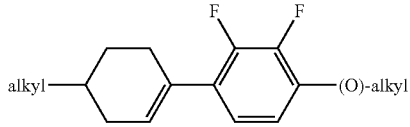
IID-2
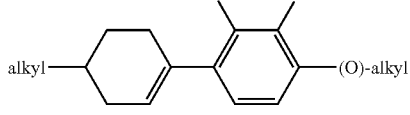
IID-3
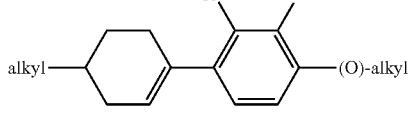
IID-4
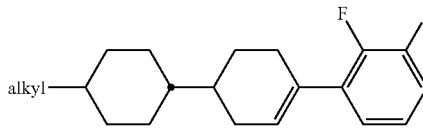
IID-5
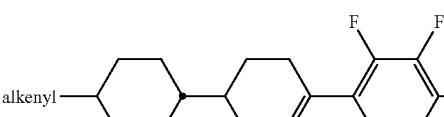
IID-6
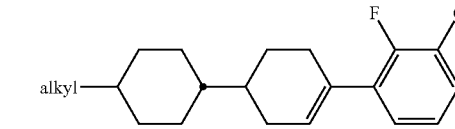
IID-7
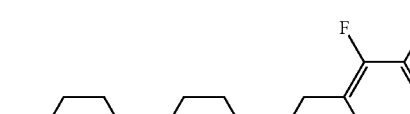
IID-8
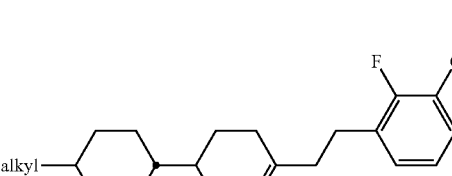
IID-9
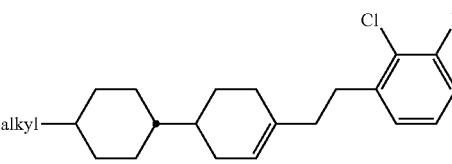

IID-10
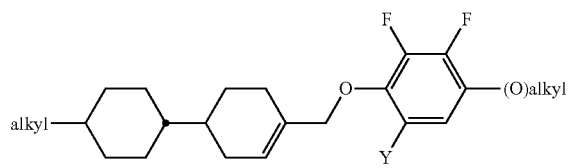

IID-11
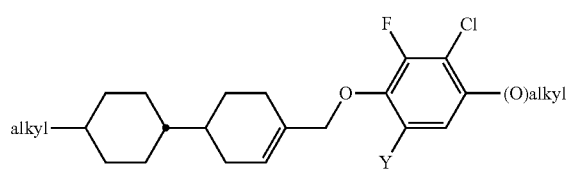

IID-12
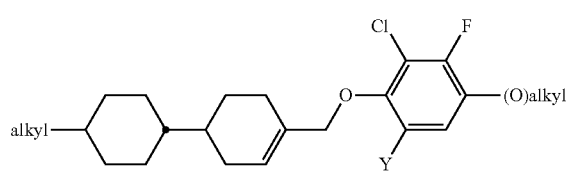

IID-13
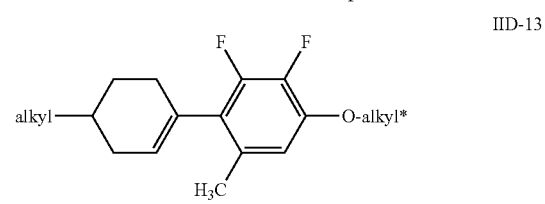

IID-14
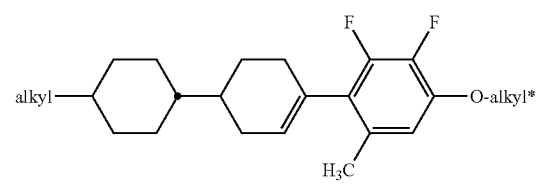

IID-15
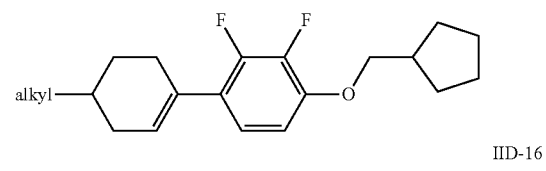

IID-16
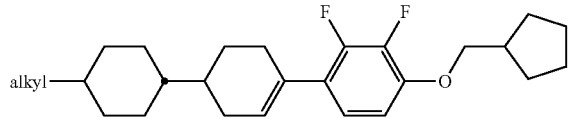

IID-17
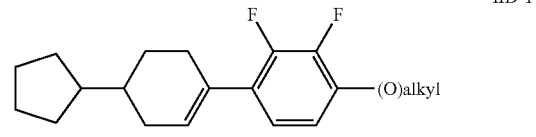

IID-18
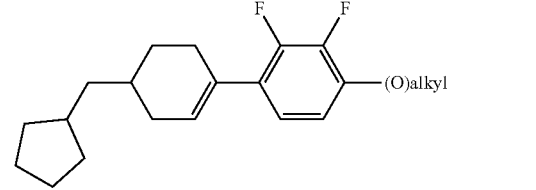

IID-19
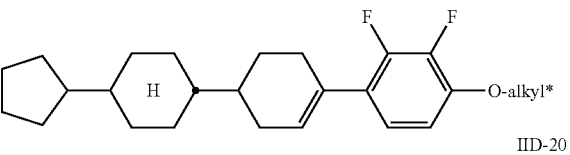

IID-20
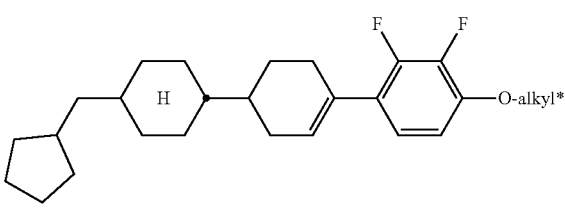

in which
a denotes 1 or 2,
alkyl and alkyl* each, independently of one another, denote a straight-chain alkyl radical having 1-6 C atoms,
alkenyl denotes a straight-chain alkenyl radical having 2-6 C atoms, and
(O) denotes an oxygen atom or a single bond.

8. The LC medium according to claim 2, wherein the third component C comprises one or more compounds selected from compounds of the following formulae, IV-1
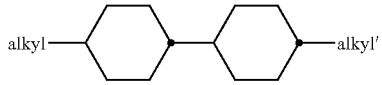

IV-2
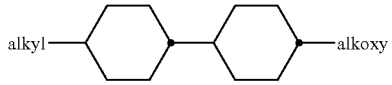

IV-3
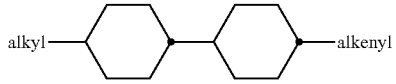

IV-4
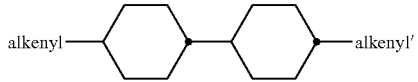

in which
alkyl and alkyl' independently of one another, denote alkyl having 1 to 7 C atoms,
alkenyl denotes an alkenyl radical having 2 to 5 C atoms,
alkenyl' denotes an alkenyl radical having 2 to 5 C atoms, and
alkoxy denotes alkoxy having 1 to 5 C atoms.

9. The LC medium according to claim 2, wherein the third component C comprises one or more compounds of formula V V

in which

R$^{51}$, R$^{52}$ independently of one another denote H, or an alkyl or alkoxy radical having 1 to 15 C atoms or an alkenyl radical having 2 to 15 C atoms, which is unsubstituted, monosubstituted by F, Cl, CN or CF$_3$ or at least monosubstituted by halogen, in which one or more CH$_2$ groups may be replaced by —O—, —S—, —C≡C—, —CF$_2$O—, —OCF$_2$—, —OC—O—, —O—CO—

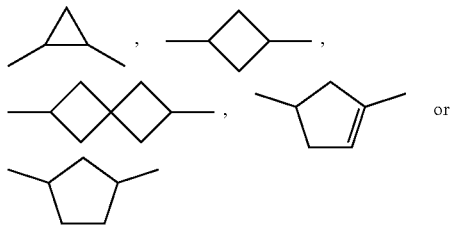

in such a way that O atoms are not linked directly to one another,

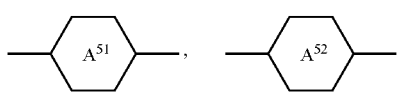

identically or differently, denote

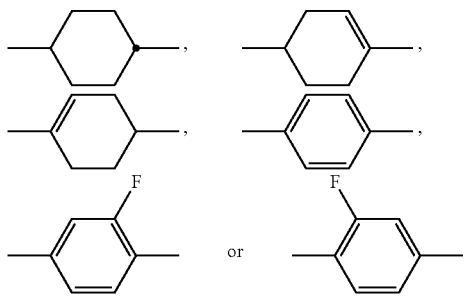

Z$^{51}$, Z$^{52}$ each, independently of one another, denote —CH$_2$—CH$_2$—, —CH$_2$—O—, —CH═CH—, —C≡C—, —COO— or a single bond, and n is 1 or 2.

10. The LC medium according to claim 2, wherein the third component C comprises one or more compounds of formula V-3

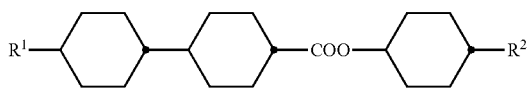

V-3 in which

R$^1$ and R$^2$ independently of one another denote H, or an alkyl or alkoxy radical having 1 to 15 C atoms or an alkenyl radical having 2 to 15 C atoms, which is unsubstituted, monosubstituted by F, Cl, CN or CF$_3$ or at least monosubstituted by halogen, in which one or more CH$_2$ groups may be replaced by —O—, —S—, —C≡C—, —CF$_2$O—, —OCF$_2$—, —OC—O—, —O—CO—

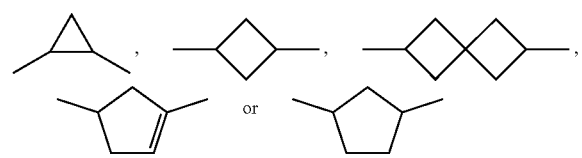

in such a way that O atoms are not linked directly to one another.

11. The LC medium according to claim 2, wherein the total proportion of component A in the LC medium is 8 to 50%, the total proportion of component B in the LC medium is 15 to 70%, and the total proportion of component C in the LC medium is 5 to 65% by weight.

12. The LC medium according to claim 1, which shows planar or homeotropic alignment.

13. An optical retarder or optical compensator comprising a layer of the LC medium according to claim 1.

14. The optical retarder or optical compensator according to claim 13, which comprises two transparent, plane parallel substrates between which is provided a layer of said LC medium, wherein each of the substrates is optionally equipped with an alignment layer, and is optionally not equipped with an electrode layer, at the side facing the layer of the LC medium.

15. The optical retarder or optical compensator according to claim 13, which is a +A plate or +C plate retarder.

16. The LC medium according to claim 1, which has a dielectric anisotropy Δε of −0.1 to +0.1.

17. An optical, electrooptical or electronic component or device comprising the LC medium according to claim 1 or comprising an optical retarder or optical compensator comprising a layer of said LC medium.

18. The component of claim 17, which is selected from the group consisting of optical retardation films, polarizers, compensators, beam splitters, reflective films, antistatic protection sheets, electromagnetic interference protection sheets, polarization controlled lenses, autostereoscopic 3D displays, IR reflection films, window applications, spatial light modulators, and lenses for light guides, focusing or optical effects.

19. The device of claim 17, which is selected from LC displays, autostereoscopic 3D displays, OLEDs, optical data storage devices, goggles for AR/VR applications and smart windows.

20. The LC medium according to claim 1, which has a dielectric anisotropy Δε of −0.05 to 0.05.

* * * * *